(12) United States Patent
Yamasaki et al.

(10) Patent No.: US 8,957,557 B2
(45) Date of Patent: Feb. 17, 2015

(54) DRIVE APPARATUS

(75) Inventors: Masashi Yamasaki, Obu (JP); Hideki Kabune, Nagoya (JP); Atsushi Furumoto, Nukata-gun (JP)

(73) Assignee: Denso Corporation, Kariya (JP)

(*) Notice: Subject to any disclaimer, the term of this patent is extended or adjusted under 35 U.S.C. 154(b) by 499 days.

(21) Appl. No.: 13/380,321

(22) PCT Filed: Jun. 23, 2010

(86) PCT No.: PCT/JP2010/004156
§ 371 (c)(1),
(2), (4) Date: Dec. 22, 2011

(87) PCT Pub. No.: WO2010/150527
PCT Pub. Date: Dec. 29, 2010

(65) Prior Publication Data
US 2012/0098366 A1 Apr. 26, 2012

(30) Foreign Application Priority Data

Jun. 24, 2009 (JP) ................................. 2009-149650
Jan. 26, 2010 (JP) ................................. 2010-014393
May 21, 2010 (JP) ................................. 2010-117686

(51) Int. Cl.
| H02K 11/00 | (2006.01) |
| B62D 5/04 | (2006.01) |
| H02K 5/22 | (2006.01) |
| H02K 9/22 | (2006.01) |
| H02K 3/50 | (2006.01) |

(52) U.S. Cl.
CPC .......... *H02K 11/0073* (2013.01); *B62D 5/0406* (2013.01); *H02K 5/225* (2013.01); *H02K 9/22* (2013.01); *H02K 3/50* (2013.01)
USPC ......................................... 310/68 D; 310/72

(58) Field of Classification Search
USPC .................................. 310/68 D, 89, 68 B, 72
See application file for complete search history.

(56) References Cited

U.S. PATENT DOCUMENTS

| 4,773,829 A | 9/1988 | Vettori |
| 4,988,905 A | 1/1991 | Tolmie, Jr. |

(Continued)

FOREIGN PATENT DOCUMENTS

| JP | 3-89837 | 4/1991 |
| JP | 9-123929 | 5/1997 |

(Continued)

OTHER PUBLICATIONS

Office Action (12 pgs.) dated May 13, 2014 issued in co-pending U.S. Appl. No. 13/379,096.

(Continued)

*Primary Examiner* — Dang Le
(74) *Attorney, Agent, or Firm* — Nixon & Vanderhye PC

(57) ABSTRACT

An electronic control unit (50, 70) including semiconductor modules (501 to 506) and capacitors (701 to 706) is disposed in the axial direction of a motor (30). The semiconductor modules (501 to 506) are placed longitudinally and brought into contact with a heat sink (601). The vertical line to each of surfaces of semiconductor chips included in the semiconductor modules (501 to 506) is perpendicular to the axial line of the motor (30). Accordingly, the capacitors (701 to 706) are disposed so that at least a part of the capacitors (701 to 706) overlap the semiconductor modules (501 to 506) and heat sink (601) in the axial direction of the motor (30).

20 Claims, 95 Drawing Sheets

(56) References Cited

U.S. PATENT DOCUMENTS

| | | | |
|---|---|---|---|
| 5,406,154 | A | 4/1995 | Kawaguchi et al. |
| 5,500,563 | A | 3/1996 | Kawaguchi et al. |
| 5,552,988 | A | 9/1996 | Kawaguchi et al. |
| 5,932,942 | A | 8/1999 | Patyk et al. |
| 5,952,751 | A | 9/1999 | Yamakoshi et al. |
| 6,081,056 | A | 6/2000 | Takagi et al. |
| 6,577,030 | B2 | 6/2003 | Tominaga et al. |
| 6,593,674 | B2 | 7/2003 | Sanchez et al. |
| 6,704,201 | B2 | 3/2004 | Kasuga |
| 7,207,187 | B2 | 4/2007 | Funahashi et al. |
| 8,299,664 | B2 | 10/2012 | Iwai et al. |
| 8,710,705 | B2 * | 4/2014 | Yamasaki et al. ............ 310/68 D |
| 2002/0060105 | A1 | 5/2002 | Tominaga et al. |
| 2003/0047304 | A1 | 3/2003 | Kasuga |
| 2004/0090130 | A1 | 5/2004 | Kaneko et al. |
| 2005/0167183 | A1 | 8/2005 | Tominaga et al. |
| 2006/0208582 | A1 | 9/2006 | Marioni |
| 2006/0261689 | A1 | 11/2006 | Natsuhara et al. |
| 2008/0106160 | A1 | 5/2008 | Yoshinari et al. |
| 2008/0127463 | A1 | 6/2008 | Zhao et al. |
| 2010/0225307 | A1 | 9/2010 | Takahashi |
| 2011/0286185 | A1 | 11/2011 | Abe et al. |
| 2012/0104886 | A1 | 5/2012 | Yamasaki et al. |

FOREIGN PATENT DOCUMENTS

| | | |
|---|---|---|
| JP | 10-234158 | 9/1998 |
| JP | 10-322973 | 12/1998 |
| JP | 2000-174203 | 6/2000 |
| JP | 2002-120939 | 4/2002 |
| JP | 2002-345211 | 11/2002 |
| JP | 2005-73373 | 3/2005 |
| JP | 2005-073392 | 3/2005 |
| JP | 2005-176451 | 6/2005 |
| JP | 2007-288929 | 11/2007 |
| JP | 2008-29093 | 2/2008 |
| JP | 2008-141881 | 6/2008 |
| JP | 2008-270293 | 11/2008 |
| JP | 2009-113526 | 5/2009 |

OTHER PUBLICATIONS

Advisory Action (3 pages) dated Jun. 11, 2014 issued in co-pending U.S. Appl. No. 13/380,309.
Office Action (7 pages) dated May 21, 2014, issued in corresponding Chinese Application No. 201080028284.5 and English translation (9 pages).
U.S. Appl. No. 13/379,096, M. Yamasaki et al., filed Dec. 19, 2011.
U.S. Appl. No. 13/379,118, M. Yamasaki et al., filed Dec. 19, 2011.
U.S. Appl. No. 13/380,309, M. Yamasaki et al., filed Dec. 22, 2011.
U.S. Appl. No. 13/336,492, M. Yamasaki et al., filed Dec. 23, 2011.
Office Action (8 pages) dated Jun. 4, 2013, issued in copending Chinese Application No. 201080028216.9 and English translation (14 pages).
Office Action (14 pgs.) dated Aug. 14, 2013 issued in co-pending U.S. Appl. No. 13/336,492.
Office Action (12 pages) dated Oct. 18, 2013, issued in copending U.S. Appl. No. 13/380,309.
Office Action (2 pages) dated Nov. 14, 2013, issued in corresponding Japanese Application No. 2010-117684 and English translation (3 pages).
Office Action (5 pages) dated Jul. 25, 2014, issued in corresponding Chinese Application No. 201210013678.4 and English translation (11 pages).
Office Action (8 pages) dated Mar. 4, 2013, issued in copending U.S. Appl. No. 13/336,492.
Office Action (17 pages) dated Apr. 16, 2014, issued in corresponding Chinese Application No. 201080028286.4 and English translation (29 pages).
Office Action (6 pages) dated Jun. 4, 2014, issued in corresponding Chinese Application No. 201080028288.3 and English translation (11 pages).
International Search Report for PCT/JP2010/004156, mailed Sep. 28, 2010.
Written Opinion of the International Searching Authority for PCT/JP2010/004156, mailed Sep. 28, 2010.
Office Action (7 pages) dated Dec. 24, 2013, issued in corresponding Chinese Application No. 201210013678.4 and English translation (13 pages).
Office Action (2 pages) dated Jul. 19, 2013, issued in copending Japanese Application No. 2010-117683 and English translation (3 pages).
Office Action (3 pages) dated Jul. 19, 2013, issued in copending Japanese Application No. 2010-117684 and English translation (4 pages).
Office Action (2 pages) dated Jul. 19, 2013, issued in copending Japanese Application No. 2010-117685 and English translation (3 pages).
Office Action (2 pages) dated Jul. 19, 2013, issued in copending Japanese Application No. 2010-117686 and English translation (3 pages).
Office Action (14 pages) dated Feb. 28, 2014, issued in copending U.S. Appl. No. 13/380,309.
Office Action (11 pages) dated Sep. 25, 2014, issued in co-pending U.S. Appl. No. 13/379,096 to Yamasaki, filed Dec. 19, 2011.
Office Action (13 pages) dated Sep. 10, 2014 issued in co-pending U.S. Appl. No. 13/379,118 to Yamasaki, filed Dec. 19, 2011.
Office Action (2 pages) dated Sep. 30, 2014 issued in corresponding Japanese Application No. 2013-254922 and English translation (2 pages).

* cited by examiner

DRIVE APPARATUS

CROSS REFERENCE TO RELATED APPLICATIONS

This application is the U.S. national phase of International Application No. PCT/JP2010/004156 filed on Jun. 23, 2010, which designated the U.S. and claims priority to Japanese Patent Applications No. 2009-149650 filed on Jun. 24, 2009, No. 2010-14393 filed on Jan. 26, 2010 and No. 2010-117686 filed on May 21, 2010, the disclosures of each of which are incorporated herein by reference.

TECHNICAL FIELD

The present invention relates to a drive apparatus, which has an electric motor and an electronic control unit for controlling driving of the electric motor.

BACKGROUND ART

In recent years, as a mechanism for assisting operation of a steering wheel of a vehicle, an electric power steering (EPS) system that electrically generates torque is used. In the EPS system, unlike a hydraulic system, only when a driver's steering operation is performed, the vehicle steering operation is assisted. Therefore, the EPS system provides many advantages such as low fuel consumption.

As a motor serving as a torque generation source of the EPS system, a brushless motor that is driven to rotate by applying, for example, a three-phase alternating current is used. When such a brushless motor is used, it is necessary to produce an alternating current (AC) output, which is out of phase with a direct current (DC) output of a predetermined voltage (for example, 12V), so as to supply winding currents, which are out of phase with one another, to coils of plural phases (for example, three phases). This necessitates an electronic control unit for switching the coil currents of the motor. The electronic control unit includes semiconductor modules that implement a switching function.

In a conventional EPS system drive apparatus, an electronic control unit is disposed near a motor. For example, semiconductor modules are disposed in an axial direction of the motor (patent documents No. 1 and No. 2) or disposed around a stator included in the motor (patent document No. 3).

PRIOR ART DOCUMENT

Patent Document

Patent document No. 1: JP-A-H10-234158
Patent document No. 2: JP-A-H10-322973
Patent document No. 3: JP-A-2004-159454
Patent document No. 4: JP-A-2002-120739

In an EPS system, a relatively large motor is employed in order to provide sufficient torque. Therefore, the physical configuration of the semiconductor modules gets larger. In addition, capacitors of a large physical configuration (for example, aluminum electrolytic capacitors) are generally included in the electronic control unit for the purpose of preventing semiconductor chips from being broken by a surge voltage generated due to switching operation.

However, aside from the EPS system, various systems are incorporated in a vehicle these days. Therefore, a space wide enough to install the various systems is needed. The motor of the EPS system is therefore requested to be compact.

From this viewpoint, a motor described in, for example, patent document No. 1 or 2, semiconductor modules and capacitors are juxtaposed in an axial direction of the motor. As a result, the physical configuration in the axial direction of the motor gets larger.

In a motor described in patent document No. 3, semiconductor modules are disposed around a stator. Therefore, the physical configuration in the axial direction of the motor is small, but the physical configuration in a radial direction of the motor is large. In addition, under a situation in which, for example, cylindrical capacitors have to be employed, though a smoothing capacitor is of a flat type, the physical configuration in the radial direction gets further larger.

SUMMARY OF INVENTION

It is therefore an object of the present invention to provide a small-sized drive apparatus having a built-in electronic control unit.

A drive apparatus according to the present invention includes a motor, a heat sink, and an electronic control unit. The motor includes a cylindrical motor case that forms an outer periphery, a stator that is disposed on the radially inner side of the motor case, and has windings wound about it to form plural phases, a rotor disposed on the radially inner side of the stator, and a shaft that rotates together with the rotor. The heat sink is extended in the same direction as the center line direction of the shaft from an end wall of the motor case. The electronic control unit is disposed on the heat sink side of the motor case in the center line direction, and perform control of drive of the motor. The electronic control unit includes semiconductor modules that include semiconductor chips for switching winding currents which flow through the windings of plural phases, and that is placed longitudinally to be directly or indirectly in contact with a side wall surface of the heat sink so that the vertical line to each semiconductor chip surface is non-parallel to the center line of the shaft. In addition, the electronic control unit includes capacitors connected in parallel between a line from supplying sides of the semiconductor modules to a power supply, and a line from grounding sides of the semiconductor modules to a ground. In the center line direction, at least parts of respective ranges of dispositions of the semiconductor modules, the heat sink and the capacitors overlap one another.

DESCRIPTION OF EMBODIMENTS

Figure 1:
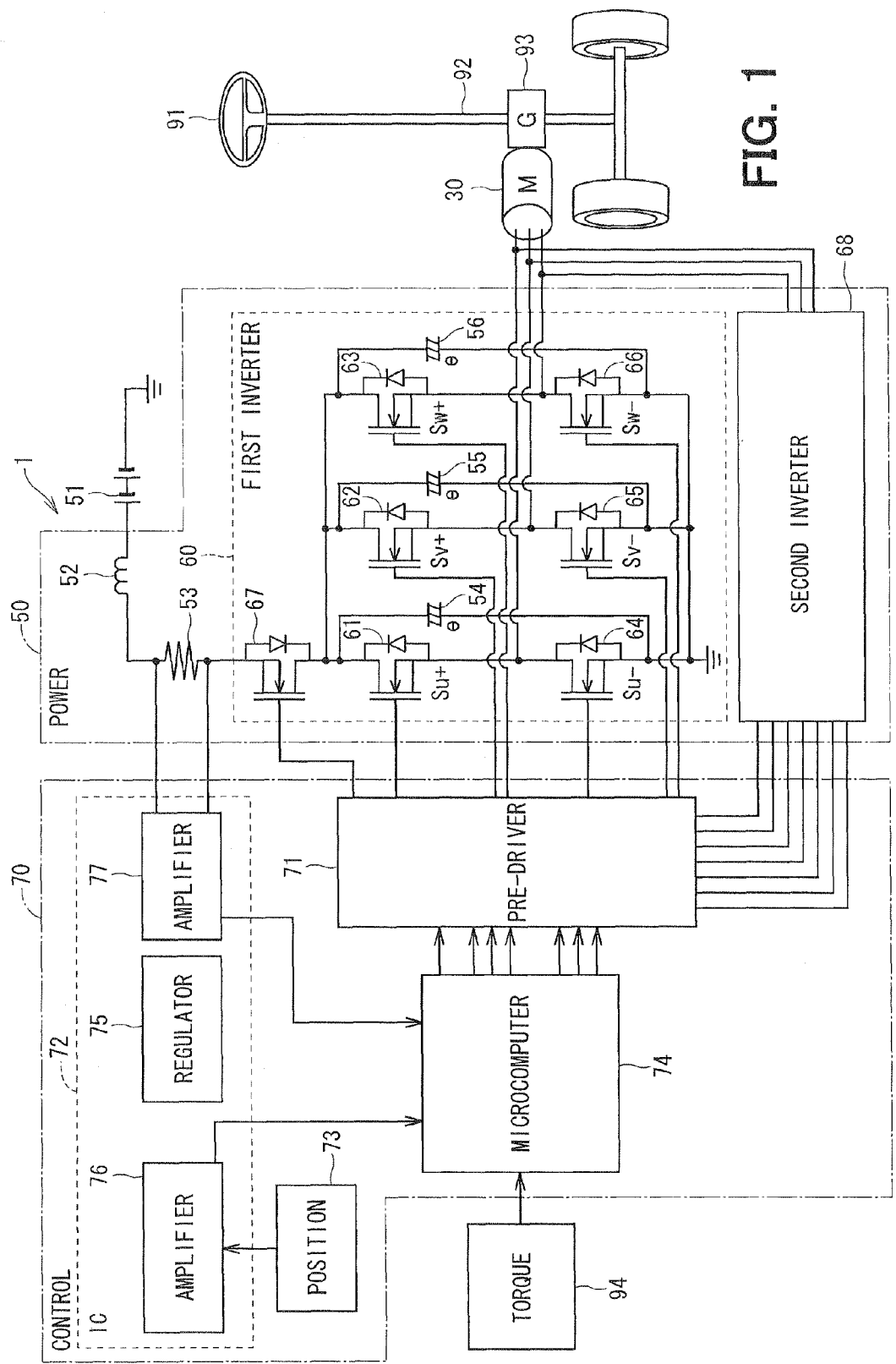
FIG. 1 is a block diagram showing an electric power steering system using a drive apparatus according to a first embodiment of the present invention.

Embodiments of a drive apparatus having a built-in electronic control unit according to the present invention will be described below with reference to the accompanying drawings. In each of the following embodiments, the same or equivalent reference number is added to the same or equivalent parts in the drawings.

First Embodiment

A drive apparatus 1 according to a first embodiment includes, as shown in FIG. 1, a motor 30, a power circuit 50, and a control circuit 70. The drive apparatus 1 generates rotation torque on a column shaft 92 via a gear 93 fixed to the column shaft 92 that is a rotation shaft of a steering wheel 91 of a vehicle, and assists steering operation of the steering wheel 91. More particularly, when the steering wheel 91 is manipulated by a driver, a steering torque occurring on the column shaft 92 due to the manipulation is detected by a torque sensor 94. In addition, vehicle speed information is acquired over a controller area network (CAN) in order to assist in the driver's steering operation by the steering wheel 91. When this kind of mechanism is utilized, not only steering can be assisted but also manipulations of the steering wheel 91 for keeping of a lane on an expressway, guiding to a parking space in a parking lot, and other operations can be automatically controlled, though it depends on a control technique.

The motor 30 is a brushless motor that rotates the gear 93 in forward and reverse directions. It is the power circuit 50 that feeds power to the motor 30. The power circuit 50 includes a choke coil 52 that exists on a power line led from a power supply 51, a shunt resistor 53, and two inverter circuits 60 and 68.

The inverter circuit 60 includes seven metal-oxide semiconductor field-effect transistors (MOSFETs) 61, 62, 63, 64, 65, 66, and 67 that are one type of field-effect transistors. The MOSFETs 61 to 67 are switching elements. More particularly, depending on a potential at a gate, a source-drain path is turned on (conduction) or off (non-conduction). The other inverter circuit 68 has the same configuration as the inverter circuit 60. Therefore, only the inverter circuit 60 will be described below.

Hereinafter, the MOSFETs 61 to 67 shall be denoted simply as FETs 61 to 67. The FET 67 located closest to the shunt resistor 53 is provided for protection from reverse connection. Specifically, when the power supply is erroneously connected, the FET 67 prevents a reverse current from flowing.

The drains of the three FETs 61 to 63 are connected on the side of a power line. The sources of the FETs 61 to 63 are connected to the drains of the three remaining FETs 64 to 66. Further, the sources of the FETs 64 to 66 are connected to a ground. The gates of the six FETs 61 to 66 are connected to six output terminals of a pre-driver circuit 71 that will be described later. Nodes between pairs of upper and lower FETs 61 to 66 in FIG. 1 are connected to a U-phase coil, a V-phase coil, and a W-phase coil of the motor 30, respectively.

When the FETs 61 to 66 have to be discriminated from one another, the reference numerals in FIG. 1 are used to denote the FETs as the FET(Su+) 61, FET(Sv+) 62, FET(Sw+) 63, FET(Su−) 64, FET(Sv−) 65, and FET(Sw−) 66.

Between the power line for the FET(Su+) 61 and the ground for the FET(Su−) 64, an aluminum electrolytic capacitor 54 is connected in parallel. Likewise, between the power line for the FET(Sv+) 62 and the ground for the FET (Sv−) 65, an aluminum electrolytic capacitor 55 is connected in parallel. Between the power line for the FET(Sw+) 63 and the ground for the FET(Sw−) 66, an aluminum electrolytic capacitor 56 is connected in parallel.

The control circuit 70 includes the pre-driver circuit 71, a custom IC 72, a position sensor 73 and a microcomputer 74. The custom IC 72 includes as functional blocks a regulator circuit 75, a position sensor signal amplifier circuit 76, and a detection voltage amplifier circuit 77.

The regulator circuit 75 is a stabilization circuit that stabilizes power. The regulator circuit 75 stabilizes power to be supplied to the respective components. For example, the microcomputer 74 operates with a stable predetermined line voltage (for example, 5V) owing to the regulator circuit 75.

A signal sent from the position sensor 73 is inputted to the position sensor signal amplifier circuit 76. The position sensor 73 outputs, as described later, a rotational position signal of the motor 30. The position sensor signal amplifier circuit 76 amplifies the rotational position signal and outputs the resultant signal to the microcomputer 74.

The detection voltage amplifier circuit 77 detects a voltage across the shunt resistor 53 included in the power circuit 50, amplifies the voltage, and outputs the resultant voltage to the microcomputer 74.

Therefore, the rotational position signal of the motor 30 and the voltage across the shunt resistor 53 are inputted to the microcomputer 74. To the microcomputer 74, a steering torque signal is inputted from the torque sensor 94 attached to the column shaft 92. Further, to the microcomputer 74, vehicle speed information is inputted over a CAN.

When the steering signal and vehicle speed information are inputted to the microcomputer 74, the microcomputer 74 controls the first inverter circuit 60 via the pre-driver circuit 71 in response to a rotational position signal so as to assist in steering by the steering wheel 91 according to a vehicle speed. The control of the inverter circuit 60 is achieved by turning on or off the FETs 61 to 66 via the pre-driver circuit 71. Specifically, since the gates of the six FETs 61 to 66 are connected to the six output terminals of the pre-driver circuit 71, the gate potentials are varied by the pre-driver circuit 71.

Based on the voltage across the shunt resistor 53 inputted from the detection voltage amplifier circuit 77, the microcomputer 74 controls the inverter circuit 60 so as to approximate a current, which is supplied to the motor 30, to a sine wave.

For the foregoing control of the inverter circuit 60, the choke coil 52 reduces noise caused by the power supply 51. The capacitors 54 to 56 store charge so as to aid power feed to the FETs 61 to 66 or suppress a noise component such as a surge voltage. Since the FET 67 for reverse connection protection is included, even when the power supply is incorrectly connected, the capacitors 54 to 56 will not be damaged.

As described above, the power circuit 50 and control circuit 70 are provided for controlling drive of the motor 30. The power circuit 50 and control circuit 70 form an electronic circuit (electronic control unit: ECU).

The output of the motor 30 to be employed in EPS is on the order of 200 W to 500 W. The percentage of an area occupied by the power circuit 50 and the control circuit 70 to the entire drive apparatus 1 is on the order of 20% to 40%. The output of the motor 30 is so large that the power circuit 50 tends to get larger in size. 70% or more of the area occupied by the power circuit 50 and the control circuit 70 is an area occupied by the power circuit 50.

Large ones out of the components of the power circuit 50 are the choke coil 52, the capacitors 54 to 56, and the FETs 61 to 67. The FETs 61 to 67 are formed as semiconductor modules.

The FET(Su+) 61 and the FET(Su−) 64 are formed as semiconductor chips, and these semiconductor chips are resin-molded to be one semiconductor module.

Further, the FET(Sv+) 62 and the FET(Sv−) 65 are formed as semiconductor chips, and these semiconductor chips are resin-molded to be one semiconductor module.

Further, the FET(Sw+) 63 and the FET(Sw−) 66 are formed as semiconductor chips, and these semiconductor chips are resin-molded to be one semiconductor module.

The first inverter circuit 60 in FIG. 1 includes three semiconductor modules. In the present embodiment, as shown in FIG. 1, a total of two inverter circuits of the first and the second inverter circuits 60 and 63 are included. This halves a current that flows into one inverter circuit 60 or 68. Due to the inclusion of the two inverter circuits 60 and 68, the present embodiment includes six semiconductor modules and six capacitors.

Figure 2:
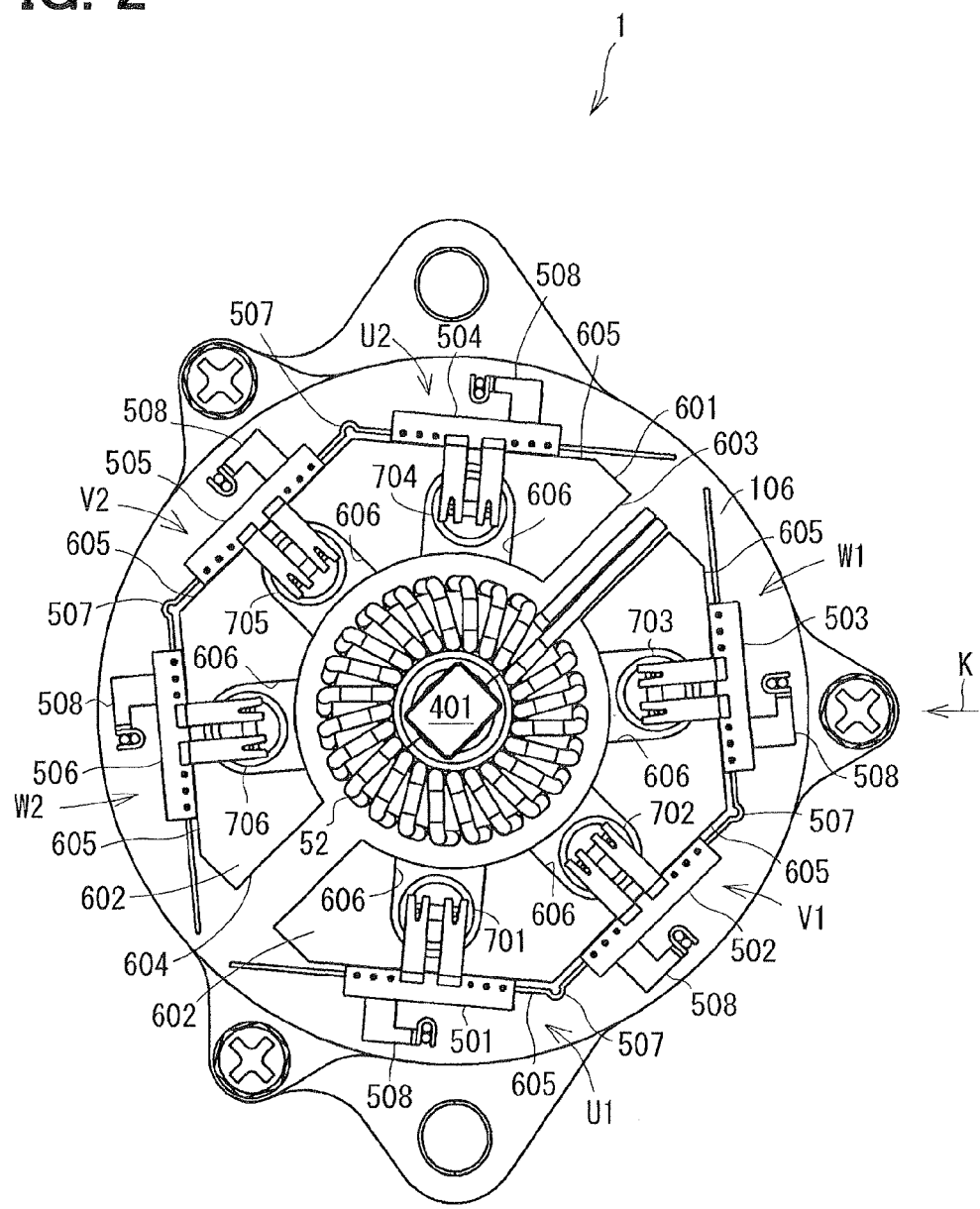
FIG. 2 is a plan view of the drive apparatus according to the first embodiment.
Figure 3:
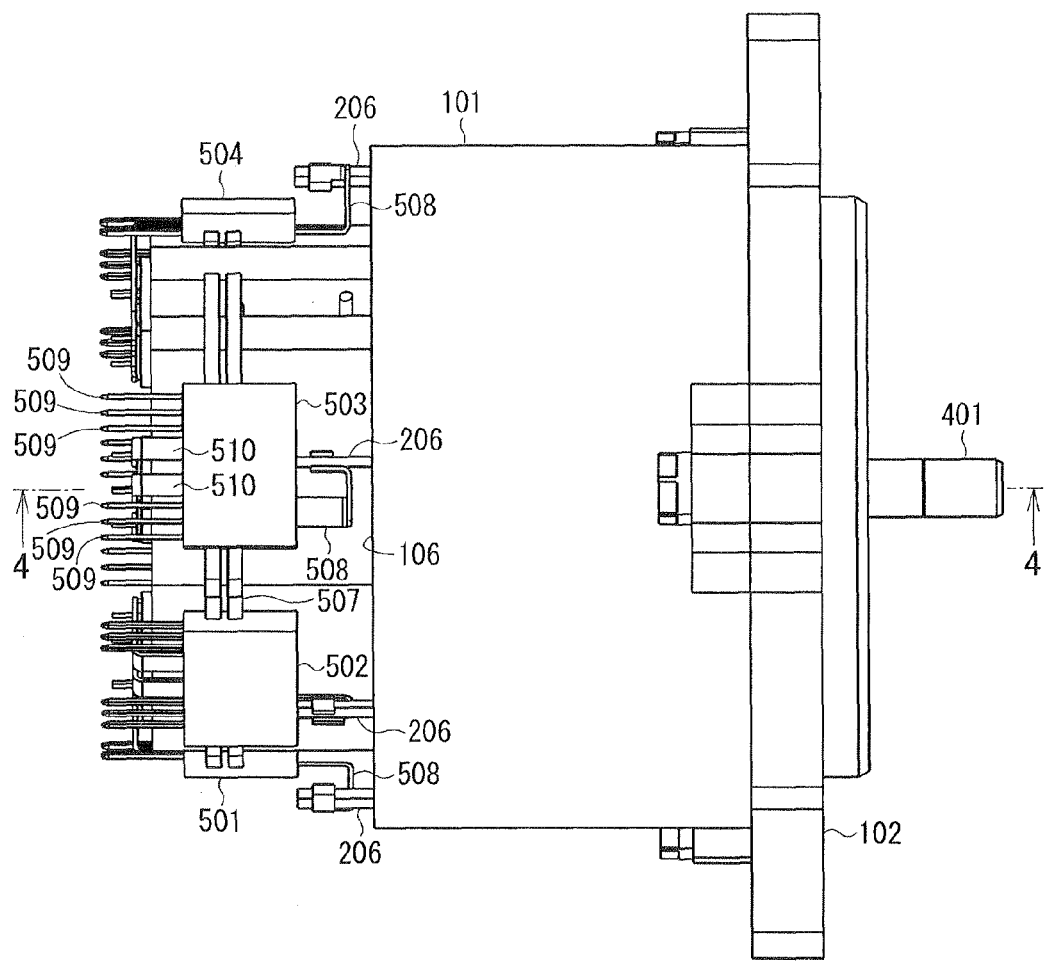
FIG. 3 is a side view of the drive apparatus according to the first embodiment.
Figure 4:
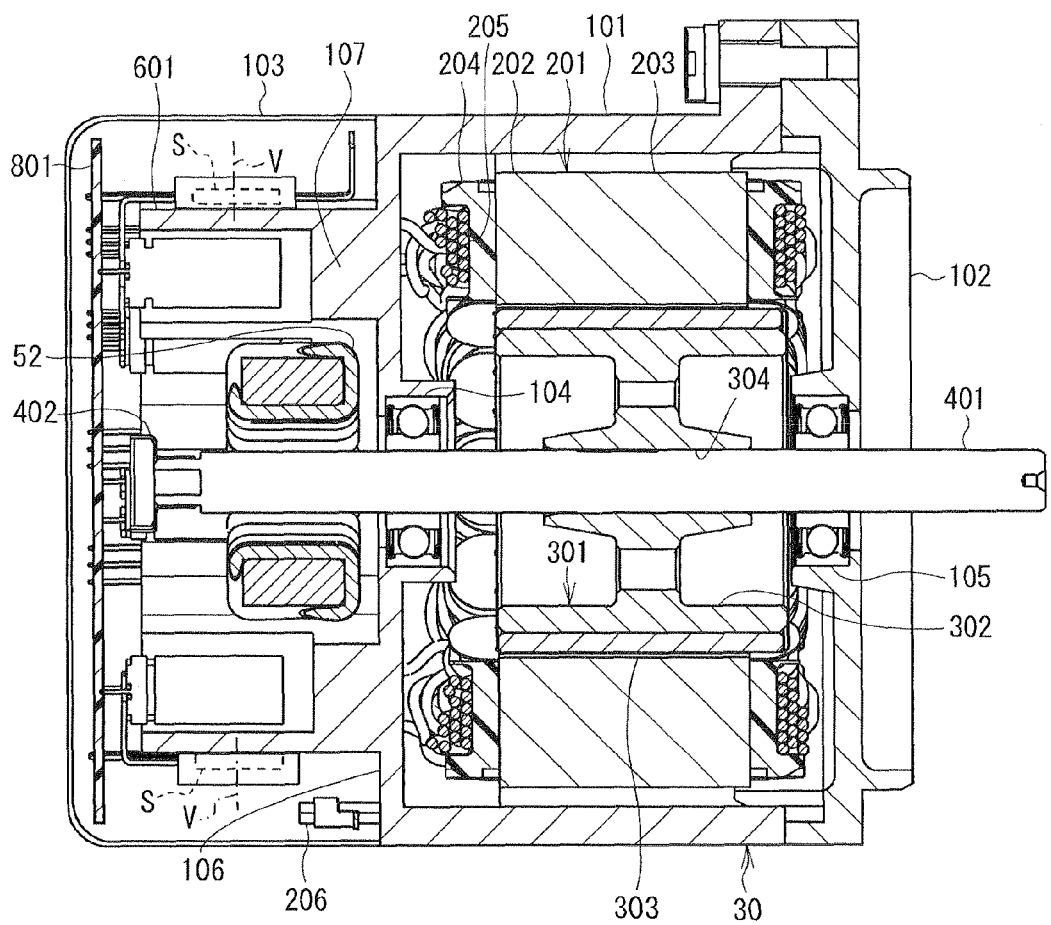
FIG. 4 is a sectional view taken along a line 4-4 in FIG. 3.
Figure 5:
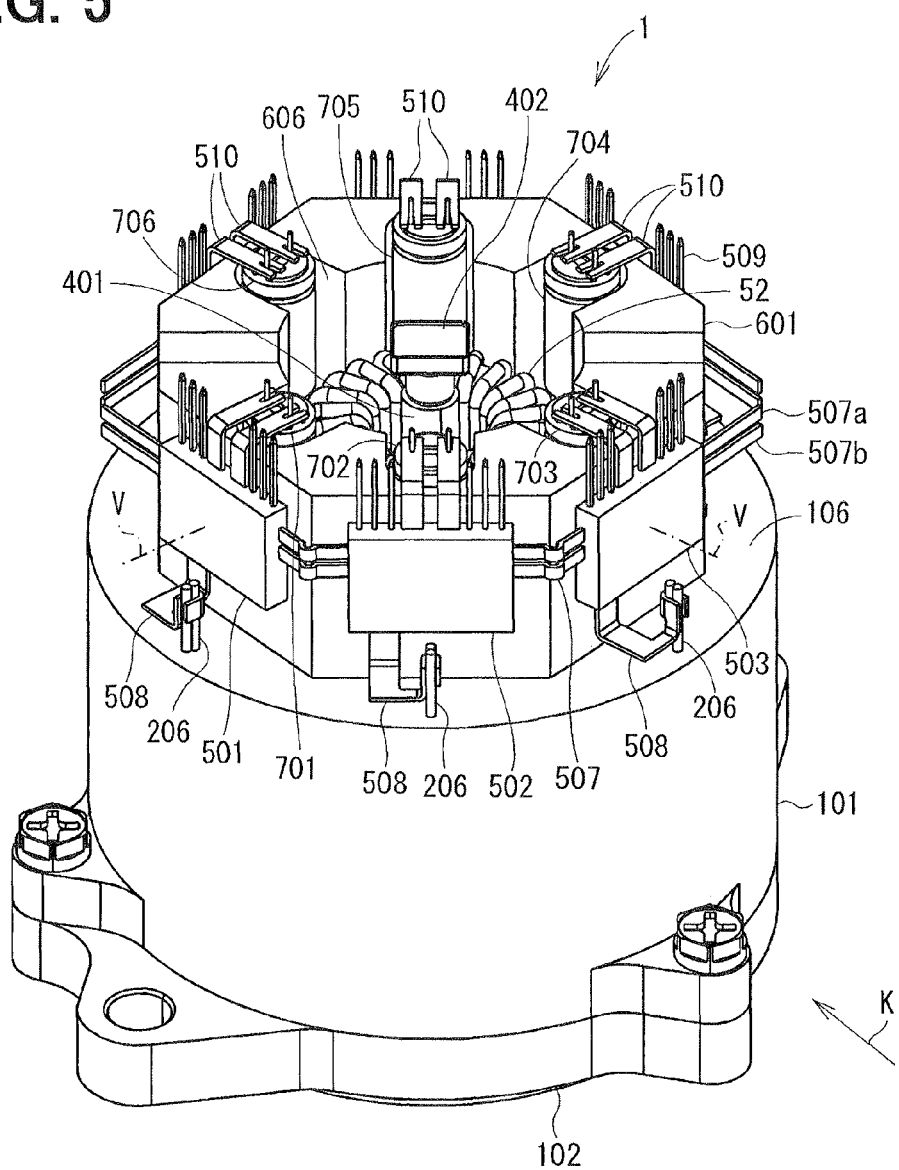
FIG. 5 is a perspective view of the drive apparatus according to the first embodiment.
Figure 6:
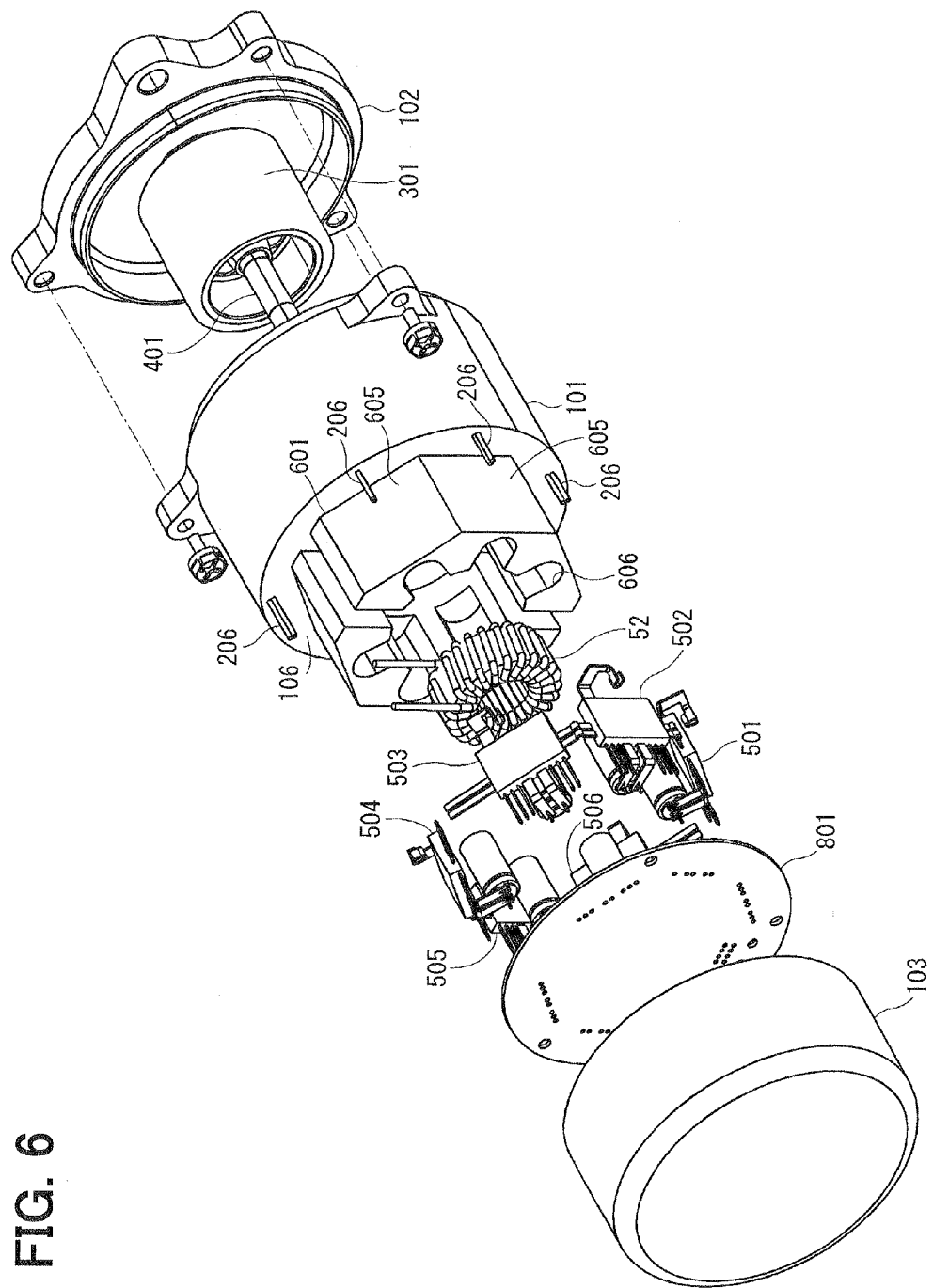
FIG. 6 is an exploded perspective view of the drive apparatus according to the first embodiment.

Next, the configuration of the drive apparatus 1 of the present embodiment will be described below. FIG. 2 is a plan view of the drive apparatus 1, FIG. 3 is a side view in which the drive apparatus is seen in an arrow direction K in FIG. 2, FIG. 4 is a sectional view taken along a line 4-4 in FIG. 3, FIG. 5 is a perspective view, and FIG. 6 is an exploded perspective view.

The drive apparatus 1 includes a cylindrical motor case 101, which defines a motor outer periphery, an end frame 102 screwed to an output end side of the motor case 101, and a bottomed cylindrical cover 103 that covers an electronic control unit.

The motor 30 includes the motor case 101, a stator 201 disposed on the radially inner side of the motor case 101, a rotor 301 disposed on the radially inner side of the stator 201, and a shaft 401 that rotates together with the rotor 301.

The stator 201 includes twelve salient poles 202 that jut out in radially inward directions of the motor case 101. The salient poles 202 are disposed at predetermined angular intervals in the circumferential direction of the motor case 101. The salient pole 202 includes a laminated iron core 203 produced by stacking thin plates made of a magnetic material, and an insulator 204 that is engaged with the axially external side of the laminated core 203. Windings 205 are wound about the insulator 204. Lead wires 206 through which current is supplied to the windings 205 are led out from six parts of the windings 205. The windings 205 function as three-phase windings for U, V, and W phases according to a mode of supplying the current to the lead wires 206. The windings 205 realize the three-phase windings for the U, V, and W phases. The lead wires 206 are led out toward the electronic control unit through six holes which are formed in an axial end of the motor case 101.

The rotor 301 is cylindrically formed with a magnetic material, for example, iron. The rotor 301 includes a rotor core 302 and permanent magnets 303 disposed on the radially outer side of the rotor core 302. The permanent magnets 303 have north poles and south poles alternately in the circumferential direction.

The shaft 401 is fitted in a shaft hole 304 formed in the axial center of the rotor core 302. The shaft 401 is borne in a rotatable manner by a bearing 104 of the motor case 101, and a bearing 105 formed on the end frame 102. Therefore, the shaft 401 is rotatable together with the rotor 301 with respect to the stator 201. Part provided with the bearing 104 is a border between the electronic control unit and motor (movable part) or is an end wall 106 of the motor case 101. The shaft 401 extends from the end wall 106 toward the electronic control unit, and has a magnet 402, which is used to detect a rotational position, at the distal end on the electronic control unit side thereof. In the vicinity of the electronic control unit-side distal end of the shaft 401, a resin-made printed circuit board 801 is disposed. The printed circuit board 801 has a position sensor 73 (FIG. 1) in the center thereof. Accordingly, the rotational position of the magnet 402, that is, the rotational position of the shaft 401 is detected by the position sensor 73.

The seven FETs 61 to 67 (FIG. 1) included in the inverter circuit 60 of the power circuit 50 are formed as three semiconductor modules. The drive apparatus 1 of the present embodiment includes two inverter circuits 60 and 68 and therefore has six semiconductor modules.

As shown in FIG. 2, the drive apparatus 1 includes six semiconductor modules 501, 502, 503, 504, 505, and 506. For discriminating the semiconductor modules 501 to 506 from one another, the reference numerals in FIG. 2 are used to denote the semiconductor modules as the U1 semiconductor module 501, V1 semiconductor module 502, W1 semiconductor module 503, U2 semiconductor module 504, V2 semiconductor module 505, and W2 semiconductor module 506 respectively.

Regarding the relationship of correspondence to FIG. 1, the U1 semiconductor module 501 includes the FETs 61 and 64 corresponding to the U phase. The V1 semiconductor module 502 includes the FETs 62 and 65 corresponding to the V phase. Further, the W1 semiconductor module 503 includes the FETs 63 and 66 corresponding to the W phase and the reverse-connection protection FET 67. Likewise, the U2 semiconductor module 504 includes the FETs 61 and 64 corresponding to the U phase and the reverse-connection protection FET 67, the V2 semiconductor module 505 includes the FETs 62 and 65 corresponding to the V phase, and the W2 semiconductor module 506 includes the FETs 63 and 66 corresponding to the W phase. Specifically, the three U1, V1, and W1 semiconductor modules 501 to 503 form the inverter circuit 60, and the three U2, V2, and W2 semiconductor modules 504 to 506 constitute the other inverter circuit 68.

The three U1 to W1 semiconductor modules 501 to 503 forming the inverter circuit 60, and the three U2 to W2 semiconductor modules 504 to 506 are interconnected through bus bars 507 to form module units. The bus bars 507 have an interconnecting function. In addition, a bus bar 507*a* farther from the motor case 101 serves as a ground, and a bus bar 507*b* closer to the motor case 101 serves as a power line (FIG. 5). Namely, power is supplied to the semiconductor modules 501 to 506 through the bus bars 507.

FIG. 2 to FIG. 6 show configuration in which the semiconductor modules 501 to 506 are incorporated, but do not show power supplying configuration. In reality, a connector is attached to the cover 103, and power is supplied to the bus bars 507 via the connector.

The semiconductor modules 501 to 506 are mounted on a heat sink 601 extended in the same direction as the center line direction of the shaft 401 from the end wall 106 of the motor case 101.

The heat sink 601 has, as shown in FIG. 2, two column-shaped parts, the shape on the section perpendicular to the axial direction of which is a substantially trapezoidal shape, juxtaposed as if to sandwich the center line of the shaft 401. Further, the heat sink 601 has a predetermined radius portion thereof cut out so that a cylindrical space can be formed in the center. When viewed as a whole, the heat sink 601 has a thick cylindrical shape that axially looks like an octagon. The heat sink 601 is not limited to the octagonal shape but may, for example, axially look like a hexagon. The heat sink 601 includes side walls 602 that form the column-shaped parts each of which is shaped to axially and sectionally look like a trapezoid. The side walls 602 include notched portions 603 and 604 that provide discontinuous parts. The heat sink 601 is integrally formed together with the motor case 101.

The side walls 602 of the heat sink 601 include side wall surfaces 605 that are flanks oriented in the radially outward directions and are made wider than flanks which adjoin the notched portions 603 and 604 respectively. As for the side wall surfaces 605, six side wall surfaces in total are formed in the circumferential direction. In radially inward directions of the respective side wall surfaces 605, accommodation spaces 606 that open onto the cylindrical space in the center are formed. The accommodation spaces 606 have arc surfaces in line with the contours of capacitors. The accommodation spaces 606 are formed at positions at which the accommodation spaces are opposed to the side wall surfaces 605. In the heat sink 601, regions having the accommodation spaces 606 formed therein are made thin. However, parts from the accommodation spaces 606 to the end wall 106 of the motor case 101 are formed as thick parts 107 that are as thick as the other part having no accommodation spaces (FIG. 4).

As for the heat sink 601, the semiconductor modules 501 to 506 are disposed one by one on the side wall surfaces 605 that are oriented in the radially outward directions. Each of the semiconductor modules 501 to 506 is shaped like a plate spread in the direction of the surfaces of the semiconductor chips that are molded. One of the surfaces of the semiconductor module having a relatively large surface area serves as a heat radiation surface (the same will apply to embodiments to be described later). For example, on the heat radiation surface, a metal such as copper is bared. The semiconductor modules 501 to 506 are disposed in such a manner that the heat radiation surfaces thereof can be in contact with the respective side wall surfaces 605. Here, the side wall surfaces 605 are realized with planes, and the heat radiation surfaces of the semiconductor modules 501 to 506 are planar accordingly. Insulation sheets may be interposed between the respective heat radiation surfaces of the semiconductor modules 501 to 506 and the respective side wall surfaces 605 of the heat sink 601.

Since the semiconductor modules 501 to 506 are, as described above, disposed on the side wall surfaces 605 of the heat sink 601, the vertical line V to the planes of the semiconductor chips S is perpendicular to the center line of the shaft 401 (FIG. 4 and FIG. 5). Specifically, the semiconductor modules 501 to 506 are placed longitudinally.

Each of the semiconductor modules 501 to 506 has a coil terminal 508 at the side end thereof facing the motor case 101 (FIG. 3 and others). The coil terminal 508 is bent radially outward. The lead wires 206 for supplying current to the windings 205 are led out through the six holes, which are formed in the end wall 106 of the motor case 101, toward the electronic control unit. The lead wires 206 are lead out to accommodation spaces present on the radially outer sides of the semiconductor modules 501 to 506. Accordingly, in the accommodation spaces present on the radially outer side of the semiconductor modules 501 to 506, the lead wires 206 and coil terminals 508 are electrically coupled to one another so that the lead wires 206 are clamped by the coil terminals 508.

Each of the semiconductor modules 501 to 506 has six control terminals 509 and two capacitor terminals 510 at the side end surface thereof opposite to the motor case 101. The control terminals 509 are soldered while being inserted into through holes of the printed circuit board 801 (FIG. 4). Accordingly, the semiconductor modules 501 to 506 are electrically connected to the control circuit 70 (FIG. 1). In contrast, the capacitor terminals 510 are branched out from the power line and ground respectively in the inside of each of the semiconductor modules 501 to 506. The capacitor terminals 510 are bent in the radially inward directions. Thus, the printed circuit board 801 is disposed in a divider space formed between the distal end of the heat sink 601 and the cover 103.

As shown in FIG. 2 and others, six capacitors 701, 702, 703, 704, 705, and 706 are disposed on the same sides of the semiconductor modules 501 to 506 as the heat sink 601 is, that is, on the radially inner sides of the semiconductor modules. In order to discriminate the capacitors 701 to 706 from one another, the reference numerals in FIG. 2 are used to denote the capacitors as the U1 capacitor 701, V1 capacitor 702, W1 capacitor 703, U2 capacitor 704, V2 capacitor 705, and W2 capacitor 706.

Regarding the relationship of correspondence to FIG. 1, the U1 capacitor 701 corresponds to the capacitor 54. The V1 capacitor 702 corresponds to the capacitor 55. The W1 capacitor 703 corresponds to the capacitor 56. Likewise, the U2 capacitor 704 corresponds to the capacitor 54, the V2 capacitor 705 corresponds to the capacitor 55, and the W2 capacitor 706 corresponds to the capacitor 56.

The capacitors 701 to 706 are accommodated in the accommodation spaces 606 of the heat sink 601, and disposed near the semiconductor modules 501 to 506 in one-to-one correspondence with the semiconductor modules 501 to 506. The capacitors 701 to 706 are in a columnar shape, and are disposed so that the axes thereof become parallel to the center line of the shaft 401 (FIG. 5). The capacitor terminals 510 of the semiconductor modules 501 to 506 are bent in the radially inward directions. Therefore, terminals of the capacitors 701 to 706 are directly coupled to the bent capacitor terminals 510.

The shaft 401 is extended toward the electronic control unit. As shown in FIG. 4 and others, the choke coil 52 is disposed with the shaft 401 penetrating therethrough. The choke coil 52 is disposed in the columnar space formed in the center of the heat sink 601. The choke coil 52 has a coil wire wound about a doughnut-shaped iron core, and the coil end thereof is led out in the radially outward direction through the notched portion 603 of the heat sink 601 (FIG. 2).

The coil end of the choke coil 52 is coupled so that the choke coil exists on the power line (FIG. 1). However, FIG. 2 to FIG. 6 do not show power supply configuration for the choke coil 52.

As described above, from radially outward to radially inward, the junctions between the coil terminals 508 and lead wires 206, semiconductor modules 501 to 506, heat sink 601, capacitors 701 to 706, and choke coil 52 are disposed in this order. Thus, accommodation spaces in radial directions are efficiently utilized.

Next, the control circuit 70 will be described below. The control circuit 70 is formed on the printed circuit board 801 shown in FIG. 4 and others. Specifically, a wiring pattern is formed in the printed circuit board 801 through etching processing or the like, and ICs and others forming the control circuit 70 are mounted on the printed circuit board (ICs and other components are not shown).

The drive apparatus 1 of the present embodiment provides the following advantages (1) to (14) described below.

(1) The semiconductor modules 501 to 506 are disposed in the center line direction of the shaft 401. Accordingly, the physical configuration in a radial direction can be made smaller. In addition, the semiconductor modules 501 to 506 are placed longitudinally and disposed in contact with the side wall surfaces 605 of the heat sink 601. Further, the heat sink 601 is provided with the accommodation spaces 606, and the six capacitors 701 to 706 are disposed in radial directions. In other words, the heat sink 601 and capacitors 701 to 706 are disposed in the radially inward directions of the six semiconductor modules 501 to 506. As a result, in the center line direction of the shaft 401, at least parts of ranges of dispositions of the semiconductor modules 501 to 506, heat sink 601, and capacitors 701 to 706 are arranged one another. Therefore, unlike a conventional configuration, the physical configuration in the axial direction can be made smaller. As a result, the physical configuration of the drive apparatus 1 can be made as small as possible.

Figure 7:
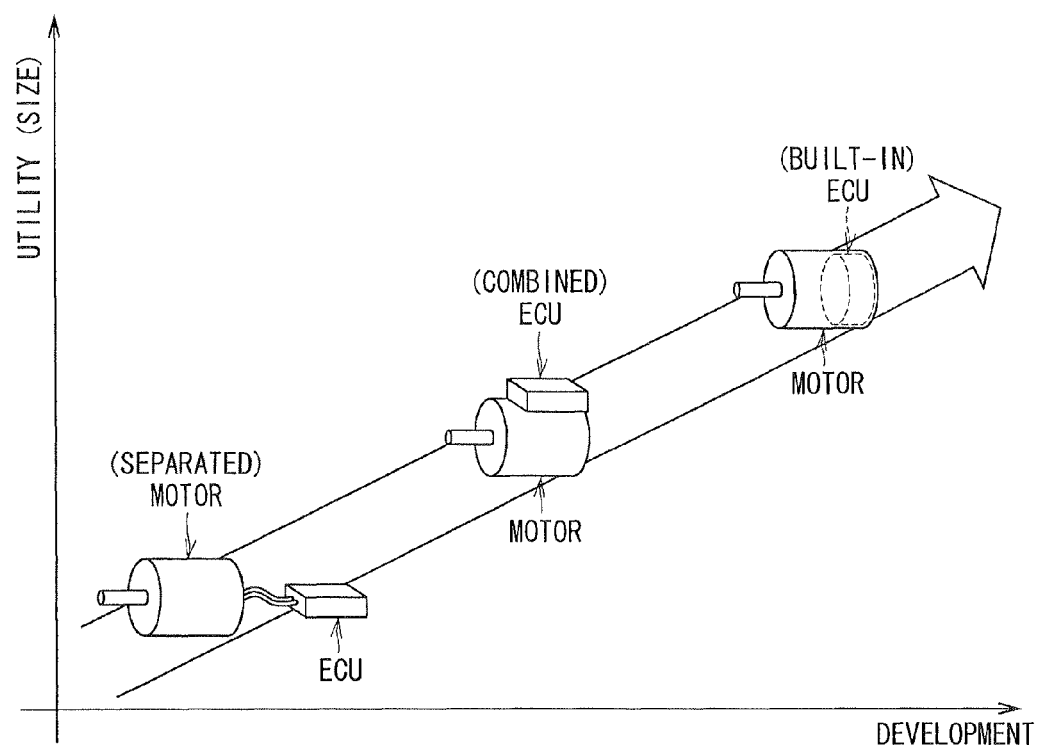
FIG. 7 is an explanatory diagram showing technical development toward integration of an electronic control unit.

A motor employed in EPS has developed as shown in FIG. 7. Specifically, a "separated" configuration that has a motor and an ECU separated from each other has initially been used, and a "combined" configuration relieved from layout of wirings has become a mainstream. However, the "combined" configuration has the ECU placed in a parallelepiped case, and has the ECU loaded on the periphery of a motor case. In this case, the physical configuration in the axial direction gets larger. In the drive apparatus 1 of the present embodiment, not only the semiconductor modules 501 to 506 are placed longitudinally but also accommodation spaces preserved due to the longitudinal placement are utilized. Thus, the relationship of disposition to the capacitors 701 to 706 has been devised. Namely, the drive apparatus 1 is of a "built-in" type.

(2) The vertical line to a semiconductor chip surface of each of the semiconductor modules 501 to 506 is perpendicular to the center line of the shaft 401. This further contributes to preservation of accommodation spaces in radial directions.

(3) The capacitors 701 to 706 are disposed near the semiconductor modules 501 to 506. In addition, each of the semiconductor modules 501 to 506 has the capacitor terminals 510 that are terminals dedicated to the capacitor. Each of the capacitors 701 to 706 has the terminals thereof coupled directly to the capacitor terminals 510 without intervention of the printed circuit board. Accordingly, compared with when the semiconductor modules 501 to 506 and capacitors 701 to 706 are connected to one another via a substrate, wirings between the semiconductor modules 501 to 506 and capacitors 701 to 706 can be made as short as possible. The function of the capacitors 701 to 706 can be fully exhibited. In addition, since the capacitors 701 to 706 are disposed in one-to-one correspondence with the semiconductor modules 501 to 506, the capacitance of the capacitors 701 to 706 can be made relatively small. The physical configuration of the capacitors 701 to 706 can be suppressed.

(4) The heat sink 601 extended from the end wall 106 of the motor case 101 in the same direction as the direction of the center line of the shaft 401 is provided. The semiconductor modules 501 to 506 are disposed on the side walls 602 of the heat sink 601. Accordingly, heat radiation from the semiconductor modules 501 to 506 is facilitated. The drive apparatus can be readily applied to an EPS system in which a large current flows into the motor 30.

(5) Further, in the drive apparatus 1 of the present invention, the capacitors 701 to 706 are disposed on the same sides of the semiconductor modules 501 to 506 as the heat sink 601 is. More particularly, the capacitors 701 to 706 are accommodated in the accommodation spaces 606 formed in the heat sink 601. Therefore, accommodation spaces can be preserved in the radially outward directions of the semiconductor modules 501 to 506. As a result, layout of wirings can be easily achieved.

(6) The heat radiation surfaces of the semiconductor modules 501 to 506 are disposed to be in contact with the side wall surfaces 605 of the heat sink 601. Accordingly, heat radiation from the semiconductor modules 501 to 506 can be further facilitated.

(7) Since the side wall surfaces 605 are planar, the heat radiation surfaces of the semiconductor modules 501 to 506 are also planar. This is advantageous from the viewpoint of easiness in flattening of the surfaces of the semiconductor modules 501 to 506.

(8) The heat sink 601 has the side walls 602 around the center line of the shaft 401. The choke coil 52 is disposed on the radially inner sides of the side walls 602. Accordingly, even when the choke coil 52 having a relatively large physical configuration is employed, the physical configuration of the drive apparatus 1 can be made as small as possible.

(9) The side walls 602 include the two notched portions 603 and 604 respectively that provide discontinuous parts. The notched portion 603 is utilized in order to lead out the coil end of the choke coil 52 in a radially outward direction. Accordingly, routing of a winding of the choke coil 52 can be achieved easily.

(10) The semiconductor modules 501 to 506 and printed circuit board 801 are juxtaposed in an axial direction. The semiconductor modules 501 to 506 include the control terminals 509, and the control terminals 509 are soldered to the printed circuit board 801. Accordingly, even when the control circuit 70 is disposed independently of the semiconductor modules 501 to 506, electrical connections are achieved via the control terminals 509. Therefore, the configuration will not be complicated.

(11) The semiconductor modules 501 to 506 have the coil terminals 508 at the other ends on the sides thereof opposite to the printed circuit board 801. The coil terminals 508 are electrically coupled to the lead wires 206. Thus, electrical connections to the windings 205 of the stator 201 can be relatively easily achieved.

(12) The magnet 402 is disposed at the distal end of the shaft 401. The position sensor 73 on the printed circuit board 301 detects the rotational position of the magnet 402, whereby the rotational position of the shaft 401 is detected. Thus, the rotational position of the motor 30 can be relatively easily detected.

(13) The W1 and U2 semiconductor modules 503 and 504 each include the reverse connection protection FET 67. Therefore, even when the power supply is incorrectly connected, the capacitors 701 to 706 can be prevented from being damaged.

(14) The semiconductor modules 501 to 506 are in correspondence to three phases of the U, V, and W phases. More particularly, the U1 and U2 semiconductor modules 501 and 504 are in correspondence to the U phase, the V1 and V2 semiconductor modules 502 and 505 are in correspondence to the V phase, and the W1 and W2 semiconductor modules 503 and 506 are in correspondence to the W phase. Further, the U1 to W1 semiconductor modules 501 to 503, and the U2 to W2 semiconductor modules 504 to 506 are interconnected through the bus bars 507 to form module units. Thus, the semiconductor modules 501 to 506 are formed as modules in units of a function. Therefore, the configuration of the inverter circuit 60 becomes simple.

Second Embodiment

Figure 8:
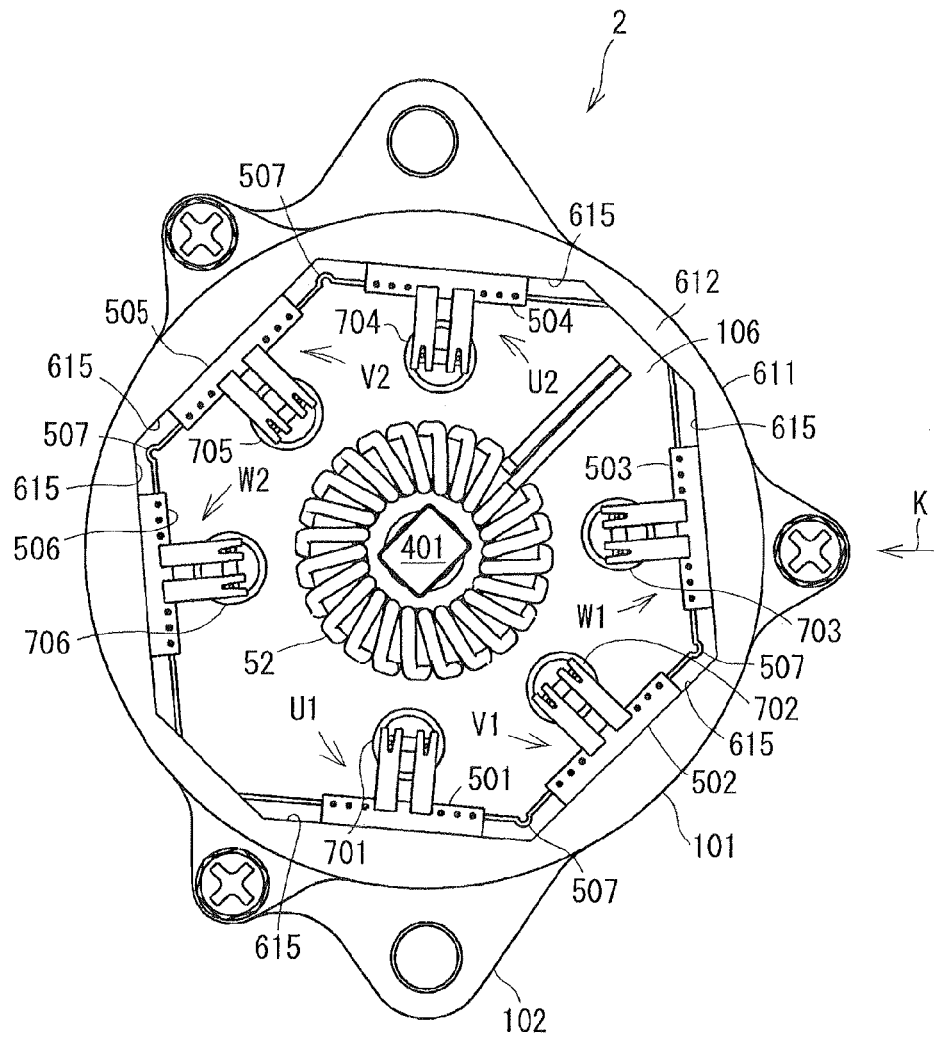
FIG. 8 is a plan view of a drive apparatus according to a second embodiment.

A drive apparatus 2 of a second embodiment includes, as shown in FIG. 8, six semiconductor modules 501, 502, 503, 504, 505, and 506. For discriminating the semiconductor modules 501 to 506 from one another, the reference numerals in FIG. 8 are used to denote them as the U1 semiconductor module 501, V1 semiconductor module 502, W1 semiconductor module 503, U2 semiconductor module 504, V2 semiconductor module 505, and W2 semiconductor module 506.

The three U1 to W1 semiconductor modules 501 to 503, and the three U2 to W2 semiconductor modules 504 to 506 are interconnected over the bus bars 507 to form module units. The bus bars 507 have an interconnecting function and serve as a power line.

The semiconductor modules 501 to 506 are mounted on a heat sink 611 extended in the same direction as the direction of the center line of the shaft 401 from the end wall 106 of the motor case 101.

Figure 9:
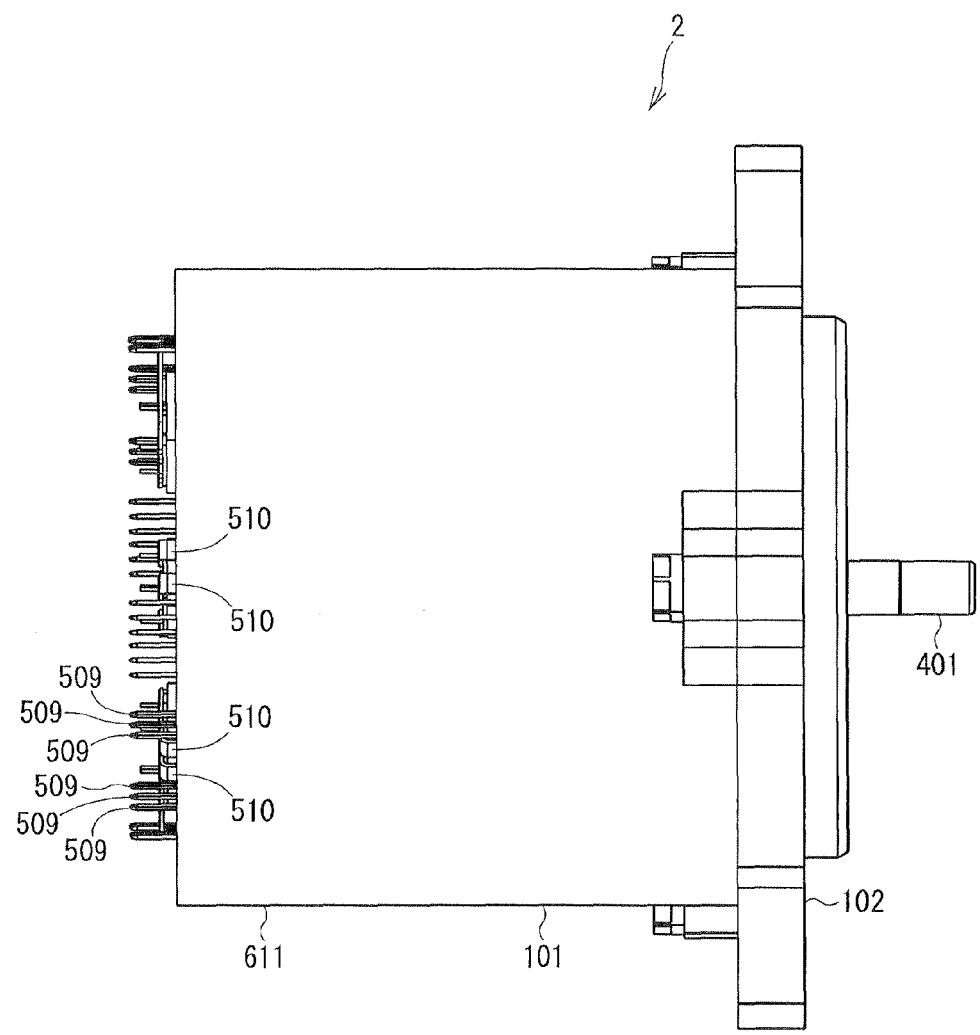
FIG. 9 is a side view of the drive apparatus according to the second embodiment.
Figure 10:
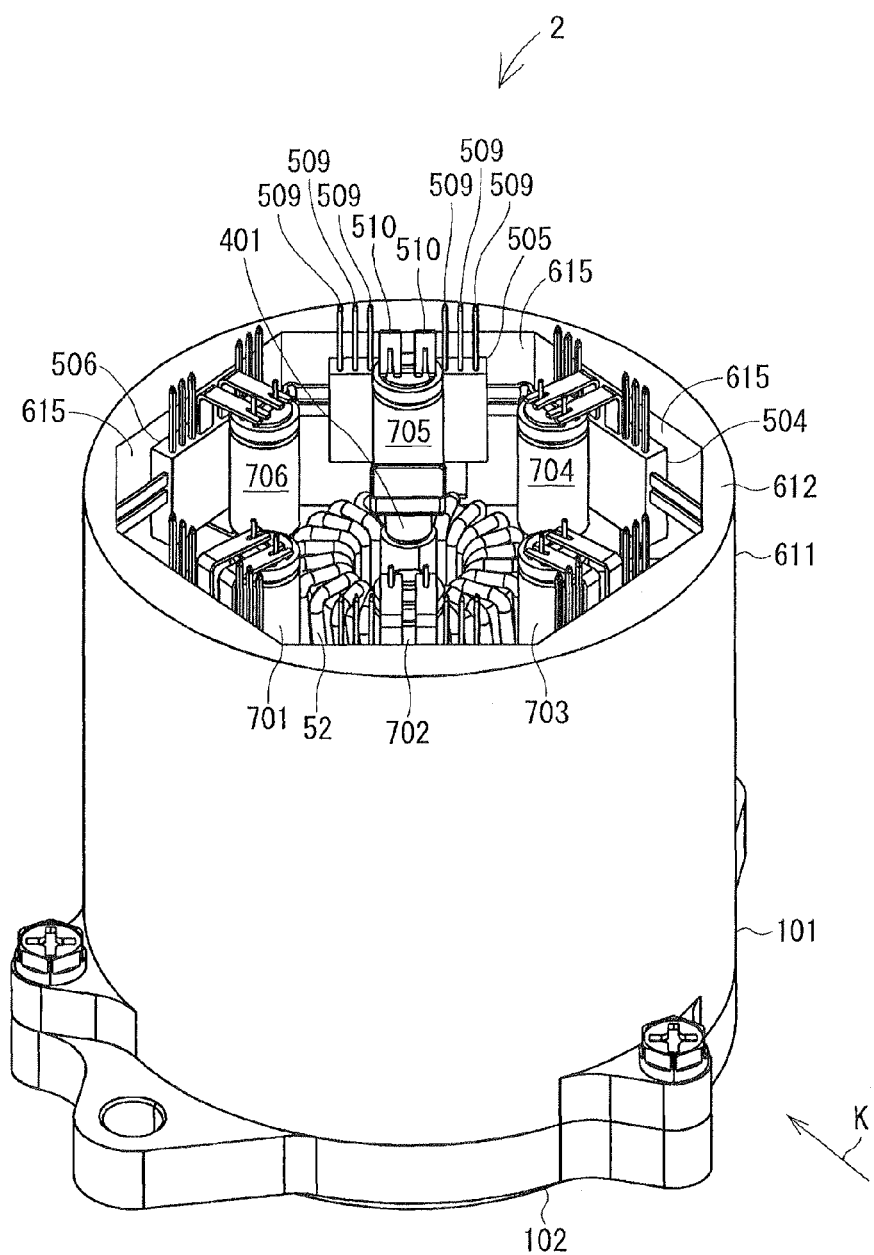
FIG. 10 is a perspective view of the drive apparatus according to the second embodiment.

The shape of the heat sink 611 on the section perpendicular to the axial direction is, as shown in FIG. 8, a cylindrical shape, and has a prism-shaped space formed internally. The heat sink 611 has the side wall 612 around the center line of the shaft 401. In this case, the external wall surface of the heat sink 611 forms part of the outer periphery of the drive apparatus 2 (FIG. 9 and FIG. 10). Namely, the outer diameter of the motor case 103 in a region thereof in which the stator 201 is arranged, and the outer diameter of the heat sink 611 are identical to each other.

The side wall 612 of the heat sink 611 has side wall surfaces 615 oriented in radially inward directions. As for the side wall surfaces 615, a total of six side wall surfaces are formed in the circumferential direction.

As for the heat sink 611, the semiconductor modules 501 to 506 are disposed one by one on the side wall surfaces 615 that are oriented in the radially inward directions. The semiconductor modules 501 to 506 are disposed so that the heat radiation surfaces thereof are in contact with the side wall surfaces 615. The side wall surfaces 615 are formed in planes, and the heat radiation surfaces of the semiconductor modules 501 to 506 are also formed in planes accordingly.

The semiconductor modules 501 to 506 are, as described above, disposed on the respective side wall surfaces 615 of the heat sink 611, whereby the vertical line to each semiconductor chip surface is perpendicular to the center line of the shaft 401 (FIG. 10).

Each of the semiconductor modules 501 to 506 has a coil terminal (not shown) at the side end thereof facing the motor case 101. In addition, each of the semiconductor modules 501 to 506 has six control terminals 509 and two capacitor terminals 510 at the side end surface thereof opposite to the motor case 101 (FIG. 9 and FIG. 10).

As shown in FIG. 8 and others, six capacitors 701, 702, 703, 704, 705, and 706 are disposed on the sides of the semiconductor modules 501 to 506 opposite to the heat sink 611.

The capacitors 701 to 706 are disposed near the semiconductor modules 501 to 506 in one-to-one correspondence with the semiconductor modules 501 to 506. The capacitors 701 to 706 are in a columnar shape, and are disposed so that the axes thereof become parallel to the center line of the shaft 401. In addition, the capacitor terminals 510 of the semiconductor modules 501 to 506 are bent in the radially inward directions, and terminals of the capacitors 701 to 706 are coupled directly to the bent capacitor terminals 510.

The choke coil 52 is disposed with the shaft 401 penetrating therethrough (FIG. 10). The choke coil 52 has the coil wire wound about the doughnut-shaped iron core.

As described above, from radially outward to radially inward, the heat sink 611, semiconductor modules 501 to 506, capacitors 701 to 706, and choke coil 52 are disposed in this order. Thus, accommodation spaces in radial directions are efficiently utilized.

The drive apparatus 2 of the present embodiment provides the same advantages as the advantages (1) to (4), (6) to (8), and (10) to (14) described in relation to the first embodiment.

Especially, in the drive apparatus 2 of the second embodiment, the capacitors 701 to 706 are disposed on the sides of the semiconductor modules 501 to 506 opposite to the heat sink 611. Therefore, accommodation spaces for the capacitors 701 to 706 need not be formed in the heat sink 611.

Third Embodiment

Figure 11:
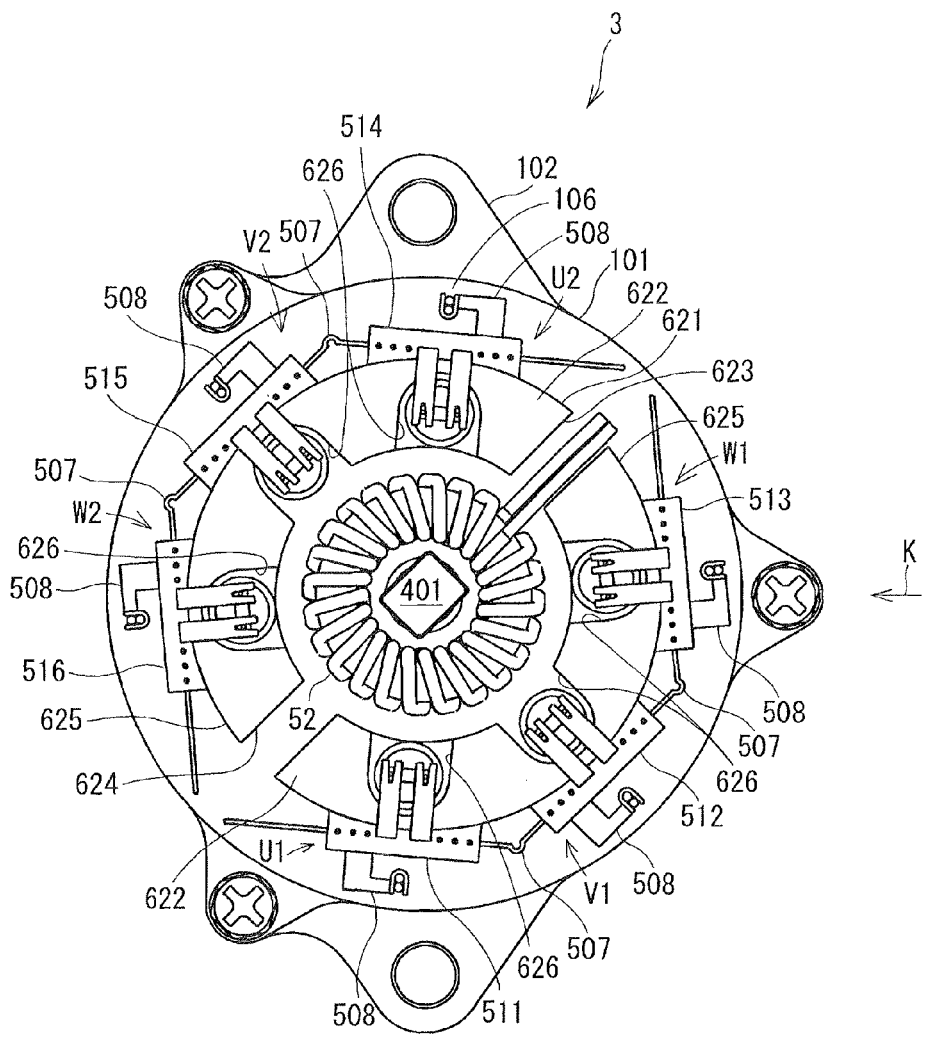
FIG. 11 is a plan view of a drive apparatus according to a third embodiment.

A drive apparatus 3 of a third embodiment includes, as shown in FIG. 11, six semiconductor modules 511, 512, 513, 514, 515, and 516. For discriminating the semiconductor modules 511 to 516 from one another, the reference numerals in FIG. 11 are used to denote them as the U1 semiconductor module 511, V1 semiconductor module 512, W1 semiconductor module 513, U2 semiconductor module 514, V2 semiconductor module 515, and W2 semiconductor module 516.

The three U1 to W1 semiconductor modules 511 to 513, and the three U2 to W2 semiconductor modules 514 to 516 are interconnected through the bus bars 507 to form module units. The bus bars 507 have the interconnecting function and serve as the power line.

The semiconductor modules 511 to 516 are mounted on a heat sink 621 extended in the same direction as the center line direction of the shaft 401 from the end wall 106 of the motor case 101.

The heat sink 621 has, as shown in FIG. 11, two column-shaped parts, the shape on a section perpendicular to the axial direction of which is a substantially semicircular shape, juxtaposed as if to sandwich the center line of the shaft 401. Further, the heat sink 621 has a predetermined radius portion thereof cut out so that a columnar space can be formed in the center thereof. When viewed as a whole, the heat sink 621 has a thick cylindrical shape, and has side walls 622 around the center line of the shaft 401. The side walls 622 include two notched portions 623 and 624 respectively that provide discontinuous parts.

The side walls 622 of the heat sink 621 have side wall surfaces 625 oriented in the radially outward directions. The side wall surfaces 625 are columnar peripheral surfaces. Accommodation spaces 626 that open onto the center columnar space are formed in the radially inward directions of the side wall surfaces 625.

As for the heat sink 621, the semiconductor modules 511 to 516 are disposed on the side wall surfaces 625 that are oriented in the radially outward directions. Herein, the semiconductor modules 511 to 516 are disposed so that the heat radiation surfaces thereof are in contact with the side wall surfaces 625. Here, the side wall surfaces are the columnar peripheral surfaces and realized with convexly curved surfaces. Accordingly, the heat radiation surfaces of the semiconductor modules 511 to 516 are concavely curved surfaces.

The semiconductor modules 511 to 516 are, as described above, disposed on the side wall surfaces 625 of the heat sink 621, whereby the vertical line to each semiconductor chip surface is perpendicular to the center line of the shaft 401.

Figure 12:
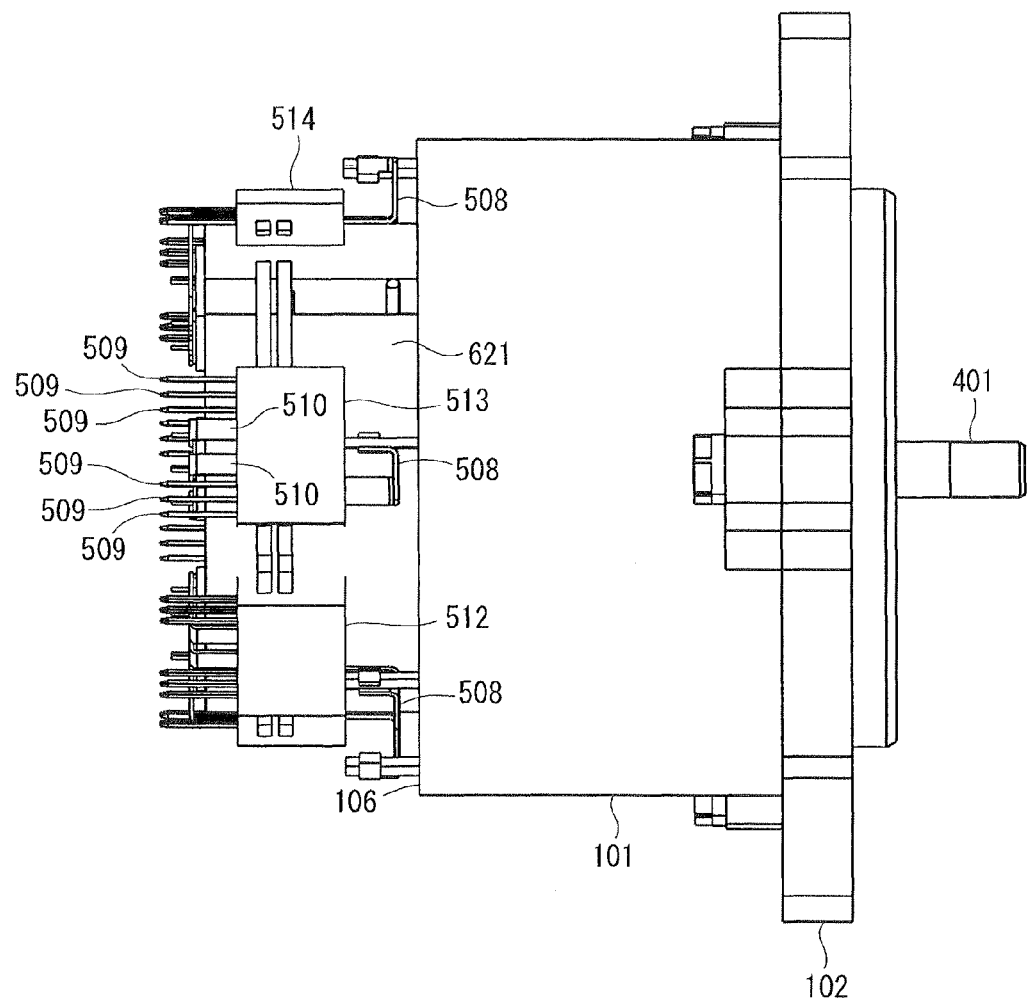
FIG. 12 is a side view of the drive apparatus according to the third embodiment.

Each of the semiconductor modules 511 to 516 has the coil terminal 508 at the side end thereof facing the motor case 101. In addition, each of the semiconductor modules 511 to 516 has six control terminal 509 and two capacitor terminals 510 at the side end surface thereof opposite to the motor case 101 (FIG. 12 and FIG. 13).

As shown in FIG. 11, six capacitors 701, 702, 703, 704, 705, and 706 are disposed on the same sides of the semiconductor modules 511 to 516 as the heat sink 621 is. More particularly, the capacitors are disposed in the accommodation spaces 626 of the heat sink 621.

The capacitors 701 to 706 are disposed near the semiconductor modules 511 to 516 in one-to-one correspondence with the semiconductor modules 511 to 516. The capacitors 701 to 706 are in a columnar shape, and are disposed so that the axes thereof become parallel to the center line of the shaft 401. In addition, since the capacitor terminals 510 of the semiconductor modules 511 to 516 are bent in the radially inward directions, terminals of the capacitors 701 to 706 are coupled directly to the bent capacitor terminals 510.

Figure 13:
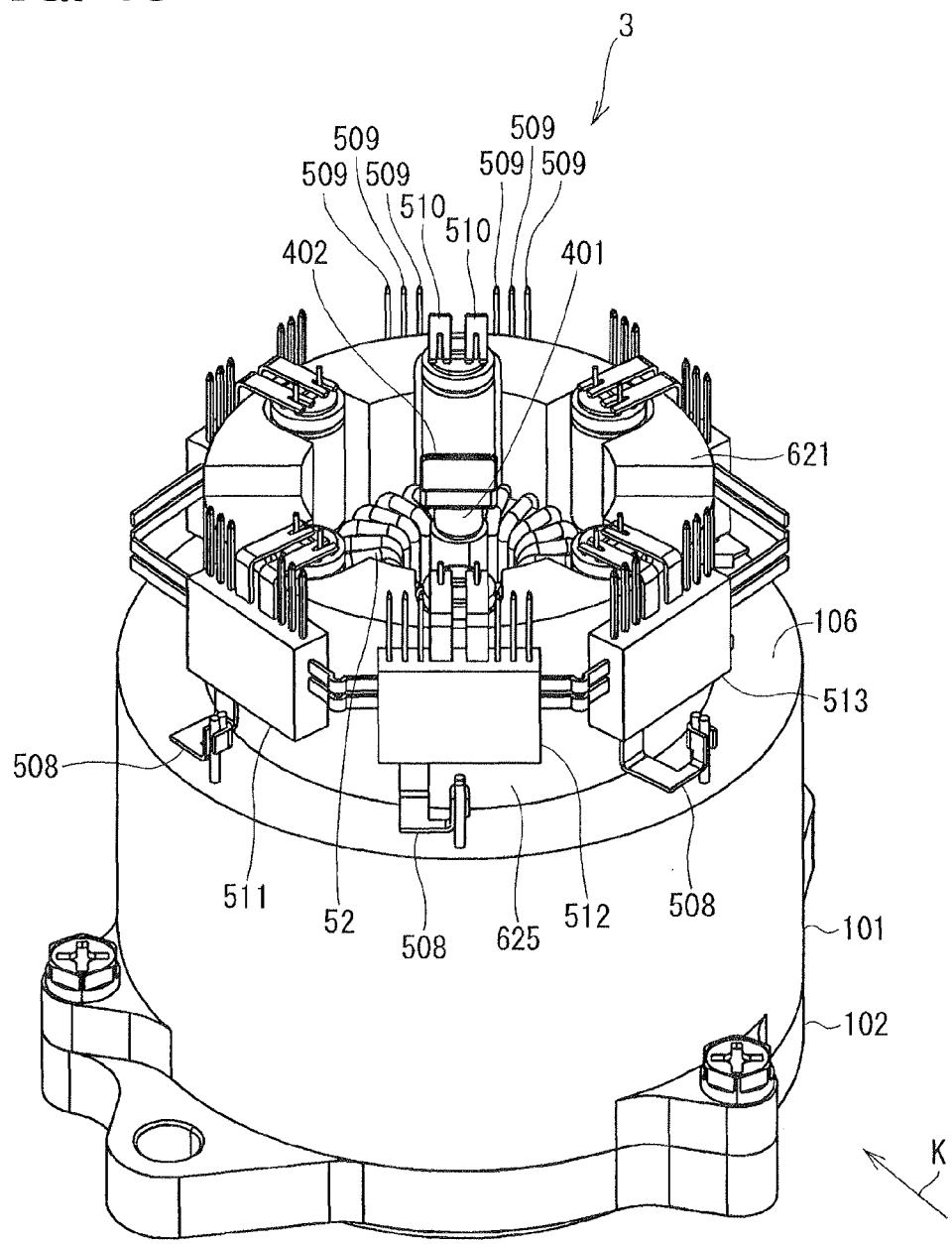
FIG. 13 is a perspective view of the drive apparatus according to the third embodiment.

The choke coil 52 is disposed with the shaft 401 penetrating therethrough (FIG. 13). The choke coil 52 has the coil wire wound about the doughnut-shaped iron core. The coil end of the choke coil 52 is led out in the radially outward direction through the notched portion 623 of the heat sink 621 (FIG. 11).

The drive apparatus 3 of the present embodiment provides the same advantages as the advantages (1) to (6) and (8) to (14) of the first embodiment.

In particular, in the drive apparatus 3, the side wall surfaces 625 of the heat sink 621 are the columnar peripheral surfaces, and the heat sink 621 is shaped substantially like a cylinder. Accordingly, the heat sink 621 is formed simply.

Fourth Embodiment

Figure 14:
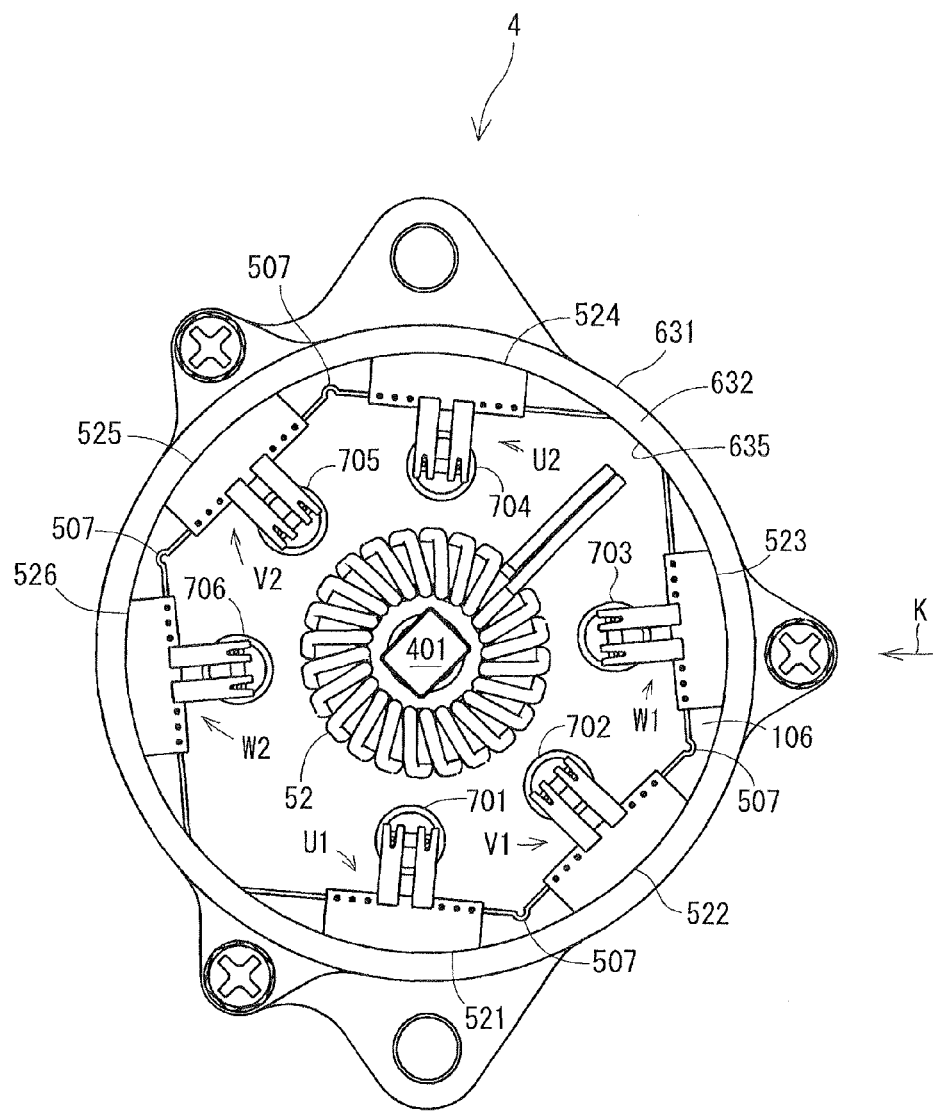
FIG. 14 is a plan view of a drive apparatus according to a fourth embodiment.

A drive apparatus 4 of a fourth embodiment includes, as shown in FIG. 14, six semiconductor modules 521, 522, 523, 524, 525, and 526. For discriminating the semiconductor modules 521 to 526 from one another, the reference numerals in FIG. 14 are used to denote them as the U1 semiconductor module 521, V1 semiconductor module 522, W1 semiconductor module 523, U2 semiconductor module 524, V2 semiconductor module 525, and W2 semiconductor module 526.

The three U1 to W1 semiconductor modules 521 to 523, and the three U2 to W2 semiconductor modules 524 to 526 are interconnected through the bus bars 507 to form module units. The bus bars 507 have the interconnecting function.

The semiconductor modules 521 to 526 are provided on a heat sink 631 extended in the same direction as the direction of the center line of the shaft 401 from the end wall 106 of the motor case 101.

Figure 15:
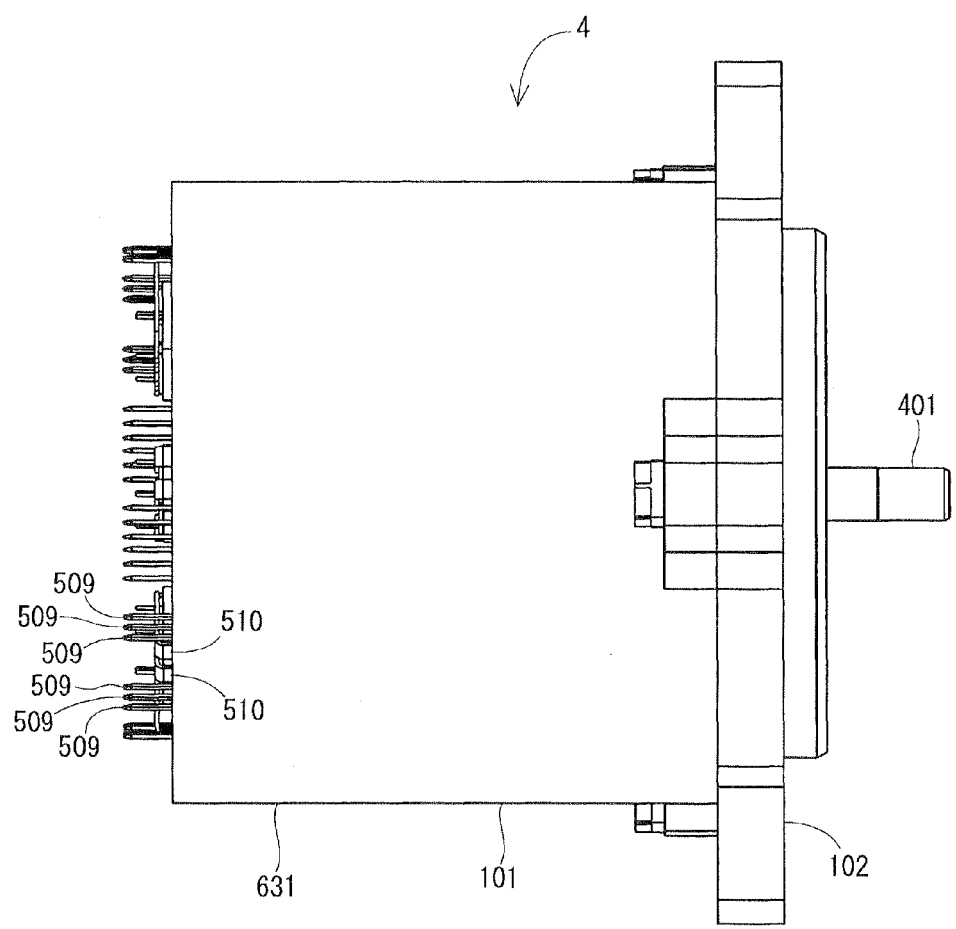
FIG. 15 is a side view of the drive apparatus according to the fourth embodiment.
Figure 16:
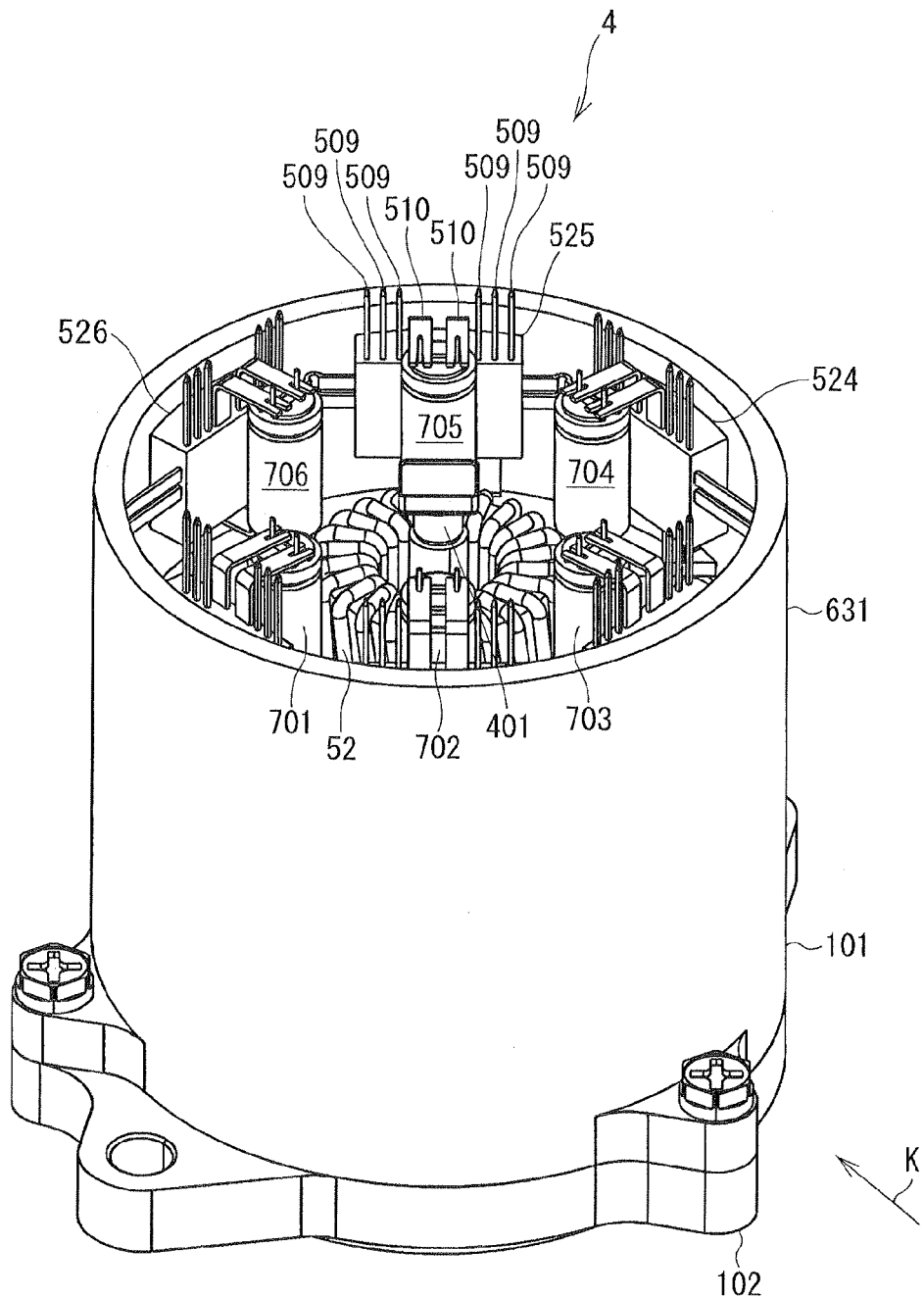
FIG. 16 is a perspective view of the drive apparatus according to the fourth embodiment.

The shape of the heat sink 631 on the section perpendicular to the axial direction is, as shown in FIG. 14, a cylindrical shape, and a columnar space is formed internally. The heat sink 631 has a side wall 632 around the center line of the shaft 401. In this case, an external wall surface of the heat sink 631 forms part of the outer periphery of the drive apparatus 4 (FIG. 15 and FIG. 16).

The side wall 632 of the heat sink 631 has a side wall surface 635 oriented in radially inward directions. The side wall surface 635 is a cylindrical inner peripheral surface.

As for the heat sink 631, the semiconductor modules 521 to 526 are disposed on the side wall surface 635 which is oriented in the radially inward directions. The semiconductor modules 521 and 526 are disposed so that the heat radiation surfaces thereof are in contact with the side wall surface 635. Here, the side wall surface 635 is a concavely curved surface, and the heat radiation surfaces of the semiconductor modules 521 to 526 are convexly curved surfaces accordingly.

Since the semiconductor modules 521 to 526 are, as described above, disposed on the side wall surface 635 of the heat sink 631, the vertical line to each semiconductor chip surface is perpendicular to the center line of the shaft 401.

Each of the semiconductor modules 521 to 526 has a coil terminal (not shown) at the side end thereof facing the motor case 101. In addition, each of the semiconductor modules 521 to 526 has six control terminals 509 and two capacitor terminals 510 at the side end surface thereof opposite to the motor case 101 (FIG. 15 and FIG. 16).

As shown in FIG. 14, six capacitors 701, 702, 703, 704, 705, and 706 are disposed on the sides of the semiconductor modules 521 to 526 opposite to the heat sink 631.

The capacitors 701 to 706 are disposed near the semiconductor modules 521 to 526 in one-to-one correspondence with the semiconductor modules 521 to 526. The capacitors 701 to 706 are in a columnar shape, and are disposed so that the axes thereof become parallel to the center line of the shaft 401. In addition, since the capacitor terminals 510 of the semiconductor modules 521 to 526 are bent in the radially inward directions, terminals of the capacitors 701 to 706 are coupled directly to the bent capacitor terminals 510.

The choke coil 52 is disposed with the shaft 401 penetrating therethrough (FIG. 16). The choke coil 52 has the coil wire wound about the doughnut-shaped iron core.

The drive apparatus 4 of the fourth embodiment provides the same advantages as the advantages (1) to (4, (6), (8), and (10) to (14).

Especially, in the drive apparatus 4, the capacitors 701 to 706 are disposed on the sides of the semiconductor modules 521 to 526 opposite to the heat sink 631. Therefore, accommodation spaces for the capacitors 701 to 706 need not be formed in the heat sink 631.

In addition, in the drive apparatus 4, the side wall surface 635 of the heat sink 631 is a cylindrical inner peripheral surface, and the heat sink 631 is shaped like a cylinder. Therefore, the heat sink 631 is formed simply.

Fifth Embodiment

Figure 17:
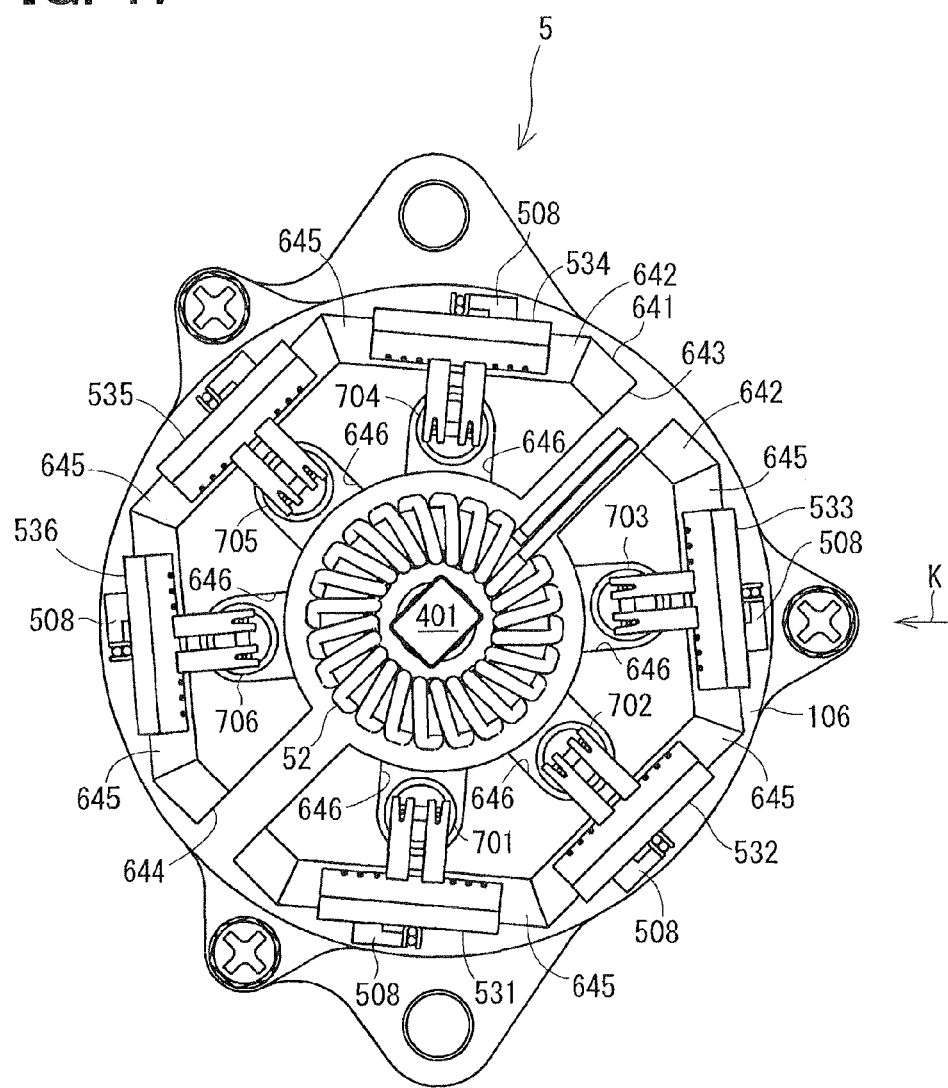
FIG. 17 is a plan view of a drive apparatus according to a fifth embodiment.

A drive apparatus 5 of a fifth embodiment includes, as shown in FIG. 17, six semiconductor modules 531, 532, 533, 534, 535, and 536.

The semiconductor modules 531 to 536 are mounted on a heat sink 641 extended in the same direction as the direction of the center line of the shaft 401 from the end wall 106 of the motor case 101.

The heat sink 641 has, as shown in FIG. 17, two column-shaped parts, the shape on a section perpendicular to the axial direction of which is a substantially trapezoidal shape, juxtaposed as if to sandwich the center line of the shaft 401. Further, the heat sink has a predetermined radius portion thereof cut out so that a columnar space can be formed in the center thereof. Here, the heat sink 641 differs from the heat sink 601 in the above-described embodiment (FIG. 2) in that the radially outward wall surfaces are tilted to approach the center line of the shaft 401 as they are distanced from the motor case 101. When the heat sink 641 is seen as a whole, the heat sink 641 is shaped like a truncated pyramid whose bottom is located on the side of the motor case 101. The heat sink 641 has side walls 642 around the center line of the shaft 401. The side walls 642 include two notched portions 643 and 644 respectively that provide discontinuous parts.

The side walls 642 of the heat sink 641 include six side wall surfaces 645 that are oriented in the radially outward directions. The side wall surfaces 645 are planar and tilted. Accommodation spaces 646 that open onto the columnar space in the center are formed in radially inward directions of the side wall surfaces 645.

As for the heat sink 641, the semiconductor modules 531 to 536 are disposed on the side wall surfaces 645 that are oriented in the radially outward directions. The semiconductor modules 531 to 536 are disposed so that the heat radiation surfaces thereof are in contact with the respective side wall surfaces 645. The side wall surfaces 645 are planar, and the heat radiation surfaces of the semiconductor modules 531 to 536 are planar accordingly.

The semiconductor modules 531 to 536 are, as described above, disposed on the side wall surfaces 645 of the heat sink 641, and are therefore tilted with respect to the center line of the shaft 401.

Figure 18:
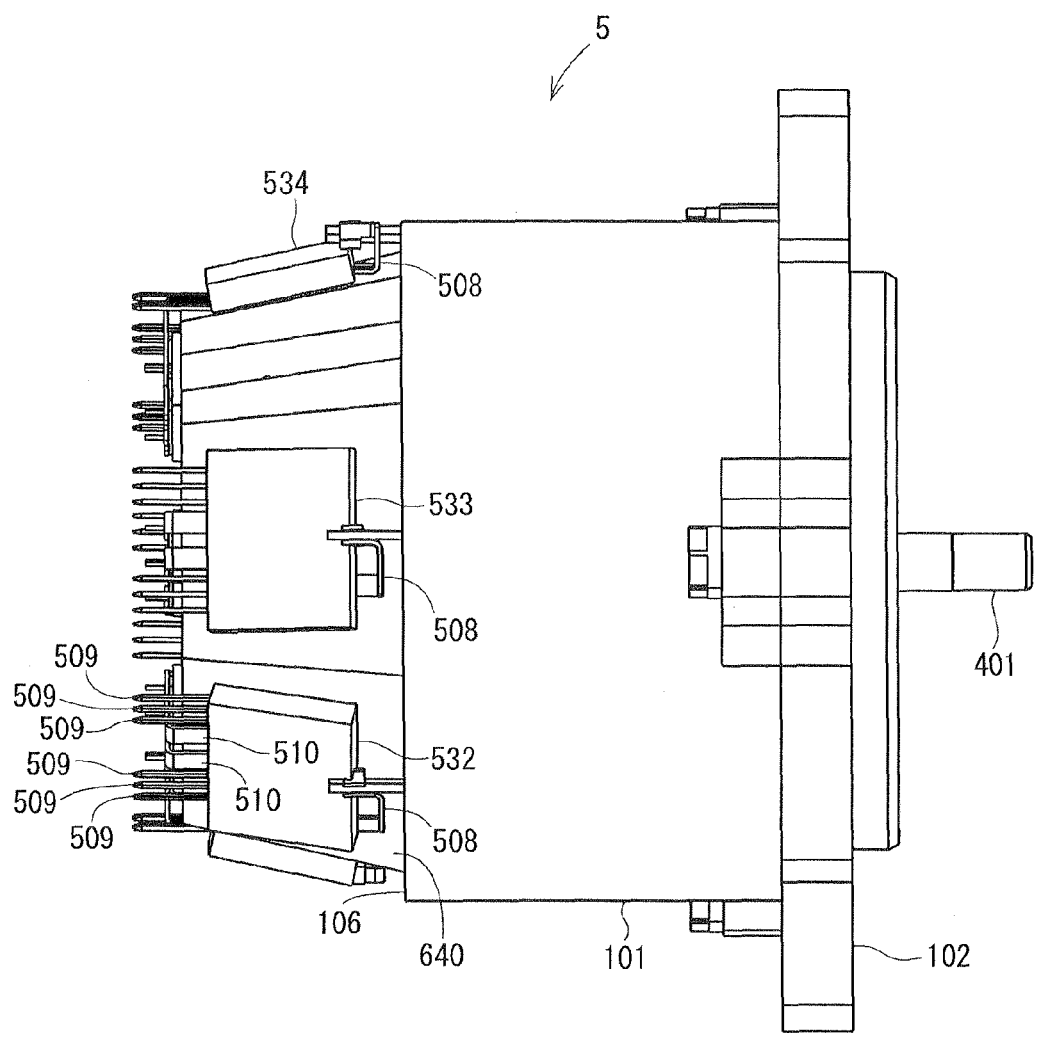
FIG. 18 is a side view of the drive apparatus according to the fifth embodiment.

Further, each of the semiconductor modules 531 to 536 has the coil terminal 508 at the side end thereof facing the motor case 101. In addition, each of the semiconductor modules 531 to 536 has six control terminals 509 and two capacitor terminals 510 at the side end surface thereof opposite to the motor case 101 (FIG. 18 and FIG. 19).

As shown in FIG. 17 and others, six capacitors 701, 702, 703, 704, 705, and 706 are disposed on the same sides of the semiconductor modules 531 to 536 as the heat sink 641 is. More particularly, the capacitors are disposed in the accommodation spaces 646 of the heat sink 641.

The capacitors 701 to 706 are disposed near the semiconductor modules 531 to 536 in one-to-one correspondence with the semiconductor modules 531 to 536. The capacitors 701 to 706 are in a columnar shape, and are disposed so that the axes thereof become parallel to the center line of the shaft 401. In addition, the capacitor terminals 510 of the semiconductor modules 531 to 536 are bent in the radially inward directions. Therefore, terminals of the capacitors 701 to 706 are coupled directly to the bent capacitor terminals 510 (FIG. 19).

Figure 19:
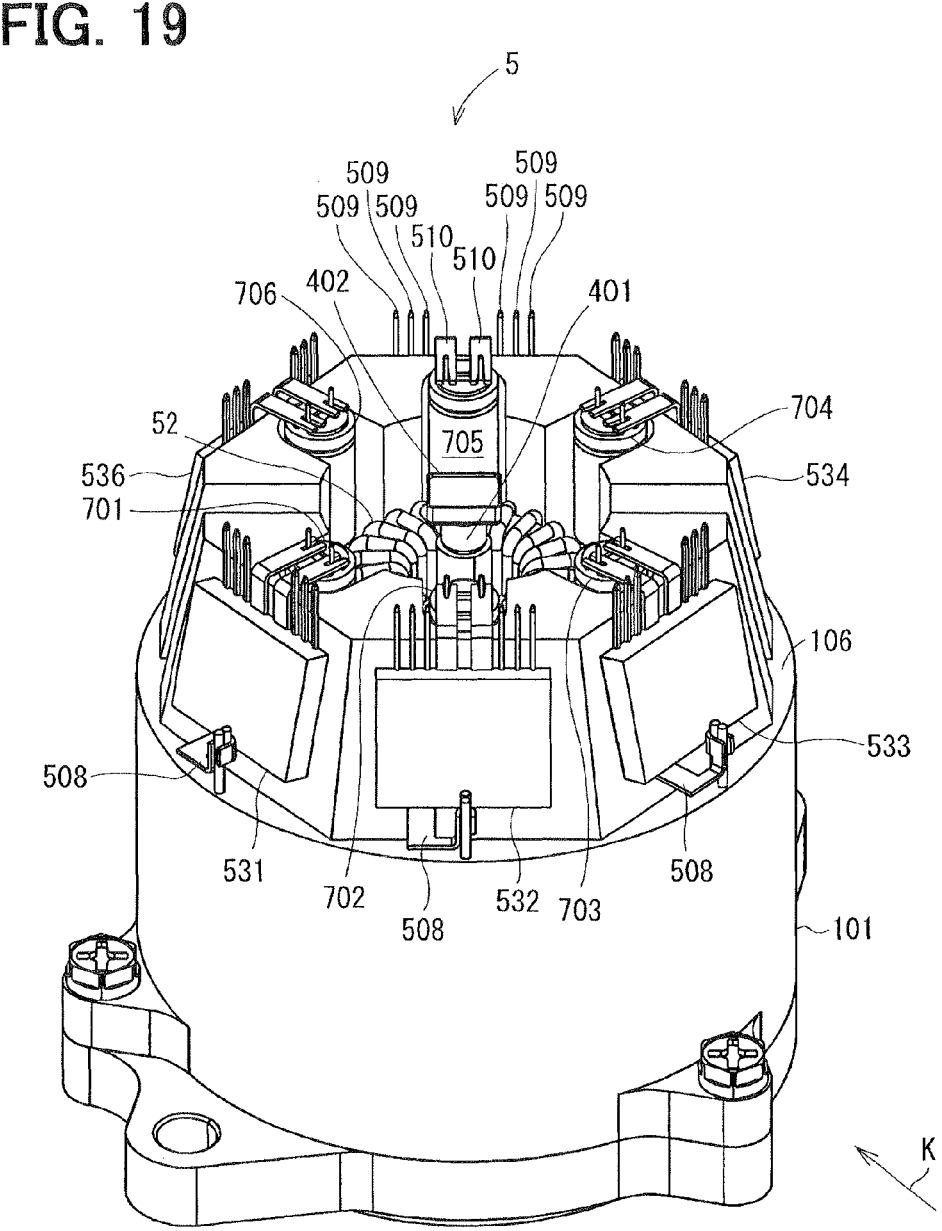
FIG. 19 is a perspective view of the drive apparatus according to the fifth embodiment.

The choke coil 52 is disposed with the shaft 401 penetrating therethrough (FIG. 19). The choke coil 52 has the coil wire wound about the doughnut-shaped iron core. The coil end of the choke coil 52 is led out in the radially outward direction through the notched portion 643 of the heat sink 641 (FIG. 17).

The drive apparatus 5 of the fifth embodiment provides the same advantages as the advantages (1) and (3) to (13) described in relation to the first embodiment.

Especially, in the drive apparatus 5, since the semiconductor modules 531 to 536 are tilted, the physical configuration in the axial direction can be made smaller.

In addition, the side wall surfaces 645 are tilted to approach the center line of the shaft 401 as they are separated from the end wall 106 of the motor case 101. Therefore, when the heat sink 641 is produced through casting processing, the processing is relatively easy to do.

Sixth Embodiment

Figure 20:
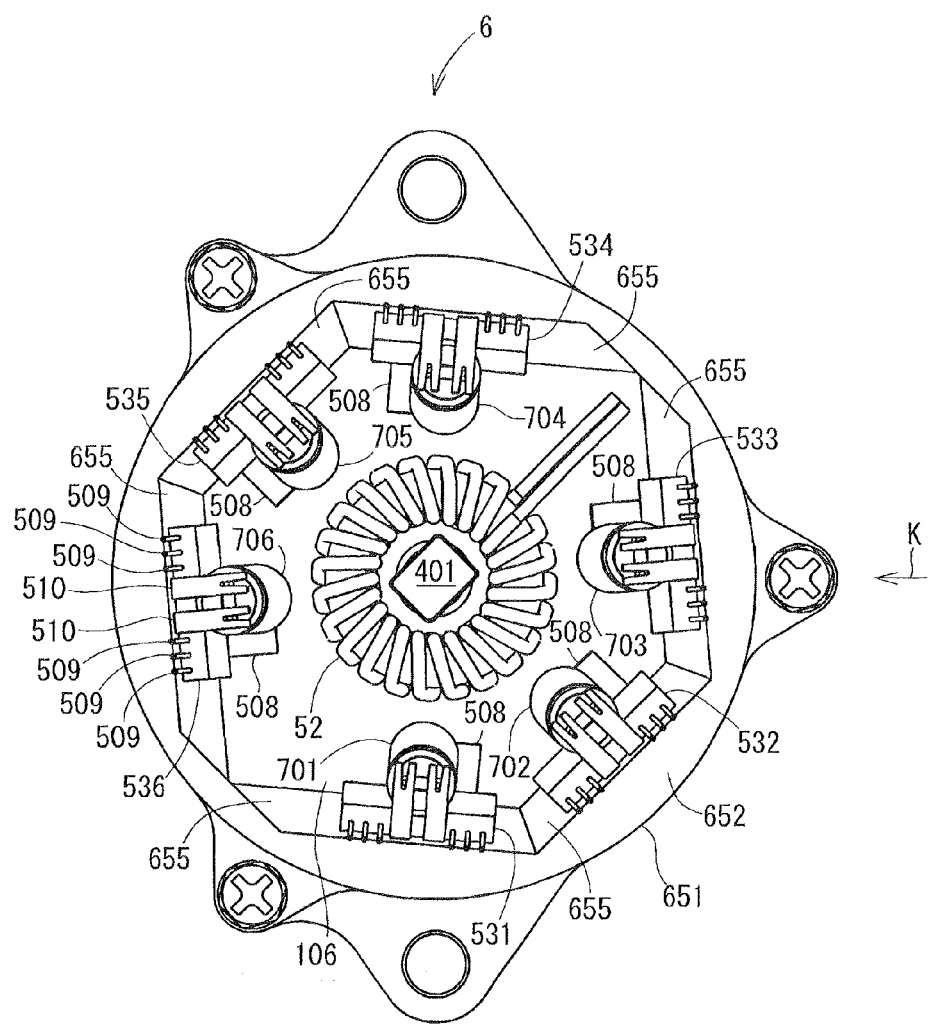
FIG. 20 is a plan view of a drive apparatus according to a sixth embodiment.

A drive apparatus 6 of a sixth embodiment includes, as shown in FIG. 20, six semiconductor modules 531, 532, 533, 534, 535, and 536.

The semiconductor modules 531 to 536 are mounted on a heat sink 651 extended in the same direction as the direction of the center line of the shaft 401 from the end wall 106 of the motor case 101.

Figure 21:
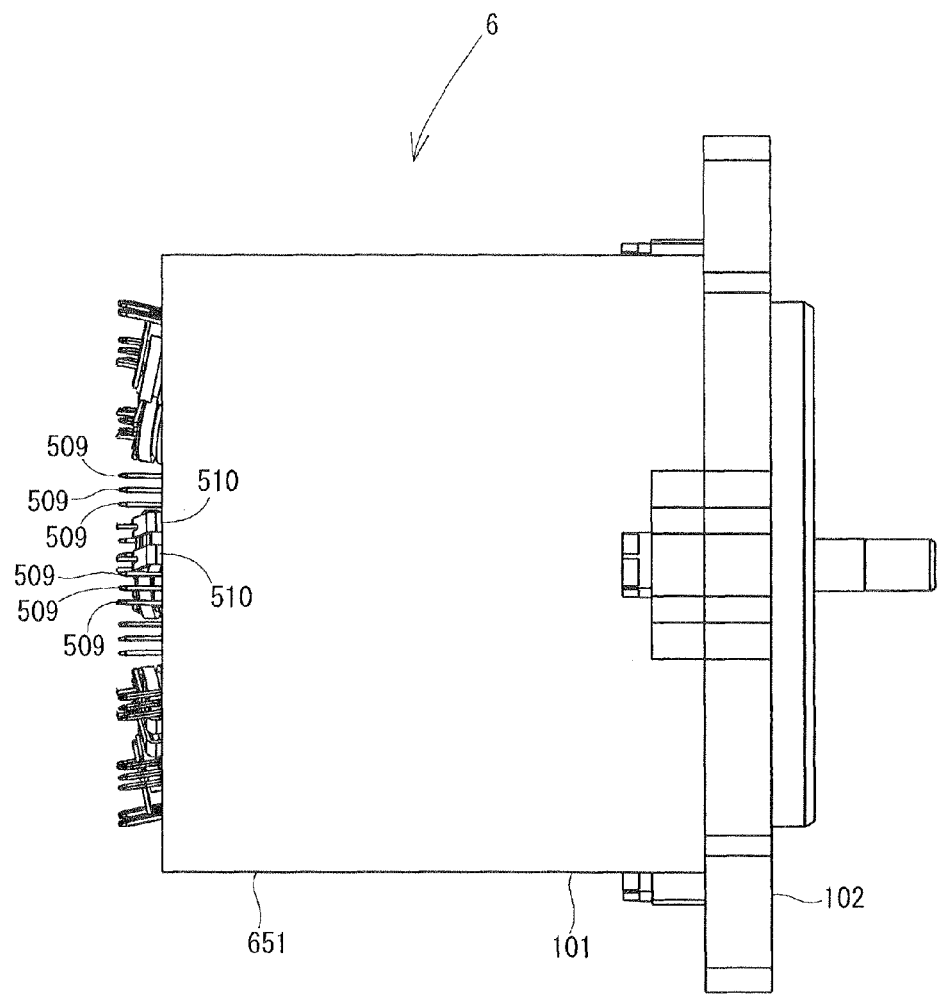
FIG. 21 is a side view of the drive apparatus according to the sixth embodiment.
Figure 22:
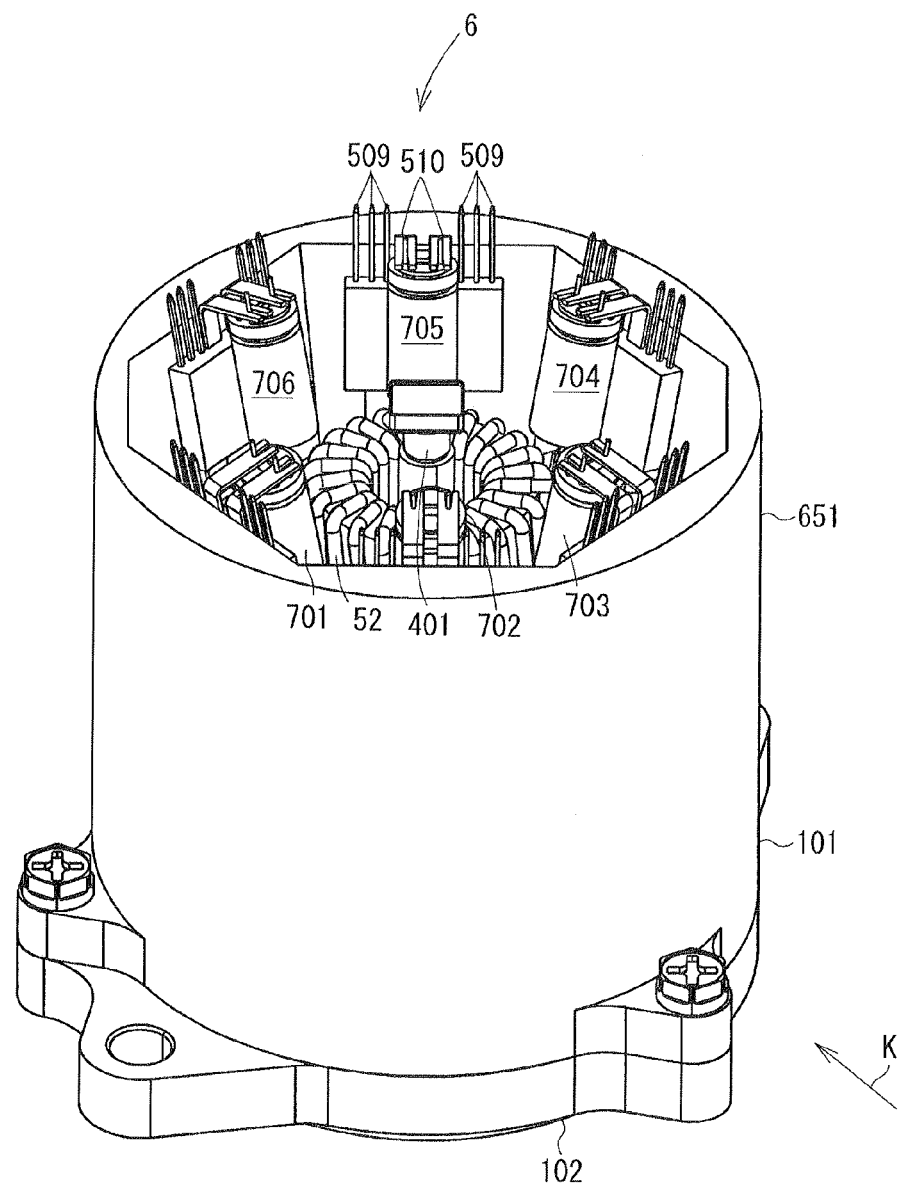
FIG. 22 is a perspective view of the drive apparatus according to the sixth embodiment.

The shape of the heat sink 651 on the section perpendicular to the axial direction is, as shown in FIG. 20, a cylindrical shape, and an accommodation spaceshaped like a truncated pyramid is formed internally. The heat sink 651 has a side wall 652 around the center line of the shaft 401. In this case, the external wall surface of the heat sink 651 forms part of the outer periphery of the drive apparatus 6 (FIG. 21 and FIG. 22).

In addition, the side wall 652 of the heat sink 651 has side wall surfaces 655 oriented in radially inward directions. As for the side wall surfaces 655, a total of six side wall surfaces are formed in the circumferential direction. The heat sink 651 differs from the heat sink 611 (FIG. 8) in the above-described embodiment in that the side wall surfaces 655 are tilted. More particularly, the side wall surfaces 655 are tilted to recede from the center line of the shaft 401 as they are distanced from the end wall 106 of the motor case 101.

As for the heat sink 651, the semiconductor modules 531 to 536 are disposed one by one on the side wall surfaces 655 that are oriented in the radially inward directions. The semiconductor modules 531 to 536 are disposed so that the heat radiation surfaces thereof are in contact with the respective side wall surfaces 655. Here, the side wall surfaces 655 are provided with planes, and the heat radiation surfaces of the semiconductor modules 531 to 536 are planar accordingly.

The semiconductor modules 531 to 536 are, as described above, disposed on the respective side wall surfaces 655 of the heat sink 651, whereby the semiconductor modules are tilted with respect to the center line of the shaft 401.

Each of the semiconductor modules 531 to 536 has the coil terminal 508 at the side end thereof facing the motor case 101 (FIG. 20). Further, each of the semiconductor modules 531 to 536 has six control terminals 509 and two capacitor terminals 510 at the side end surface thereof opposite to the motor case 101 (FIG. 21 and FIG. 22).

As shown in FIG. 20 and others, six capacitors 701, 702, 703, 704, 705, 706 are disposed on the sides of the semiconductor modules 531 to 536 opposite to the heat sink 651.

The capacitors 701 to 706 are disposed near the semiconductor modules 531 to 536 in one-to-one correspondence with the semiconductor modules 531 to 536. The capacitors 701 to 706 are in a columnar shape, and are tilted along the semiconductor modules. In addition, since the capacitor terminals 510 of the semiconductor modules 531 to 536 are bent in the radially inward directions, terminals of the capacitors 701 to 706 are coupled directly to the bent capacitor terminals 510.

The choke coil 52 is disposed with the shaft 401 penetrating therethrough (FIG. 22). The choke coil 52 has the coil wire wound about the doughnut-shaped iron core.

The drive apparatus 6 of the sixth embodiment provides the same advantages as the advantages (1), (3), (4), (6) to (8), and (10) to (13) of the first embodiment.

Especially, in the drive apparatus 6, the capacitors 701 to 706 are disposed on the sides of the semiconductor modules 531 to 536 opposite to the heat sink 651. This obviates necessity of forming accommodation spaces for the capacitors 701 to 706 in the heat sink 651.

In the drive apparatus 6 of the present embodiment, the semiconductor modules 531 to 536 are tilted. Therefore, the physical configuration in the axial direction can be made smaller.

Further, the side wall surfaces 655 are tilted to recede from the center line of the shaft 401 as they separate from the end wall 106 of the motor case 101. Therefore, when the heat sink 651 is formed through casting processing, the processing is relatively easy to do.

Seventh Embodiment

Figure 23:
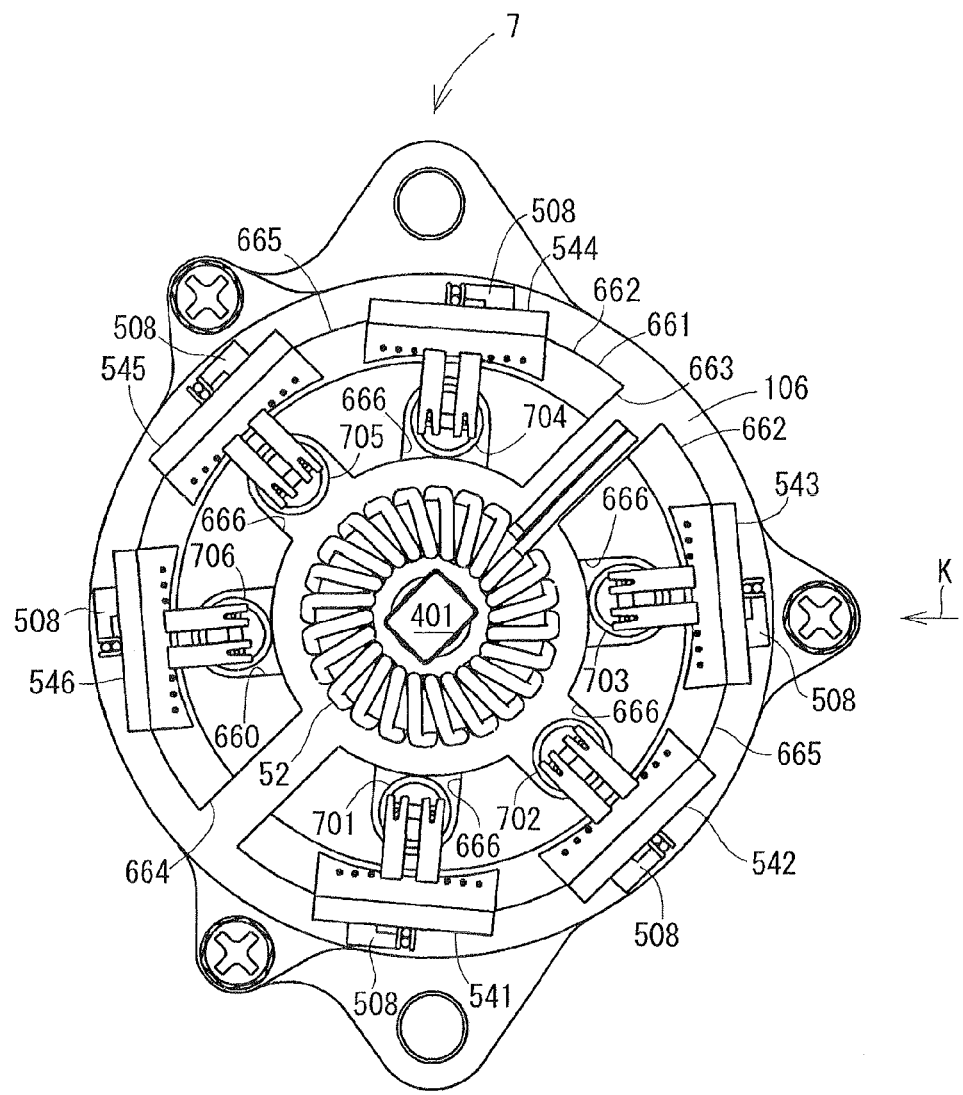
FIG. 23 is a plan view of a drive apparatus according to a seventh embodiment.

A drive apparatus 7 of a seventh embodiment includes, as shown in FIG. 23, six semiconductor modules 541, 542, 543, 544, 545, and 546.

The semiconductor modules 541 to 546 are mounted on a heat sink 661 extended in the same direction as the direction of the center line of the shaft 401 from the end wall 106 of the motor case 101.

The heat sink 661 has, as shown in FIG. 23, two column-shaped parts, the shape on a section perpendicular to the axial direction of which is a substantially semicircular shape, juxtaposed as if to sandwich the center line of the shaft 401. Further, the heat sink 661 has a predetermined radius portion thereof cut out so that a columnar space can be provided in the center. Here, the heat sink 661 differs from the heat sink 621 of the above-described embodiment (FIG. 11) in that the radially outward wall surfaces are tilted to approach the center line of the shaft 401 as they are distanced from the motor case 101. When the heat sink 661 is seen as a whole, the heat sink is shaped like a truncated pyramid whose bottom is located on the side of the motor case 101. The heat sink 661 has side walls 662 around the center line of the shaft 401. The side walls 662 include two notched portions 663 and 664 respectively that provide discontinuous parts.

The side walls 662 of the heat sink 661 include side wall surfaces 665 oriented in the radially outward directions. The side wall surfaces 665 are conical peripheral surfaces and are tilted. Accommodation spaces 666 that open onto the columnar space in the center are formed in the radially inward directions of the side wall surfaces 665.

As for the heat sink 661, the semiconductor modules 541 to 546 are disposed on the side wall surfaces 665 that are oriented in the radially outward directions. The semiconductor modules 541 to 546 are disposed so that the heat radiation surfaces thereof are in contact with the side wall surfaces 665. Here, the side wall surfaces 665 are convexly curved surfaces, and the heat radiation surfaces of the semiconductor modules 531 to 536 are concavely curved surfaces accordingly.

In addition, since the semiconductor modules 541 to 546 are, as described above, disposed on the side wall surfaces 665 of the heat sink 661, the semiconductor modules are tilted with respect to the center line of the shaft 401.

Figure 24:
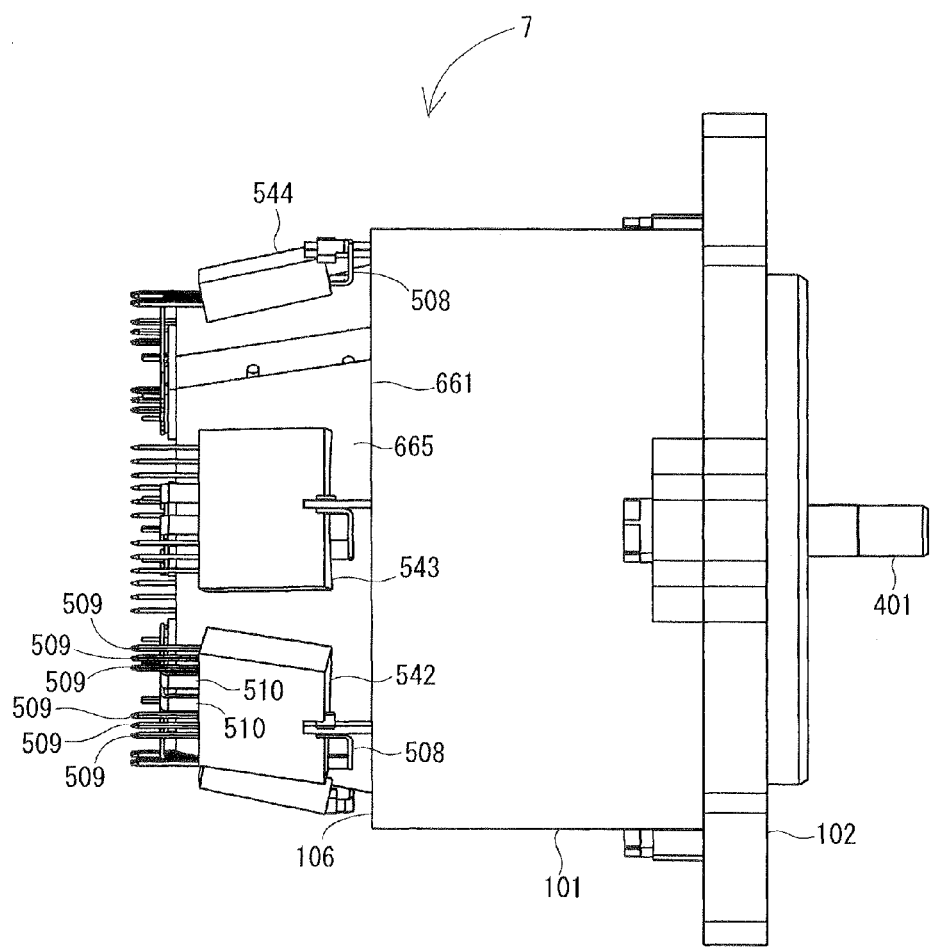
FIG. 24 is a side view of the drive apparatus according to the seventh embodiment.

Further, each of the semiconductor modules 541 to 546 has the coil terminal 508 at the side end thereof facing the motor case 101. In addition, each of the semiconductor modules 541 to 546 has six control terminals 509 and two capacitor terminals 510 at the side end surface thereof opposite to the motor case 101 (FIG. 24 and FIG. 25).

As shown in FIG. 23 and others, six capacitors 701, 702, 703, 704, 705, and 706 are disposed on the same sides of the semiconductor modules 541 to 546 as the heat sink 661 is. More particularly, the capacitors are disposed in the accommodation spaces 666 of the heat sink 661.

The capacitors 701 to 706 are disposed near the semiconductor modules 541 to 546 in one-to-one correspondence with the semiconductor modules 541 to 546. The capacitors 701 to 706 are in a columnar shape, and are disposed so that the axes thereof become parallel to the center line of the shaft 401. In addition, the capacitor terminals 510 of the semiconductor modules 541 to 546 are bent in the radially inward directions. Therefore, terminals of the capacitors 701 to 706 are coupled directly to the bent capacitor terminals 510 (FIG. 25).

Figure 25:
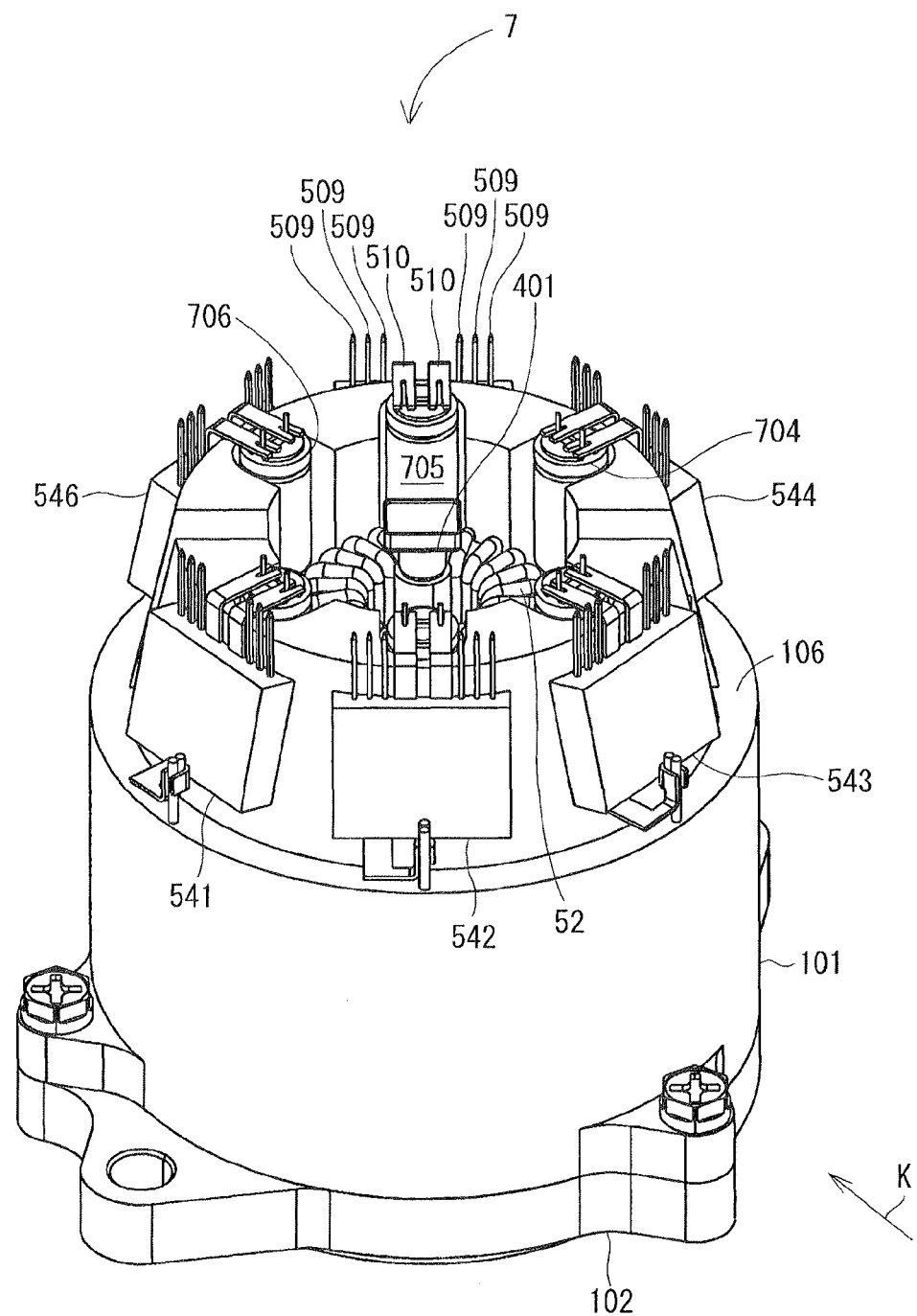
FIG. 25 is a perspective view of the drive apparatus according to the seventh embodiment.

The choke coil 52 is disposed with the shaft 401 penetrating therethrough (FIG. 25). The choke coil 52 has the coil wire wound about the doughnut-shaped iron core. The coil end of the choke coil 52 is led out in the radially outward direction through the notched portion 663 of the heat sink 661 (FIG. 23).

The drive apparatus 7 of the present embodiment provides the same advantages as the advantages (1), (3) to (6), and (8) to (13) described in relation to the first embodiment.

Especially, in the drive apparatus 7, since the semiconductor modules 541 to 546 are tilted, the physical configuration in the axial direction can be made smaller.

When viewed as a whole, the heat sink 661 is shaped like a truncated pyramid. In addition, the side wall surfaces 665 are tilted to approach the center line of the shaft 401 as they separate from the end wall 106 of the motor case 101. Therefore, when the heat sink 661 is formed through casting processing, the processing becomes relatively easy to do.

Eighth Embodiment

Figure 26:
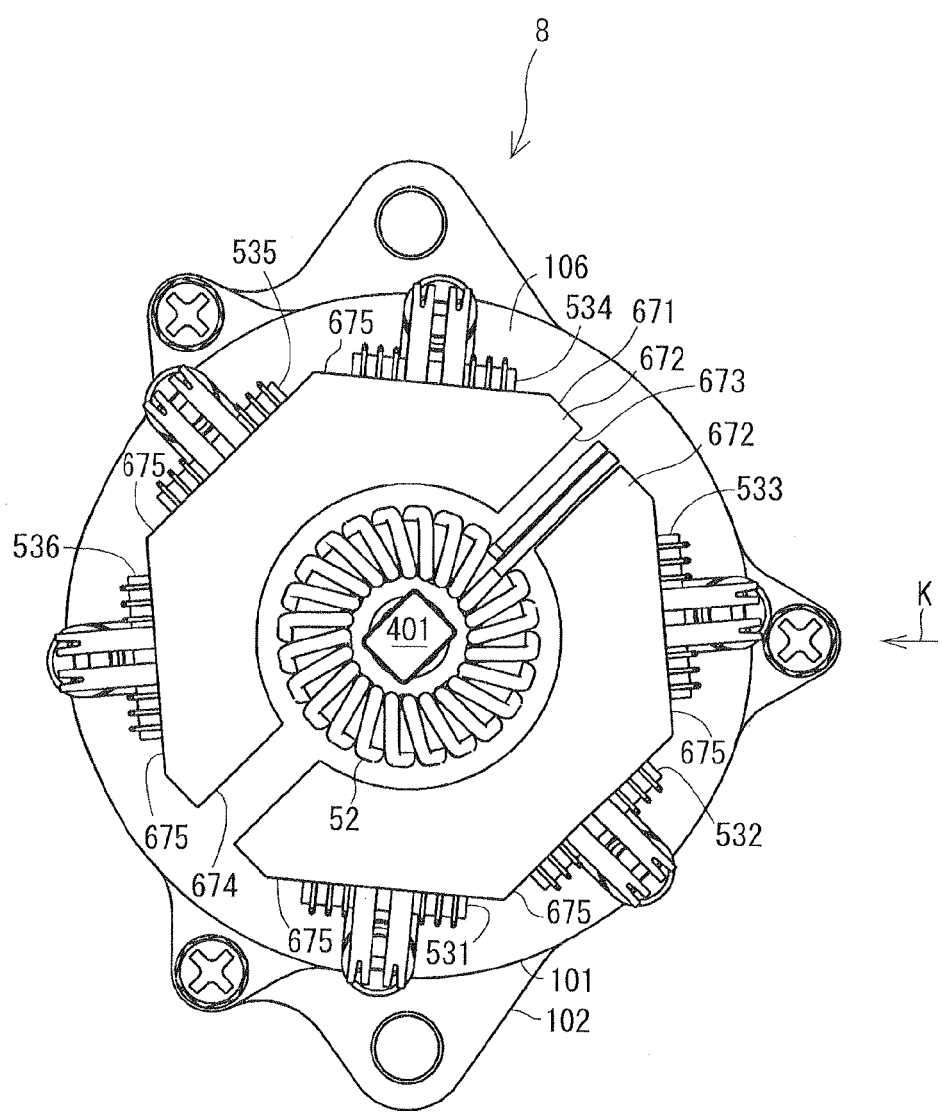
FIG. 26 is a plan view of a drive apparatus according to an eighth embodiment.

A drive apparatus 8 of an eighth embodiment includes, as shown in FIG. 26, six semiconductor modules 531, 532, 533, 534, 535, and 536.

The semiconductor modules 531 to 536 are mounted on a heat sink 671 extended in the same direction as the direction of the center line of the shaft 401 from the end wall 106 of the motor case 101.

The heat sink 671 has, as shown in FIG. 26, two column-shaped parts, the shape on the section perpendicular to the axial direction of which is a substantially trapezoidal shape, juxtaposed as if to sandwich the center line of the shaft 401. Further, the heat sink 671 has a predetermined radius portion thereof cut out so that a columnar space can be formed in the center. Here, the heat sink 671 differs from the heat sink 601 of the above-described embodiment (FIG. 2) in that the radially outward wall surfaces are tilted to recede from the center line of the shaft 401 as they separate from the motor case 101. When the heat sink 671 is seen as a whole, the heat sink is shaped like a truncated pyramid whose top surface that is parallel to a bottom is located on the side of the motor case 101. The heat sink 671 has side walls 672 around the center line of the shaft 401. The side walls 672 include two notched portions 673 and 674 respectively that provide discontinuous parts.

The side walls 672 of the heat sink 671 include six side wall surfaces 675 that are oriented in the radially outward directions. The side wall surfaces 675 are tilted.

As for the heat sink 671, the semiconductor modules 531 to 536 are disposed on the side wall surfaces 675 that are oriented in the radially outward directions. The semiconductor modules 531 to 536 are disposed so that the heat radiation surfaces thereof are in contact with the side wall surfaces 675. Here, the side wall surfaces 675 are planar, and the heat radiation surfaces of the semiconductor modules 531 to 536 are planar accordingly.

Since the semiconductor modules 531 to 536 are, as described above, disposed on the side wall surfaces 675 of the heat sink 671, the semiconductor modules are tilted with respect to the center line of the shaft 401.

Figure 27:
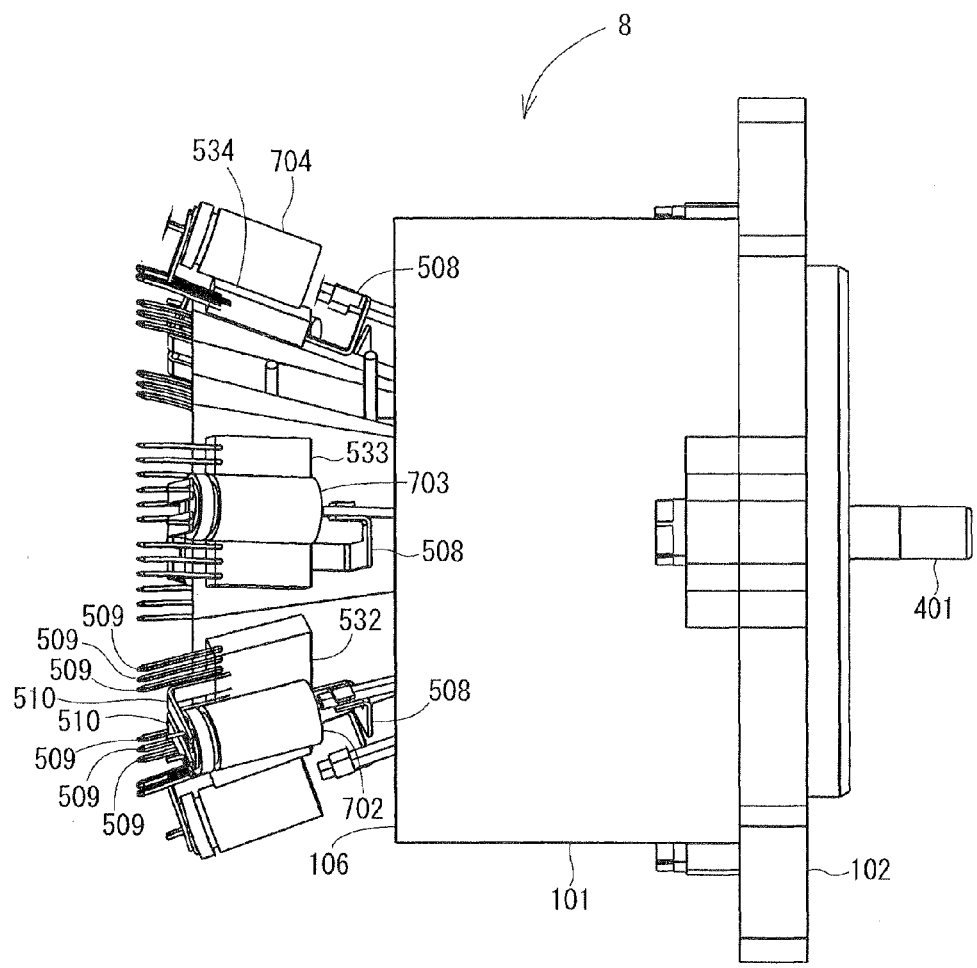
FIG. 27 is a side view of the drive apparatus according to the eighth embodiment.
Figure 28:
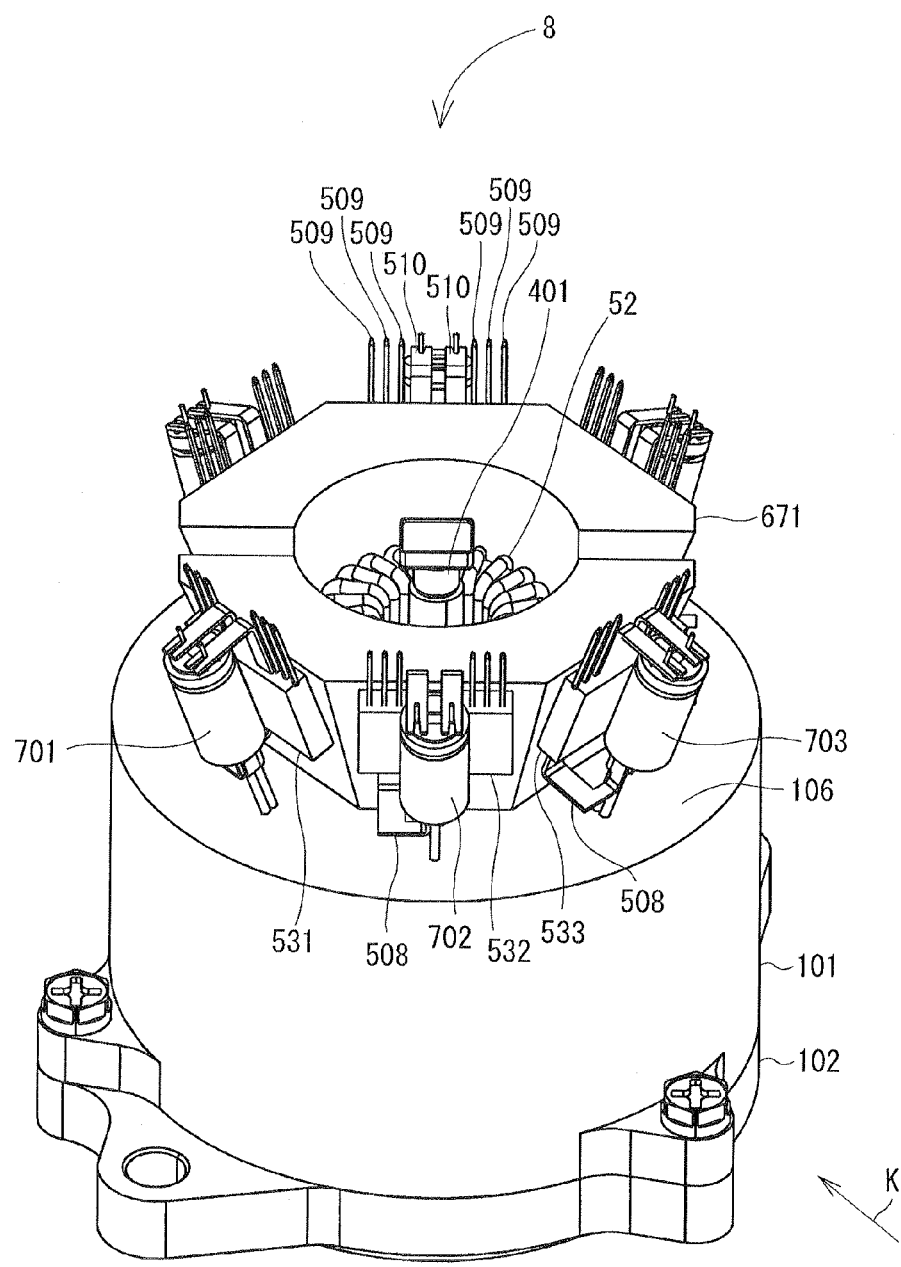
FIG. 28 is a perspective view of the drive apparatus according to the eighth embodiment.

Further, each of the semiconductor modules 531 to 536 has the coil terminal 508 at the side end thereof facing the motor case 101 (FIG. 27 and FIG. 28). In addition, each of the semiconductor modules 531 to 536 has six control terminals 509 and two capacitor terminals 510 at the side end surface thereof opposite to the motor case 101 (FIG. 27 and FIG. 28).

As shown in FIG. 26 and others, six capacitors 701, 702, 703, 704, 705, and 706 are disposed on the sides of the semiconductor modules 531 to 536 opposite to the heat sink 671.

The capacitors 701 to 706 are disposed near the semiconductor modules 531 to 536 in one-to-one correspondence with the semiconductor modules 531 to 536. The capacitors 701 to 706 are in a columnar shape, and are tilted along the semiconductor modules 531 to 536. In addition, since the capacitor terminals 510 of the semiconductor modules 531 to 536 are bent in the radially outward directions, terminals of the capacitors 701 to 706 are coupled directly to the bent capacitor terminals 510 (FIG. 28).

The choke coil 52 is disposed with the shaft 401 penetrating therethrough (FIG. 28). The choke coil 52 has the coil wire wound about the doughnut-shaped iron core. The coil end of the choke coil 52 is led out in the radially outward direction through the notched portion 673 of the heat sink 671.

The drive apparatus 8 of the eighth embodiment provides the same advantages as the advantages (1), (3), (4), and (6) to (13) described in relation to the first embodiment.

In particular, in the drive apparatus 8, since the semiconductor modules 531 to 536 are tilted, the physical configuration in the axial direction can be made smaller.

In addition, the side wall surfaces 675 of the heat sink 671 are tilted to recede from the center line of the shaft 401 as they separate from the end wall 106 of the motor case 101. Therefore, a space can be preserved on the end wall 106 of the motor case 101.

Further, in the drive apparatus 8, the capacitors 701 to 706 are disposed on the sides of the semiconductor modules 531 to 536 opposite to the heat sink 671. This obviates the necessity of forming accommodation spaces for the capacitors 701 to 706 in the heat sink 671.

Ninth Embodiment

Figure 29:
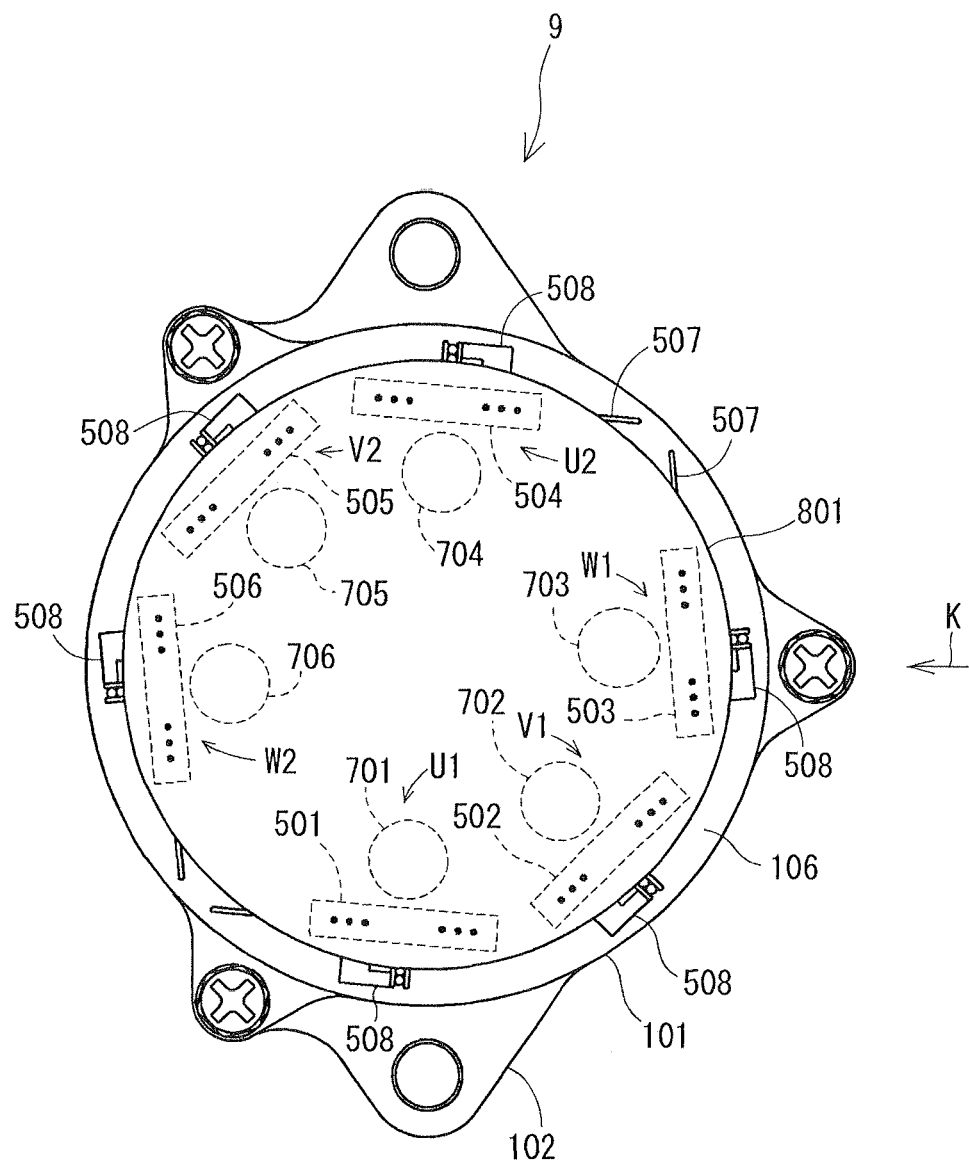
FIG. 29 is a plan view of a drive apparatus according to a ninth embodiment.

A drive apparatus 9 of a ninth embodiment includes, as shown in FIG. 29, six semiconductor modules 501, 502, 503, 504, 505, and 506. For discriminating the semiconductor modules 501 to 506 from one another, the reference numerals in FIG. 29 are used to denote them as the U1 semiconductor module 501, V1 semiconductor module 502, W1 semiconductor module 503, U2 semiconductor module 504, V2 semiconductor module 505, and W2 semiconductor module 506.

Herein, the three U1 to W1 semiconductor modules 501 to 503, and the three U2 to W2 semiconductor modules 504 to 506 are interconnected through the bus bars 507 to form module units. The bus bars 507 have the interconnecting function and serve as the power line.

In the ninth embodiment, the drive apparatus 9 does not include a heat sink.

Figure 30:
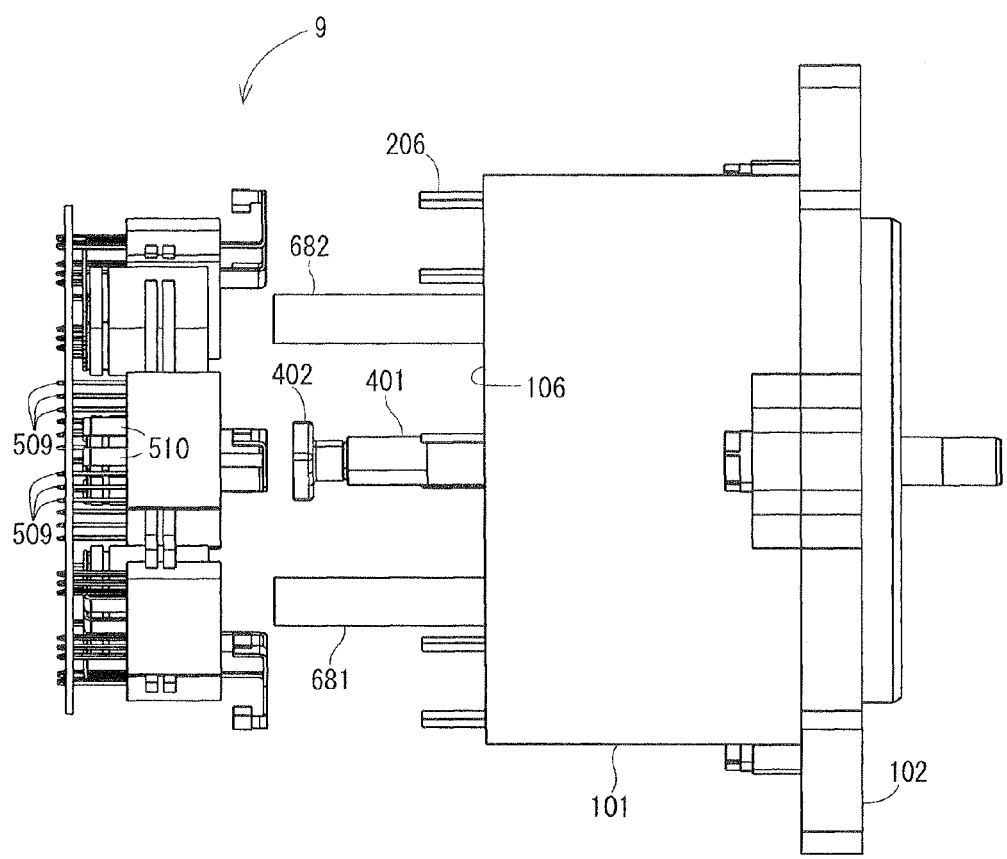
FIG. 30 is a side view of the drive apparatus according to the ninth embodiment.

Each of the semiconductor modules 501 to 506 has the coil terminal 508 at the side end thereof facing the motor case 101. In addition, each of the semiconductor modules 501 to 506 has six control terminals 509 and two capacitor terminals 510 at the side end surface thereof opposite to the motor case 101 (FIG. 30).

Figure 31:
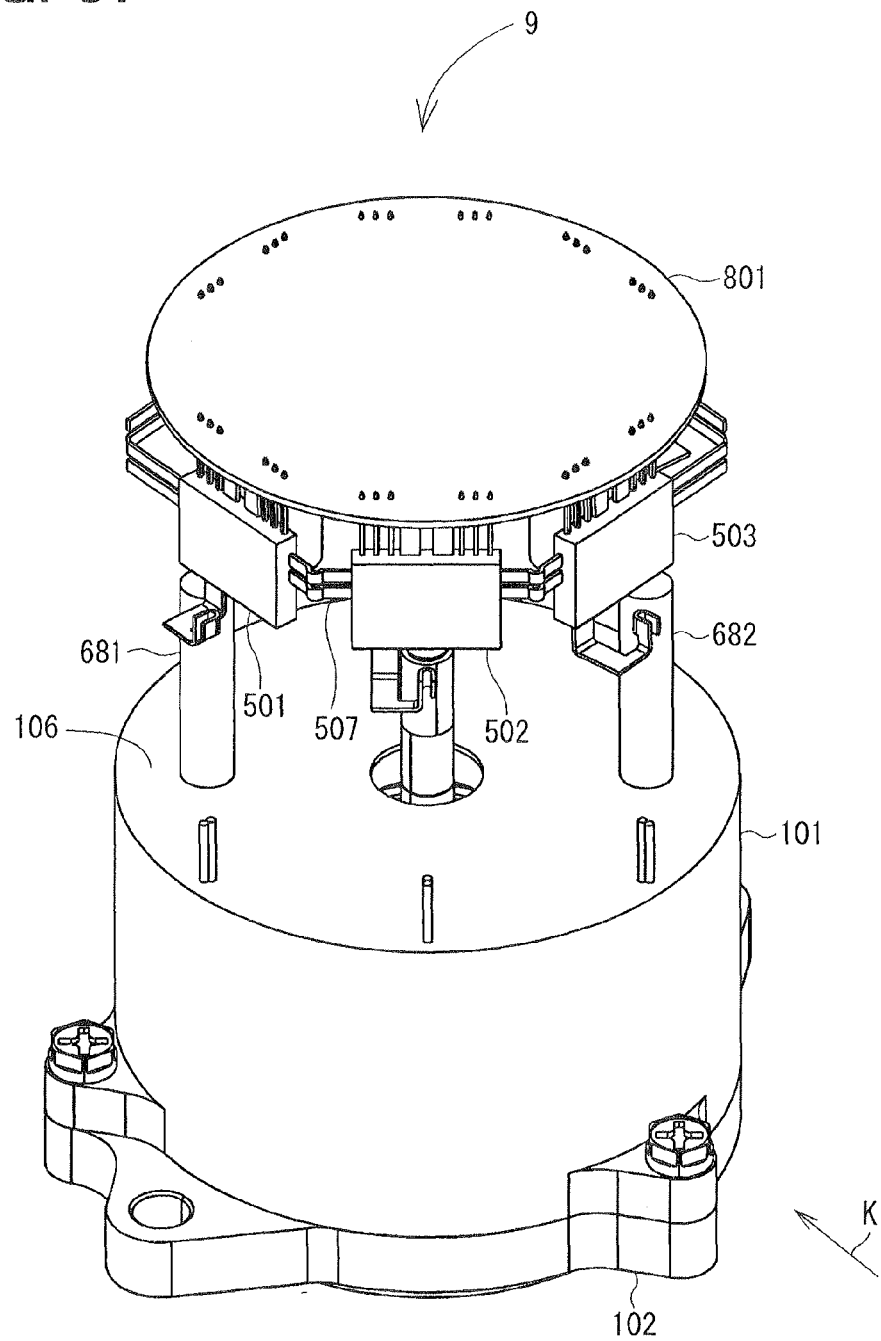
FIG. 31 is a perspective view of the drive apparatus according to the ninth embodiment.

The control terminals 509 are inserted into through holes in the printed circuit board 801, and then soldered. The semiconductor modules 501 to 506 are circumferentially arranged so that the vertical line to each semiconductor chip surface becomes perpendicular to the center line of the shaft 401 and is oriented in the radial direction. The printed circuit board 801 is, as shown in FIG. 30 and FIG. 31, screwed to the distal ends of two spacers 681 and 682 that are set up on the motor case 101 in parallel with the center line of the shaft 401. Accordingly, the semiconductor modules 501 to 506 are positioned with respect to the motor case 101.

As shown in FIG. 29, six capacitors 701, 702, 703, 704, 705, and 706 are disposed on the radially inner sides of the semiconductor modules 501 to 506.

The capacitors 701 to 706 are disposed near the semiconductor modules 501 to 506 in one-to-one correspondence with the semiconductor modules 501 to 506. The capacitors 701 to 706 are in a columnar shape, and are disposed so that the axes thereof become parallel to the center line of the shaft 401. In addition, since the capacitor terminals 510 of the semiconductor modules 501 to 506 are bent in the radially inward directions, terminals of the capacitors 701 to 706 are coupled directly to the bent capacitor terminals 510.

The drive apparatus 9 of the ninth embodiment provides the same advantages as the advantages (1) to (3) and (10) to (14) described in relation to the first embodiment.

Especially, the ninth embodiment is advantageous in a case where power consumption is limited and heat radiation from the semiconductor modules 501 to 506 is limited.

Tenth Embodiment

Figure 32:
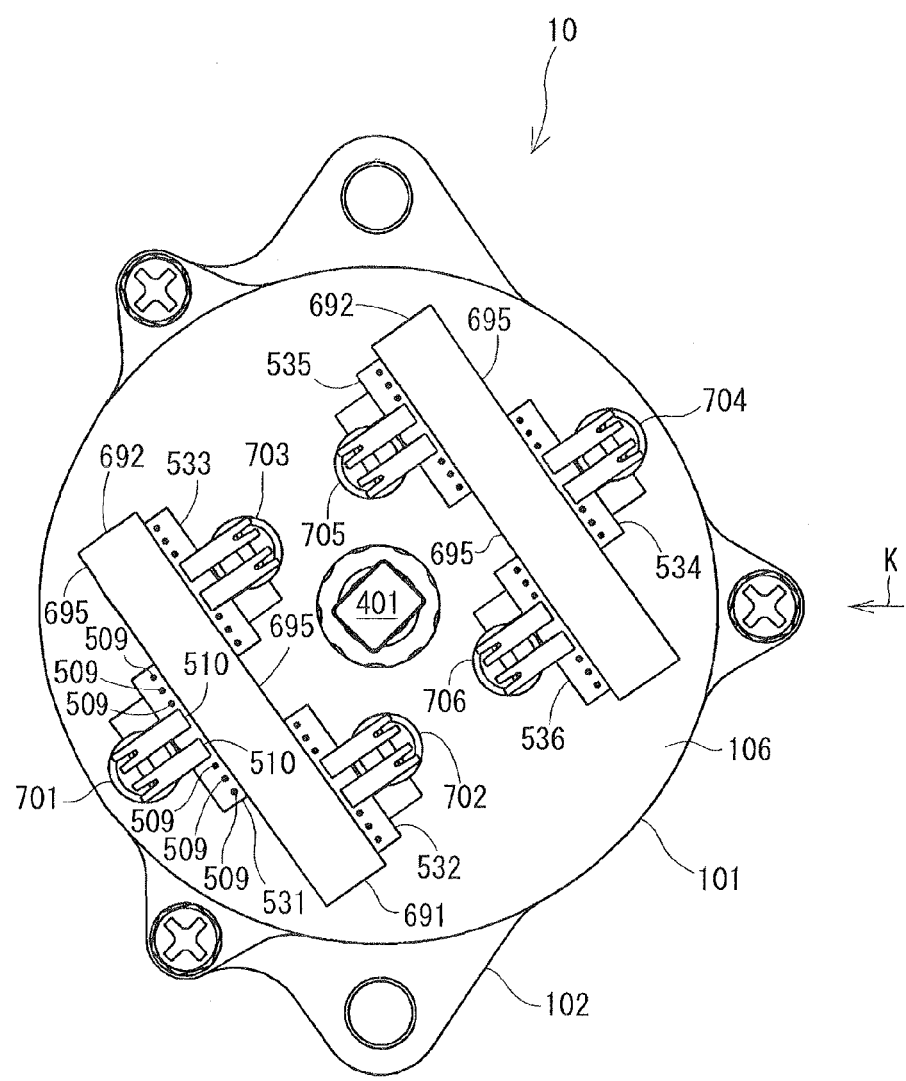
FIG. 32 is a plan view of a drive apparatus according to a tenth embodiment.

A drive apparatus 10 of a tenth embodiment includes, as shown in FIG. 32, six semiconductor modules 531, 532, 533, 534, 535, and 536. The semiconductor modules 531 to 536 are mounted on a heat sink 691 extended in the same direction as the direction of the center line of the shaft 401 from the end wall 106 of the motor case 101.

The heat sink 691 has, as shown in FIG. 32, two column-shaped parts, the shape on the section perpendicular to the axial direction of which is a rectangular shape, juxtaposed as if to sandwich the center line of the shaft 401. The heat sink 691 has side walls 692 around the center line of the shaft 401.

The side walls 692 of the heat sink 691 include four side wall surfaces 695 that are perpendicular to the center line of the shaft 401, and are parallel to one another.

The six semiconductor modules 531 to 536 are disposed on the side wall surfaces 695 of the heat sink 691. More particularly, four semiconductor modules in total are disposed on the two inner side wall surfaces 695 out of the four side wall surfaces 695 with two of the four semiconductor modules being on each inner side wall surface 696. Two semiconductor modules in total are disposed on the two outer side wall surfaces 695 with one of the two semiconductor modules being on each outer side wall surface.

The semiconductor modules 531 to 536 are disposed so that the heat radiation surfaces thereof are in contact with the side wall surfaces 695. Here, the side wall surfaces are planar, and the heat radiation surfaces of the semiconductor modules 531 to 536 are planar accordingly. In addition, the semiconductor modules 531 to 536 are disposed so that the semiconductor modules on the outer sides of the side walls 692 and the semiconductor modules on the inner sides of the side walls 692 are deviated from each other for fear the heat radiation surfaces may be precisely opposed to each other with each of the side walls 692 between them.

Figure 33:
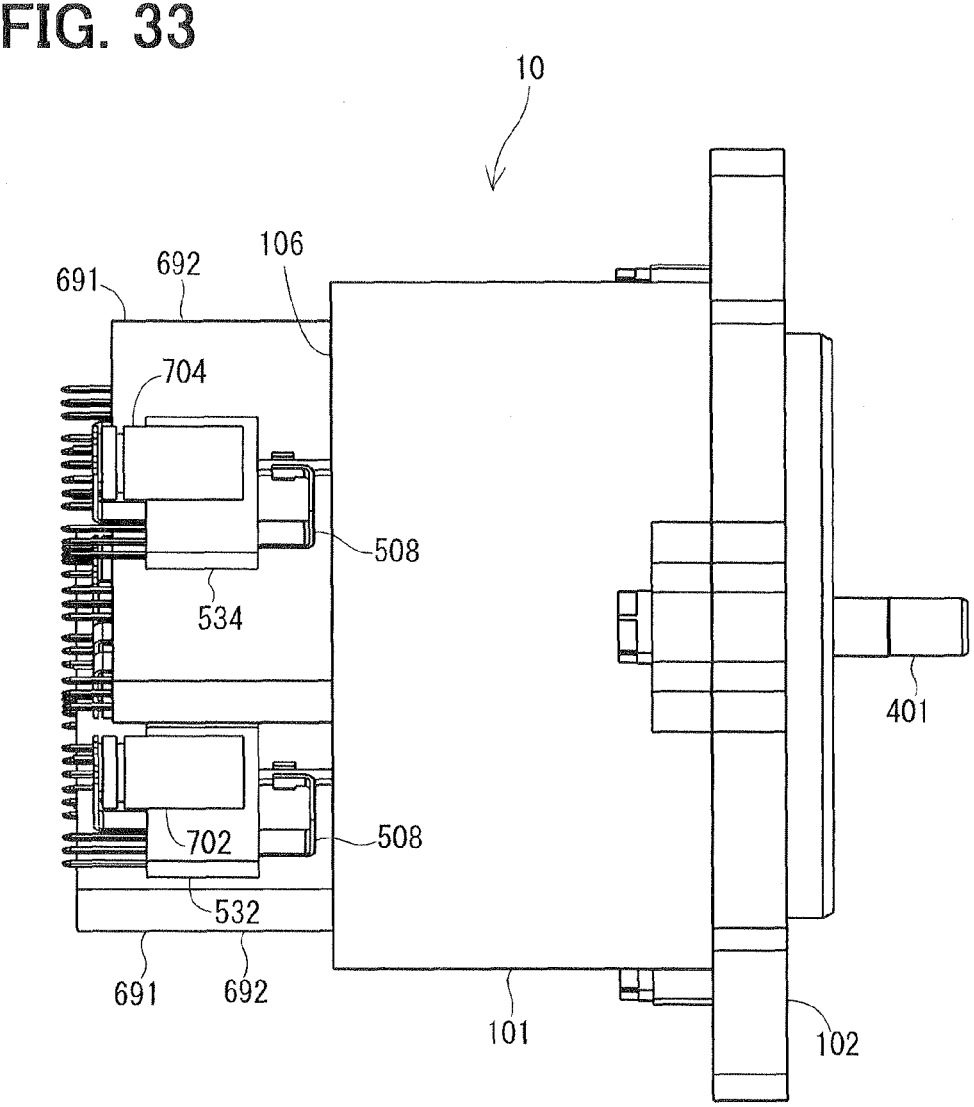
FIG. 33 is a side view of the drive apparatus according to the tenth embodiment.
Figure 34:
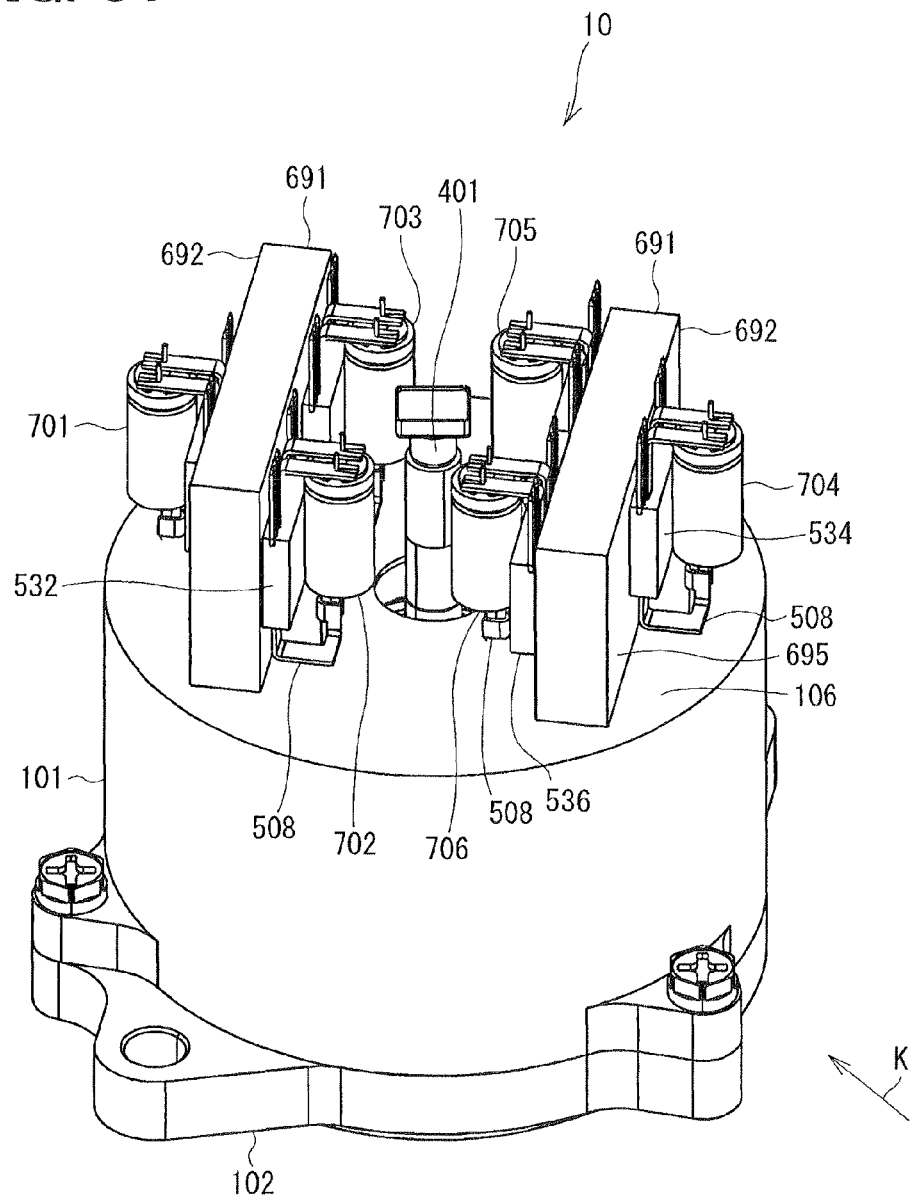
FIG. 34 is a perspective view of the drive apparatus according to the tenth embodiment.

In addition, each of the semiconductor modules 531 to 536 has the coil terminal 508 at the side end thereof facing the motor case 101 (FIG. 33 and FIG. 34). In addition, each of the semiconductor modules 531 to 536 has six control terminals 509 and two capacitor terminals 510 on the side end surface thereof opposite to the motor case 101 (FIG. 32).

As shown in FIG. 32 and others, six capacitors 701, 702, 703, 704, 705, and 706 are disposed on the sides of the semiconductor modules 531 to 536 opposite to the heat sink 691.

The capacitors 701 to 706 are disposed near the semiconductor modules 531 to 536 in one-to-one correspondence with the semiconductor modules 531 to 536. The capacitors 701 to 706 are in the columnar shape, and are disposed so that the axes thereof are parallel to the center line of the shaft 401. In addition, since the capacitor terminals of the semiconductor modules 531 to 536 are bent to the sides of the semiconductor modules 531 to 536 opposite to the side wall surfaces 695, terminals of the capacitors 701 to 706 are coupled directly to the bent capacitor terminals 510.

The drive apparatus 10 of the tenth embodiment provides the same advantages as the advantages (1) to (4), (6), (7), and (10) to (13) described in relation to the first embodiment.

Eleventh Embodiment

Figure 35:
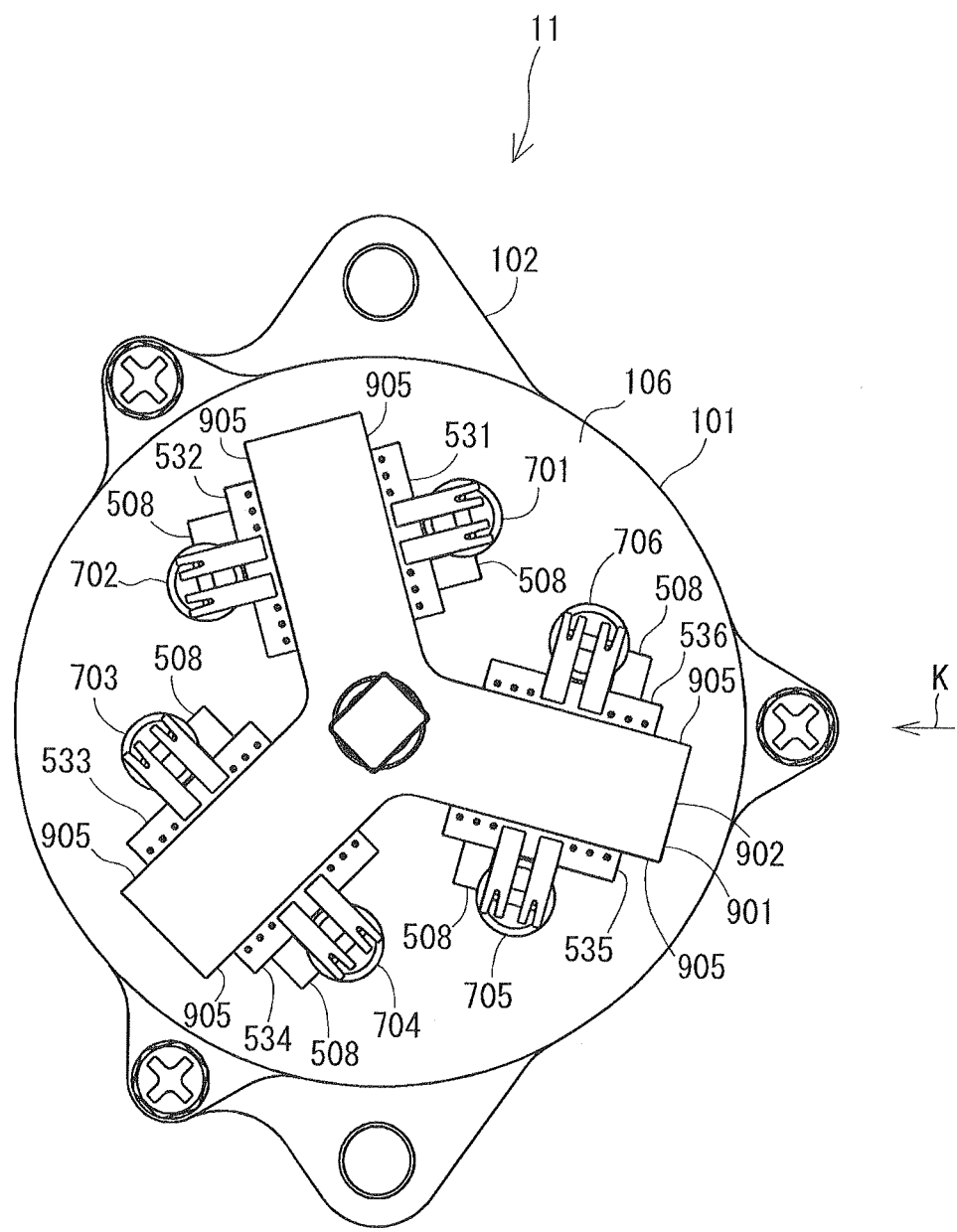
FIG. 35 is a plan view of a drive apparatus according to an eleventh embodiment.
Figure 36:
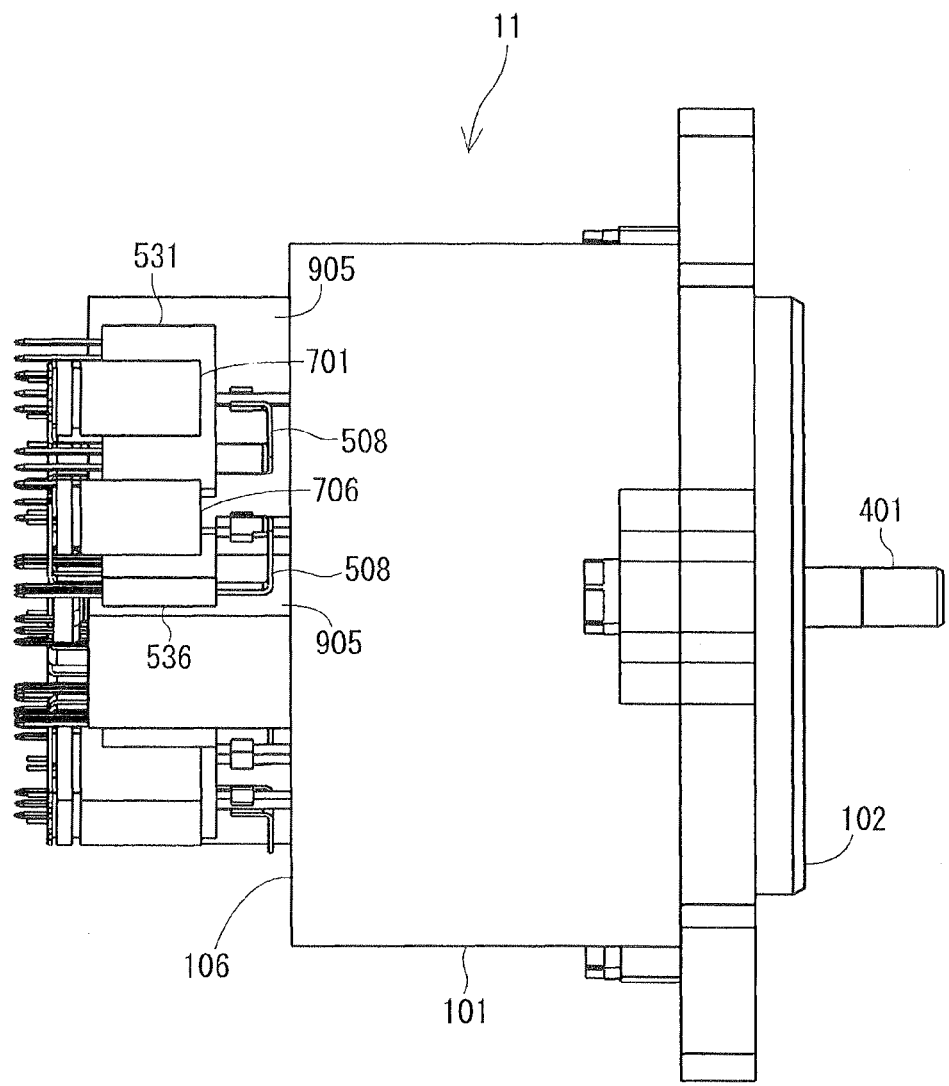
FIG. 36 is a side view of the drive apparatus according to the eleventh embodiment.

A drive apparatus 11 of an eleventh embodiment includes, as shown in FIG. 35, six semiconductor modules 531, 532, 533, 534, 535, and 536. The semiconductor modules 531 to 536 are mounted on a heat sink 901 extended in the same direction as the direction of the center line of the shaft 401 from the end wall 106 of the motor case 101.

The heat sink 901 has, as shown in FIG. 35, a side wall 902 that extends radially from the center at intervals of 120°. The radially extending side wall 902 has two side wall surfaces 905 on both sides thereof. Therefore, six side wall surfaces 905 in total are formed.

The six semiconductor modules 531 to 536 are disposed on the side wall surfaces 905 of the heat sink 901.

The semiconductor modules 531 to 536 are disposed so that the heat radiation surfaces thereof are in contact with the side wall surfaces 905. Here, the side wall surfaces 905 are planar, and the heat radiation surfaces of the semiconductor modules 531 to 536 are planar accordingly.

Figure 37:
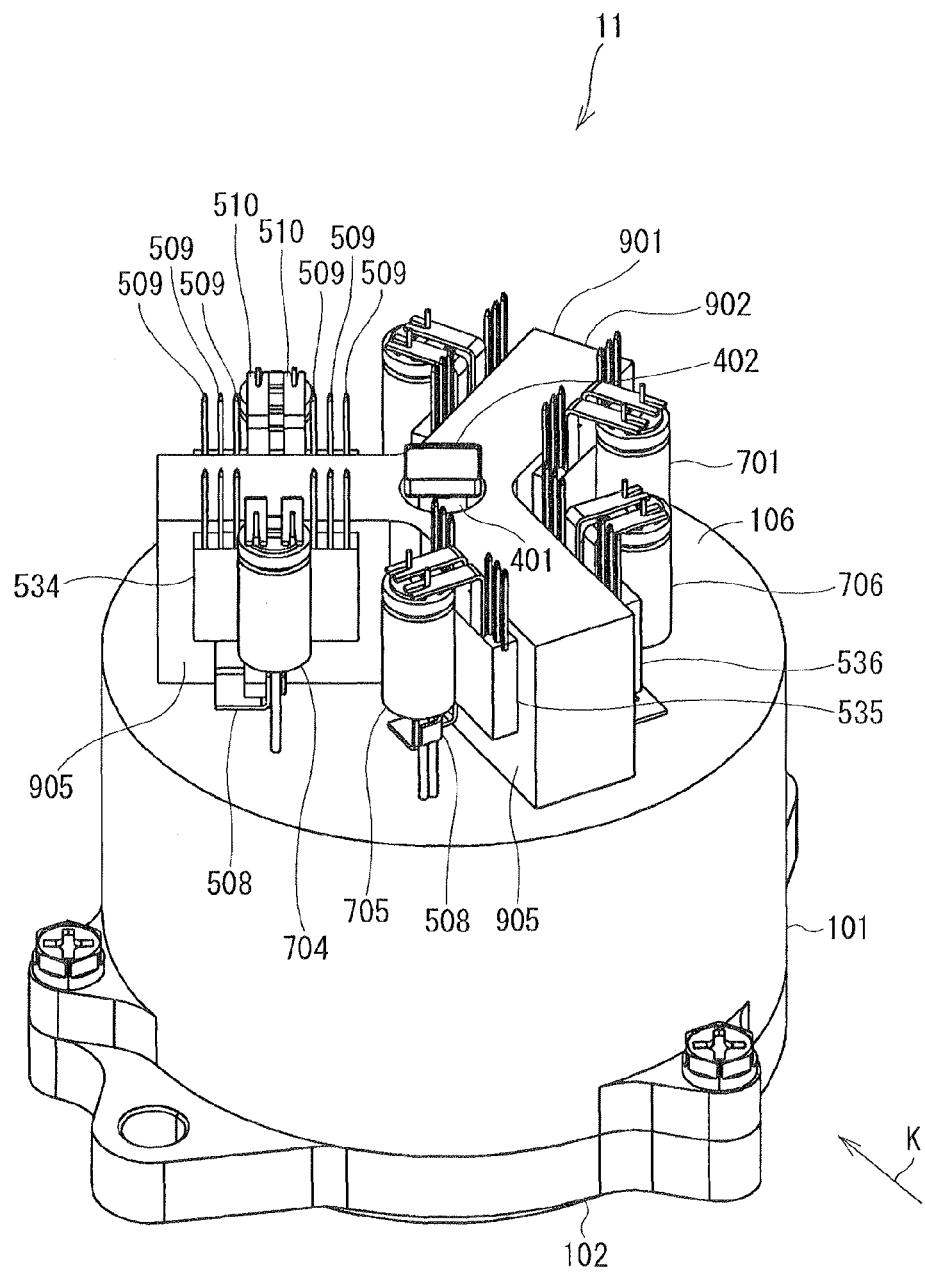
FIG. 37 is a perspective view of the drive apparatus according to the eleventh embodiment.

In addition, each of the semiconductor modules 531 to 536 has the coil terminal 508 at the side end thereof facing the motor case 101. In addition, each of the semiconductor modules 531 to 536 has six control terminals 509 and two capacitor terminals 510 at the side end surface thereof opposite to the motor case 101 (FIG. 37).

As shown in FIG. 35 and others, six capacitors 701, 702, 703, 704, 705, and 706 are disposed on the sides of the semiconductor modules 531 to 536 opposite to the heat sink 641.

The capacitors 701 to 706 are disposed near the semiconductor modules 531 to 536 in one-to-one correspondence with the semiconductor modules 531 to 536. The capacitors 701 to 706 are in the columnar shape, and are disposed so that the axes thereof become parallel to the center line of the shaft 401. In addition, since the capacitor terminals 510 of the semiconductor modules 531 to 536 are bent to the sides thereof opposite to the side wall surfaces 905, terminals of the capacitors are coupled directly to the bent capacitor terminals 510 (FIG. 37).

The drive apparatus 11 of the eleventh embodiment provides the same advantages as the advantages (1) to (4), (6), (7), and (10) to (13) described in relation to the first embodiment.

Twelfth Embodiment

Figure 38:
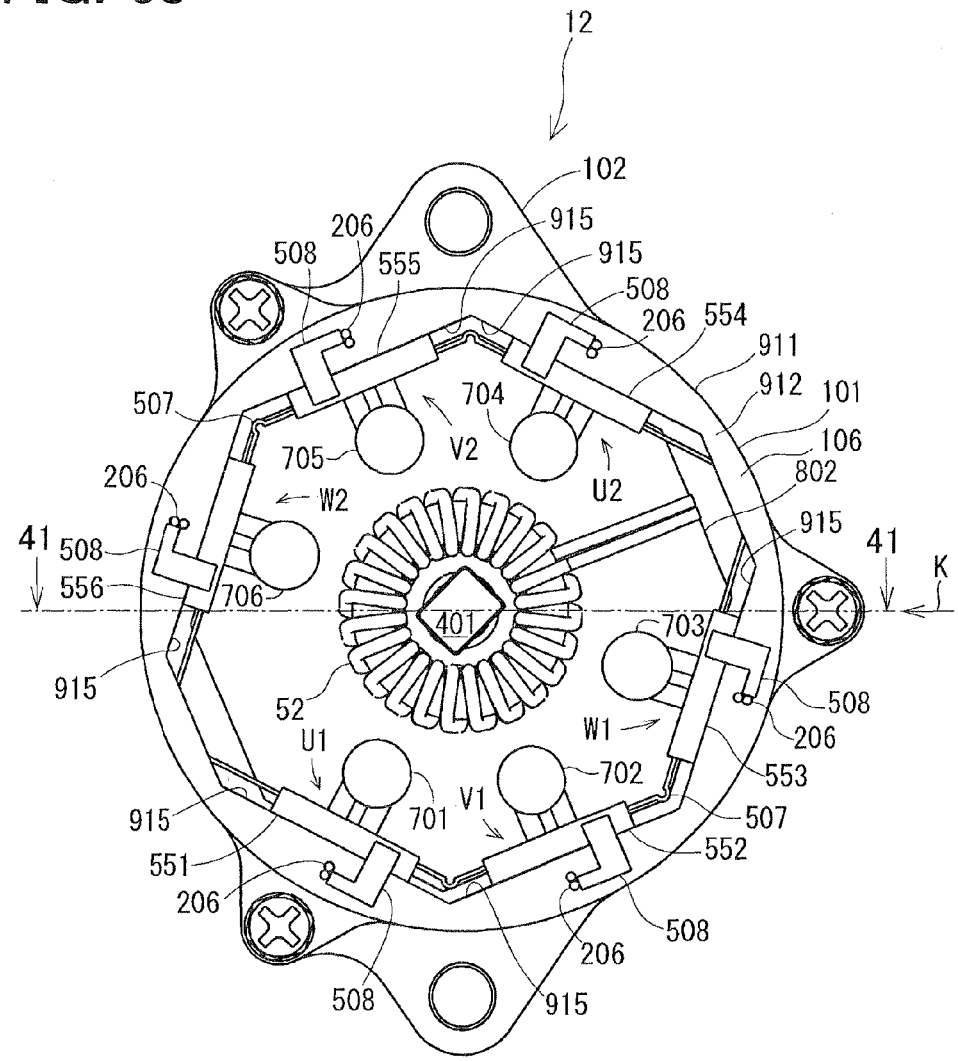
FIG. 38 is a plan view of a drive apparatus according to a twelfth embodiment.

A drive apparatus 12 of a twelfth embodiment includes, as shown in FIG. 38, six semiconductor modules 551, 552, 553, 554, 555, and 556. For discriminating the semiconductor modules 551 to 556 from one another, the reference numerals in FIG. 38 are used to denote them as the U1 semiconductor module 551, V1 semiconductor module 552, W1 semiconductor module 553, U2 semiconductor module 554, V2 semiconductor module 555, and W2 semiconductor module 556.

Herein, the three U1 to W1 semiconductor modules 551 to 553, and the three U2 to W2 semiconductor modules 554 to 556 are interconnected through the bus bars 507 to form module units. The bus bars 507 have the interconnecting function and serve as the power line.

The semiconductor modules 551 to 556 are mounted on a heat sink 911 extended in the same direction as the direction of the center line of the shaft 401 from the end wall 106 of the motor case 101.

Figure 39:
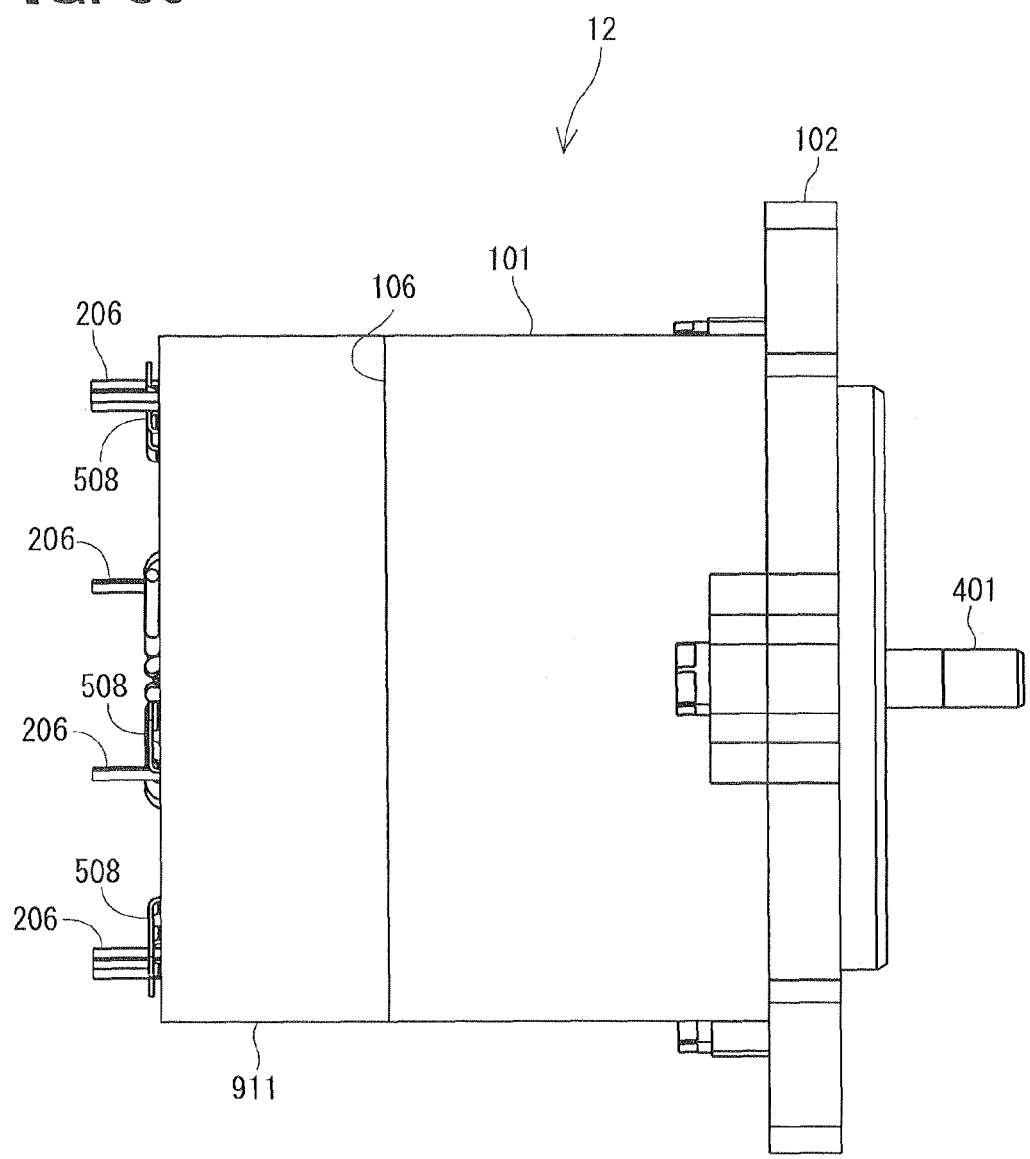
FIG. 39 is a side view of the drive apparatus according to the twelfth embodiment.
Figure 40:
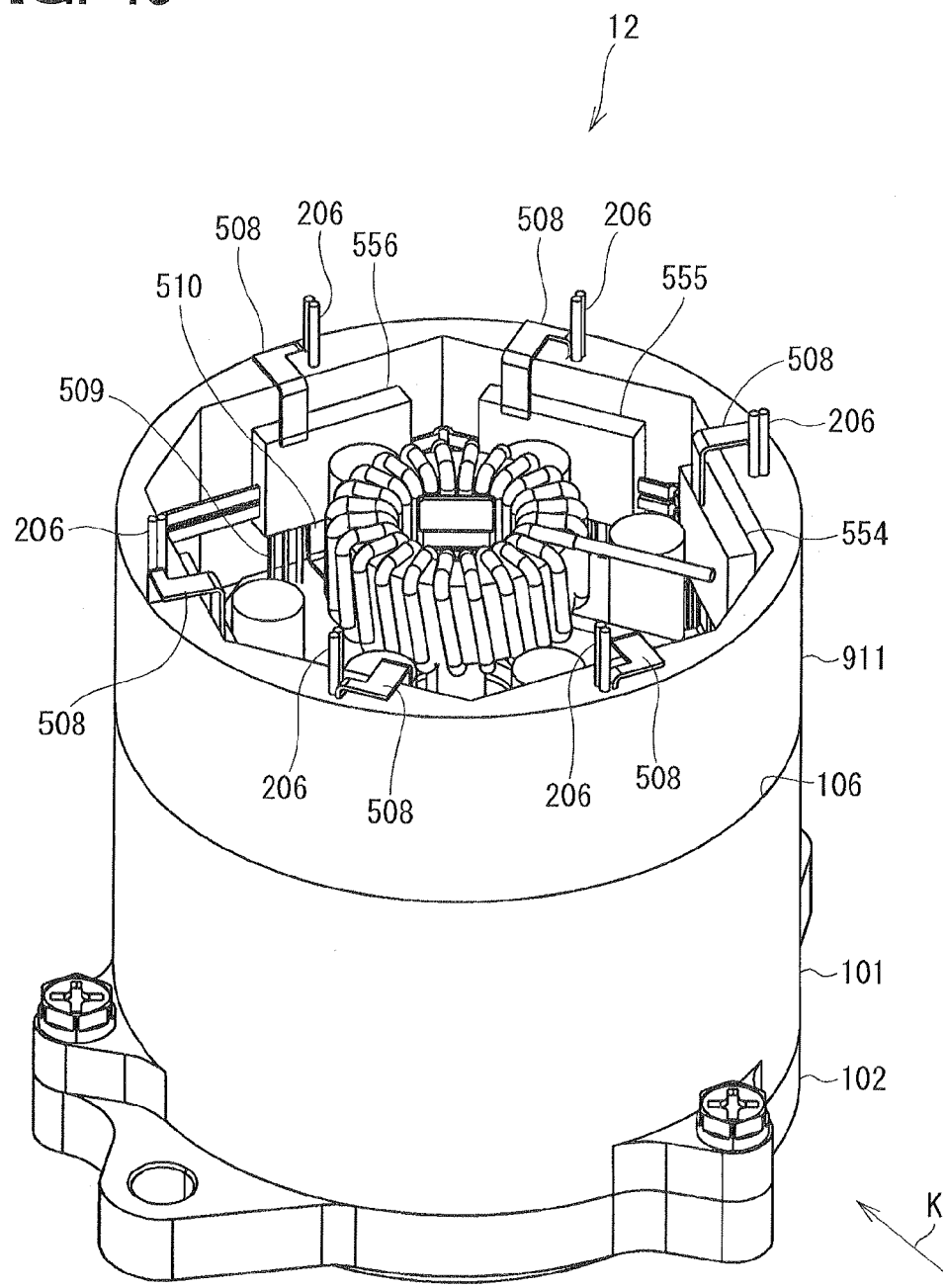
FIG. 40 is a perspective view of the drive apparatus according to the twelfth embodiment.
Figure 41:
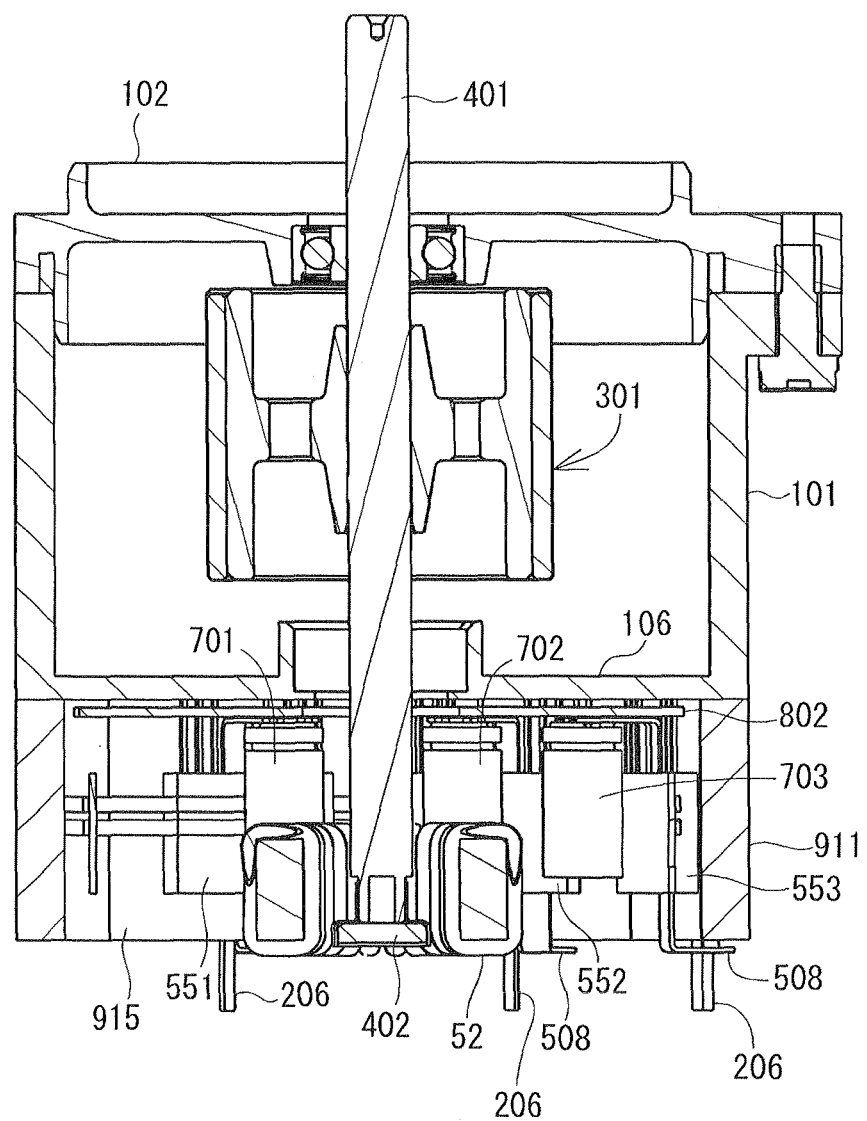
FIG. 41 is a sectional view taken along a line 41-41 in FIG. 38.

The shape of the heat sink 911 on the section perpendicular to the axial direction is, as shown in FIG. 38, a cylindrical shape, and a prismatic space is formed internally. In other words, the heat sink 911 has a side wall 912 around the center line of the shaft 401. In this case, the external wall surface of the heat sink 911 forms part of the outer periphery of the drive apparatus 12 (FIG. 39 and FIG. 40). In addition, the side wall 912 of the heat sink 911 includes side wall surfaces 915 oriented in radially inward directions. As for the side wall surfaces 915, a total of six side wall surfaces are formed in the circumferential direction.

As for the heat sink 911, the semiconductor modules 551 to 556 are disposed one by one on the side wall surfaces 915 that are oriented in the radially inward directions. The semiconductor modules 551 to 556 are disposed so that the heat radiation surfaces thereof are in contact with the side wall surfaces 915. Here, the side wall surfaces 915 are planar, and the heat radiation surfaces of the semiconductor modules 551 to 556 are also planar accordingly.

Since the semiconductor modules 551 to 556 are, as described above, disposed on the side wall surfaces 915 of the heat sink 911, the vertical line to each semiconductor chip surface is perpendicular to the center line of the shaft 401.

In the present embodiment, a printed circuit board 802 is disposed on the sides of the semiconductor modules 551 to 556 closer to the motor case 110. Therefore, unlike the above-described embodiments, each of the semiconductor modules 501 to 506 has six control terminals 509 and two capacitor terminals 510 at the side end thereof facing the motor case 101 (FIG. 40). In addition, each of the semiconductor modules 501 to 506 has a coil terminal 508 at the side end surface thereof opposite to the motor case 101. Therefore, lead wires 206 from windings 205 are penetrated through the side wall 912 of the heat sink 911, and led out to the end of the heat sink 911.

As shown in FIG. 38 and others, six capacitors 701, 702, 703, 704, 705, and 706 are disposed on the sides of the semiconductor modules 551 to 556 opposite to the heat sink 911.

The capacitors 701 to 706 are disposed near the semiconductor modules 551 to 556 in one-to-one correspondence with the semiconductor modules 551 to 556. The capacitors 701 to 706 are in a columnar shaft shape, and are disposed so that the axes thereof become parallel to the center line of the shaft 401. In addition, since the capacitor terminals 510 of the semiconductor modules 551 to 556 are bent in the radially inward directions, terminals of the capacitors 701 to 706 are coupled directly to the bent capacitor terminals 510.

The choke coil 52 is disposed with the shaft 401 penetrating therethrough. The choke coil 52 has the coil wire wound about the doughnut-shaped iron core.

The drive apparatus 12 of the twelfth embodiment provides the same advantages as the advantages (1) to (4), (6) to (8), and (10) to (14) described in relation to the first embodiment.

Especially, in the drive apparatus 12, the capacitors 701 to 706 are disposed on the sides of the semiconductor modules 551 to 556 opposite to the heat sink 911. This obviates the necessity of forming accommodation spaces for the capacitors 701 to 706 in the heat sink 911.

Thirteenth Embodiment

Figure 42:
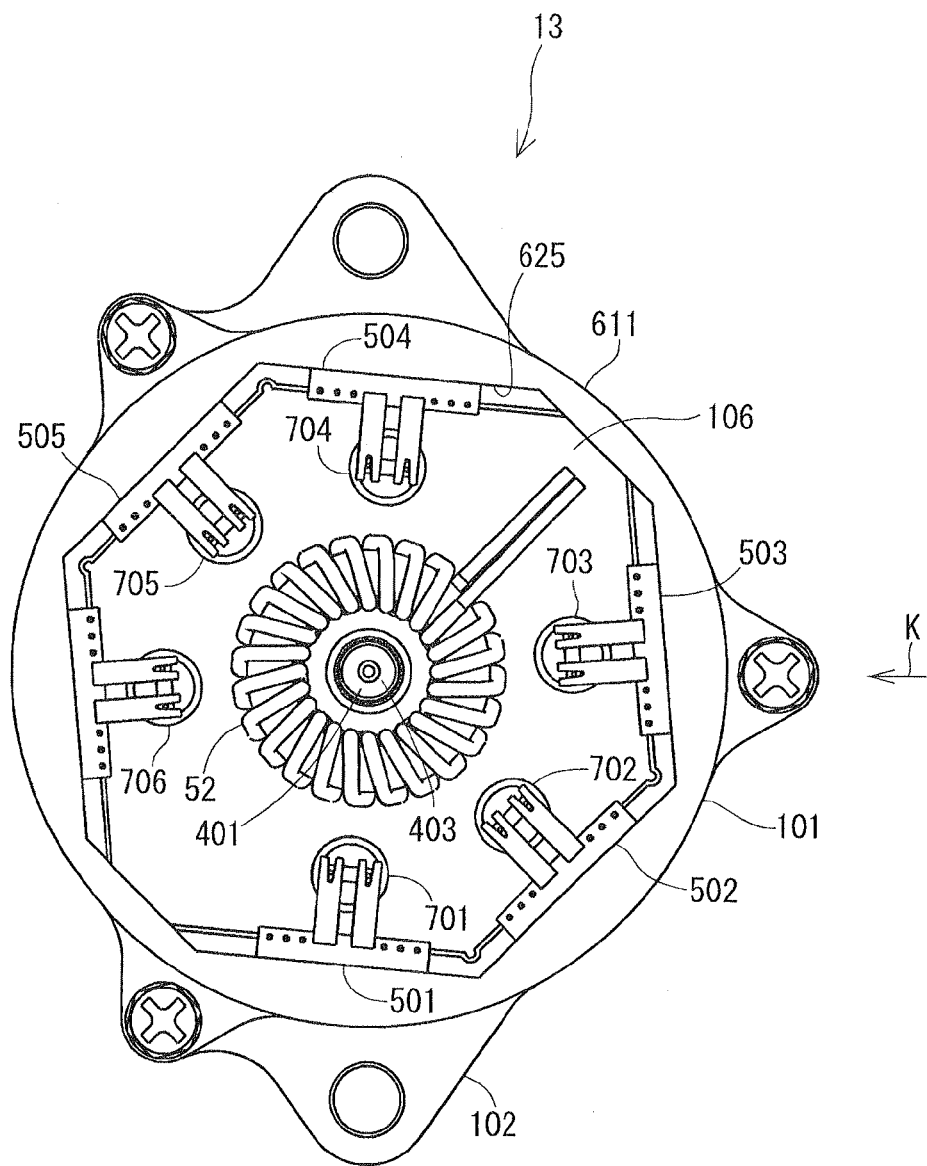
FIG. 42 is a plan view of a drive apparatus according to a thirteenth embodiment.
Figure 43:
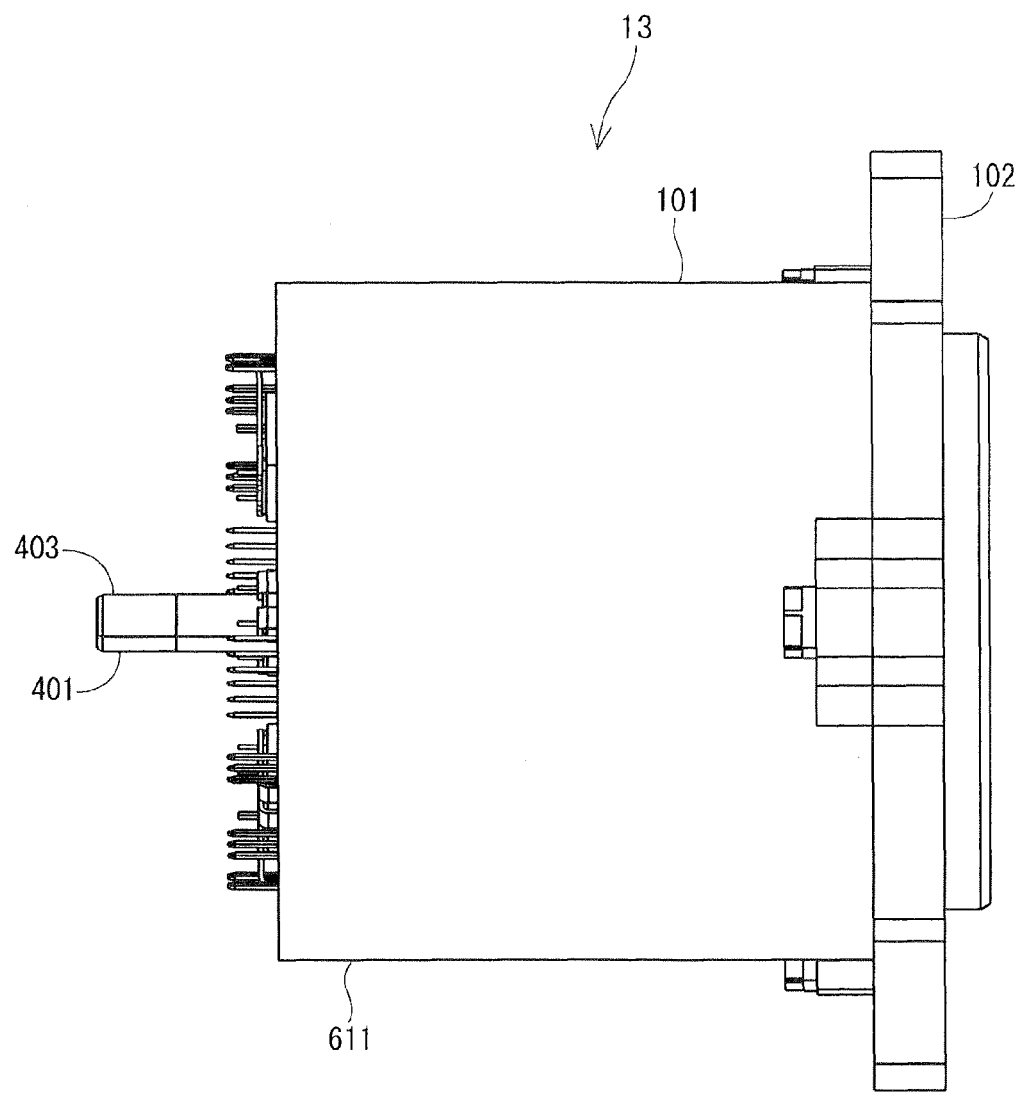
FIG. 43 is a side view of the drive apparatus according to the thirteenth embodiment.
Figure 44:
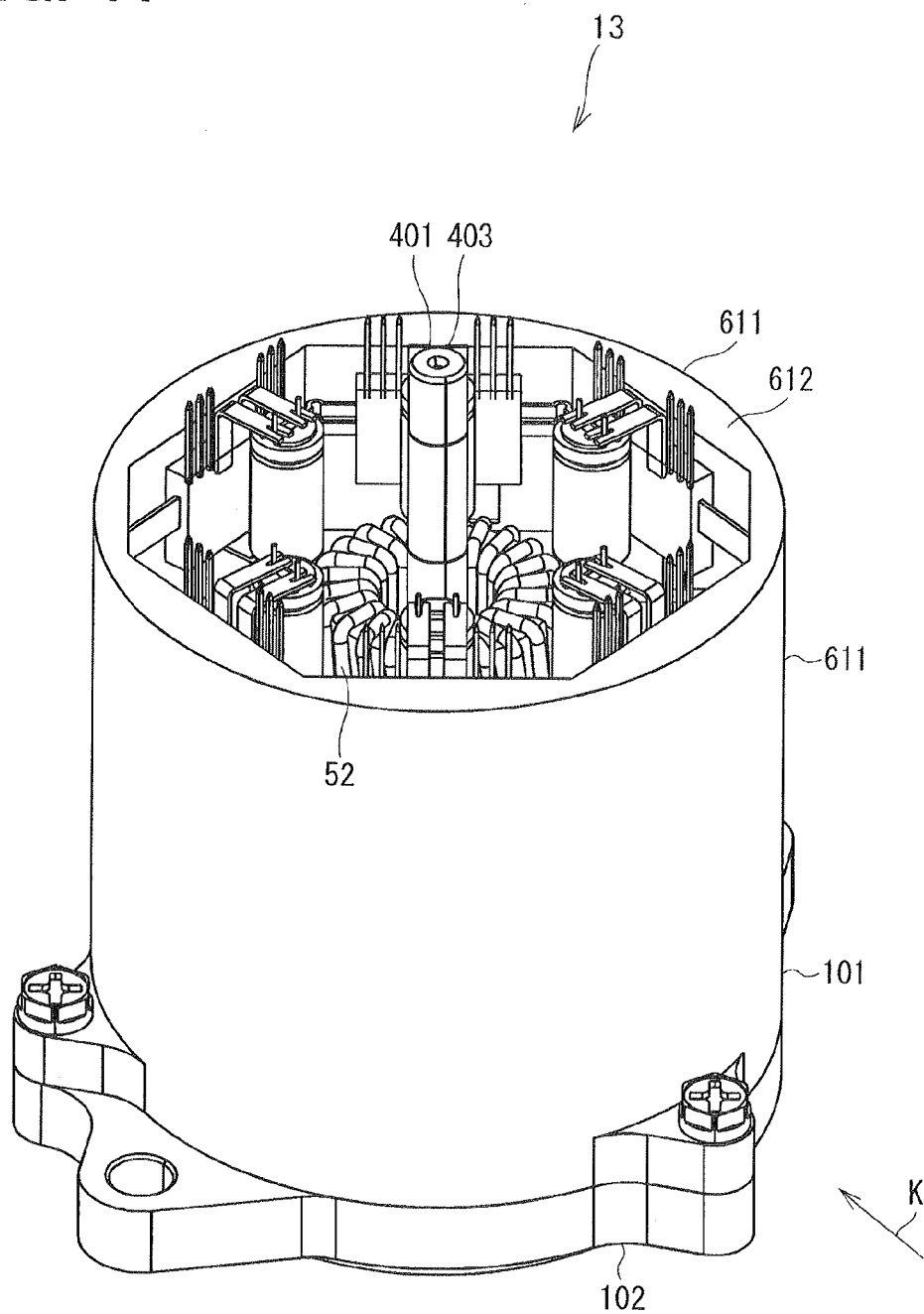
FIG. 44 is a perspective view of the drive apparatus according to the thirteenth embodiment.

A drive apparatus 13 of a thirteenth embodiment has, as shown in FIG. 42, the same configuration as the drive apparatus 2 of the second embodiment (FIG. 8 to FIG. 10) does. Specifically, the drive apparatus 13 includes six semiconductor modules 501, 502, 503, 504, 505, and 506. The semiconductor modules 501 to 506 are mounted on the heat sink 611 extended in the same direction as the direction of the center line of the shaft 401 from the end wall 106 of the motor case 101. In addition, six capacitors 701, 702, 703, 704, 705, and 706 are disposed on the sides of the semiconductor modules 501 to 506 opposite to the heat sink 611. In addition, the choke coil 52 is disposed with the shaft 401 penetrating therethrough.

The drive apparatus 13 differs from the drive apparatus 2 in that the power circuit 50 is configured on the side of an output end 403 of the shaft 401.

The drive apparatus 13 of the thirteenth embodiment provides the same advantages as the advantages (1) to (4), (6) to (8), and (10) to (14) described in relation to the first embodiment.

Especially, in the drive apparatus 13, the capacitors 701 to 706 are disposed on the sides of the semiconductor modules 501 to 506 opposite to the heat sink 611. This obviates the necessity of forming accommodation spaces for the capacitors 701 to 706 in the heat sink 611.

Fourteenth Embodiment

Figure 45:
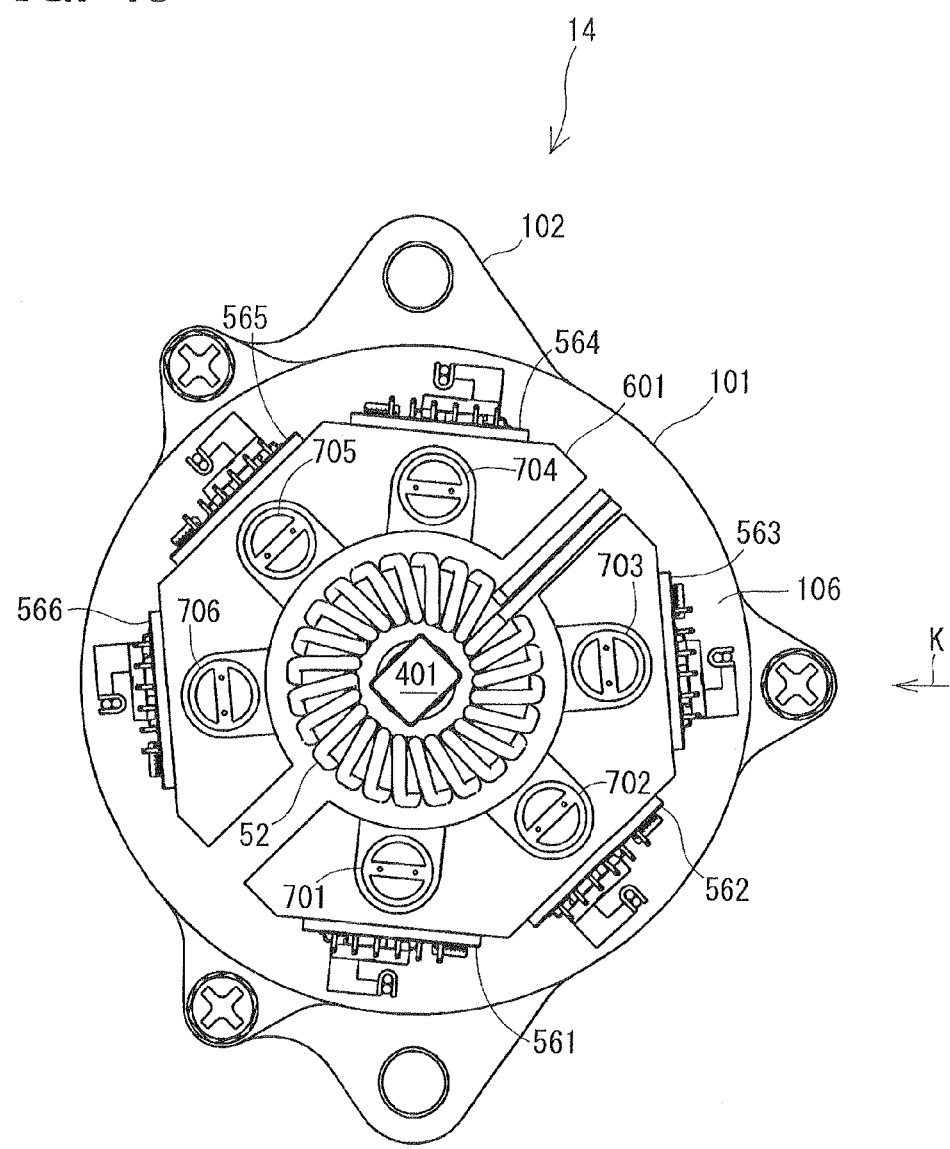
FIG. 45 is a plan view of a drive apparatus according to a fourteenth embodiment.
Figure 46:
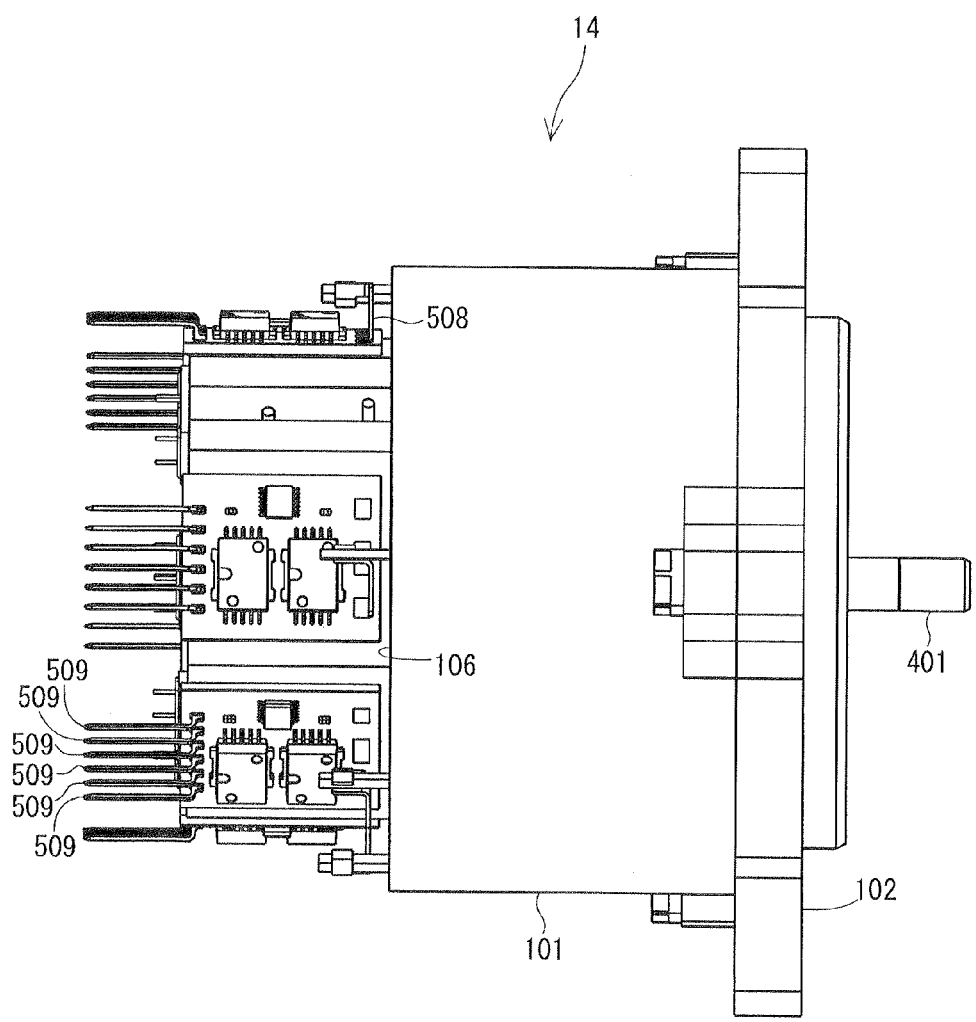
FIG. 46 is a side view of the drive apparatus according to the fourteenth embodiment.

A drive apparatus 14 of a fourteenth embodiment has, as shown in FIG. 45, nearly the same configuration as the drive apparatus 1 of the first embodiment (FIG. 2 to FIG. 6). Specifically, the drive apparatus includes six semiconductor modules 561, 562, 563, 564, 565, and 566. The semiconductor modules 561 to 566 are mounted on the heat sink 601 extended in the same direction as the direction of the center line of the shaft 401 from the end wall 106 of the motor case 101. In addition, six capacitors 701, 702, 703, 704, 705, and 706 are disposed on the same sides of the semiconductor modules 561 to 566 as the heat sink 601 is. A choke coil 52 is disposed with the shaft 401 penetrating therethrough (FIG. 47).

The drive apparatus 14 differs from the drive apparatus 1 in the configuration of the semiconductor modules 561 to 566. In the present invention, each of the semiconductor modules 561 to 566 has, as shown in FIG. 47, ICs 567 and others mounted on a metal substrate 568. The ICs 567 are formed by molding semiconductor chips with a resin.

Figure 47:
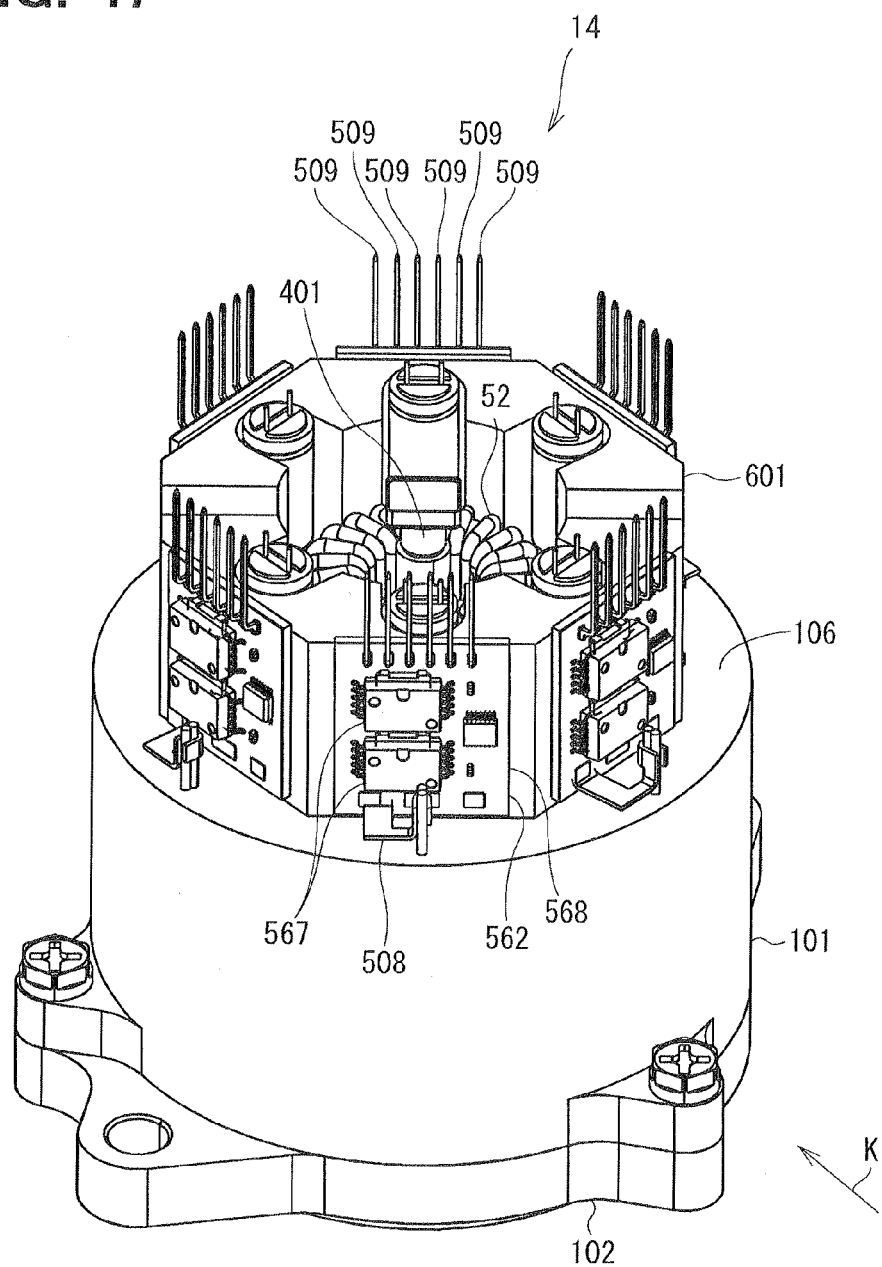
FIG. 47 is a perspective view of the drive apparatus according to the fourteenth embodiment.

Herein, each of the semiconductor modules 561 to 566 has a coil terminal 508 on the motor case 101 side thereof, and has six control terminals 509 at the side thereof opposite to the motor case 101 side (FIG. 45 and FIG. 47).

The drive apparatus 14 of the fourteenth embodiment provides the same advantages as the advantages (1) to (13) described in relation to the first embodiment.

Especially, since the metal substrate 568 is employed, the drive apparatus 14 is excellent in heat radiation performance.

Fifteenth Embodiment

Figure 48:
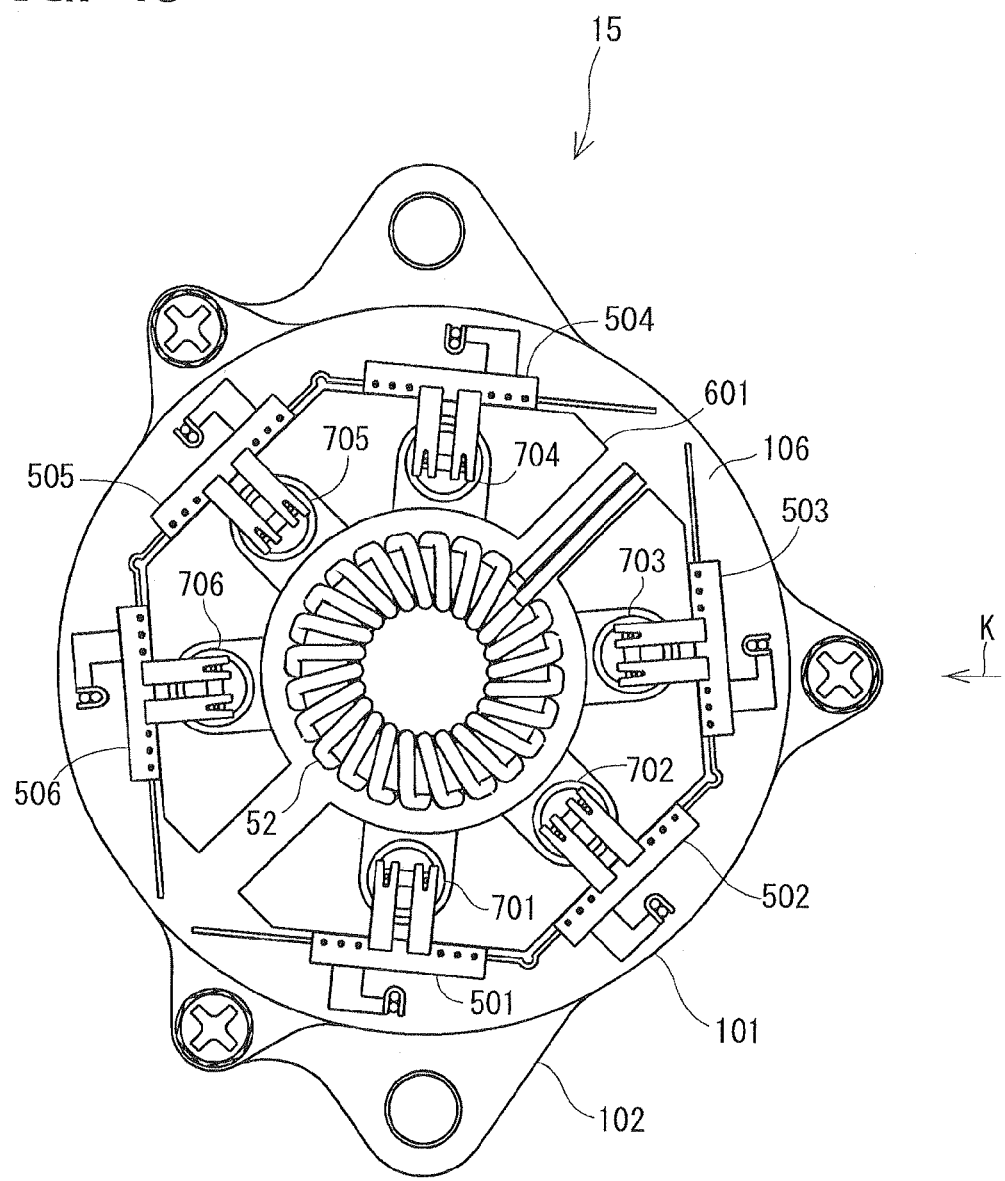
FIG. 48 is a plan view of a drive apparatus according to a fifteenth embodiment.
Figure 49:
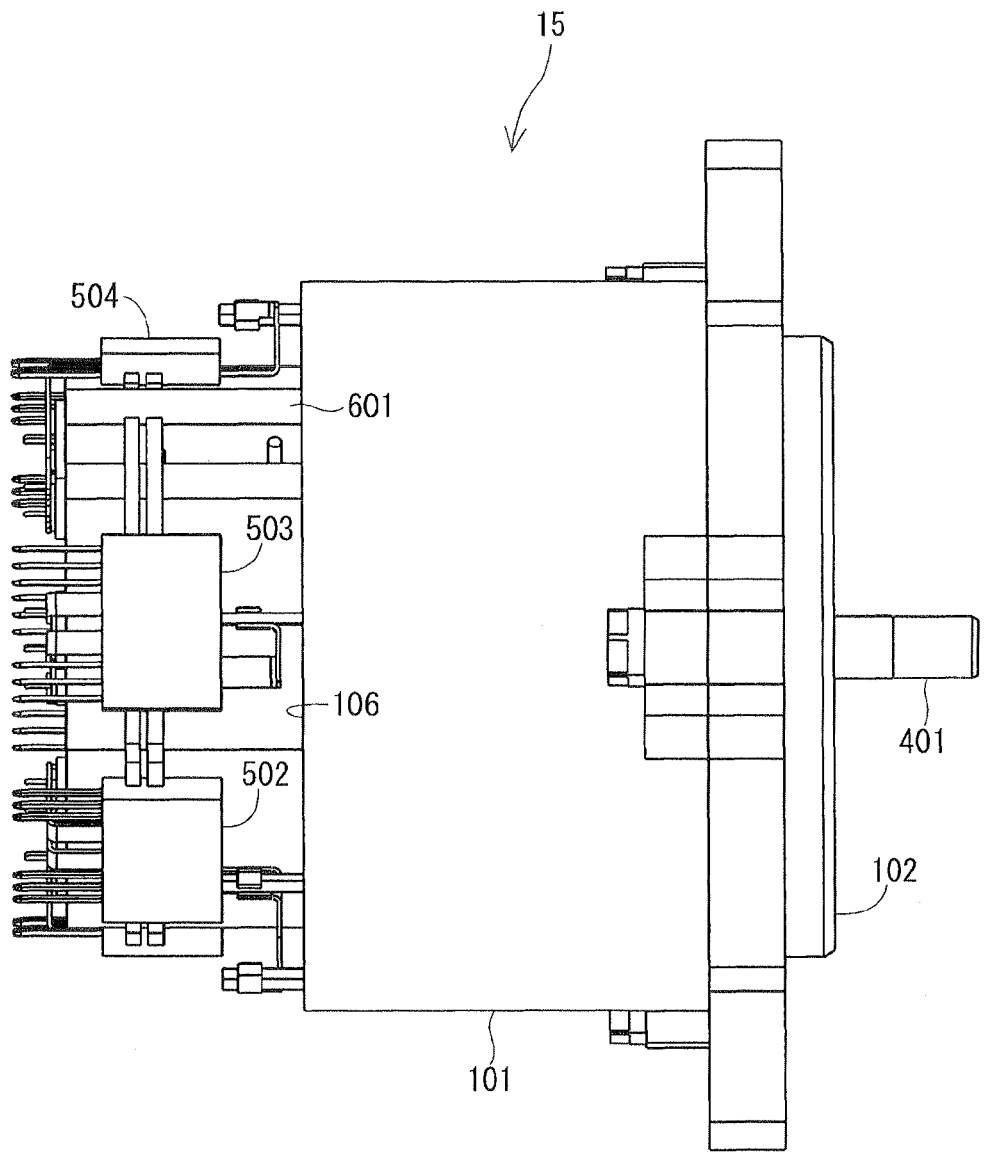
FIG. 49 is a side view of the drive apparatus according to the fifteenth embodiment.
Figure 50:
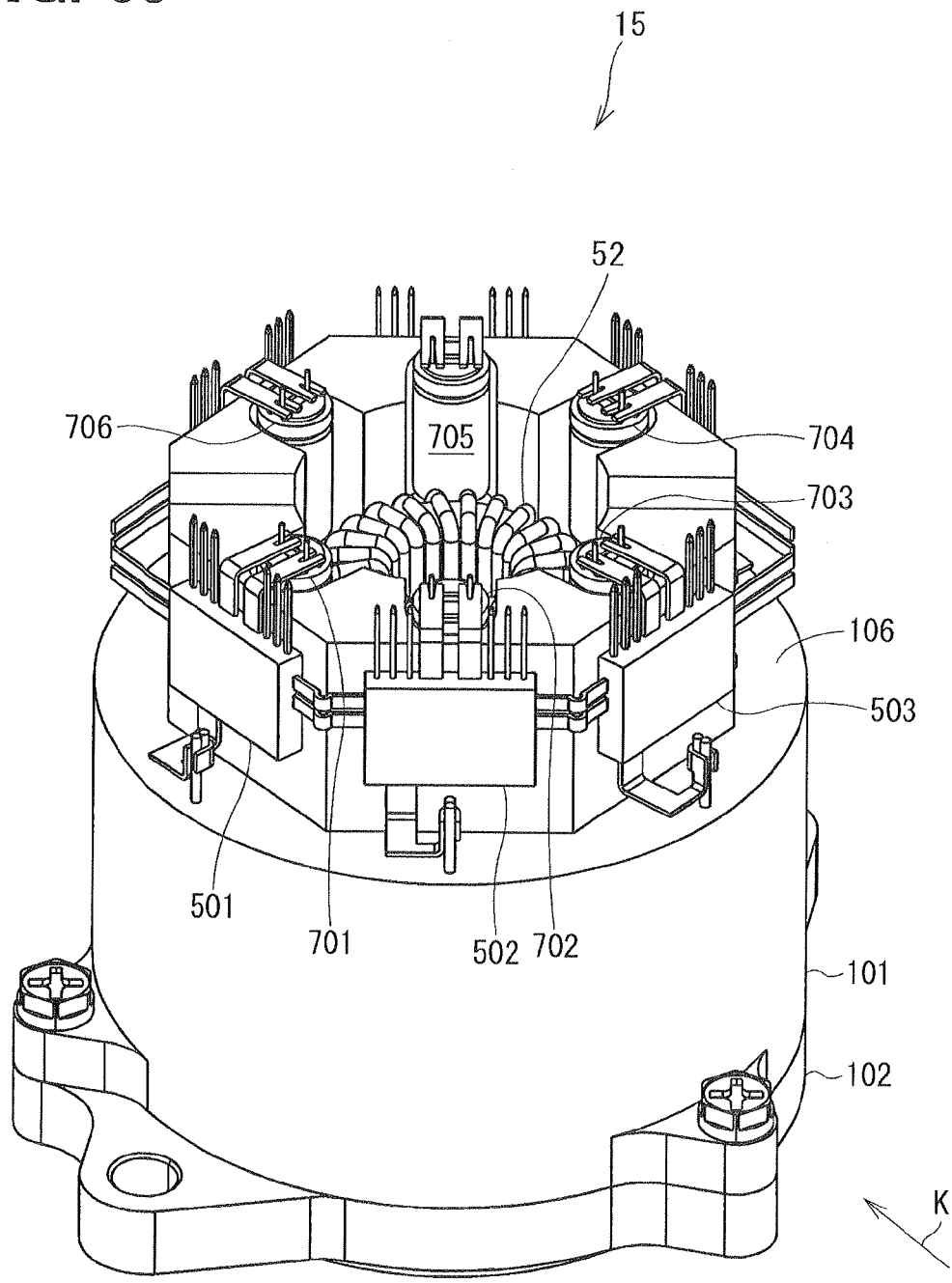
FIG. 50 is a perspective view of the drive apparatus according to the fifteenth embodiment.

A drive apparatus 15 of the fifteenth embodiment is, as shown in FIG. 48, nearly the same configuration as the drive apparatus 1 of the first embodiment (FIG. 2 to FIG. 6). Specifically, the drive apparatus 15 includes six semiconductor modules 501, 502, 503, 504, 505, and 506. The semiconductor modules 501 to 506 are mounted on the heat sink 601 extended in the same direction as the direction of the center line of the shaft 401 from the end wall 106 of the motor case 101. In addition, six capacitors 701, 702, 703, 704, 705, and 706 are disposed on the same sides of the semiconductor modules 501 to 506 as the heat sink 601 is.

The drive apparatus 15 differs from the drive apparatus 1 in that the shaft 401 neither extends toward an electronic control unit part nor penetrates through the choke coil 52.

The drive apparatus 15 of the fifteenth embodiment provides the same advantages as the advantages (1) to (14) described in relation to the first embodiment.

Sixteenth Embodiment

Figure 51:
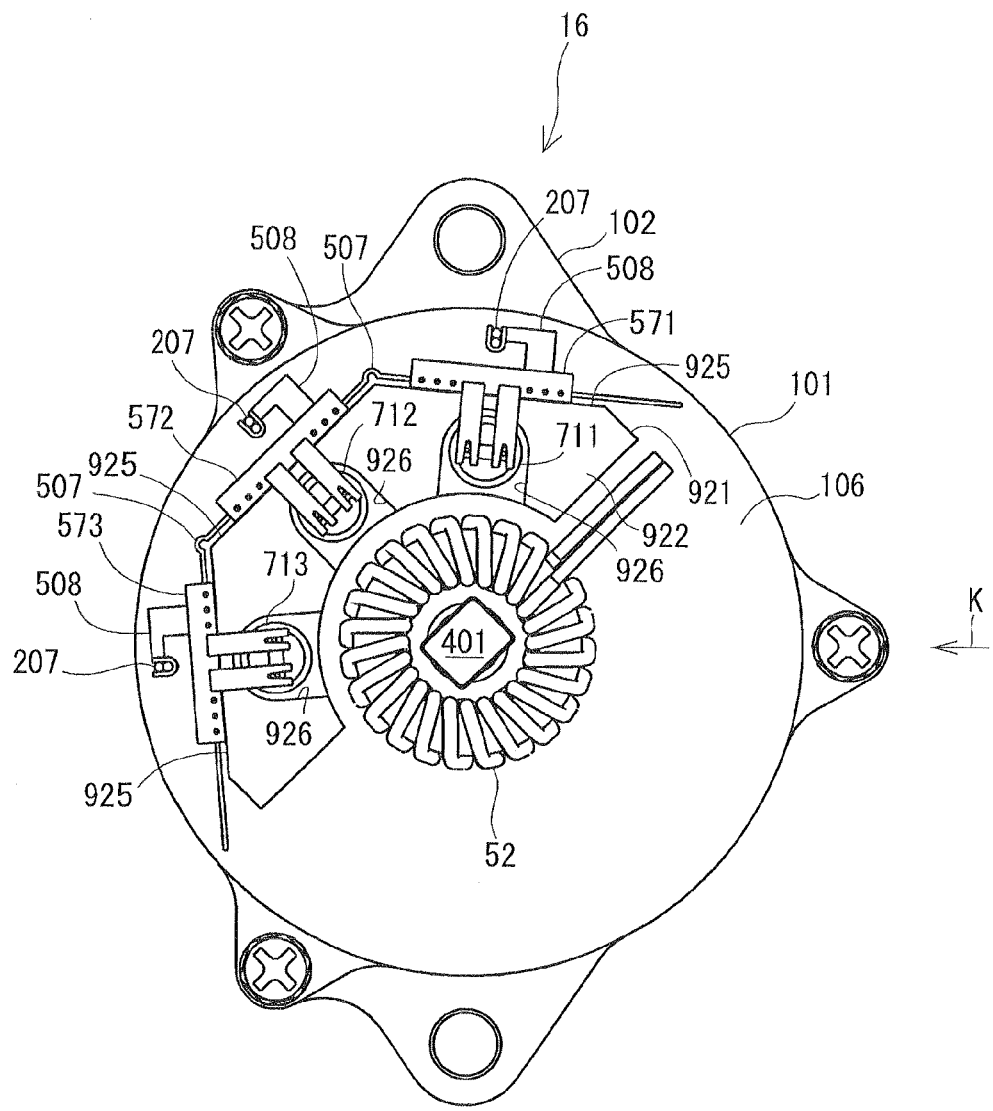
FIG. 51 is a plan view of a drive apparatus according to a sixteenth embodiment.

A drive apparatus 16 of a sixteenth embodiment is, as shown in FIG. 51, constructed to include only one inverter circuit 60 shown in FIG. 1. Therefore, the drive apparatus 16 includes three semiconductor modules 571, 572, and 573.

The three semiconductor modules 571 to 573 are interconnected through the bus bars 507 to form a module unit.

The semiconductor modules 571 to 573 are mounted on a heat sink 921 extended in the same direction as the direction of the center line of the shaft 401 from the end wall 106 of the motor case 101.

The heat sink 921 has, as shown in FIG. 51, one column-shaped part, the shape on the section perpendicular to the axial direction of which is a substantially trapezoidal shape, formed on one side of the center line of the shaft 401. In addition, the heat sink 921 has a predetermined radius portion thereof cut out from the center of the shaft 401. The heat sink 921 has a side wall 922.

The side wall 922 includes side wall surfaces 925 oriented in the radially outward direction. The side wall surfaces 925 are planar, and the three side wall surfaces are formed in the circumferential direction to face radially outward. Accommodation spaces 926 are formed in the radially inward directions of the respective side wall surfaces 925.

As for the heat sink 921, the semiconductor modules 571 to 573 are disposed on the side wall surfaces 925 that are oriented in the radially outward directions. The semiconductor modules 571 to 573 are disposed so that the heat radiation surfaces thereof are in contact with the side wall surfaces 925. Here, the side wall surfaces 925 are planar, and the heat radiation surfaces of the semiconductor modules 571 to 573 are planar accordingly.

Since the semiconductor modules 571 to 573 are, as described above, disposed on the side wall surfaces 925 of the heat sink 921, semiconductor chip surfaces are perpendicular to the center line of the shaft 401.

Figure 52:
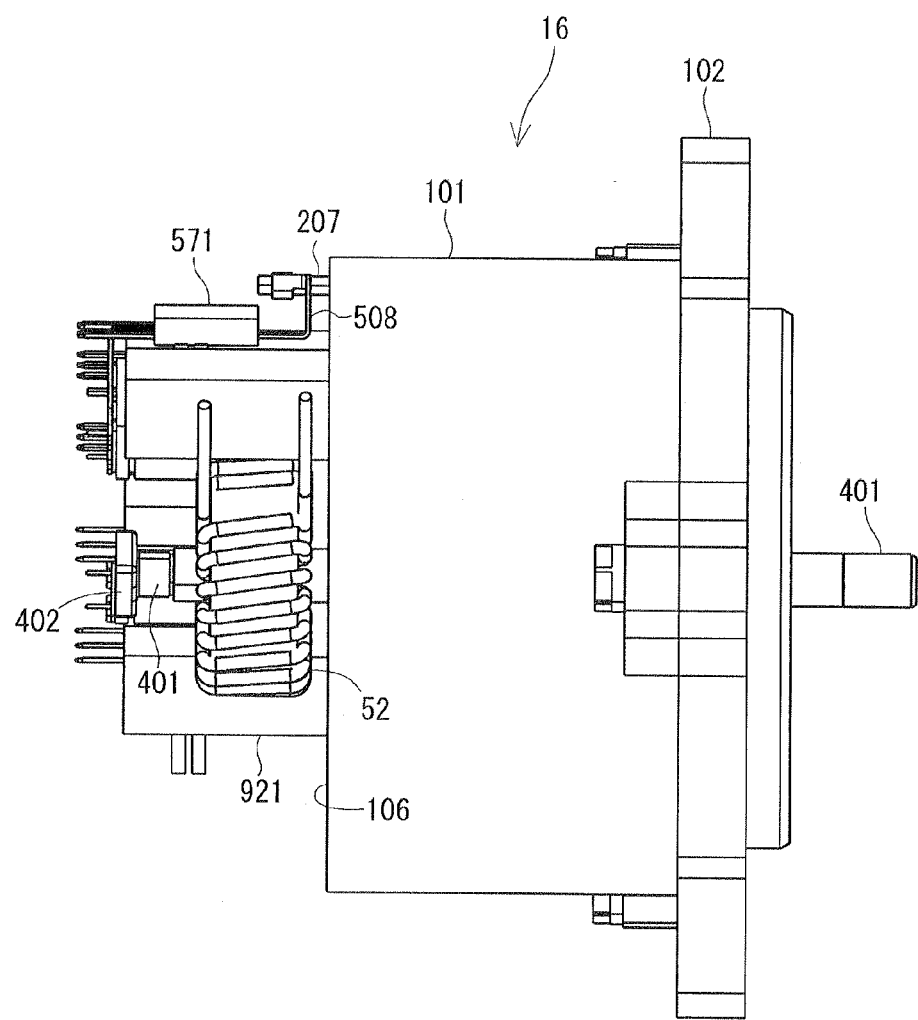
FIG. 52 is a side view of the drive apparatus according to the sixteenth embodiment.

Each of the semiconductor modules 571 to 573 has the coil terminal 508 at the side end thereof facing the motor case 101. The coil terminals 508 clamp lead wires 207 led out from three points on the end wall 106 of the motor case 101, and are thus electrically coupled to the lead wires 207 (FIG. 51 and FIG. 52). In addition, each of the semiconductor modules 571 to 573 has six control terminals 509 and two capacitor terminals 510 at the side end surface thereof opposite to the motor case 101 (FIG. 53).

As shown in FIG. 51 and others, three capacitors 711, 712, and 713 are disposed on the same sides of the semiconductor modules 571 to 573 as the heat sink 921 is. More particularly, the capacitors are disposed in the accommodation spaces 926 of the heat sink 921.

The capacitors 711 to 713 are disposed near the semiconductor modules 571 to 573 in one-to-one correspondence with the semiconductor modules 571 to 573. The capacitors 711 to 713 are in a columnar shape, and are disposed so that the axes thereof are parallel to the center line of the shaft 401. Since the capacitor terminals 510 of the semiconductor modules 571 to 573 are bent in the radially inward directions, terminals of the capacitors 711 to 713 are coupled directly to the bent capacitor terminals 510.

Figure 53:
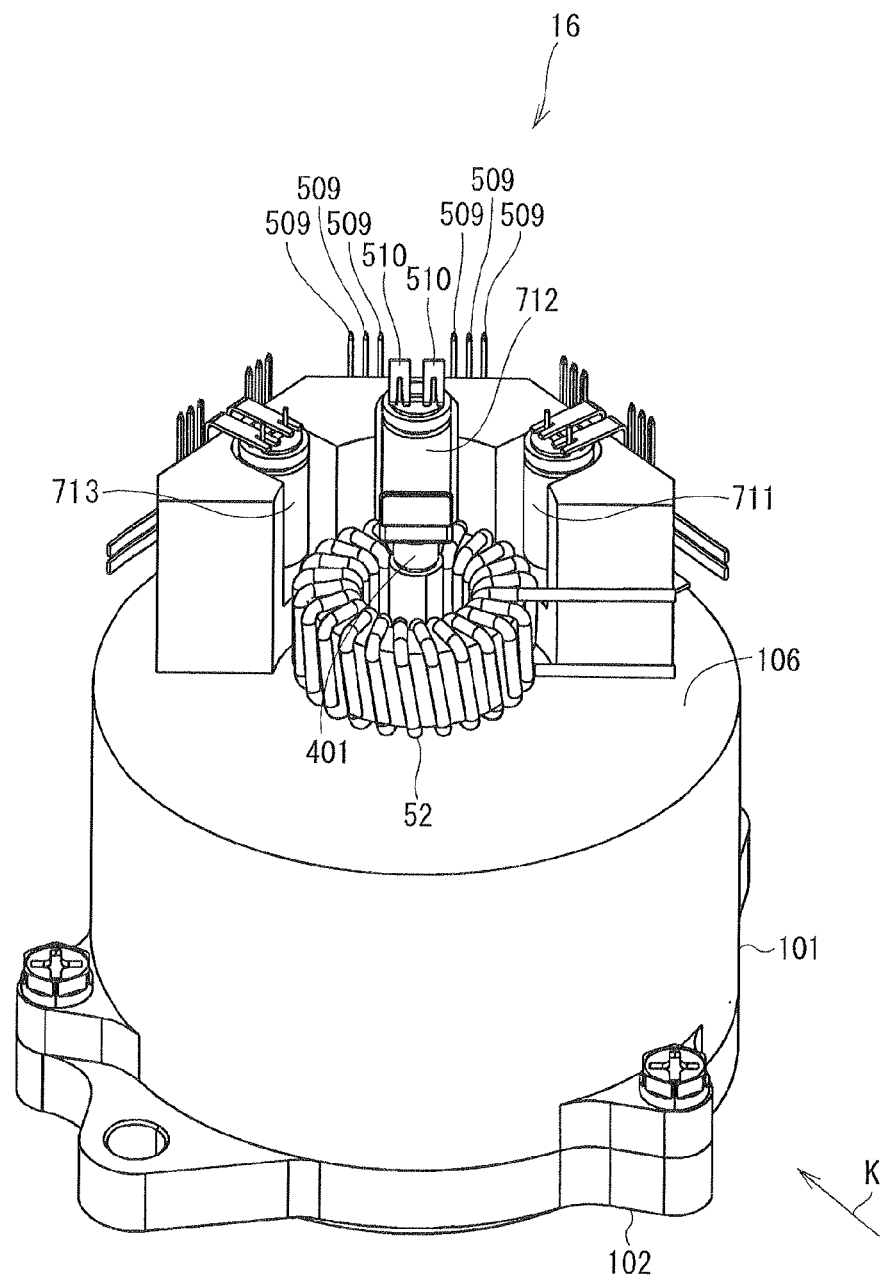
FIG. 53 is a perspective view of the drive apparatus according to the sixteenth embodiment.

The choke coil 52 is disposed with the shaft 401 penetrating therethrough (FIG. 53). The choke coil 52 has the coil wire wound about the doughnut-shaped iron core.

The drive apparatus 16 of the sixteenth embodiment provides the same advantages as the advantages (1) to (14) described in relation to the first embodiment.

Seventeenth Embodiment

Figure 54:
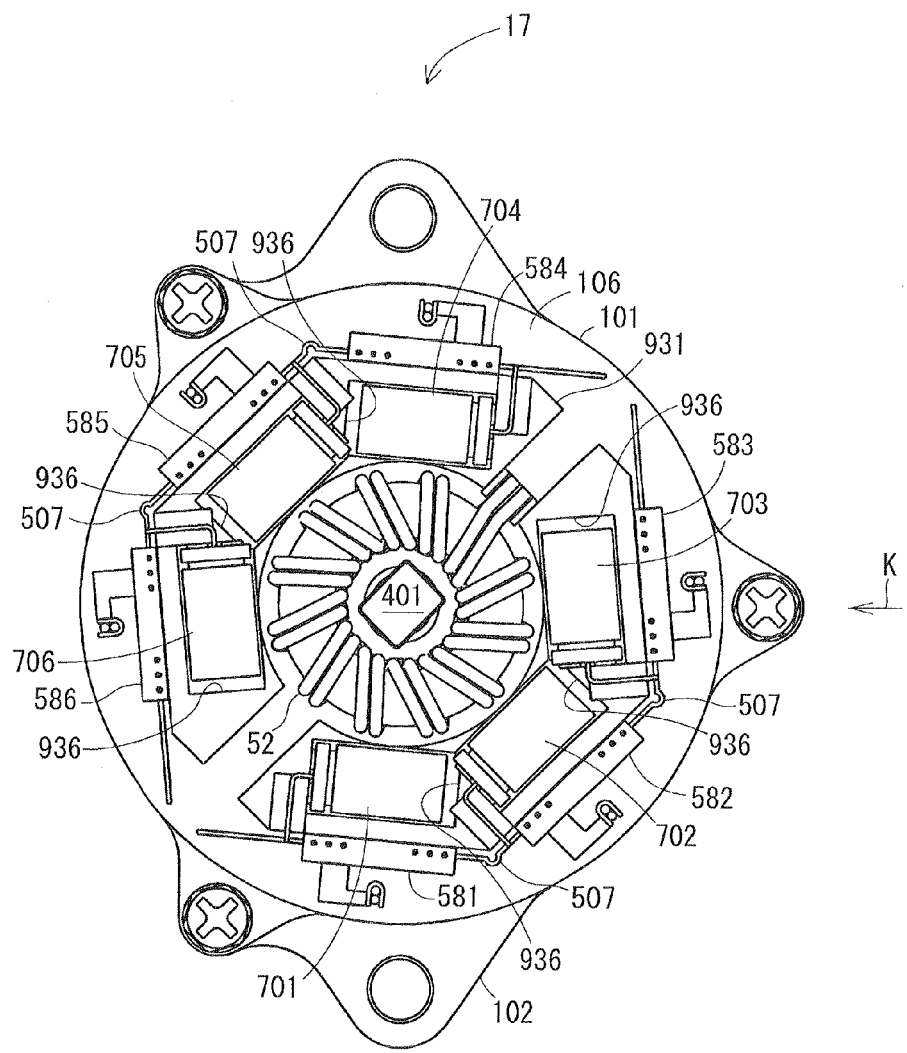
FIG. 54 is a plan view of a drive apparatus according to a seventeenth embodiment.

A drive apparatus 17 of a seventeenth embodiment has, as shown in FIG. 54, nearly the same configuration as the drive apparatus 1 of the first embodiment (FIG. 2 to FIG. 6) does. Specifically, the drive apparatus 17 includes six semiconductor modules 581, 582, 583, 584, 585, and 586. The semiconductor modules 581 to 586 are mounted on a heat sink 931 extended in the same direction as the direction of the center line of the shaft 401 from the end wall 106 of the motor case 101. In addition, six capacitors 701, 702, 703, 704, 705, and 706 are disposed on the same sides of the semiconductor modules 581 to 586 as the heat sink 931 is.

Figure 56:
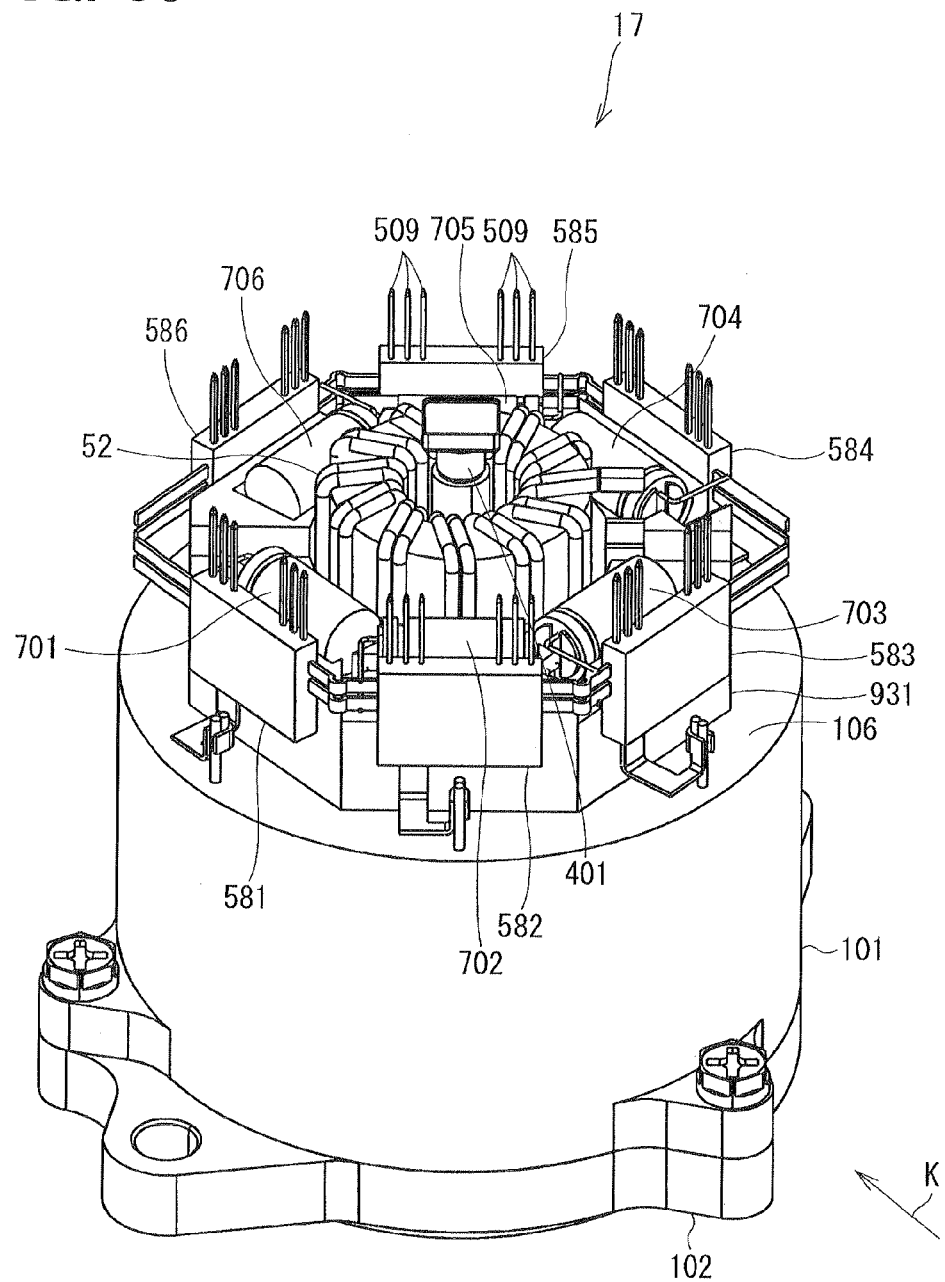
FIG. 56 is a perspective view of the drive apparatus according to the seventeenth embodiment.

The drive apparatus 17 differs from the drive apparatus 1 in that the axes of the capacitors 701 to 706 are perpendicular to the center line of the shaft 401. In short, the cylindrical capacitors 701 to 706 are placed sideways. Therefore, the heat sink 931 includes accommodation spaces 936, the shape on the section perpendicular to the axial direction of which is a rectangular shape, at an end in the axial direction. In this case, terminals of the capacitors 701 to 706 are coupled directly onto the bus bars 507 serving as the power line. In addition, each of the end sides of the semiconductor modules 581 to 586 opposite to the motor case is not provided with capacitor terminals but is provided with six control terminals 509 alone (FIG. 56).

The drive apparatus 17 of the seventeenth embodiment provides the same advantages as the advantages (1), (2), and (4) to (14) described in relation to the first embodiment.

Especially, in the drive apparatus 17, the capacitors 701 to 706 are placed sideways near the semiconductor modules 501 to 506. Therefore, although the accommodation spaces 936 are formed in the heat sink 931, it is unnecessary to dig deep in the axial direction when forming the accommodation spaces 936 compared with when forming the accommodation spaces 606 of the above-described embodiment (FIG. 2). Therefore, degradation in heat radiation performance of the heat sink 931 can be suppressed. In addition, the capacitors 701 to 706 are coupled directly to the bus bars 507 of the semiconductor modules 581 to 586. Accordingly, wirings between the semiconductor modules 581 to 586 and the capacitors 701 to 706 can be made as short as possible, and the function of the capacitors 701 to 706 can be fully exhibited. In addition, since the capacitors 701 to 706 are disposed in one-to-one correspondence with the semiconductor modules 581 to 586, the capacitance of the capacitors 701 to 706 can be made relatively small. Eventually, the physical configuration of the capacitors 701 to 706 can be suppressed.

Eighteenth Embodiment

Figure 55:
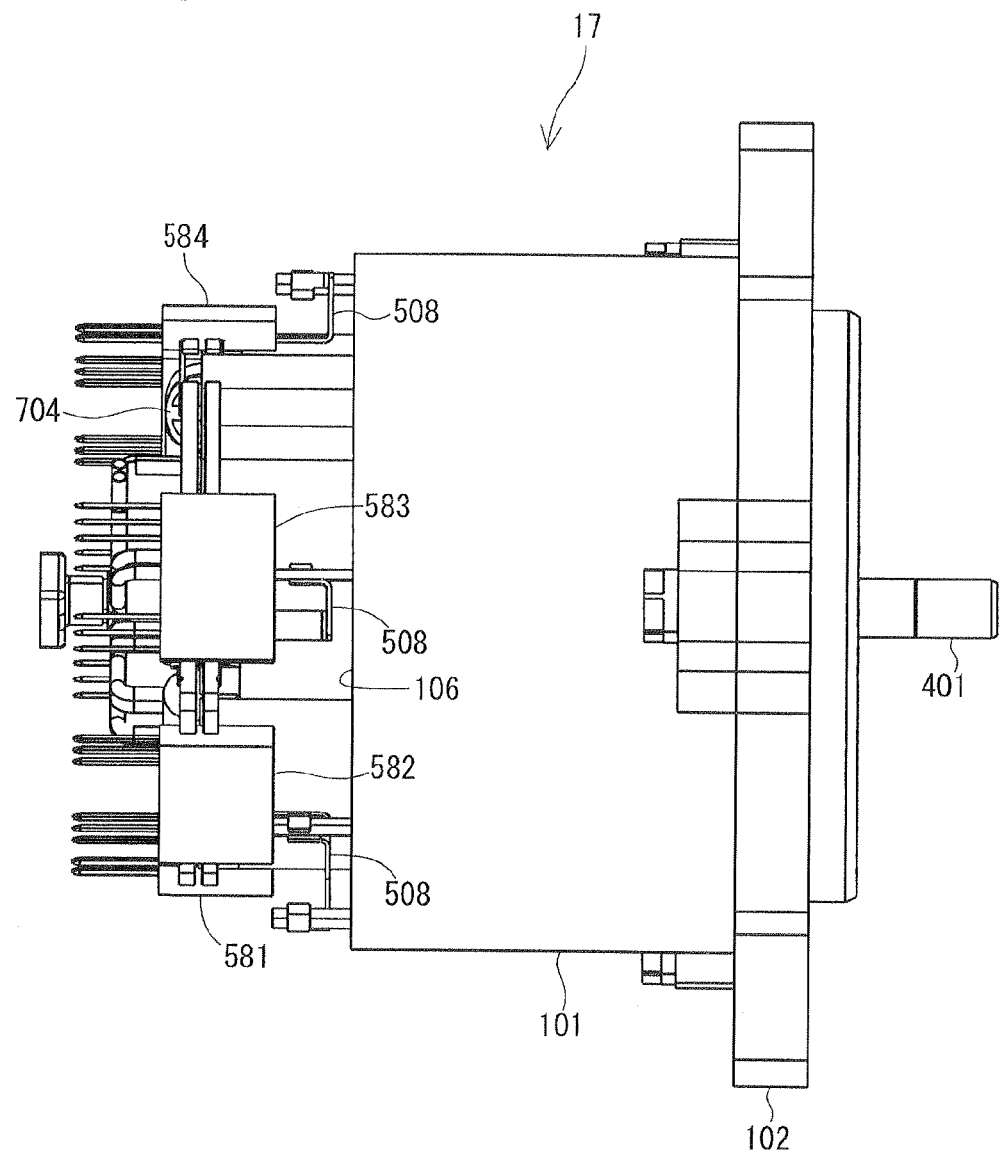
FIG. 55 is a side view of the drive apparatus according to the seventeenth embodiment.
Figure 57:
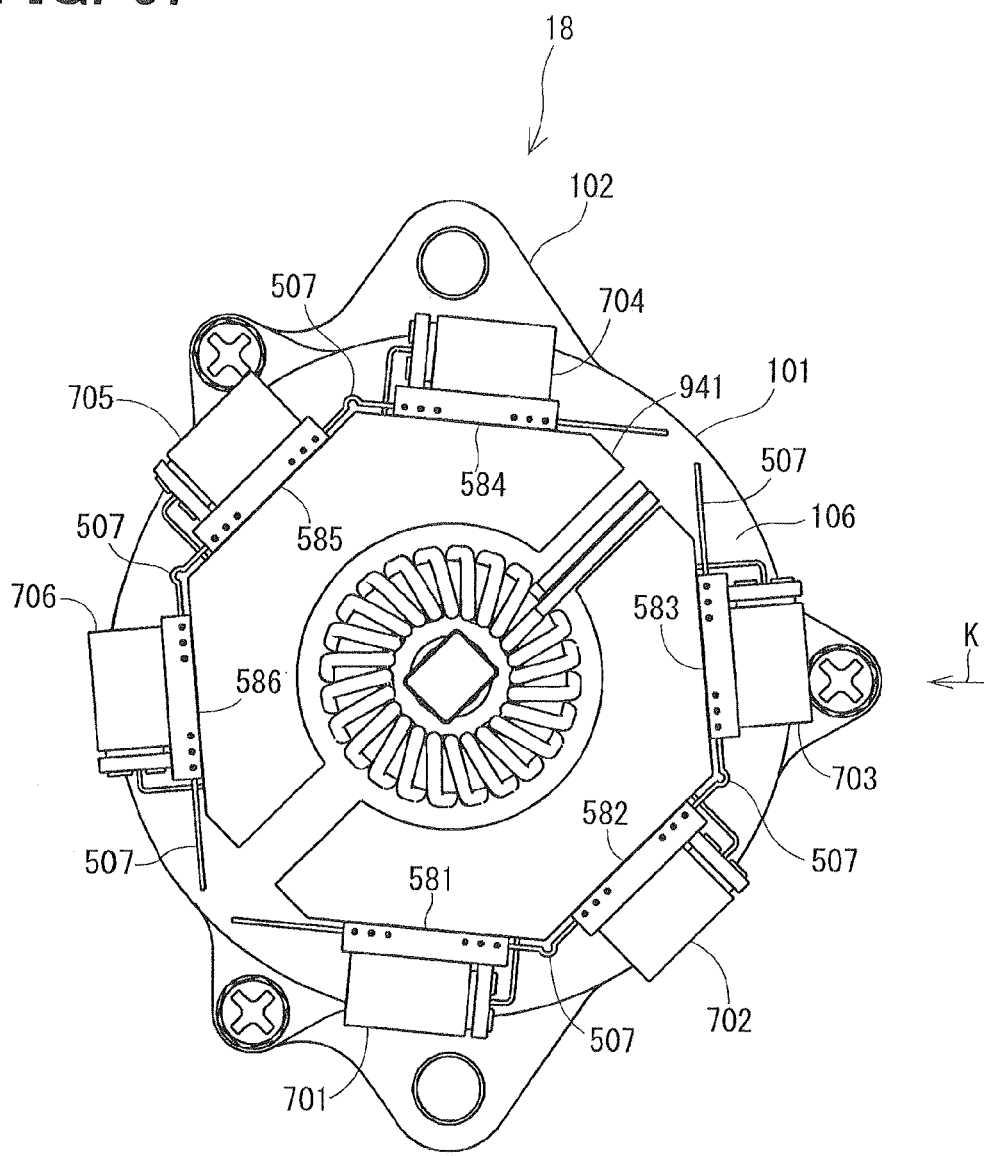
FIG. 57 is a plan view of a drive apparatus according to an eighteenth embodiment.
Figure 58:
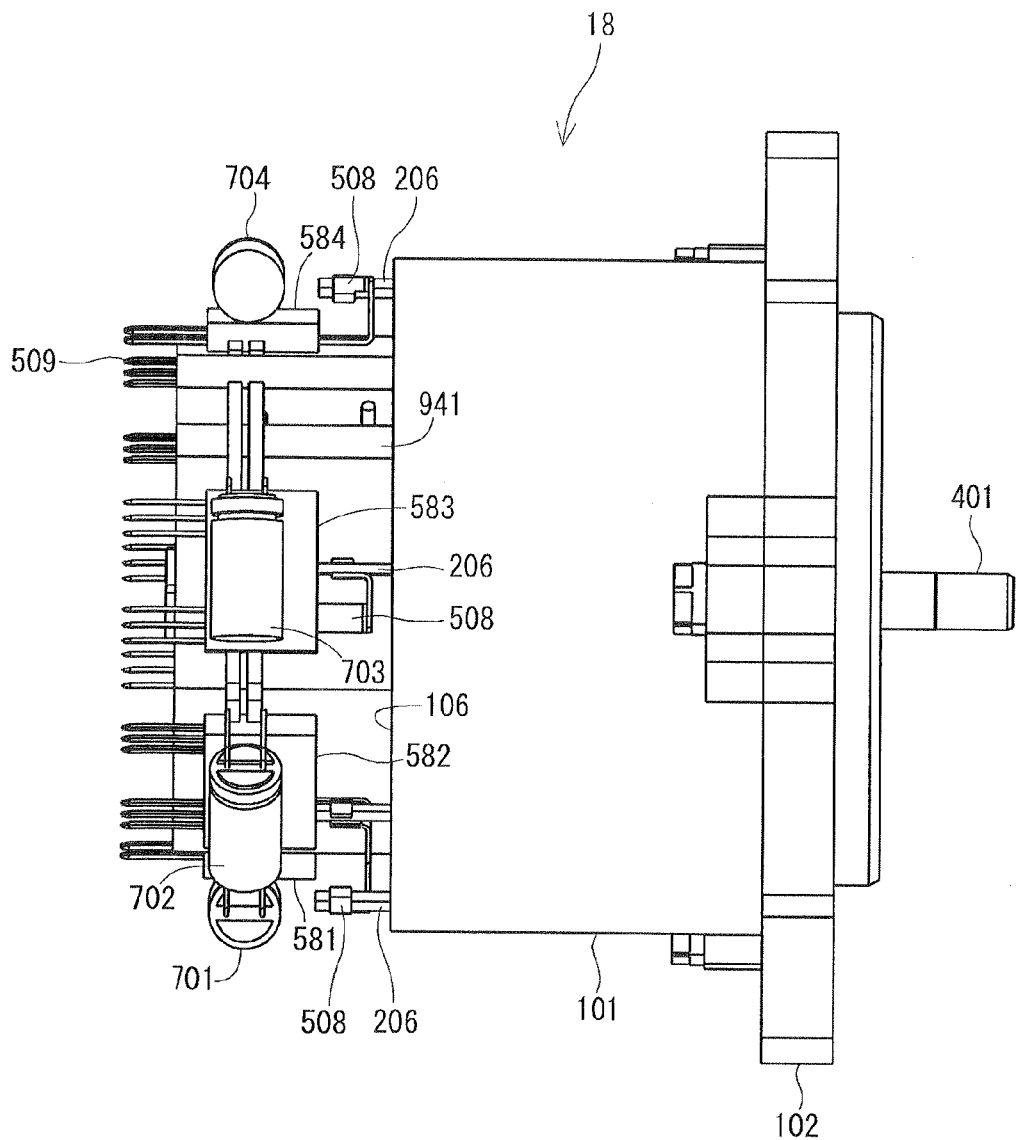
FIG. 58 is a side view of the drive apparatus according to the eighteenth embodiment.

A drive apparatus 18 of an eighteenth embodiment has, as shown in FIG. 57, nearly the same configuration as the drive apparatus 17 of the seventeenth embodiment (FIG. 54 to FIG. 56). Specifically, the drive apparatus 18 includes six semiconductor modules 581, 582, 583, 584, 585, and 586. The semiconductor modules 581 to 586 are mounted on a heat sink 941 extended in the same direction as the direction of the center line of the shaft 401 from the end wall 106 of the motor case 101. In addition, six capacitors 701, 702, 703, 704, 705, and 706 are placed sideways on the semiconductor modules 581 to 586.

Figure 59:
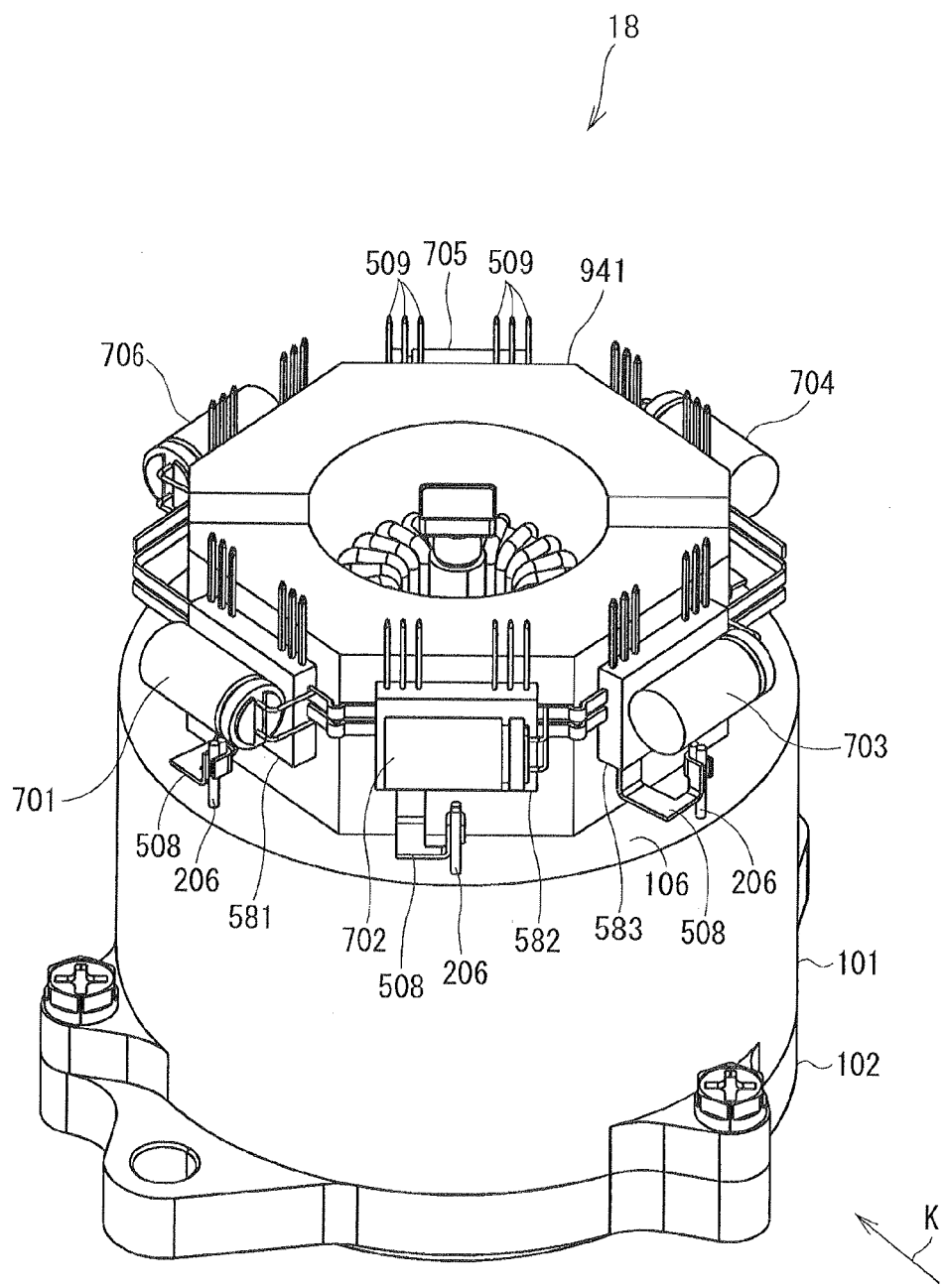
FIG. 59 is a perspective view of the drive apparatus according to the eighteenth embodiment.

The drive apparatus 18 differs from the above-described drive apparatus 17 lies in a point that the capacitors 701 to 706 are disposed on the sides opposite to the heat sink 941. Specifically, the capacitors 701 to 706 are disposed on the radially outer sides of the semiconductor modules 581 to 586. In this case, terminals of the capacitors 701 to 706 are coupled directly to bus bars 507 serving as a power line. Each of the counter-motor case sides of the semiconductor modules 581 to 586 is not provided with capacitor terminals but is provided with six control terminals 509 alone (FIG. 59).

The drive apparatus 18 of the eighteenth embodiment provides the same advantages as the advantages (1), (2), and (4) to (14) described in relation to the first embodiment.

Especially, in the drive apparatus 18, the capacitors 701 to 706 are placed sideways near the semiconductor modules 581 to 586. In addition, the capacitors are disposed on the radially outer sides of the semiconductor modules 581 to 586. This obviates the necessity of forming accommodation spaces in the heat sink 941. In addition, the terminals of the capacitors 701 to 706 are coupled directly to the bus bars 507 of the semiconductor modules 581 to 586. Accordingly, wirings between the semiconductor modules 581 to 586 and the capacitors 701 to 706 can be made as short as possible, and the function of the capacitors 701 to 706 can be fully exhibited. In addition, since the capacitors 701 to 706 are disposed in one-to-one correspondence with the semiconductor modules 581 to 586, the capacitance of the capacitors 701 to 706 can be made relatively small. Eventually, the physical configuration of the capacitors 701 to 706 can be suppressed.

Nineteenth Embodiment

A drive apparatus 19 of a nineteenth embodiment includes six semiconductor modules 591, 592, 593, 594, 595, and 596. For discriminating the semiconductor modules 591 to 596 from one another, the reference numerals in FIG. 60 are used to denote them as the U1 semiconductor module 591, V1 semiconductor module 592, W1 semiconductor module 593, U2 semiconductor module 594, V2 semiconductor module 595, and W2 semiconductor module 596.

Herein, the three U1 to W1 semiconductor modules 591 to 593 and the three U2 to W2 semiconductor modules 594 to 596 are interconnected through the bus bars 507 to form module units. The bus bars 507 have the interconnecting function and serve as the power line.

The semiconductor modules 591 to 596 are mounted on a heat sink 951 extended in the same direction as the direction of the center line of the shaft 401 from the end wall 106 of the motor case 101.

Figure 60:
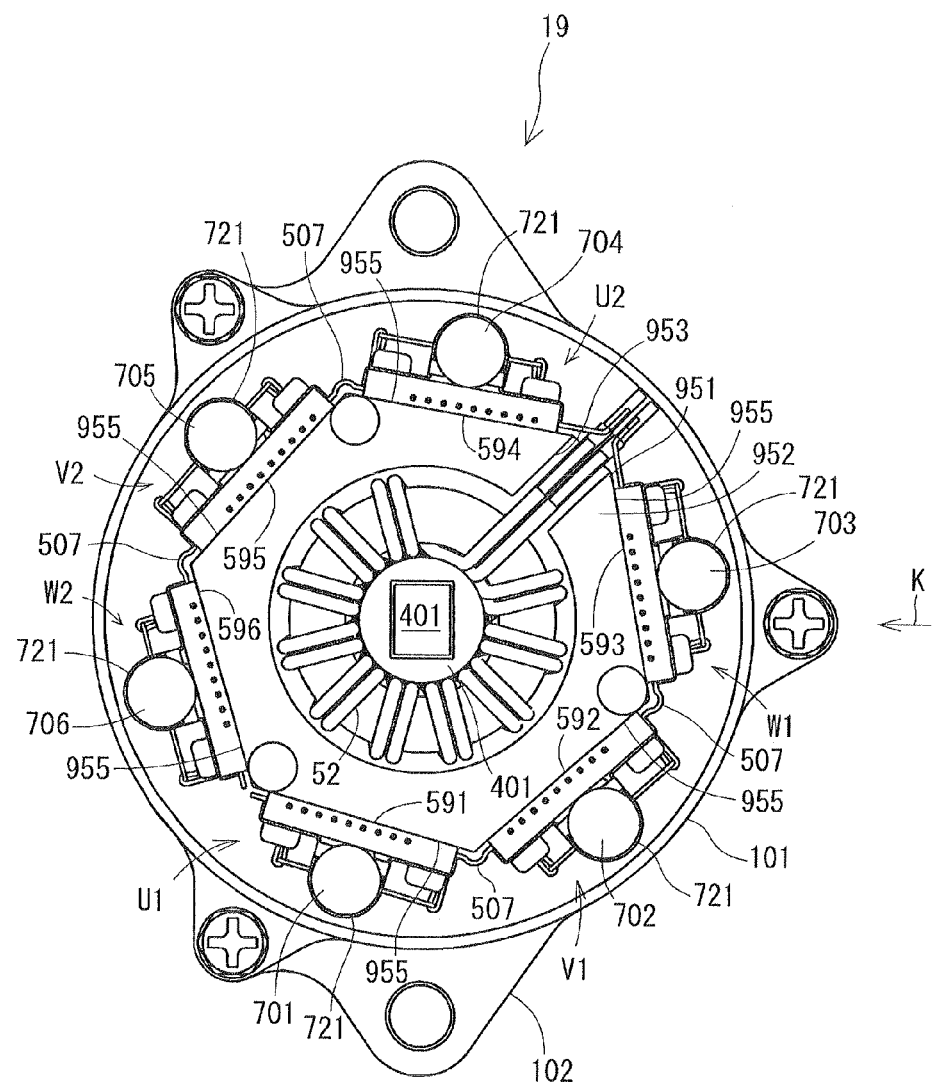
FIG. 60 is a plan view of a drive apparatus according to a nineteenth embodiment.
Figure 61:
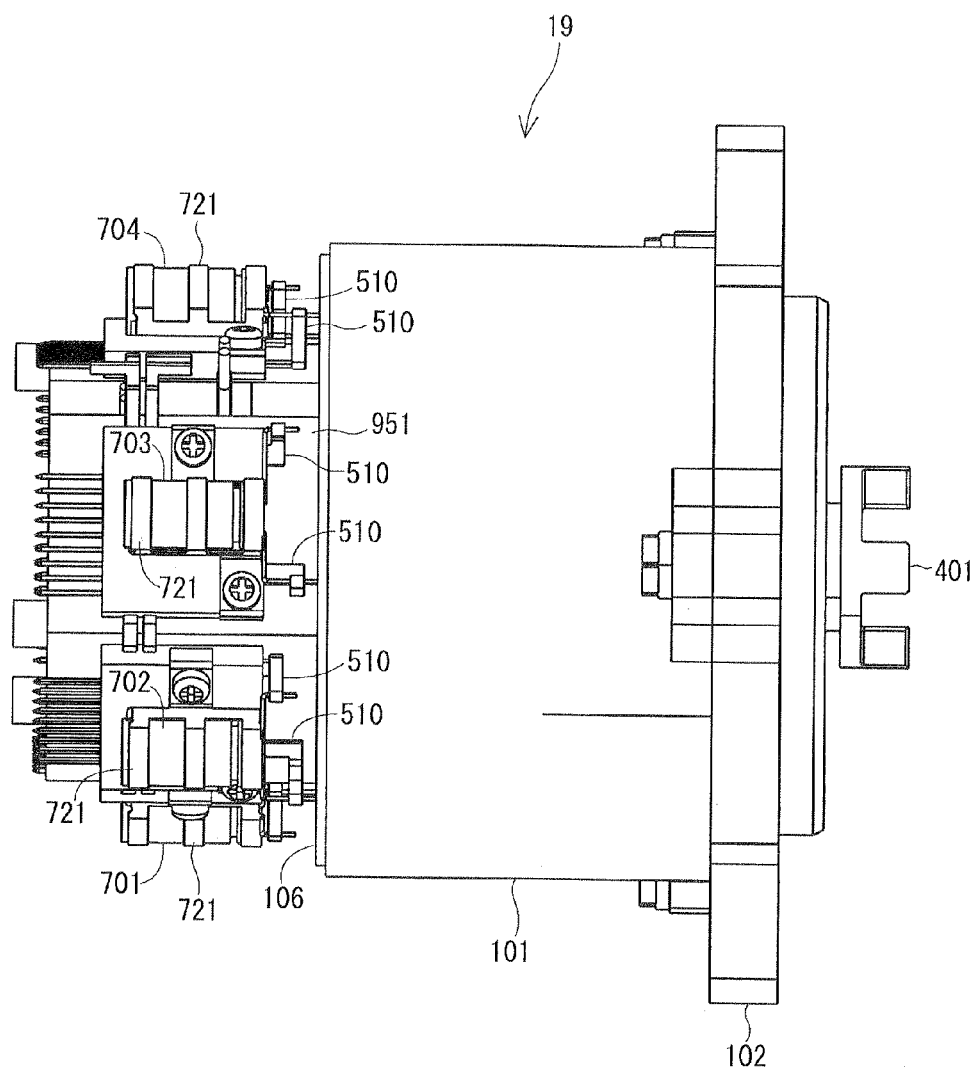
FIG. 61 is a side view of the drive apparatus according to the nineteenth embodiment.

The shape of the heat sink 951 on the section perpendicular to the axial direction is, as shown in FIG. 60, a substantially hexagonal columnar shape, and a columnar space is formed internally. In a side wall 952 of the heat sink 951, a notched portion 953 realizing a discontinuous part is formed. In addition, since the shape on the section perpendicular to the axial direction is the substantially hexagonal columnar shape, the side wall 952 has a total of six side wall surfaces 955, which are oriented in the radially outward directions, in the circumferential direction.

As for the heat sink 951, the semiconductor modules 591 to 596 are disposed one by one on the side wall surfaces 955 that are oriented in the radially outward directions. Herein, the semiconductor modules 591 to 596 are disposed so that the heat radiation surfaces thereof are in contact with the side wall surfaces 955. Here, the side wall surfaces 955 are realized with planes, and the heat radiation surfaces of the semiconductor modules 591 to 596 are planar accordingly.

Since the semiconductor modules 591 to 596 are, as described above, disposed on the side wall surfaces 955 of the heat sink 951, the vertical line to each of semiconductor chip surfaces is perpendicular to the center line of the shaft 401.

Figure 62:
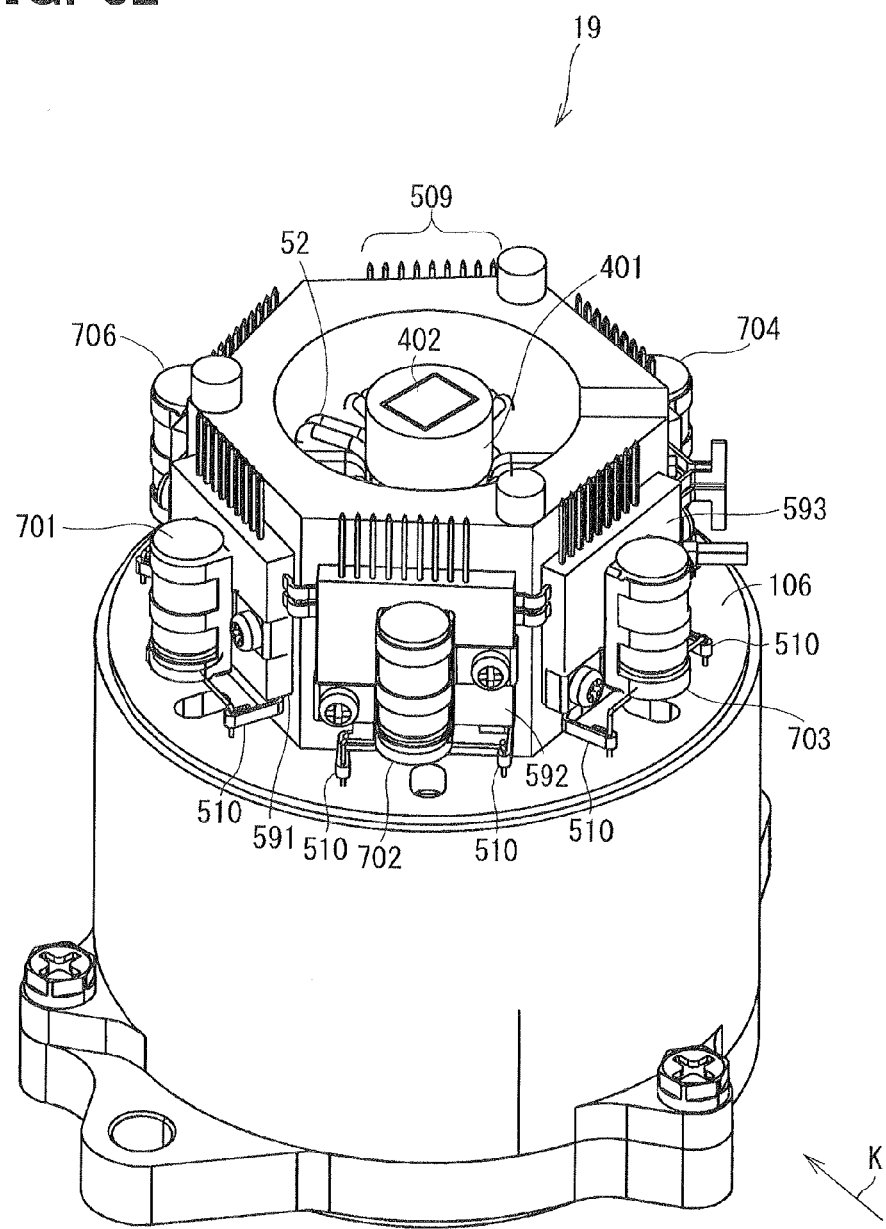
FIG. 62 is a perspective view of the drive apparatus according to the nineteenth embodiment.

Each of the semiconductor modules 591 to 596 has capacitor terminals 510 at the side end thereof facing the motor case 101. In addition, each of the semiconductor modules 591 to 596 has nine terminals 509 at the side end surface thereof opposite to the motor case 101 (FIG. 62).

As shown in FIG. 60 and others, six capacitors 701, 702, 703, 704, 705, and 706 are disposed on the sides of the semiconductor modules 591 to 596 opposite to the heat sink 951. Specifically, the capacitors 701 to 706 are disposed on the radially outer sides of the semiconductor modules 591 to 596. The capacitors 701 to 706 are attached using dedicated brackets 721.

The capacitors 701 to 706 are disposed near the semiconductor modules 591 to 596 in one-to-one correspondence with the semiconductor modules 591 to 596. The capacitors 701 to 706 are in a columnar shape, and are disposed so that the axes thereof become parallel to the center line of the shaft 401. In addition, terminals of the capacitors 701 to 706 are coupled directly to the capacitor terminals 510 of the semiconductor modules 591 to 596.

In addition, the choke coil 52 is disposed with the shaft 401 penetrating therethrough. The choke coil 52 has the coil wire wound about a doughnut-shaped iron core. Herein, the coil end of the choke coil 52 is led out in the radially outward direction through the notched portion 953 of the heat sink 951 (FIG. 60).

The drive apparatus 19 of the nineteenth embodiment provides the same advantages as the advantages (1) to (4) and (6) to (14) described in relation to the first embodiment.

Especially, in the drive apparatus 19, the capacitors 701 to 706 are disposed on the radially outer sides of the semiconductor modules 591 to 596. This obviates the necessity of forming accommodation spaces for the capacitors 701 to 706 in the heat sink 951.

Twentieth Embodiment

Figure 63:
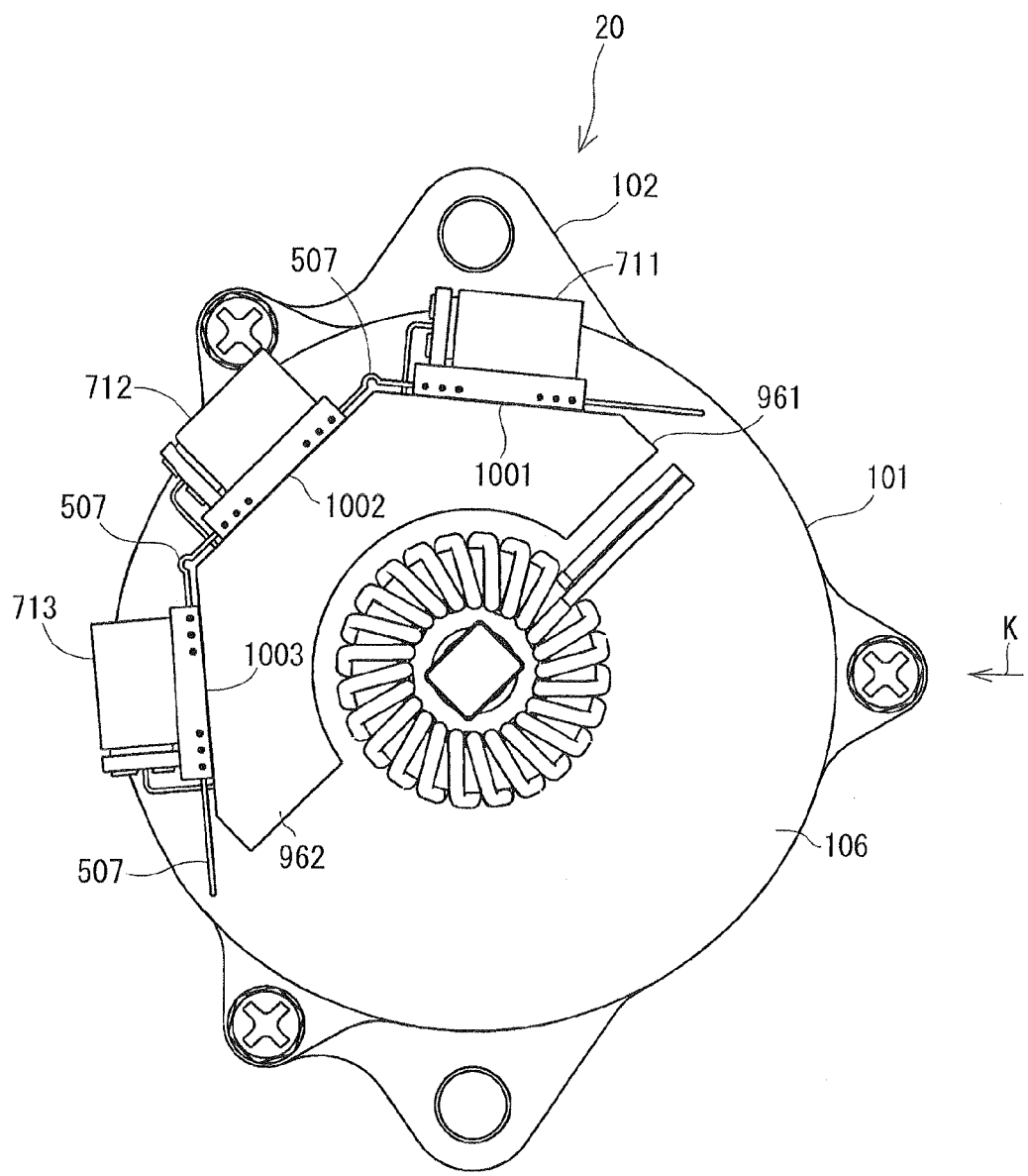
FIG. 63 is a plan view of a drive apparatus according to a twentieth embodiment.
Figure 64:
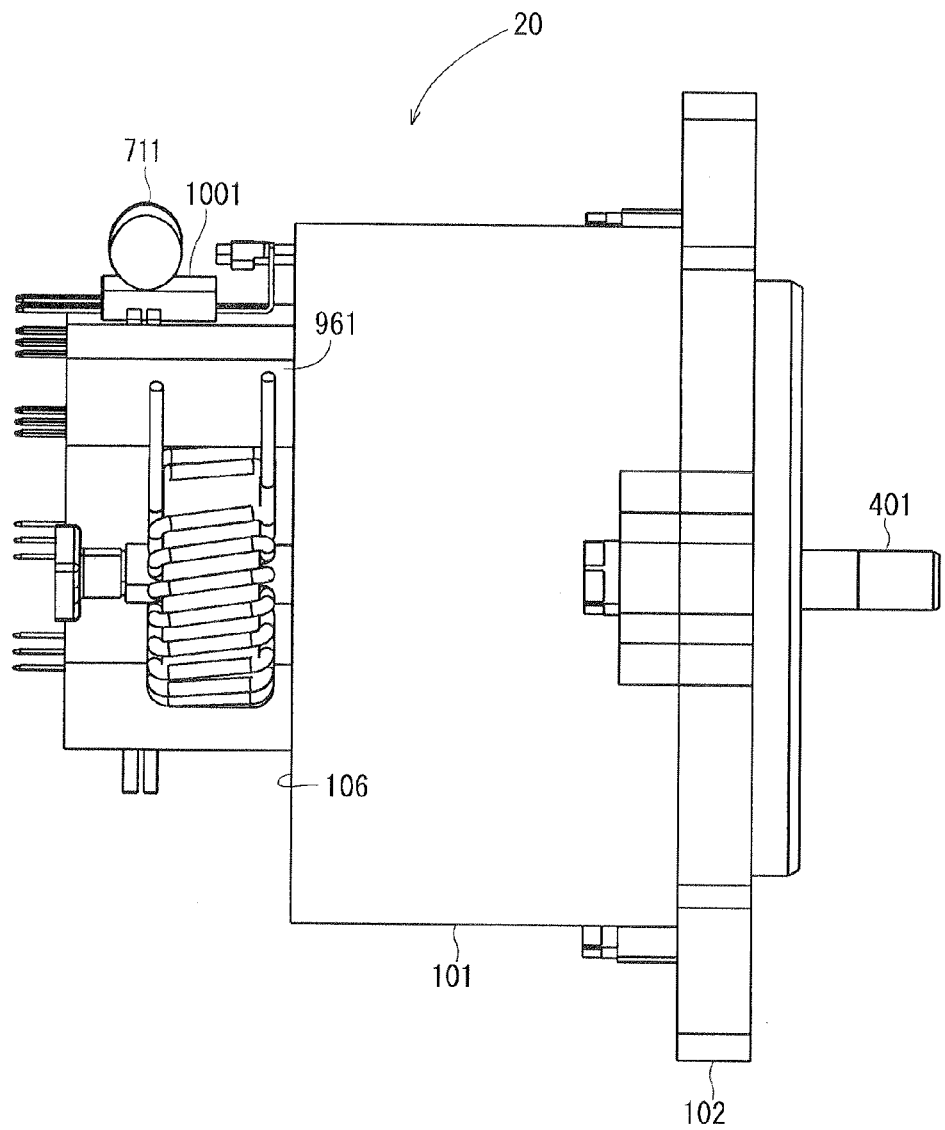
FIG. 64 is a side view of the drive apparatus according to the twentieth embodiment.
Figure 65:
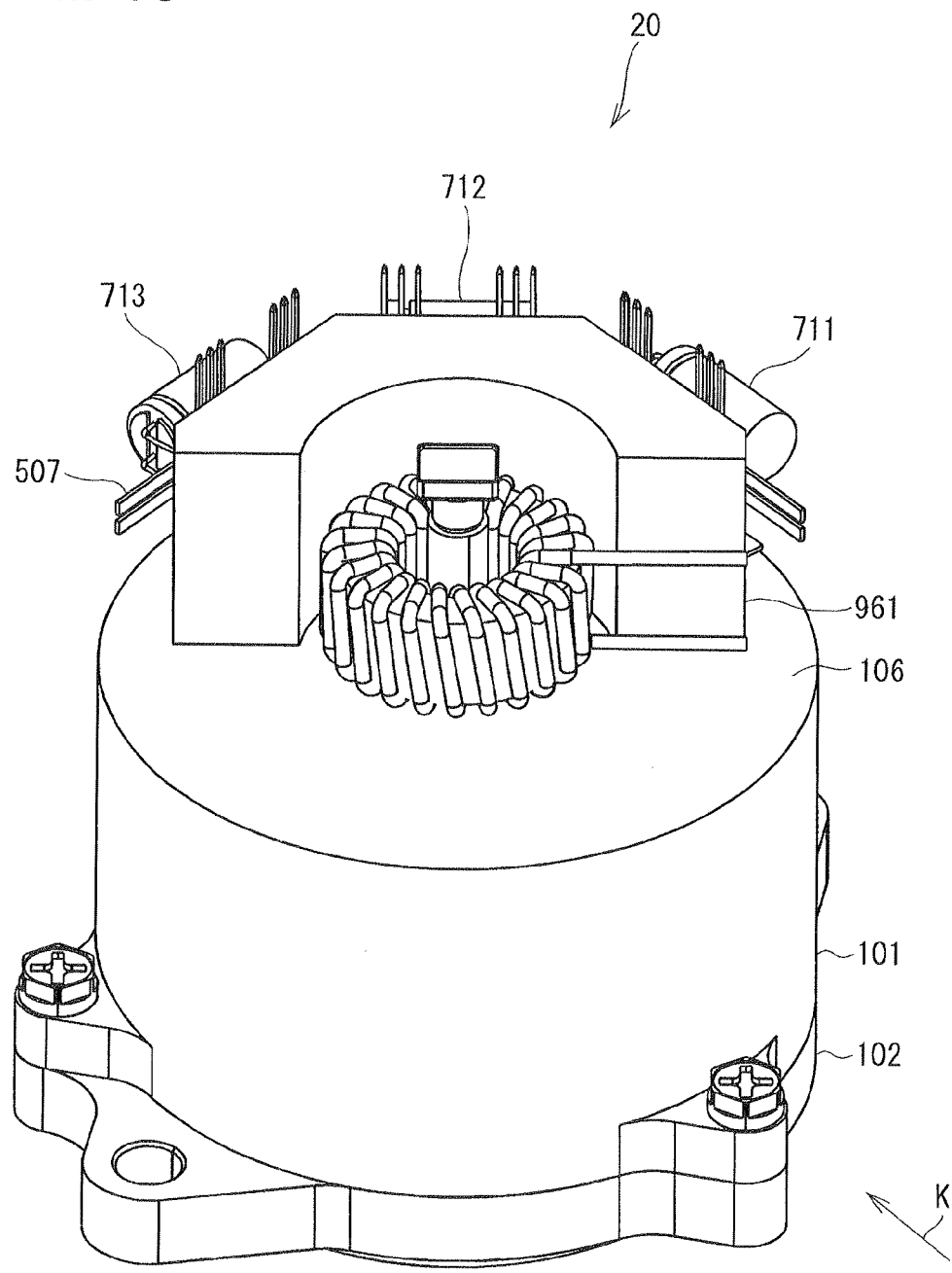
FIG. 65 is a perspective view of the drive apparatus according to the twentieth embodiment.

A drive apparatus 20 of a twentieth embodiment is, as shown in FIG. 63, similar to the drive apparatus 16 of the above-described embodiment (FIG. 51 to FIG. 53), and includes only the inverter circuit 60 shown in FIG. 1. Therefore, the drive apparatus 16 includes three semiconductor modules 1001, 1002, and 1003. The three semiconductor modules 1001 to 1003 are interconnected through the bus bars 507 to form a module unit.

The drive apparatus 20 differs from the drive apparatus 16 of the above-described embodiment in that the capacitors 711, 712, and 713 are placed sideways on the radially outer sides of the semiconductor modules 1001 to 1003. Therefore, on a side wall 962 of the heat sink 961, accommodation spaces in which the capacitors 711 to 713 are accommodated are not formed. In addition, terminals of the capacitors 711 to 713 are coupled directly to the bus bars 507 through which the semiconductor modules 1001 to 1003 are interconnected. Therefore, the semiconductor modules 1001 to 1003 have no capacitor terminal.

The drive apparatus 20 of the twentieth embodiment provides the same advantages as the advantages (1) to (14) described in relation to the first embodiment.

Twenty-First Embodiment

Figure 66:
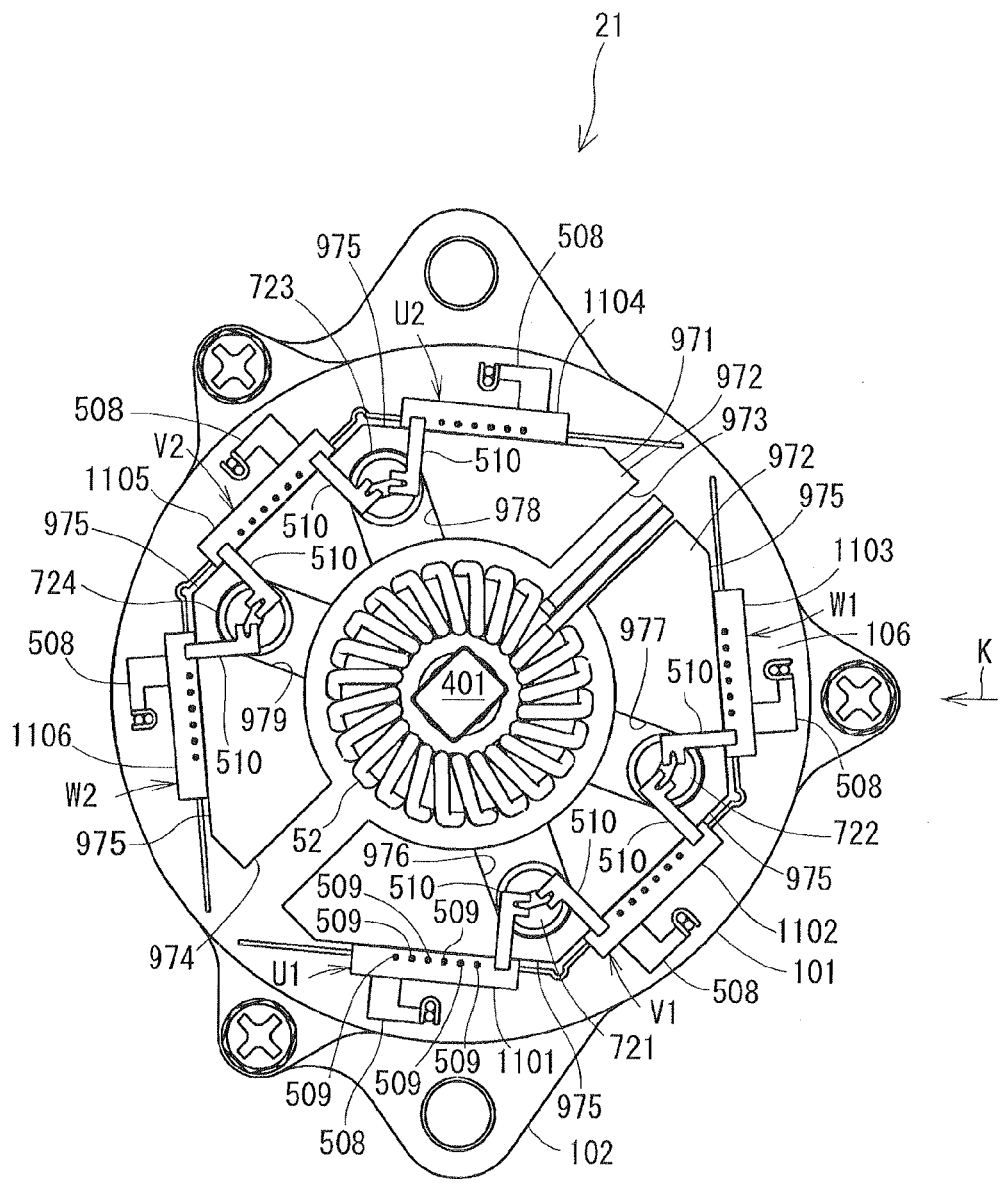
FIG. 66 is a plan view of a drive apparatus according to a twenty-first embodiment.
Figure 67:
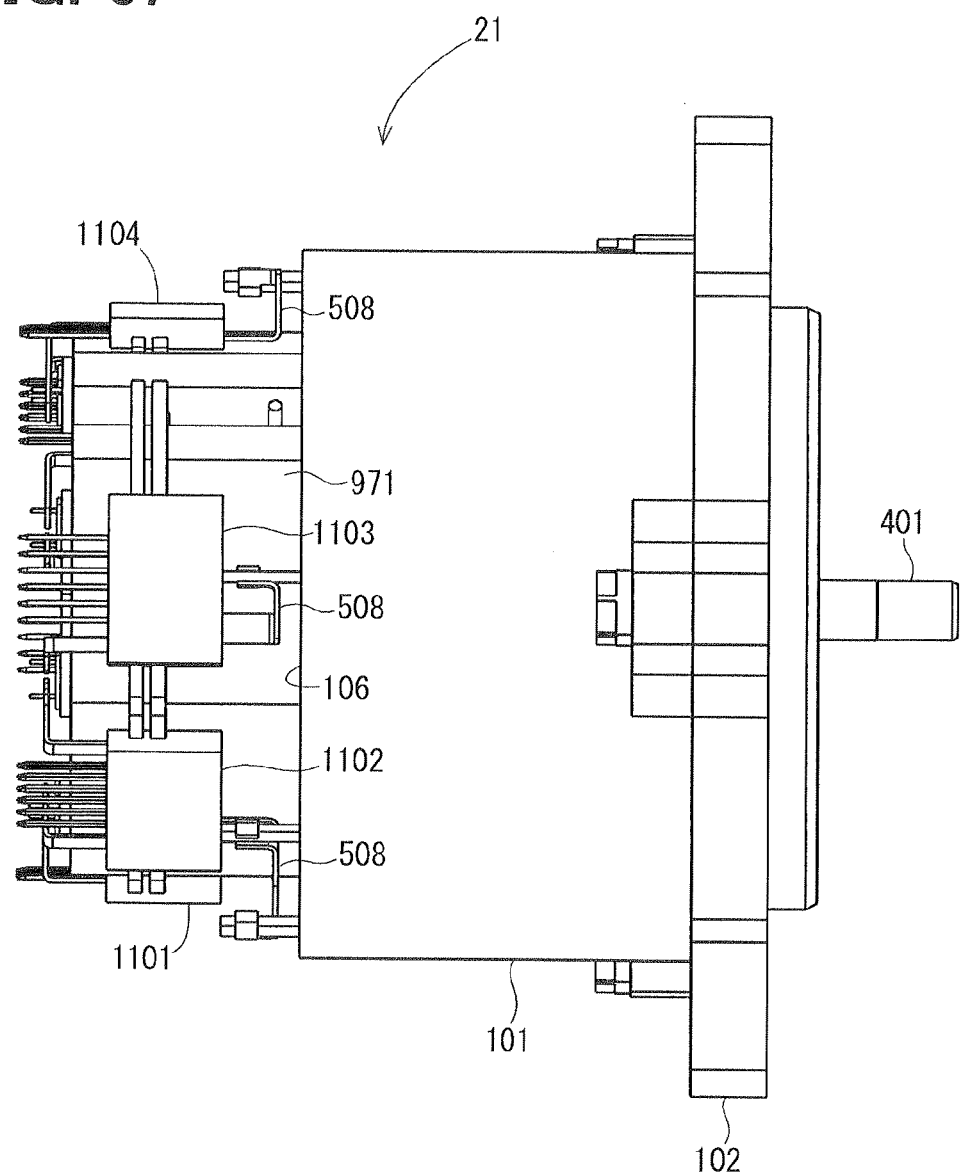
FIG. 67 is a side view of the drive apparatus according to the twenty-first embodiment.

A drive apparatus 21 of a twenty-first embodiment includes, as shown in FIG. 66, six semiconductor modules 1101, 1102, 1103, 1104, 1105, and 1106. For discriminating the semiconductor modules 1101 to 1106 from one another, the reference numerals in FIG. 66 are used to denote them as the U1 semiconductor module 1101, V1 semiconductor module 1102, W1 semiconductor module 1103, U2 semiconductor module 1104, V2 semiconductor module 1105, and W2 semiconductor module 1106.

The semiconductor modules 1101 to 1106 are mounted on a heat sink 971 extended in the same direction as the direction of the center line of the shaft 401 from the end wall 106 of the motor case 101.

The heat sink 971 has, as shown in FIG. 66, two column-shaped parts, the shape on the section perpendicular to the axial direction of which is a substantially trapezoidal shape, juxtaposed as if to sandwich the center line of the shaft 401. Further, the heat sink 971 has a predetermined radius portion thereof cut out so that a columnar space can be formed in the center. The heat sink 971 has side walls 972 around the center line of the shaft 401. The side walls 972 include two notched portions 973 and 974 respectively that provide discontinuous parts.

In addition, the side walls 972 of the heat sink 971 include side wall surfaces 975 oriented in the radially outward directions. The side wall surfaces 971 are planar. In addition, four accommodation spaces 976, 977, 978, 970 that open onto the columnar space in the center are formed in radially inward directions of the side wall surfaces 975. More particularly, the side walls 972 of the heat sink 971 include two column-shaped parts whose shape on the section perpendicular to the axial direction is a trapezoidal shape. Herein, the two accommodation spaces 976 and 977 are formed in one of the column-shaped parts, and the two remaining accommodation spaces 978 and 979 are formed in the other column-shaped part. The accommodation spaces 976 to 979 are formed so that each of the arc-like internal surfaces thereof is located at a position which coincides with the border between the adjoining side wall surfaces 975.

As for the heat sink 971, the semiconductor modules 1101 to 1106 are disposed on the side wall surfaces 975 that are oriented in the radially outward directions. Herein, the semiconductor modules 1101 to 1106 are disposed so that the heat radiation surfaces thereof are in contact with the side wall surfaces 975. Here, the side wall surfaces 975 are planar, and the heat radiation surfaces of the semiconductor modules 1101 to 1106 are planar accordingly.

In addition, since the semiconductor modules 1101 to 1106 are, as described above, mounted on the side wall surfaces 975 of the heat sink 971, semiconductor chip surfaces thereof are perpendicular to the center line of the shaft 401.

Figure 68:
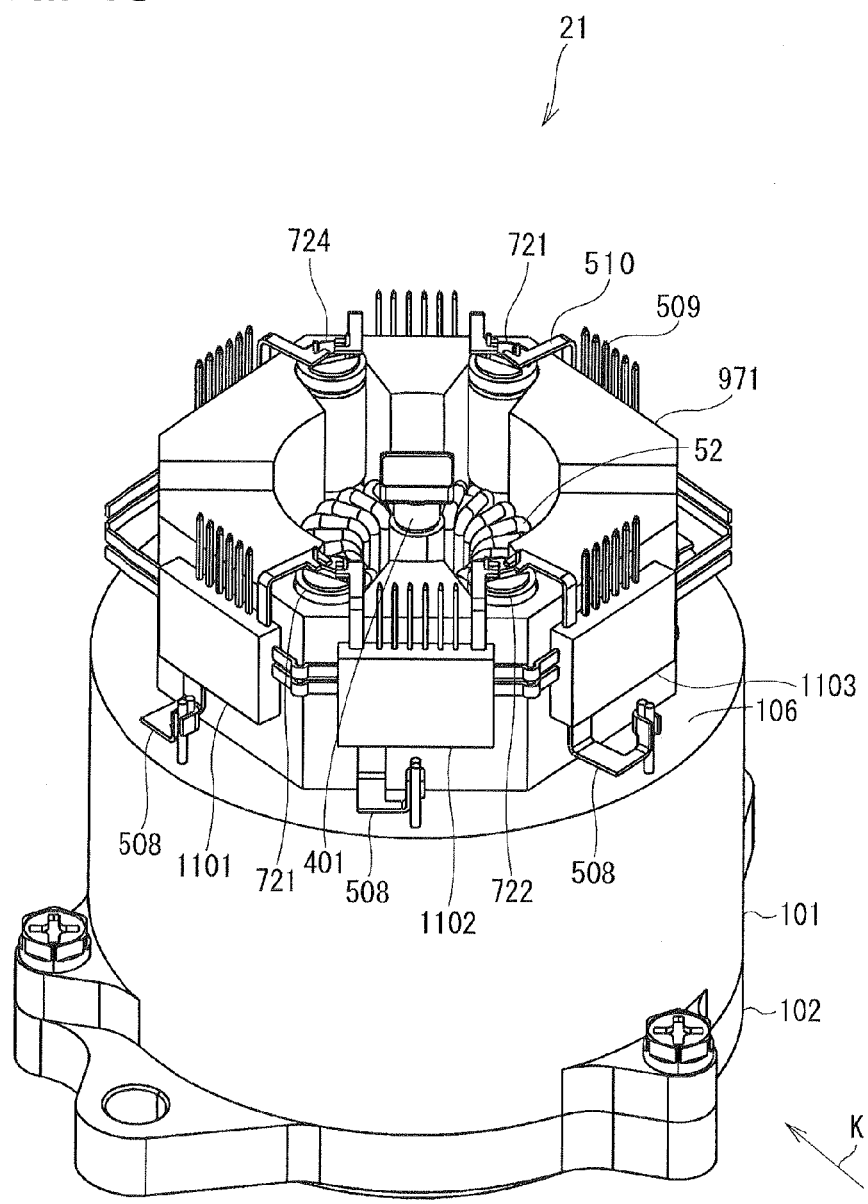
FIG. 68 is a perspective view of the drive apparatus according to the twenty-first embodiment.

Each of the semiconductor modules 1101 to 1106 has the coil terminal 508 at the side end thereof facing the motor case 101. In addition, each of the semiconductor modules 1101 to 1106 has six control terminals 509 and the capacitor terminal 510 or capacitor terminals 510 at the side end surface thereof opposite to the motor case 101 (FIG. 68). Herein, each of the U1, U2, W1, and W2 semiconductor modules 1101, 1104, 1103, and 1106 has one capacitor terminal 510. In contrast, each of the V1 and V2 semiconductor modules 1102 and 1105 has two capacitor terminals 510.

As shown in FIG. 66 and others, four capacitors 721, 722, 723, and 724 are disposed on the same sides of the semiconductor modules 1101 to 1106 as the heat sink 971 is. More particularly, the capacitors are disposed in the accommodation spaces 976 to 979 of the heat sink 971.

The capacitors 721 to 724 are disposed near the semiconductor modules 1101 to 1106. The capacitors 721 to 724 are in a columnar shape, and are disposed so that the axes thereof become parallel to the center line of the shaft 401. The capacitors 721 to 724 are located at positions that are equidistant from adjoining ones of the semiconductor modules 1101 to 1106. In addition, since the capacitor terminals 510 of the semiconductor modules 1101 to 1106 are bent in the radially inward directions, terminals of the capacitors 721 to 724 are coupled directly to the bent capacitor terminals 510. More particularly, the middle semiconductor module 1102 or 1105 of the three semiconductor modules out of the semiconductor modules 1101 to 1106 interconnected through the bus bars is provided with the two capacitor terminals 510 on both sides in a width direction, and has the control terminals 509 interposed between the capacitor terminals 510. The semiconductor modules 1101 and 1103 or semiconductor modules 1104 and 1106 located on both sides of the three semiconductor modules out of the semiconductor modules 1101 to 1106 are provided with the one capacitor terminal 510 on one side in the width direction (the side close to the adjoining module).

The present embodiment is different from the other embodiments in electric configuration. More particularly, the inverter circuit 60 shown in FIG. 1 includes three semiconductor modules and two capacitors. The capacitors can be connected in parallel between the power line and ground for the semiconductor modules. Therefore, the inverter circuit can be configured using two capacitors, though the capacitance of the capacitors has to be adjusted. The inverter circuit may be configured using one capacitor.

The choke coil 52 is disposed with the shaft 401 penetrating therethrough (FIG. 68). The choke coil 52 has the coil wire wound about the doughnut-shaped iron core. The coil end of the choke coil 52 is led out in the radially outward direction through the notched portion 973 of the heat sink 971 (FIG. 66).

The drive apparatus 21 of the twenty-first embodiment provides the same advantages as the advantages (1), (2), and (4) to (14) described in relation to the first embodiment.

Especially, since the drive apparatus 21 includes the four capacitors 721 to 724, only the four accommodation spaces 976 should be formed in the heat sink 971. Eventually, degradation in heat radiation performance of the heat sink 971 can be suppressed.

Twenty-Second Embodiment

Figure 69:
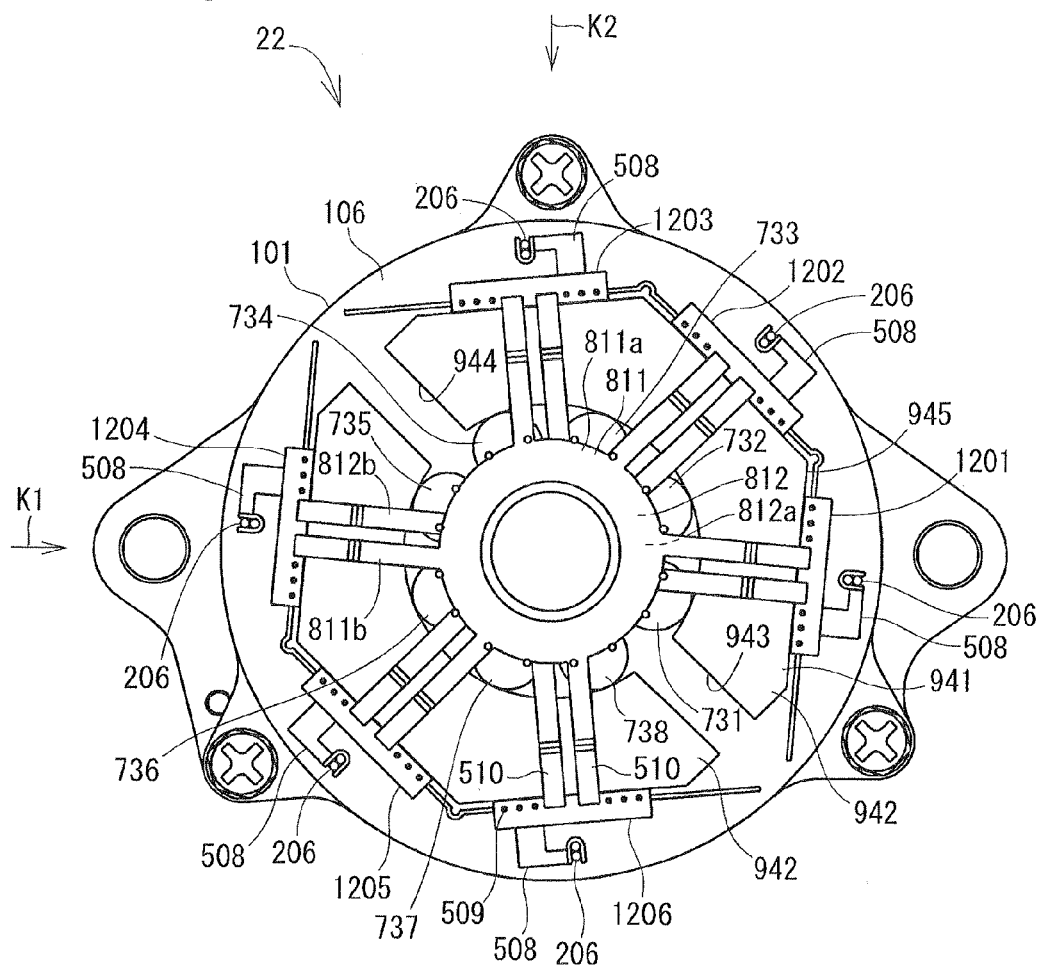
FIG. 69 is a plan view of a drive apparatus according to a twenty-second embodiment.
Figure 70:
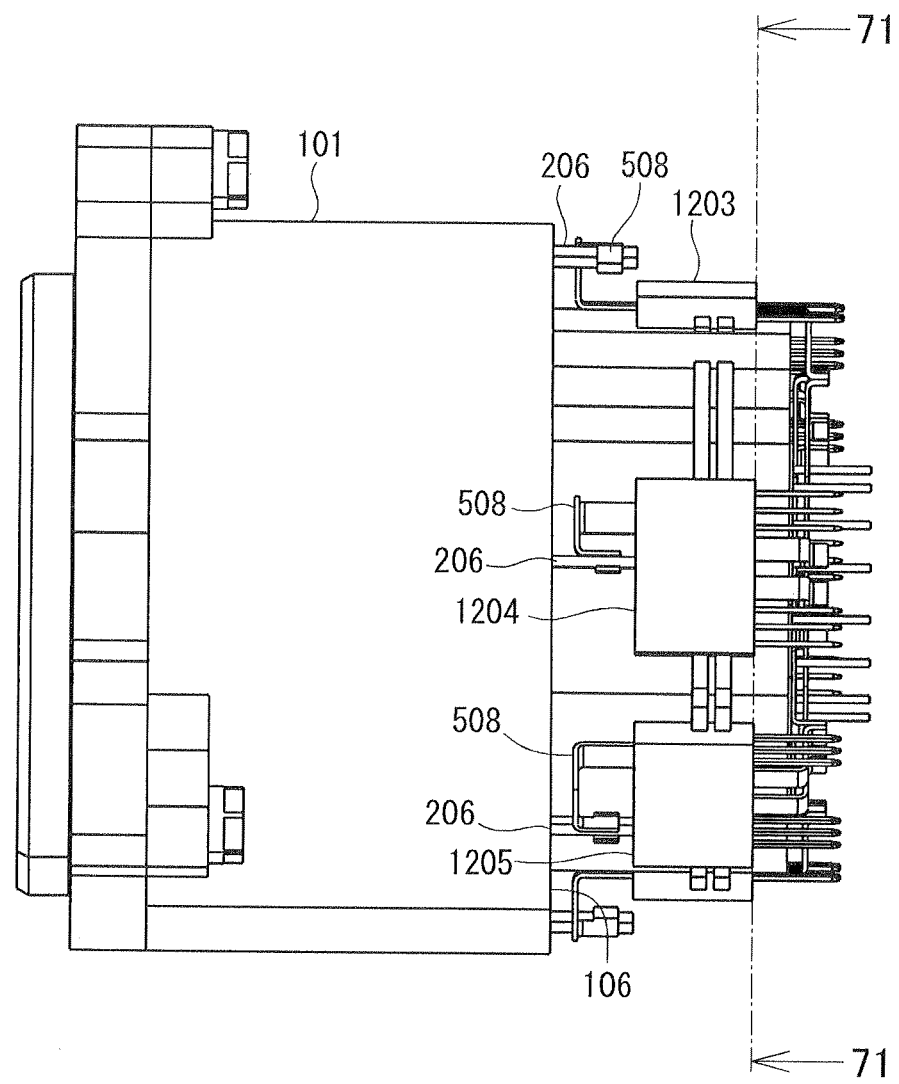
FIG. 70 is a side view of the drive apparatus according to the twenty-second embodiment.

A drive apparatus 22 of a twenty-second embodiment includes, as shown in FIG. 69, six semiconductor modules 1201, 1202, 1203, 1204, 1205, and 1206. The semiconductor modules 1201 to 1206 are mounted on a heat sink 941 extended in the same direction as the direction of the center line of the shaft 401 from the end wall 106 of the motor case 101.

The heat sink 941 has, as shown in FIG. 69, two column-shaped parts, the shape on the section perpendicular to the axial direction of which is a substantially trapezoidal shape, juxtaposed as if to sandwich the center line of the shaft 401. Further, the heat sink 941 has a predetermined radius portion thereof cut out so that a columnar space can be formed in the center. The heat sink 941 has side walls 942 around the center line of the shaft 401. The side walls 942 include two notched portions 943 and 944 respectively that provide discontinuous parts. The side walls 942 of the heat sink 941 include side wall surfaces 945 oriented in the radially outward directions. The side wall surfaces 945 are planar.

As for the heat sink 941, the semiconductor modules 1201 to 1206 are disposed on the side wall surfaces 945 that are oriented in the radially outward directions. Herein, the semiconductor modules 1201 to 1206 are disposed so that the heat radiation surfaces thereof are in contact with the side wall surfaces 945. Here, the side wall surfaces 945 are planar, and the heat radiation surfaces of the semiconductor modules 1201 to 1206 are planar accordingly.

In addition, since the semiconductor modules 1201 to 1206 are, as described above, disposed on the side wall surfaces 945 of the heat sink 941, the semiconductor chip surfaces are perpendicular to the center line of the shaft 401.

Further, each of the semiconductor modules 1201 to 1206 has the coil terminal 508 at the side end thereof facing the motor case 101. In addition, each of the semiconductor modules 1201 to 1206 has six control terminals 509 and capacitor terminals 510 at the side end surface thereof opposite to the motor case 101 (FIG. 69). The capacitor terminals 510 are bent radially inward, and coupled to conductive members 811 and 812 disposed radially inward.

Figure 71:
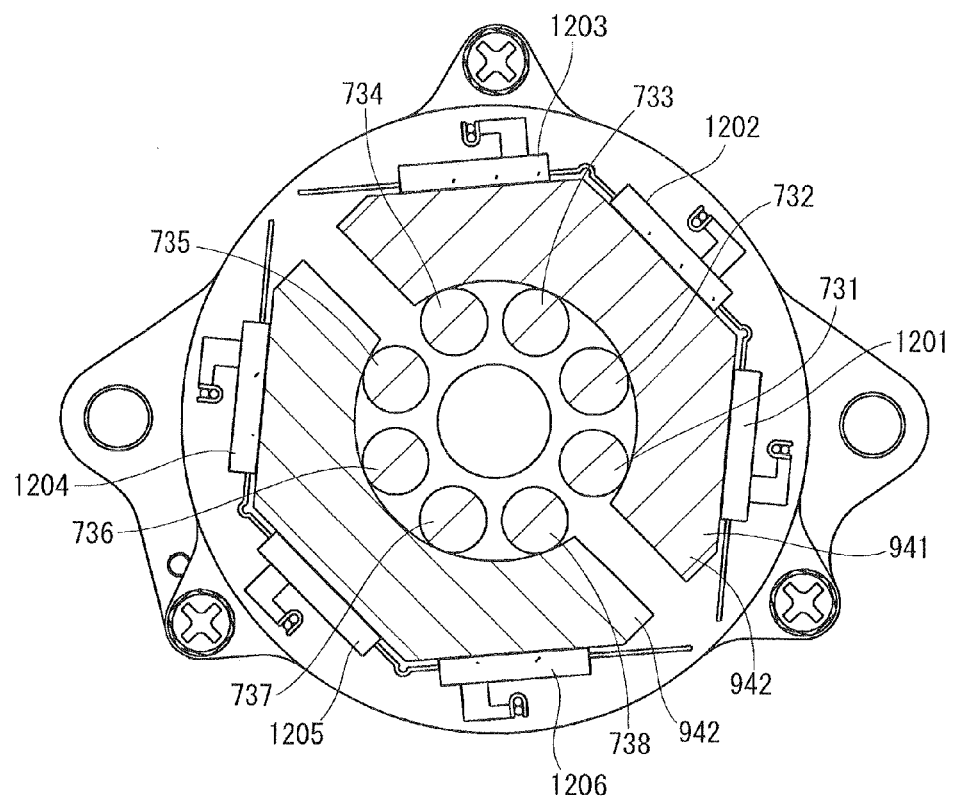
FIG. 71 is a sectional view taken along a line 71-71 in FIG. 70.

In a cylindrical space formed in the center of the heat sink 941, eight capacitors 731, 732, 733, 734, 735, 736, 737, and 738 are disposed. More particularly, the capacitors are arranged around the shaft 401 along the internal surfaces of the side walls 942 of the heat sink 941 (FIG. 71). Thus, in the present embodiment, the eight capacitors 731 to 738 are included for the six semiconductor modules 1201 to 1206.

The capacitor terminals 510 are coupled to the conductive members 811 and 812. The conductive members 811 and 812 include thin ring-shaped annular parts 811a and 812a, and joint pieces 811b and 812b extended from the annular parts in the radially outward directions. The joint pieces 811b and 812b are extended in parallel with each other toward the six semiconductor modules 1201 to 1206. The conductive members 811 and 812 are disposed while being insulated from each other in the axial direction. The conductive member 811 is disposed farther away from the motor case 101, and the other conductive member 812 is disposed closer to the motor case 101.

Figure 72:
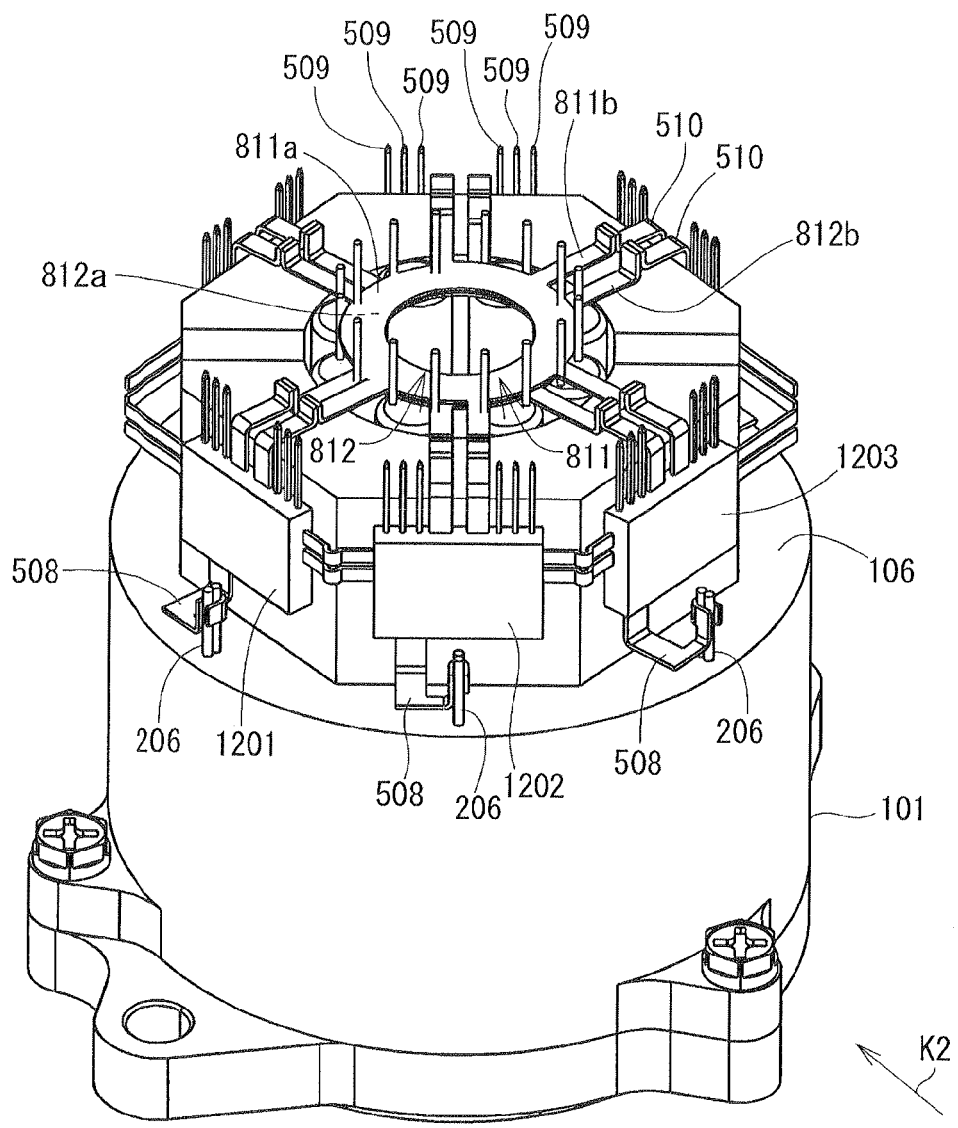
FIG. 72 is a perspective view of the drive apparatus according to the twenty-second embodiment.

One of terminals of each of the capacitors 731 to 738 is coupled to the conductive member 811, and the other terminal thereof is coupled to the other conductive member 812 (FIG. 69 and FIG. 72). The joint pieces 811b and 812b of the conductive members 811 and 812 are coupled to the capacitor terminals 510 of the semiconductor modules 1201 to 1206. More particularly, ones of the capacitor terminals 510 are coupled to the joint pieces 811b of the conductive member 811, and the other capacitor terminals 510 are coupled to the joint pieces 812b of the other conductive member 812. Accordingly, via the conductive member 811, ones of the capacitor terminals 510 of the six semiconductor modules 1201 to 1206 are connected to ones of the terminals of the eight capacitors 731 to 738. Via the other conductive member 812, the other capacitor terminals 510 of the six semiconductor modules 1201 to 1206 are connected to the other terminals of the eight capacitors 731 to 738.

The twenty-second embodiment is different from the other embodiments in electric configuration. More particularly, the semiconductor modules 1201 to 1206 and the eight capacitors 731 to 738 which constitute the inverter circuits 60 and 68 shown in FIG. 1 are wired equally via the conductive members 811 and 812. Unlike the other embodiments in which the capacitors are connected directly to the semiconductor modules, equal capacitor performance can be readily provided for the semiconductor modules irrespective of the number of capacitors or the size thereof. Therefore, the inverter circuit can be configured using an arbitrary number of capacitors, though adjustment of the capacitance is needed.

The drive apparatus 22 of the twenty-second embodiment provides the same advantages as the advantages (1), (2), (4) to (7), and (10) to (14) described in relation to the first embodiment.

Especially, since the drive apparatus 22 includes the eight capacitors 731 to 738, the physical configuration of the capacitors 731 to 738 can be made smaller. Therefore, the capacitors can be disposed without the necessity of forming accommodation spaces in the heat sink 941, and degradation in heat radiation performance of the heat sink 941 can be suppressed.

Twenty-Third Embodiment

Figure 73:
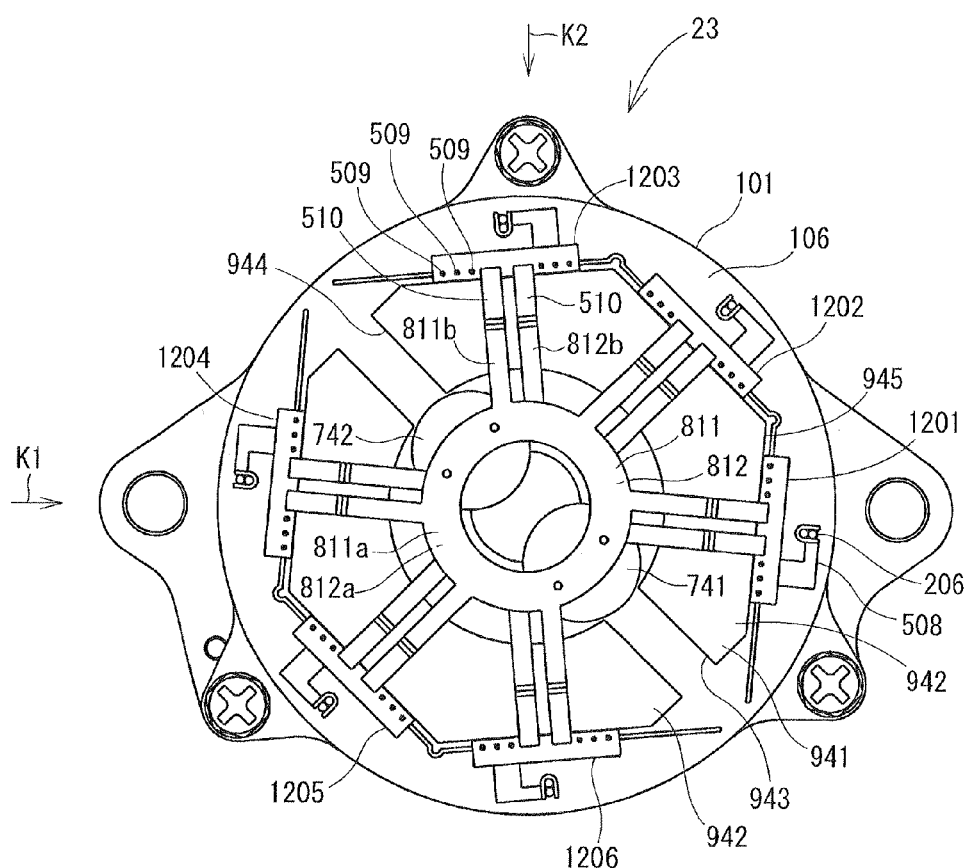
FIG. 73 is a plan view of a drive apparatus according to a twenty-third embodiment.
Figure 74:
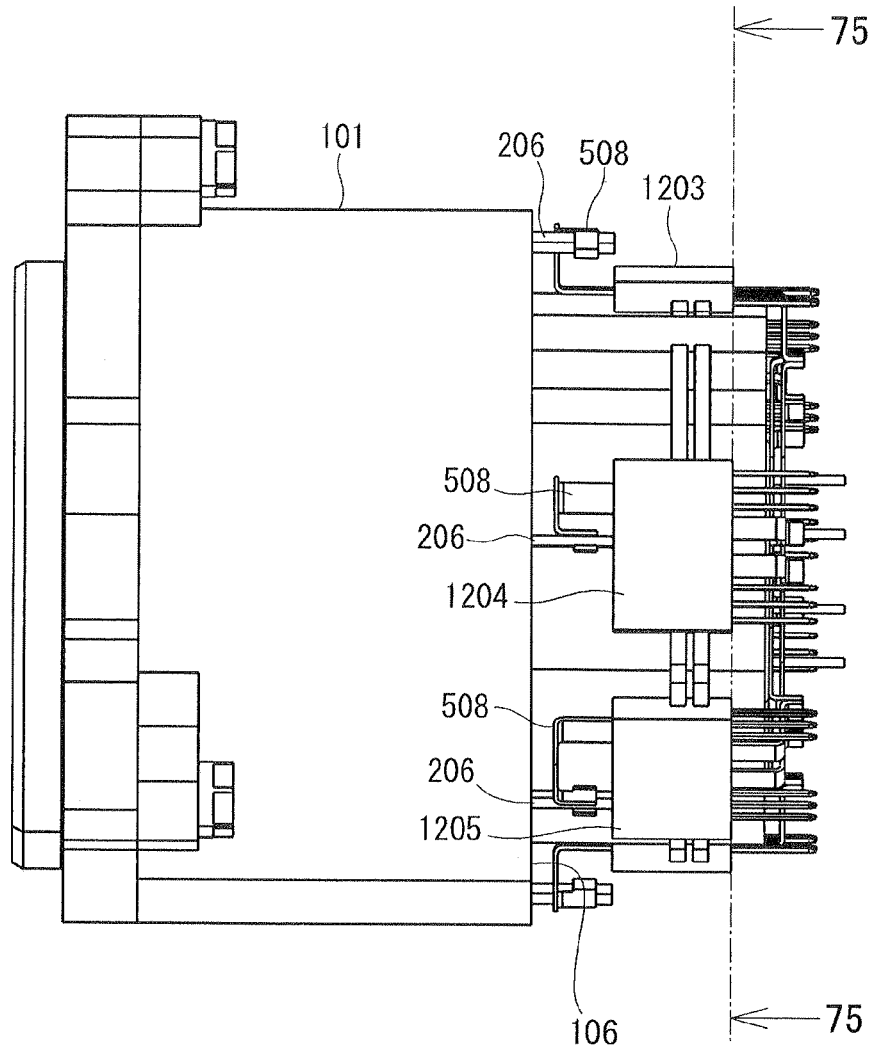
FIG. 74 is a side view of the drive apparatus according to the twenty-third embodiment.

A drive apparatus 23 of a twenty-third embodiment includes, as shown in FIG. 73, six semiconductor modules 1201, 1202, 1203, 1204, 1205, and 1206. The semiconductor modules 1201 to 1206 are mounted on a heat sink 941 extended in the same direction as the direction of the center line of the shaft 401 from the end wall 106 of the motor case 101.

The arrangement of the heat sink 941 and semiconductor modules 1201 to 1206 is identical to that in the drive apparatus 22.

Each of the semiconductor modules 1201 to 1206 has the coil terminal 508 at the side end thereof facing the motor case 101. The coil terminals 508 are bent radially outward, and coupled to the lead wires 206 extended from the stator 201. In addition, each of the semiconductor modules 1201 to 1206 has six control terminals 509 and capacitor terminals 510 at the side end surface thereof opposite to the motor case 101 (FIG. 73). The capacitor terminals 510 are bent radially inward, and coupled to conductive members 811 and 812 disposed radially inward.

Figure 75:
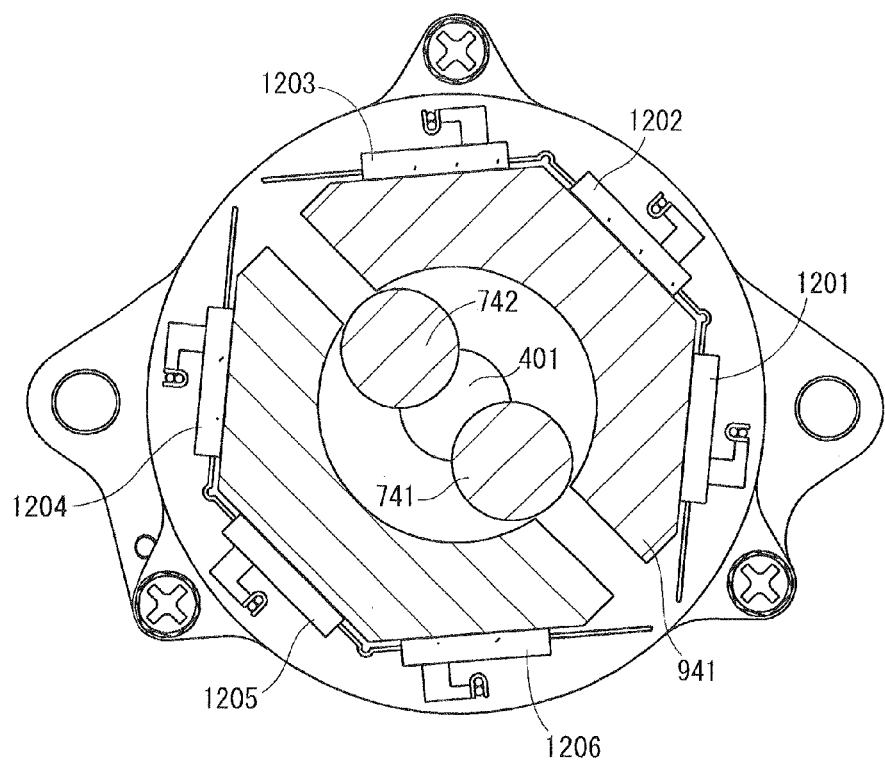
FIG. 75 is a sectional view taken along a line 75-75 in FIG. 74.
Figure 76:
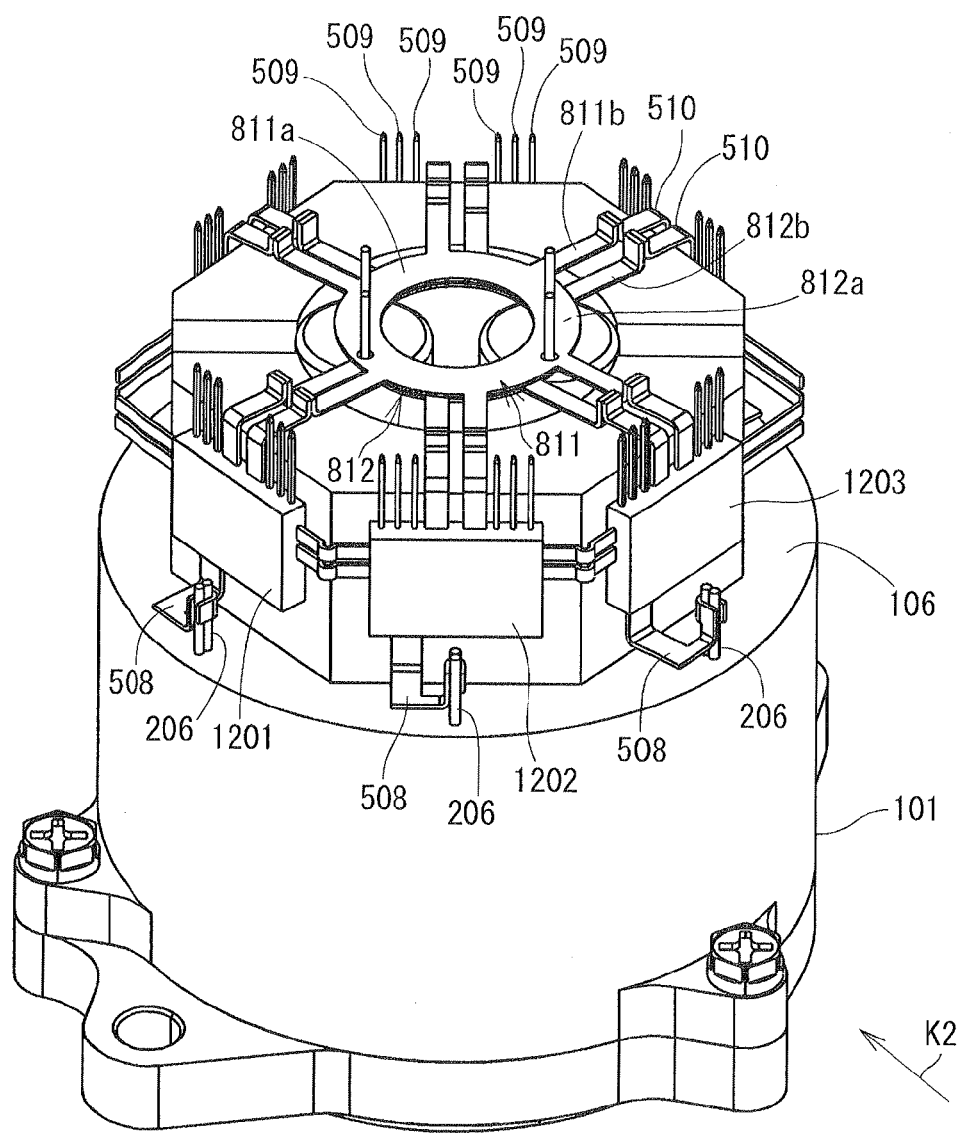
FIG. 76 is a perspective view of the drive apparatus according to the twenty-third embodiment.

In a cylindrical space formed in the center of the heat sink 941, two capacitors 741 and 742 are disposed. More particularly, the capacitors are juxtaposed on the perimeter of the shaft 401 so that they internally abut on the ends of notched portions 943 and 944 of side walls 942 of the heat sink 941 (FIG. 75). Thus, in the present embodiment, the two capacitors 741 and 742 are included for the six semiconductor modules 1201 to 1206.

The capacitor terminals 510 are coupled to the conductive members 811 and 812. The conductive members 811 and 812 include thin ring-shaped annular parts 811a and 812a, and joint pieces 811b and 812b extended in the radially outward directions from the annular parts. The joint pieces 811b and 812b are extended in parallel with each other toward the six semiconductor modules 1201 to 1206. The conductive members 811 and 812 are disposed while being insulated from each other in an axial direction. The conductive member 811 is disposed farther away from the motor case 101, and the other conductive member 812 is disposed closer to the motor case 101.

Ones of terminals of the capacitors 741 and 742 are coupled to the conductive member 811, and the other terminals thereof are coupled to the other conductive member 812 (FIG. 73). The joint pieces 811b and 812b of the conductive members 811 and 812 are coupled to the capacitor terminals 510 of the semiconductor modules 1201 to 1206. More particularly, ones of the capacitor terminals 510 are coupled to the joint pieces 811b of the conductive member 811, and the other capacitor terminals 510 are coupled to the joint pieces 812b of the other conductive member 812. Accordingly, via the conductive member 811, ones of the capacitor terminals 510 of the six semiconductor modules 1201 to 1206 are connected to ones of the terminals of the two capacitors 741 and 742. Via the other conductive member 812, the other capacitor terminals 510 of the semiconductor modules 1201 to 1206 are connected to the other terminals of the two capacitors 741 and 742.

The twenty-third embodiment is different from the other embodiments in electric configuration. More particularly, the semiconductor modules 1201 to 1206 and the two capacitors 741 and 742 which constitute the inverter circuits 60 and 68 shown in FIG. 1 are equally wired via the conductive members 811 and 812. Unlike the other embodiments in which the capacitors are directly connected to the semiconductor modules, equal capacitor performance can be readily provided for the semiconductor modules.

The drive apparatus 23 of the twenty-third embodiment provides the same advantages as the advantages (1), (2), (4) to (7), and (10) to (14) described in relation to the first embodiment.

Especially, the drive apparatus 23 includes the two capacitors 741 and 742. Therefore, although the physical configuration of one capacitor is larger, the number of capacitors to be employed can be made smaller. In addition, the capacitors can be disposed without necessity of forming accommodation spaces in the heat sink 941. Eventually, degradation in heat radiation performance of the heat sink 941 can be suppressed.

Twenty-Fourth Embodiment

Figure 77:
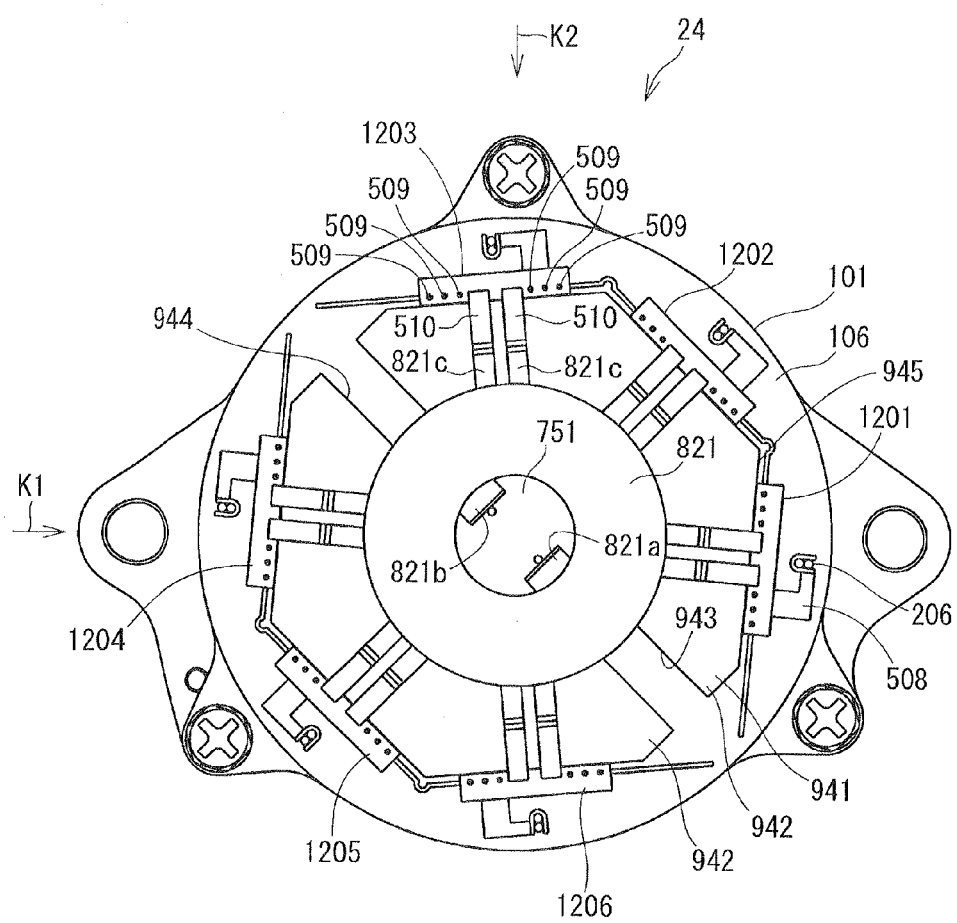
FIG. 77 is a plan view of a drive apparatus according to a twenty-fourth embodiment.
Figure 78:
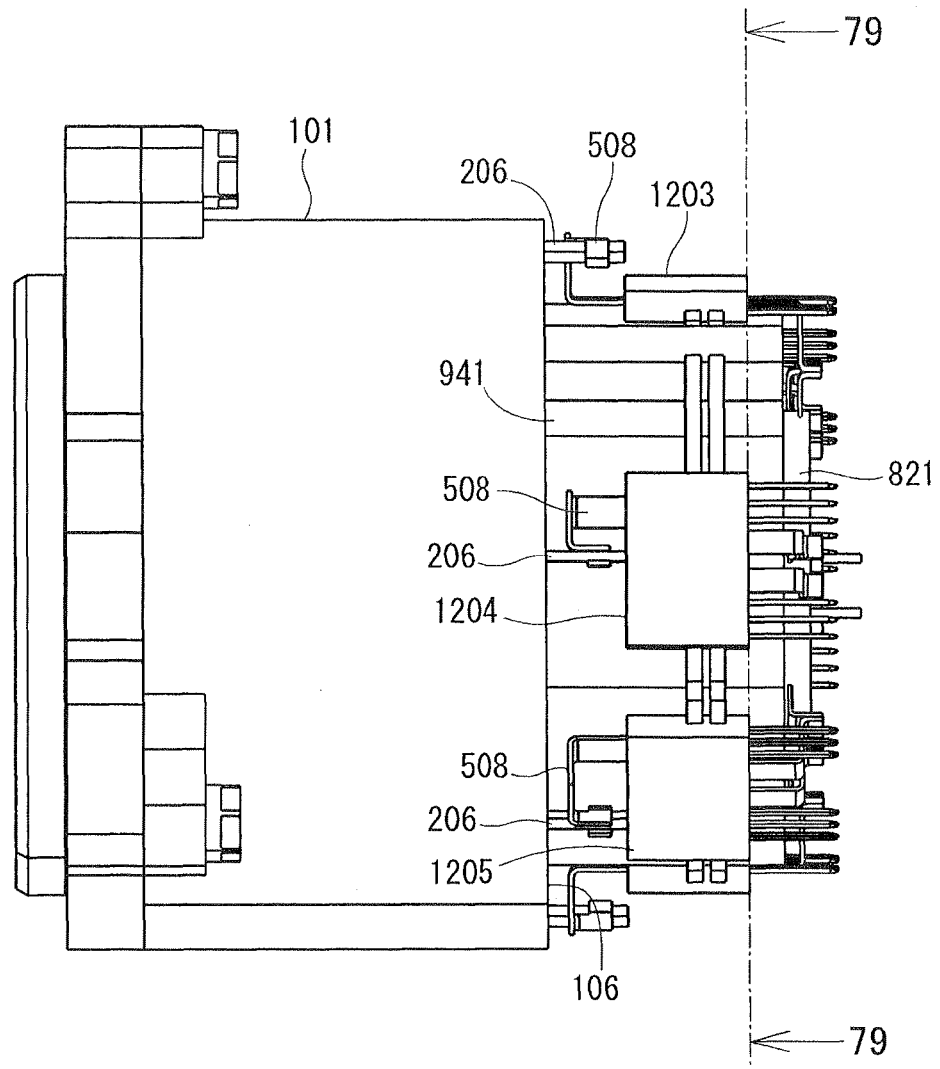
FIG. 78 is a side view of the drive apparatus according to the twenty-fourth embodiment.

A drive apparatus 24 of a twenty-fourth embodiment includes, as shown in FIG. 77, six semiconductor modules 1201, 1202, 1203, 1204, 1205, and 1206. The semiconductor modules 1201 to 1206 are mounted on a heat sink 941 extended in the same direction as the direction of the center line of the shaft 401 from the end wall 106 of the motor case 101.

The arrangement of the heat sink 941 and semiconductor modules 1201 to 1206 is identical to that in the drive apparatuses 22 and 23 of the above-described embodiments.

Each of the semiconductor modules 1201 to 1206 has the coil terminal 508 at the side end thereof facing the motor case 101. The coil terminals 508 are bent radially outward, and coupled to lead wires 206 coming from a stator 201. In addition, each of the semiconductor modules 1201 to 1206 has six control terminals 509 and capacitor terminals 510 at the side end surface thereof opposite to the motor case 101 (FIG. 77). The capacitor terminals 510 are bent radially inward, and coupled to a conductive part 821 disposed radially inward.

Figure 79:
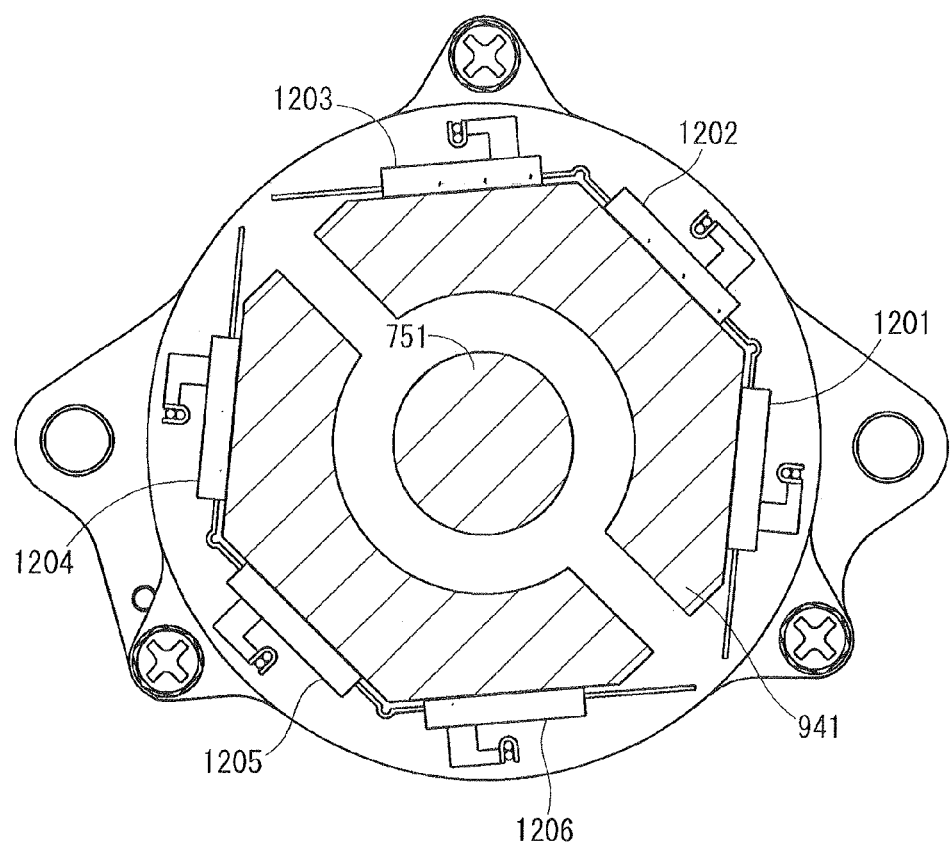
FIG. 79 is a sectional view taken along a line 79-79 in FIG. 78.
Figure 80:
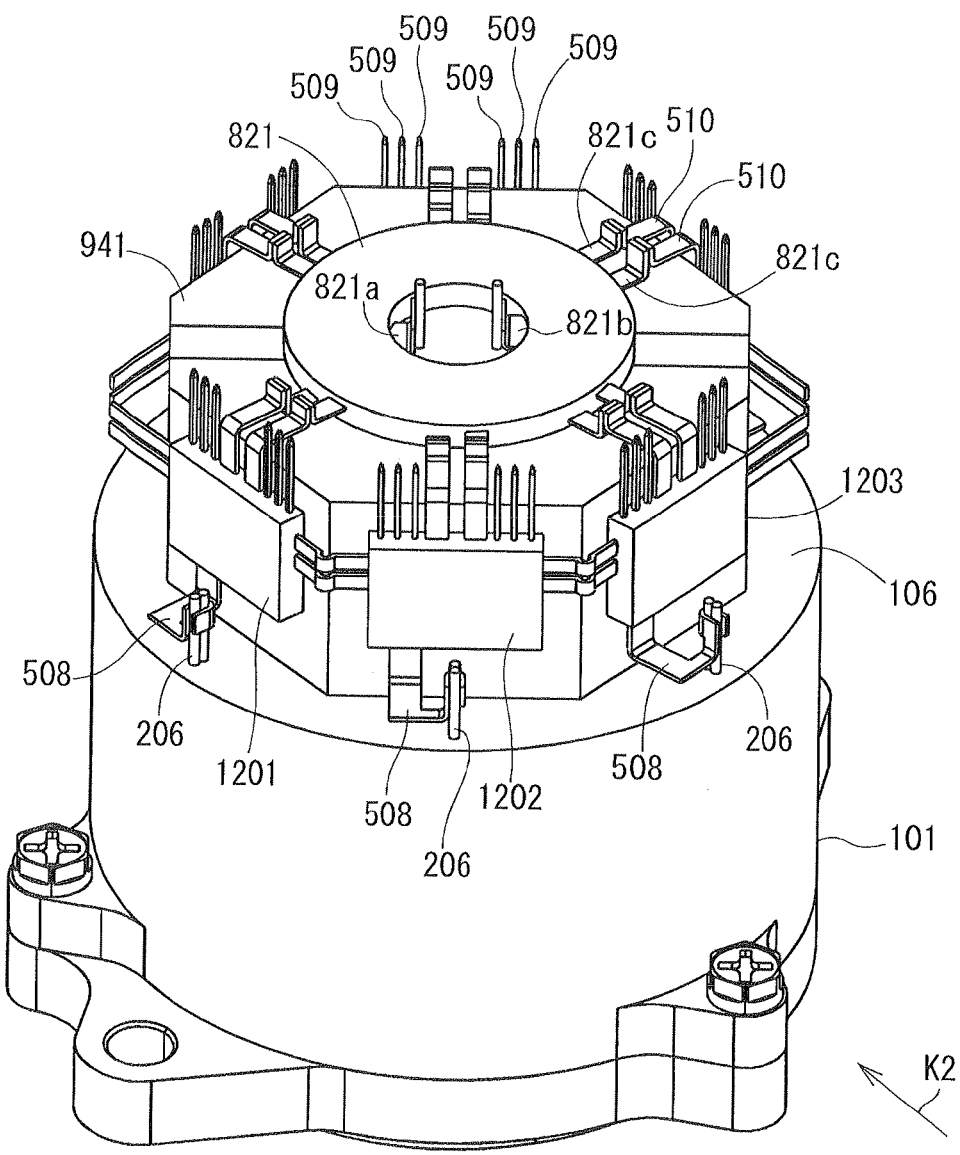
FIG. 80 is a perspective view of the drive apparatus according to the twenty-fourth embodiment.

Herein, in the center of a cylindrical space formed in the center of the heat sink 941, one capacitor 751 is disposed (FIG. 79). Thus, in the present embodiment, the capacitor 751 is provided for the six semiconductor modules 1201 to 1206.

The capacitor terminals 510 are electrically coupled to the conductive part 821. The conductive part 821 has an annular shape, is molded with a resin, and has electrodes 821a and 821b that jut radially inward so as to face each other. The conductive part 821 includes joint pieces 821c that jut out toward the semiconductor modules 1201 to 1206 located radially outward. Each pair of the joint pieces 821c juts out in parallel with each other toward each of the semiconductor modules 1201 to 1206. Herein, one of the joint pieces 821c that jut out in parallel with each other conducts electricity to the electrode 821a, and the other of the joint pieces 821c that jut out in parallel with each other conducts electricity to the other electrode 821b.

As shown in FIG. 77, the electrode 821a is electrically coupled to one of the terminals of the capacitor 751, and the other electrode 821b is electrically coupled to the other terminal of the capacitor 751. In addition, ones of the pairs of joint pieces 821c that jut in parallel with each other are electrically coupled to ones of the capacitor terminals 510 of the semiconductor modules 1201 to 1206. Further, the others of the pairs of joint pieces 821c that jut in parallel with each other are electrically coupled to the other capacitor terminals 510 of the semiconductor modules 1201 to 1206.

Accordingly, via the conductive part 821, ones of the capacitor terminals 510 of the six semiconductor modules 1201 to 1206 are connected to one of the terminals of the capacitor 751, and the other capacitor terminals 510 of the six semiconductor modules 1201 to 1206 are connected to the other terminal of the capacitor 751.

The twenty-fourth embodiment is different from the other embodiments in electrical configuration. More particularly, the two inverter circuits 60 and 68 shown in FIG. 1 include six semiconductor modules and one capacitor. The capacitor is connected in parallel between the power line and ground for the semiconductor modules. Therefore, although adjustment of the capacitance is needed, the two inverter circuits 60 and 68 can be configured using one capacitor.

The drive apparatus 24 of the twenty-fourth embodiment provides the same advantages as the advantages (1), (2), (4) to (7), and (10) to (14) described in relation to the first embodiment.

Especially, the drive apparatus 24 is constructed using the capacitor 751 alone. Therefore, although the physical configuration of the capacitor is the largest, the number of capacitors employed is only one and the capacitor can be disposed without the necessity of forming an accommodation space in the heat sink 941. Degradation in heat radiation performance of the heat sink 941 can be suppressed.

Twenty-Fifth Embodiment

FIG. 81 to FIG. 97 show a drive apparatus 2001 of a twenty-fifth embodiment. The drive apparatus 2001 is provided in an electronic power steering (EPS) system, and includes a motor 2002 and an electronic control unit 2003. The electronic control unit 2003 serving as an electronic controller includes, as shown in FIG. 82, a control circuit substrate 2040, a heat sink 2050, power modules 2060, and a power circuit substrate 2070.

Figure 81:
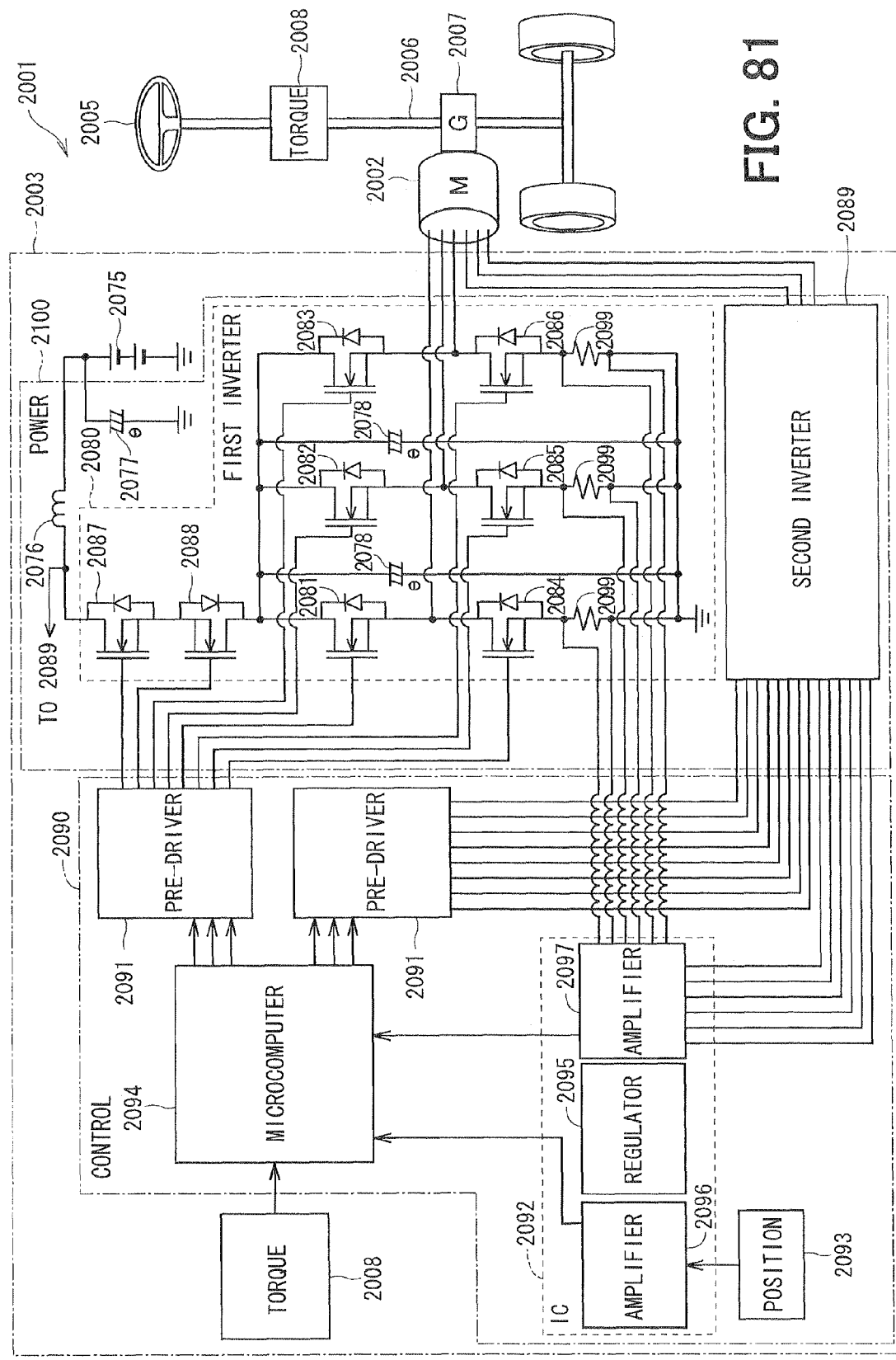
FIG. 81 is a block diagram of an electric power steering system employing a drive apparatus according to a twenty-fifth embodiment.
Figure 82:
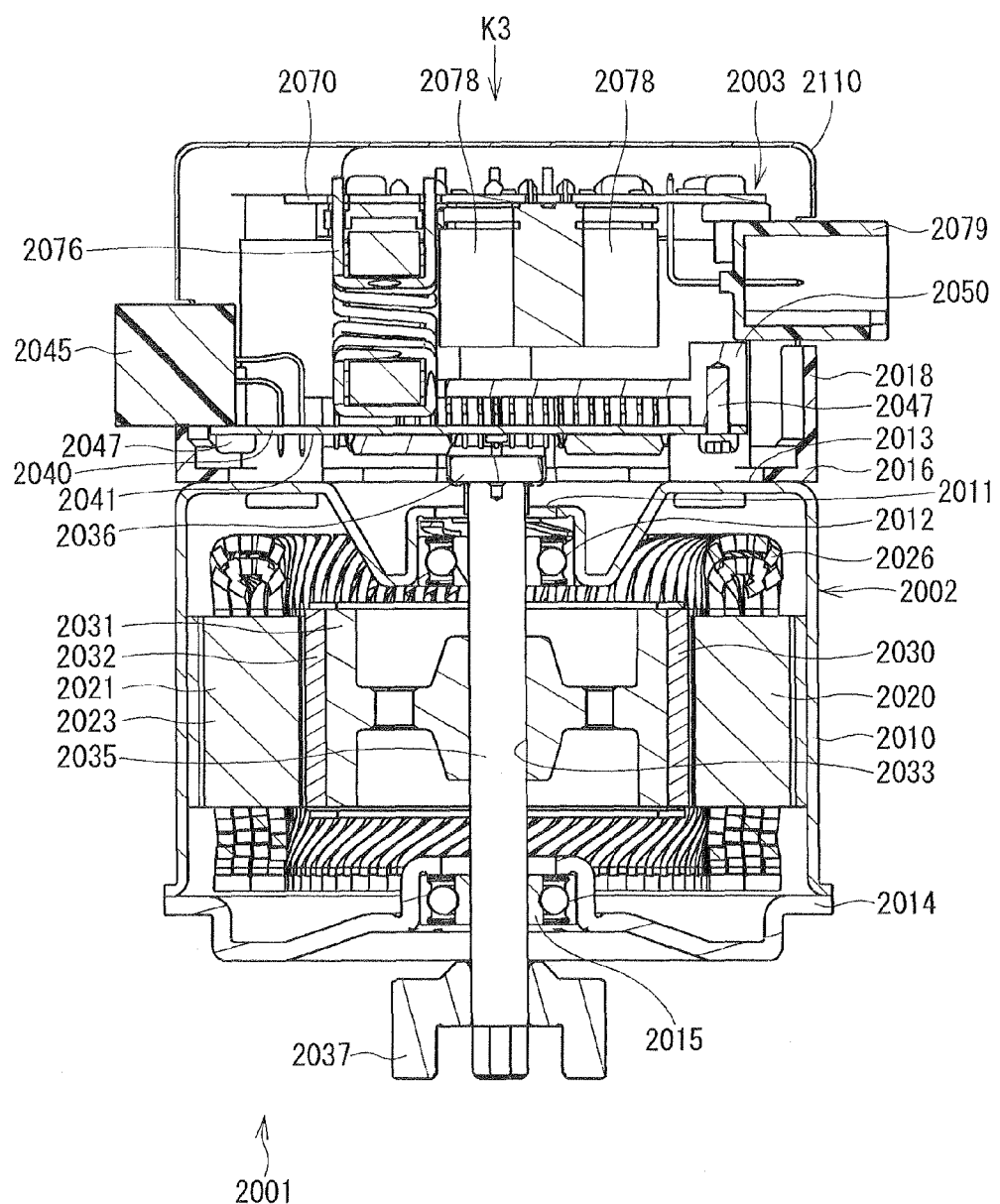
FIG. 82 is a sectional view of the drive apparatus according to the twenty-fifth embodiment.
Figure 83:
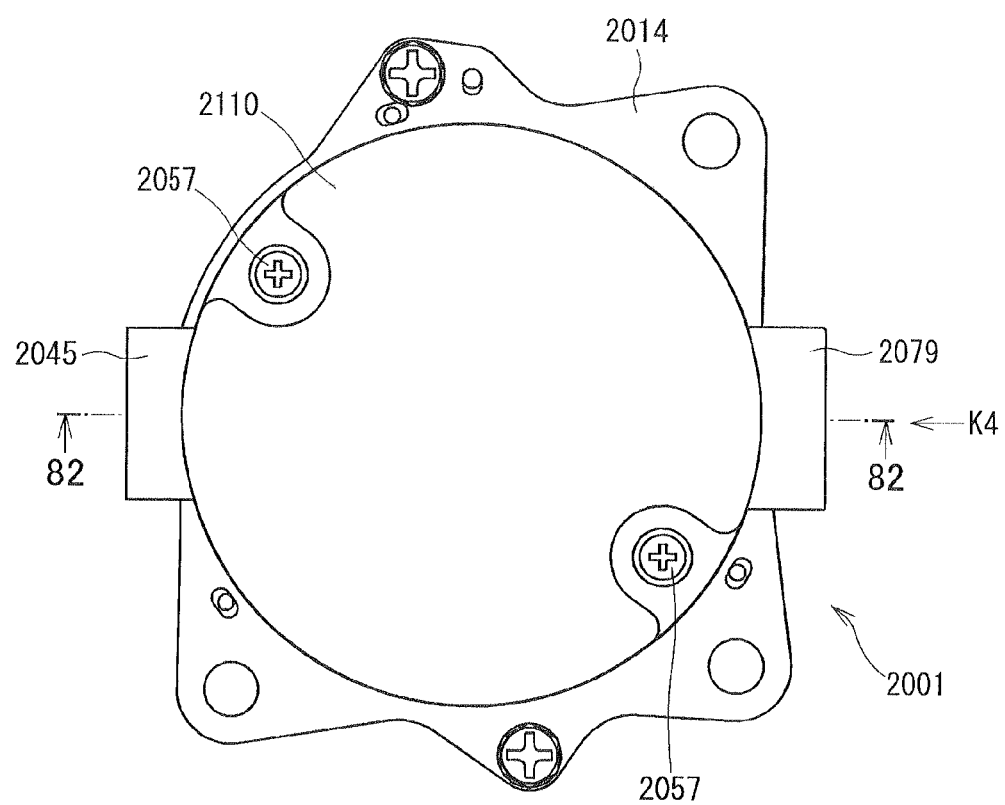
FIG. 83 is a plan view of the drive apparatus according to the twenty-fifth embodiment.
Figure 84:
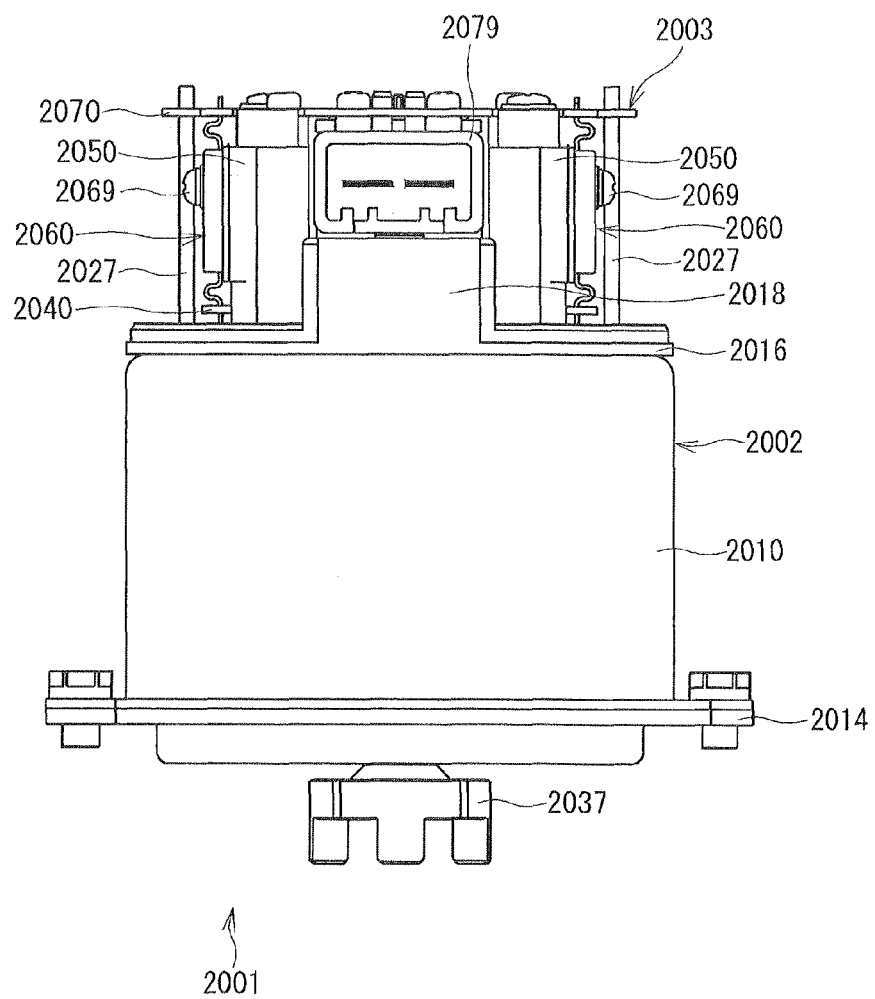
FIG. 84 is a view taken in an arrow direction in FIG. 83 with a cover removed.

As shown in FIG. 81, the drive apparatus 2001 generates a rotation torque on a column shaft 2006 via a gear 2007 fixed to the column shaft 2006 that is a rotation shaft of a steering wheel 2005 of a vehicle, and assists steering operation by the steering wheel 2005. More particularly, when the steering wheel 2005 is manipulated by a driver, steering torque induced in the column shaft 2006 by the manipulation is detected by a torque sensor 2008. In addition, vehicle speed information is acquired over a controller area network (CAN) that is not shown. The driver's steering with the steering wheel 2005 is assisted. Using this kind of mechanism, not only assisting in steering but also automatically controlling manipulation of the steering wheel 2005 for keeping a specific lane of an expressway or guiding to a parking space in a parking lot can be achieved, though it depends on a control technique.

The motor 2002 is a brush less motor that forwardly and reversely rotates the gear 2007. Current is supplied to the motor 2002 under the control of the electronic control unit 2003, whereby the motor 2002 is driven. The electronic control unit 2003 includes a power circuit 2100 that switches driving currents and a control circuit 2090 that controls switching of the driving currents.

The power circuit 2100 includes a choke coil 2076 that is provided in a power line from a power supply 2075, a smoothing capacitor 2077, and two (first and second) inverter circuits 2080 and 2089. The first inverter circuit 2080 and second inverter circuit 2089 have the same configuration. Herein, the inverter circuit 2080 will be described below.

The inverter circuit 2080 includes metal-oxide semiconductor field-effect transistors (MOSFETs) (hereinafter MOSs) 2081 to 2086 that are one type of field effect transistors. The MOSs 2081 to 2086 function as semiconductor switching elements, and the source and drain are turned on (conduction) or off (non-conduction) depending on a gate potential.

The MOS 2081 has the drain thereof connected to a power line, and has the source thereof connected to the drain of the MOS 2084. The source of the MOS 2084 is connected to a ground. A node between the MOS 2081 and MOS 2084 is connected to the U-phase coil of the motor 2002.

The MOS 2082 has the drain thereof connected to the power line, and has the source thereof connected to the drain of the MOS 2085. The source of the MOS 2085 is connected to the ground. A node between the MOS 2082 and MOS 2085 is connected to the V-phase coil of the motor 2002.

The MOS 2083 has the drain thereof connected to the power line and has the source thereof connected to the drain of the MOS 2086. The source of the MOS 2086 is connected to the ground. A node between the MOS 2083 and MOS 2086 is connected to the W-phase coil of the motor 2002.

The inverter circuit 2080 includes power relays 2087 and 2088. The power relays 2087 and 2088 are realized with MOSFETs similar to the MOSs 2081 to 2086, and function as semiconductor switching elements for reverse connection protection. The power relays 2087 and 2088 are interposed between the MOSs 2081 to 2083 and the power supply 2075. In case of abnormality, the power relays can cut off flow of a current to the motor 2002 via the MOSs 2081 to 2086.

Shunt resistors 2099 are electrically connected between the MOSs 2084 to 2086 and the ground. By detecting a voltage or current applied to any of the shunt resistors 2099, a current to be conducted to the U-phase coil, V-phase coil, or W-phase coil is detected.

The choke coil 2076 is electrically connected between the power supply 2075 and power relay 2087. In addition, the smoothing capacitor 2077 is connected between the power supply 2075 and ground. The choke coil 2076 and smoothing capacitor 2077 form a filter circuit, and reduces noise to be transmitted from any other device that shares the power supply 2075. In addition, the choke coil 2076 and smoothing capacitor 2077 reduce noise to be transmitted from the drive apparatus 2001 to any other device that shares the power supply 2075.

Electrolytic capacitors 2078 are electrically connected between the power sides of the MOSs 2081 to 2083 disposed on the side of the power line and the ground sides of the MOSs 2084 to 2086 disposed on the side of the ground. The electrolytic capacitors 2078 accumulate charges so as to aid power feed to the MOSs 2081 to 2086 or suppress a noise component such as a surge voltage.

The control circuit 2090 includes pre-driver circuits 2091, a custom IC 2092, a position sensor 2093 serving as a rotation detection circuit, and a microcomputer 2094. The custom IC 2092 functions as a regulator circuit 2095, a position sensor signal amplifier circuit 2096, and a detection voltage amplifier circuit 2097.

The regulator circuit 2095 is a stabilization circuit that stabilizes power. The regulator circuit 2095 stabilizes power to be supplied to components. For example, the microcomputer 2094 operates at a stabilized predetermined voltage (for example, 5V) owing to the regulator circuit 2095.

The position sensor signal amplifier circuit 2096 inputs a signal from the position sensor 2093. The position sensor 2093 detects a rotational position signal of the motor 2002, and the detected rotational position signal is sent to the position sensor signal amplifier circuit 2096. The position sensor signal amplifier circuit 2096 amplifies the rotational position signal and outputs the resultant signal to the microcomputer 2094.

The detection voltage amplifier circuit 2097 detects voltages across the shunt resistors 2099, amplifies the voltages, and outputs the resultant voltages to the microcomputer 2094.

To the microcomputer 2094, the rotational position signal of the motor 2002 and the voltages across the shunt resistors 2099 are inputted. In addition, to the microcomputer 2094, a steering torque signal is inputted from the torque sensor 2008 fixed to the column shaft 2006. Further, to the microcomputer 2094, vehicle speed information is inputted through the CAN. When the microcomputer 2094 receives the steering torque signal and vehicle speed information, the microcomputer 2094 controls the inverter circuit 2080 via the pre-driver circuit 2091 according to the rotational position signal so that steering with the steering wheel 2005 can be assisted according to a vehicle speed. More particularly, the microcomputer 2094 switches the ON and OFF states of the MOSs 2081 to 2086 via the pre-driver circuit 2091 so as to control the inverter circuit 2080. Specifically, since the gates of the six MOSs 2081 to 2086 are connected to six output terminals of the pre-driver circuit 2091, when the gate voltages are varied by the pre-driver circuit 2091, the ON and OFF states of MOSs 2081 to 2086 are switched.

Based on the voltages across the shunt resistors 2099 inputted from the detection voltage amplifier circuit 2097, the microcomputer 2094 controls the inverter circuit 2080 so as to approximate a current, which is supplied to the motor 2002, to a sine wave. The microcomputer 2094 controls the other inverter circuit 2089 in the same manner as it controls the inverter circuit 2080.

Figure 96:
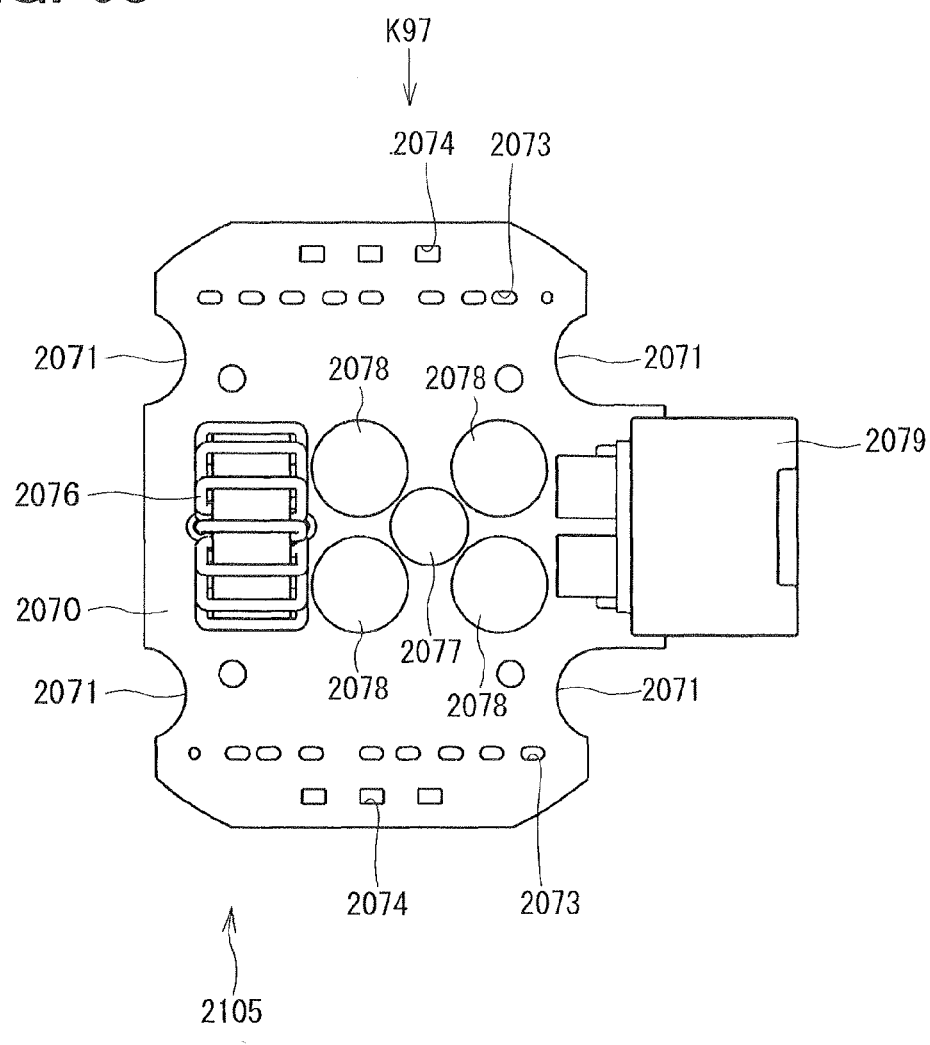
FIG. 96 is a plan view of a power unit of the drive apparatus according to the twenty-fifth embodiment.
Figure 97:
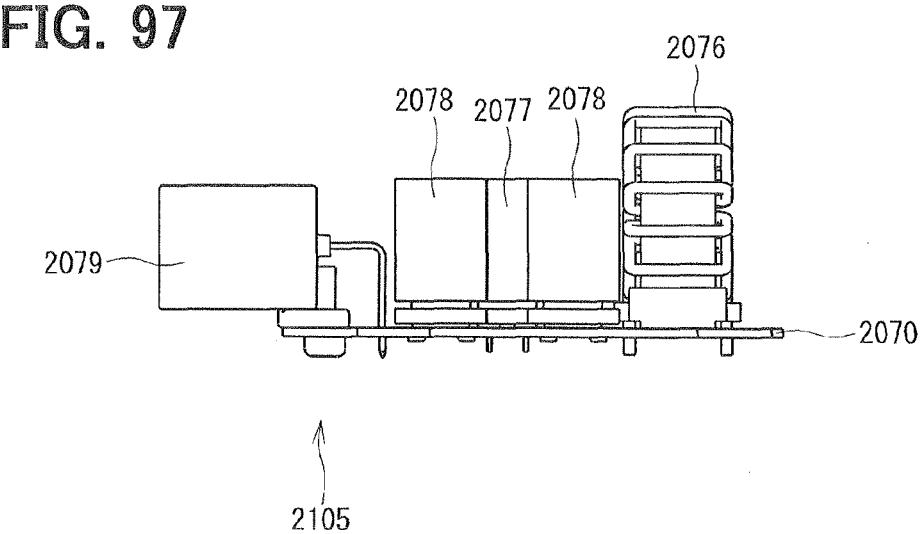
FIG. 97 is a view taken along an arrow direction K97 in FIG. 96.
Figure 98:
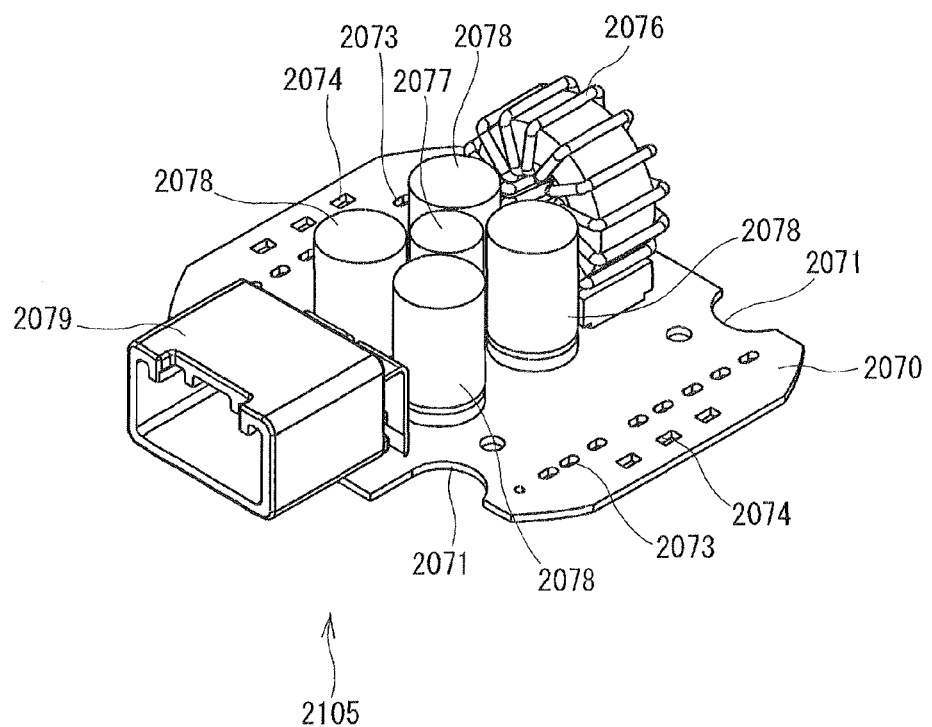
FIG. 98 is a perspective view of the power unit of the drive apparatus according to the twenty-fifth embodiment.

Next, the configuration of the drive apparatus 2001 will be described in conjunction with FIG. 82 to FIG. 97. FIG. 82 to FIG. 86 are views showing the entirety of the drive apparatus 2001, FIG. 87 to FIG. 91 are views showing the electronic control unit 2003, FIG. 92 to FIG. 95 are views showing a heat sink 2050 and power modules 2060, and FIG. 96 to FIG. 98 are views showing a power unit 2015.

The drive apparatus 2001 has the electronic control unit 2003 disposed at one end in the axial direction of the motor 2002, and the motor 2002 and the electronic control unit 2003 are stacked.

The motor 2002 includes a motor case 2010, a stator 2020, a rotor 2030, and a shaft 2035.

The motor case 2010 is cylindrically formed with iron or the like. An end frame 2014 made of aluminum is secured to the end of the motor case 2010 opposite to the electronic control unit 2003 using screws or the like. An opening 2011 is formed in the axial center at the side end of the motor case 2010 facing the electronic control unit 2003. The shaft 2035 is penetrated through the opening 2011.

A resin guide 2016 is disposed at the side end of the motor case 2010 facing the electronic control unit 2003. The resin guide 2016 is substantially annularly formed, and the center part thereof is left open. In addition, the resin guide 2016 has six holes.

The stator 2020 is disposed in the radially inner side of the motor case 2010. The stator 2020 has twelve salient poles that jut on the radially inner side of the motor case 2010. The salient poles are disposed at predetermined intervals in the circumferential direction of the motor case 2010. Each of the salient poles includes a stacked iron core formed by stacking thin plates made of a magnetic material, and an insulator that is engaged with the axially outer side of the laminated iron core. Windings 2026 are wound about the insulator. The windings 2026 are three-phase windings for U, V, and W phases.

Motor wires 2027 are led out from six of the windings 2026. The motor wires 2027 are penetrated through the six holes in the resin guide 2016. Accordingly, the motor wires 2027 are positioned by the resin guide 2016, and insulation of the motor wires 2027 from the motor case 2010 is ensured thereby. In addition, the motor wires 2027 are led out toward the electronic control unit 2003, passed on the radially outer sides of the control circuit substrate 2040 and power modules 2060, and coupled to the power circuit substrate 2070. Specifically, when viewed in the axial direction of the motor 2002, the motor wires 2027 are disposed on the radially outer sides of the power modules 2060.

On the radially inner side of the stator 2020, the rotor 2030 is disposed to be rotatable relatively to the stator 2020. The rotor 2030 is cylindrically formed with a magnetic material, for example, iron. The rotor 2030 includes a rotor core 2031, and permanent magnets 2032 disposed on the radially outer side of the rotor core 2031. The permanent magnets 2032 have north poles and south poles alternately arrayed in the circumferential direction.

The shaft 2035 is fitted in a shaft hole 2033 formed in the axial center of the rotor core 2031. The shaft 2035 is borne in a rotatable manner by a bearing 2012 disposed on the motor case 2010 and a bearing 2015 disposed on the end frame. This makes the shaft 2035 rotatable together with the rotor 2030 with respect to the stator 2020.

The shaft 2035 includes a magnet 2036 at the side end thereof facing the electronic control unit 2003. Since the side end of the shaft 2035 facing the electronic control unit 2003 is inserted into the opening 2011 of the motor case 2010, the magnet 2036 disposed at the side end of the shaft 2035 facing the electronic control unit 2003 is bared on the electronic control unit 2003 side. In the present embodiment, the shaft 2035 is not penetrated through the control circuit substrate 2040. The magnet 2036 is located at a position near a motor 2002-side end surface 2041 of the control circuit substrate 2040 at which the magnet 2036 is opposed to the end surface 2041.

In addition, the shaft 2035 has an output end 2037 at the end on the side thereof opposite to the electronic control unit 2003.

Next, the electronic control unit 2003 will be described below.

The electronic control unit 2003 is disposed to be housed in a motor case area that is an area defined by projecting the motor case 2010 in the axial direction. The electronic control unit 2003 has the control circuit substrate 2040, the heat sink 2050 and the power modules 2060, and the power circuit substrate 2070 arranged in this order from the motor 2002 side in the axial direction.

The control circuit substrate 2040 is a four-layer substrate formed with, for example, a glass epoxy substrate, and shaped like a substantially rectangular plate being housed in the motor case area. Each of the four corners of the control circuit substrate 2040 has a notch 2042 formed as an escape for attaching the heat sink 2050 to the motor case 2010. In addition, the control circuit substrate 2040 is attached to the heat sink 2050 by inserting screws 2047 from the motor 2002 side thereof.

Various electronic components forming the control circuit 2090 are mounted on the control circuit substrate 2040. On the end surface of the control circuit substrate 2040 facing the motor 2002, the pre-driver circuits 2091, custom IC 2092, position sensor 2093, and microcomputer 2094 which are shown in FIG. 81 are mounted. The position sensor 2093 is disposed substantially in the center of the control circuit substrate 2040 and faces the magnet 2036 of the shaft 2035. Accordingly, by detecting a change in a magnetic field induced by the magnet 2036 that rotates together with the shaft 2035, the rotation of the shaft 2035 is detected. In addition, in the control circuit substrate 2040, through holes 2043 for connection to control terminals 2064 of the power modules 2060 are formed along the edges on the longitudinal sides of the control circuit substrate 2040. In addition, a control connector 2045 is coupled to one of the lateral sides on the side of the control circuit substrate 2040 opposite to the motor 2002. The control connector 2045 is disposed so that a wiring can be coupled to the control connector from the radially outer side of the motor 2002, and inputs pieces of sensor information sent from various sensors.

Figure 85:
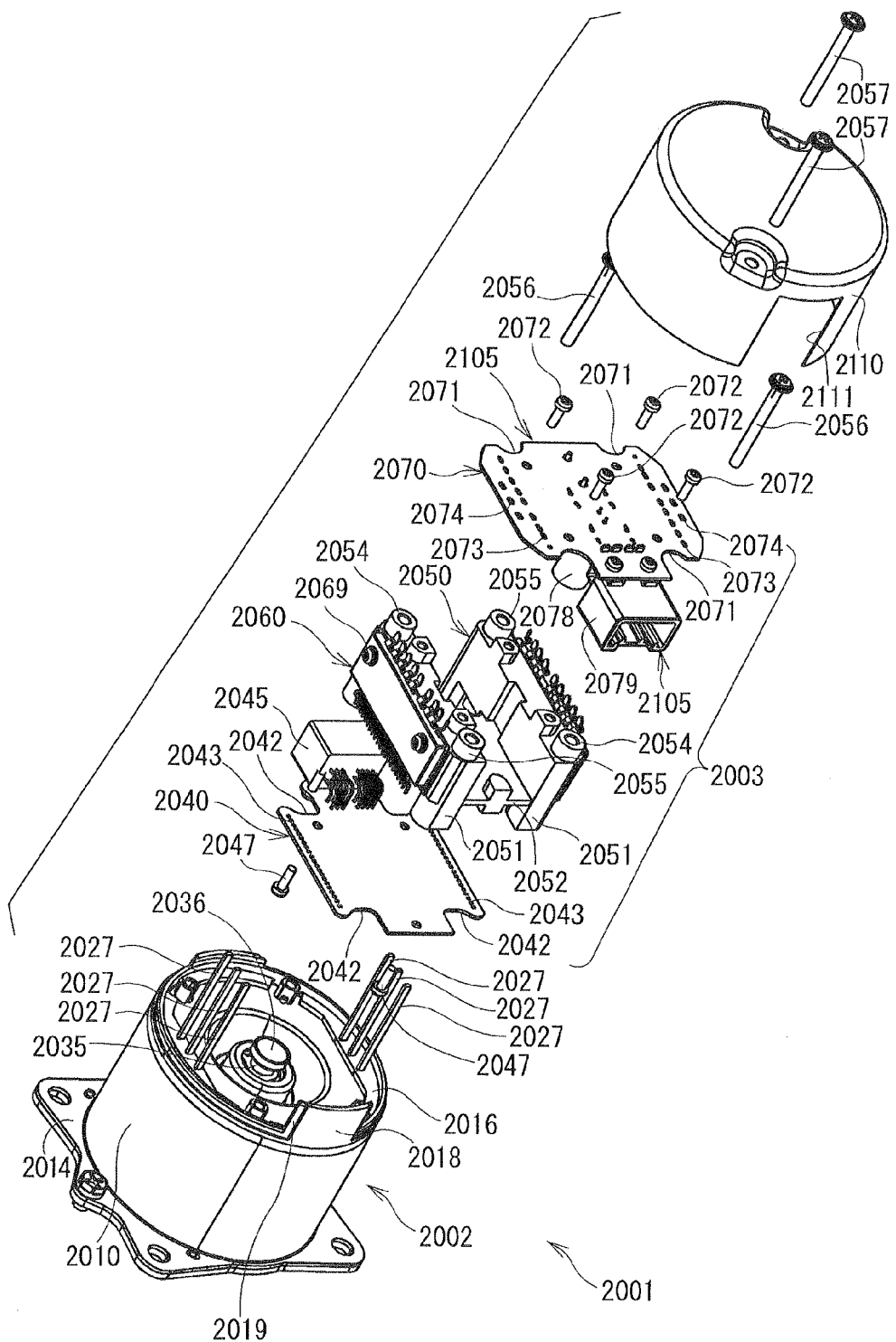
FIG. 85 is an exploded perspective view of the drive apparatus according to the twenty-fifth embodiment.
Figure 86:
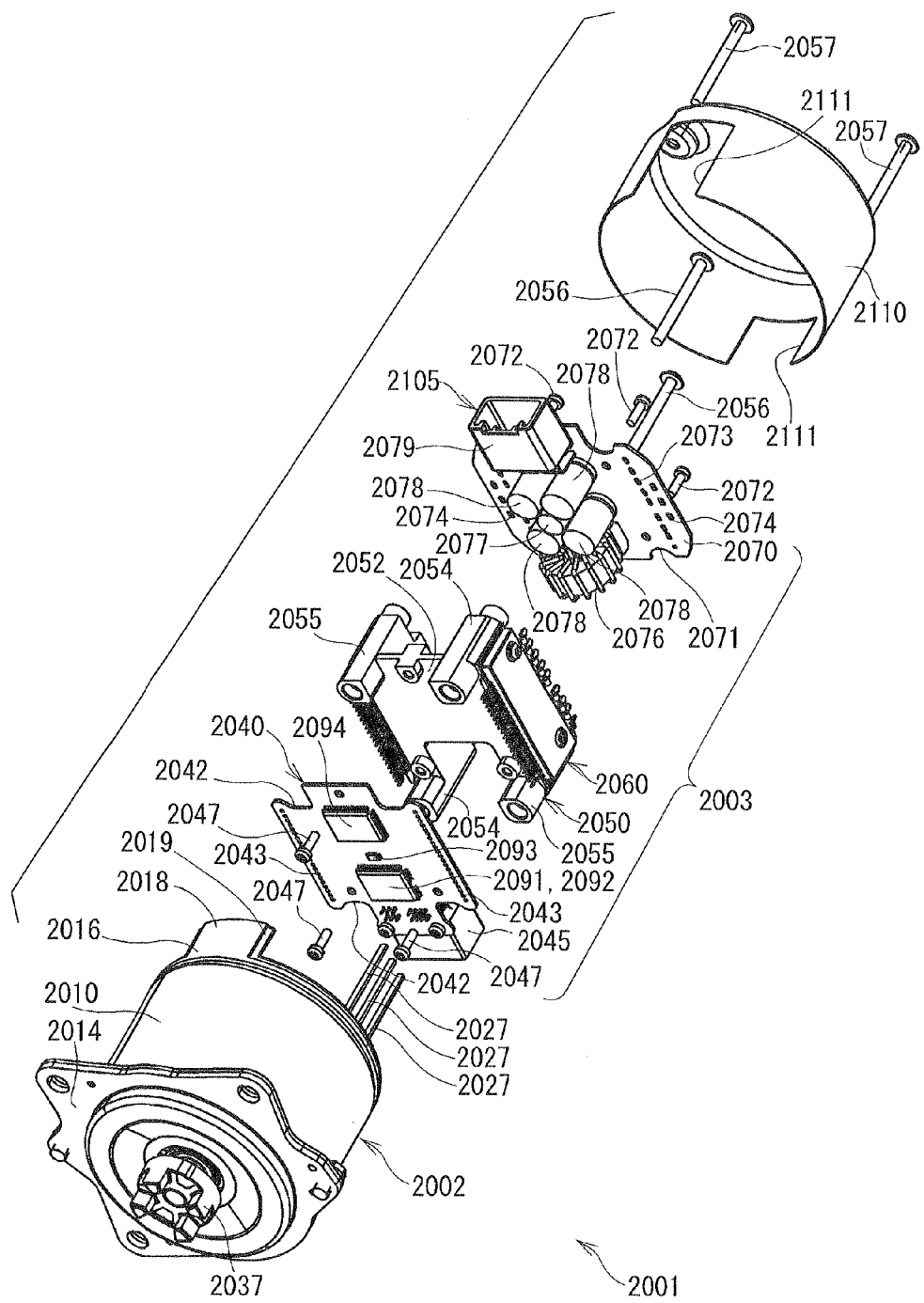
FIG. 86 is an exploded perspective view of the drive apparatus according to the twenty-fifth embodiment.
Figure 87:
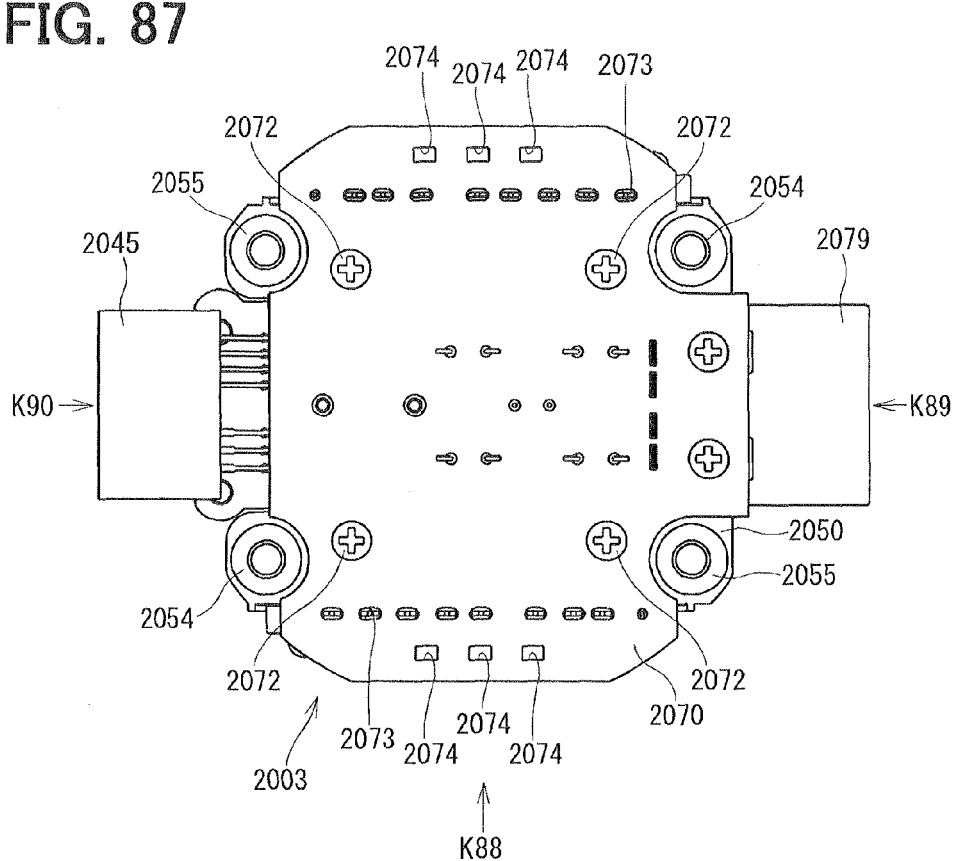
FIG. 87 is a plan view of an electronic control unit of the drive apparatus according to the twenty-fifth embodiment.

As shown in FIG. 85 and others, the heat sink 2050 includes two heat radiation blocks 2051, and a coupling part 2052 interposed between the two heat radiation blocks 2051. The two heat radiation blocks 2051 and coupling part 2052 are formed as an integrated body by a material exhibiting good thermal conductivity (for example aluminum). In the present embodiment, the heat radiation blocks 2051 are disposed on the radially outer side of the center line that is a virtual line drawn by extending the axial line of the shaft 2035 of the motor 2002. The heat radiation blocks 2051 function as side walls of the heat sink 2050.

Figure 90:
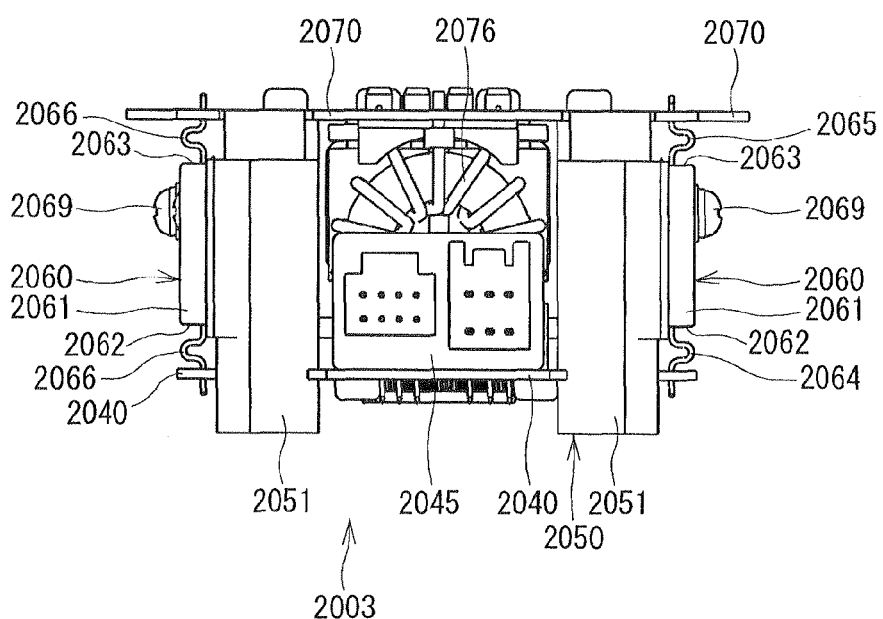
FIG. 90 is a view taken along an arrow direction K90 in FIG. 87.
Figure 91:
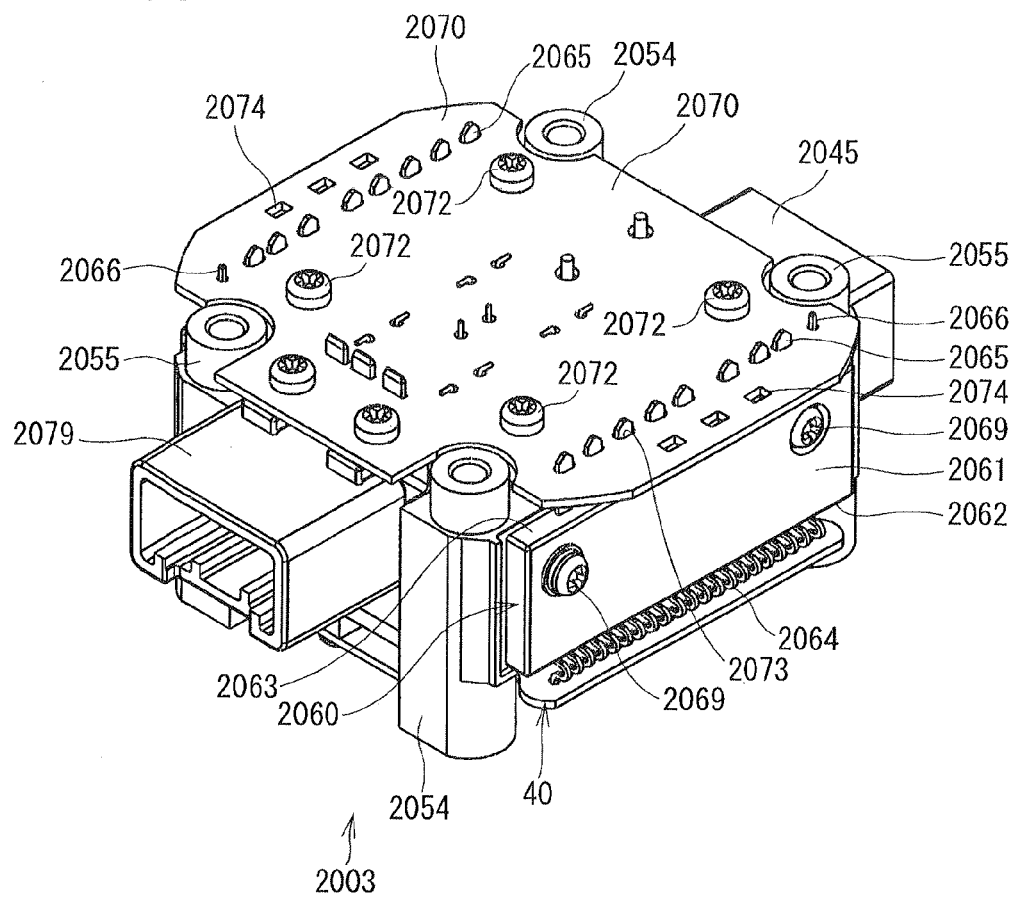
FIG. 91 is a perspective view of the electronic control unit of the drive apparatus according to the twenty-fifth embodiment.
Figure 92:
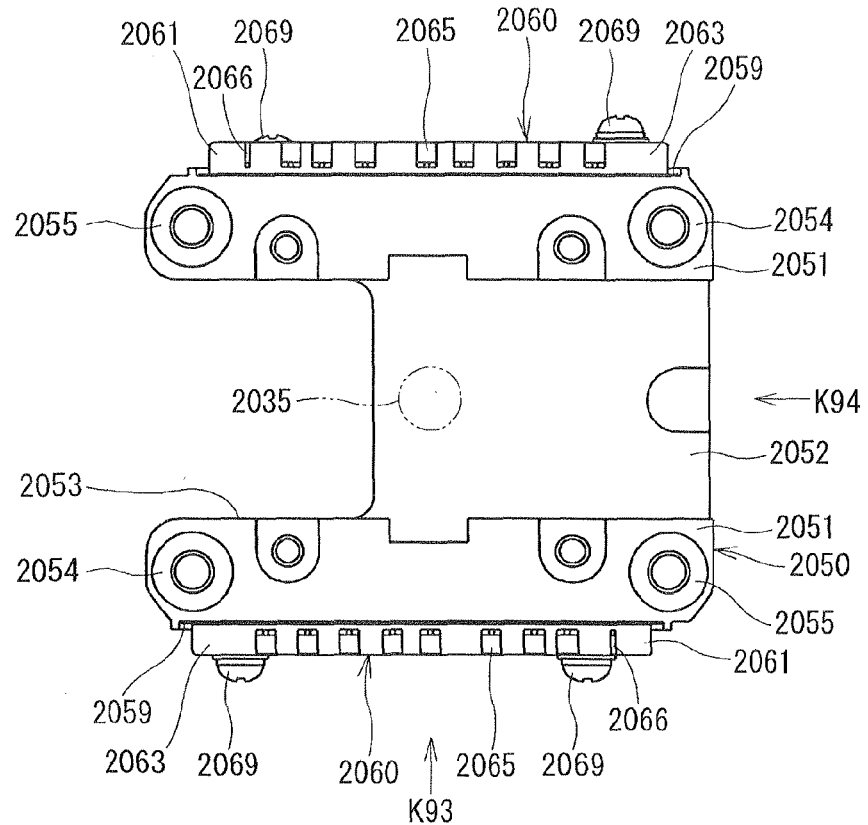
FIG. 92 is a plan view of the drive apparatus according to the twenty-fifth embodiment with power modules incorporated into a heat sink.
Figure 93:
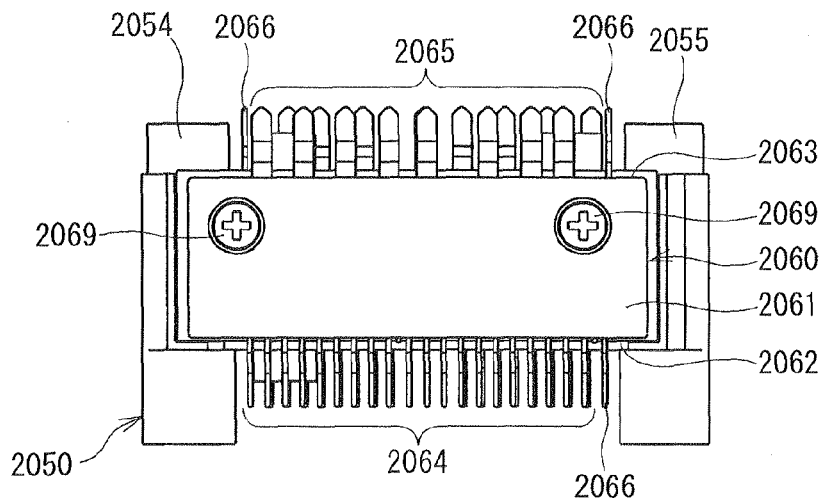
FIG. 93 is a view taken along an arrow direction K93 in FIG. 92.
Figure 94:
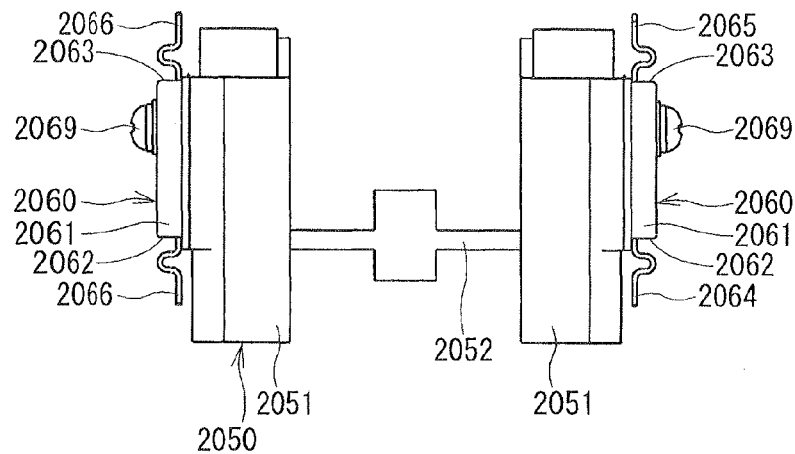
FIG. 94 is a view taken along an arrow direction K94 in FIG. 92.
Figure 95:
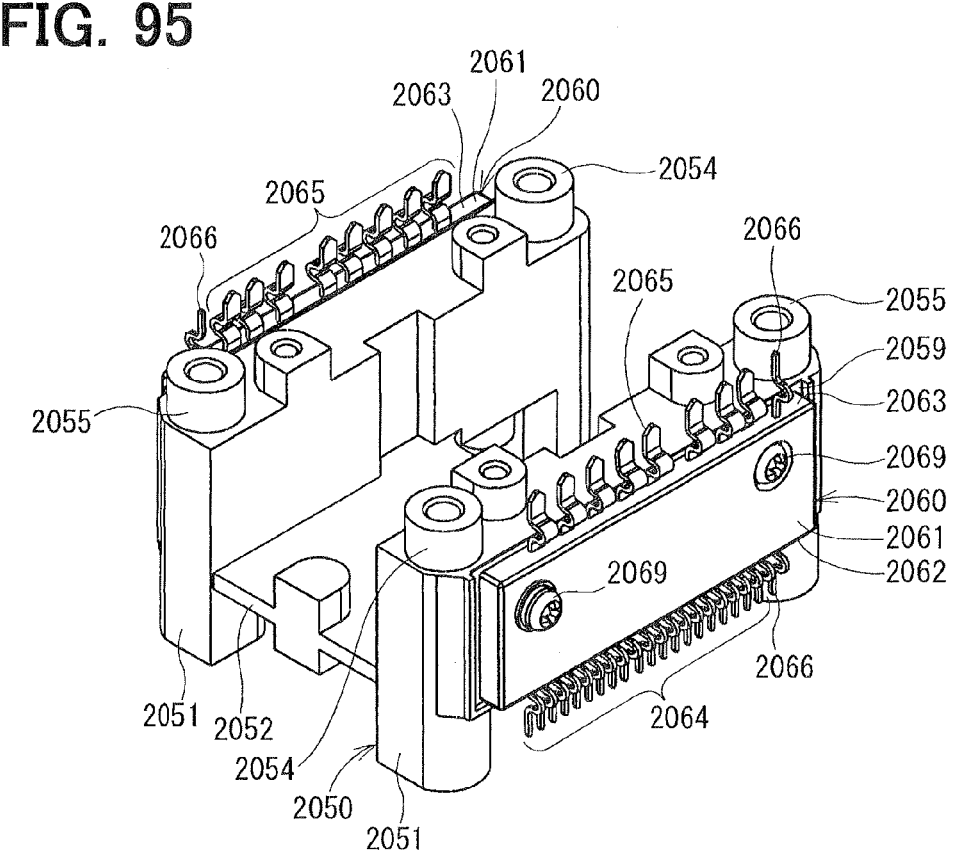
FIG. 95 is a perspective view of the drive apparatus according to the twenty-fifth embodiment with the power modules incorporated into the heat sink.

As shown in FIG. 94, the heat sink 2050 is shaped to laterally look like a letter H as a whole when viewed laterally, that is, in a direction K94 in FIG. 92. The heat sink 2050 is shaped to look like, as shown in FIG. 92, a bracket when viewed in the axial direction of the motor 2002. The two heat radiation blocks 2051 are symmetrically disposed with the center of the shaft 2035 as a reference. In a concave part 2053 formed by the radially inner side surfaces of the heat radiation blocks 2051 and the coupling part 2052, the control connector 2045 is locked as shown in FIG. 90 and others.

As shown in FIG. 85 and others, the heat radiation blocks 2051 are shaped like wide columns. On both edges of each of the heat radiation blocks 2051, connection portions 2054 and 2055 are formed. A hole that penetrates in the axial direction of the motor 2002 is formed in each of the connection portions 2054 and 2055. A screw 2056 is inserted into the connection portion 2054, whereby the heat radiation block is screwed to the motor case 2010. A screw 2057 is inserted into the other connection portion 2055, whereby the heat radiation block is screwed together with a cover 2110, which will be described later, to the motor case 2010. The connection portion 2054 of one of the heat radiation blocks 2051 and the connection portion 2054 of the other heat radiation block 2051 are disposed symmetrically with respect to the center line of the shaft 2035. Likewise, the connection portion 2055 of one of the heat radiation blocks 2051 and the connection portion 2055 of the other heat radiation block 2051 are disposed symmetrically with respect to the center line of the shaft 2035.

Each of the heat radiation blocks 2051 has a heat receiving surface 2059 that is a wide surface formed between the connection portions 2054 and 2055 on the radially outer side of the motor case 2010. The heat receiving surface 2059 is formed in a direction of rising from the end surface in the axial direction of the motor case 2010. In the present embodiment, the heat receiving surface 2059 is formed substantially perpendicularly to an end wall 2013 in the axial direction of the motor case 2010.

The power modules 2060 are disposed on the radially outer side of the heat sink 2050 in the motor 2002. The power modules 2060 are disposed one by one on the two heat radiation blocks 2051.

Figure 88:
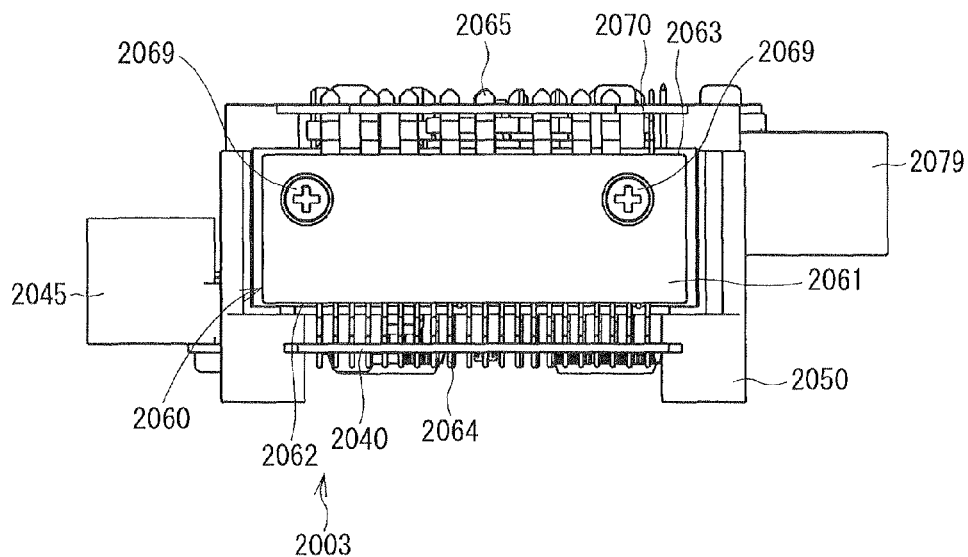
FIG. 88 is a view taken in an arrow direction K88 in FIG. 87.
Figure 89:
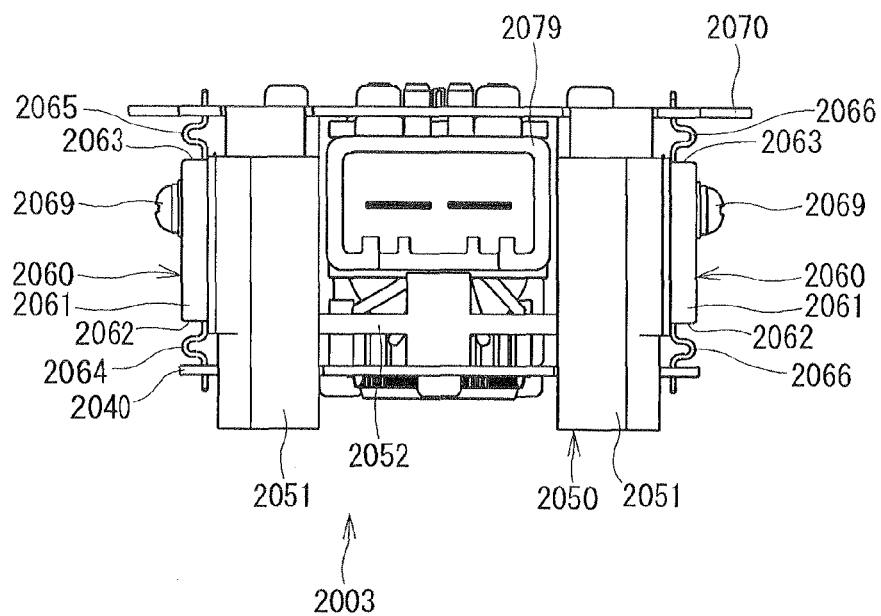
FIG. 89 is a view taken along an arrow direction K89 in FIG. 87.

Each of the power modules 2060 includes semiconductor chips that are not shown and form MOSs which are switching elements or power relays, a mold portion 2061 with which the semiconductor chips are covered, and control terminals 2064 and power terminals 2065 that jut out from the mold portion 2061 (FIG. 88 and others).

As shown in FIG. 88, the control terminals 2064 are formed on a first surface 2062 that is a surface perpendicular to the wide surface of the mold portion 2061. The power terminals 2065 are formed on a second surface 2063 that is a surface perpendicular to the wide surface of the mold portion 2061 and opposed to the first surface 2062. In the present embodiment, the power modules 2060 are disposed along the heat receiving surfaces 2059 of the heat sink 2050 so that the first surfaces 2062 on which the control terminals 2064 are formed lie on the control circuit substrate 2040 sides and the second surfaces 2063 on which the power terminals 2065 are formed lie on the power circuit substrate 2070 sides. Specifically, the power modules 2060 are placed longitudinally outside the heat sink 2050 in the radial direction of the motor 2002. When viewed in the axial direction, the control terminals 2064 and power terminals 2065 of the power modules 2060 are point-symmetric with one another with the center of the shaft 2035 as a reference.

The control terminals 2064 are inserted into the through holes 2043 of the control circuit substrate 2040, and electrically coupled to the control circuit substrate 2040 by means of solder or the like. Via the control terminals 2064, a control signal sent from the control circuit substrate 2040 is outputted to the power modules 2060. In addition, the power terminals 2065 are inserted into through holes 2073 formed in the power circuit substrate 2070, and electrically coupled to the power circuit substrate 2070 by means of solder or the like. Via the power terminals 2065, a driving current with which the motor 2002 is driven is conducted. In the present embodiment, only a small current (for example, 2 A) that is as small as required to control driving of the motor 2002 is conducted to the control circuit substrate 2040. In contrast, a larger current (for example, 80 A) for driving the motor 2002 is conducted to the power circuit substrate 2070. Therefore, the power terminals 2065 are made thicker than the control terminals 2064 are. Ground terminals 2066 are made as thick as the control terminals 2064 are. The ground terminals 2066 are penetrated through the mold portion 2061, are coupled to the control circuit substrate 2040 and power circuit substrate 2070, and serve as a ground of the control circuit substrate 2040.

A heat radiation sheet is interposed between each of the power modules 2060 and the heat sink 2050. The power module 2060 is attached together with the heat radiation sheet to the heat sink 2050 with screws 2069. Accordingly, the power module 2060 is fixed to the heat sink 2050 with the heat radiation sheet between them, and has heat, which is derived from conduction, dissipated to the heat sink 2050 via the heat radiation sheet. On the heat sink 2050 side of the power module 2060, part of a wiring pattern is exposed from the mold portion 2061 as a metallic heat radiation part. The metallic heat radiation part is in contact with the heat sink 2050 via the heat radiation sheet, whereby heat can be efficiently dissipated. The heat radiation sheet transfers heat, which is generated by the power module 2060, to the heat sink 2050, and ensures insulation between the power module 2060 and heat sink 2050.

The power module 2060 has the semiconductor chips, shunt resistors 2099, and others mounted on a wiring pattern made of copper and covered with the mold portion 2061 made of a resin. In the present embodiment, the two power modules 2060 are included in order to realize the inverter circuits 2080 and 2089 shown in FIG. 1.

The relationship between the power modules 2060 and the electric circuits shown in FIG. 81 is described next. One of the power modules 2060 corresponds to the inverter circuit 2080, and includes the MOSs 2081 to 2086, power relays 2087 and 2088, and shunt resistors 2099 which are shown in FIG. 81. In the present embodiment, the MOSs 2081 to 2086, power relays 2087 and 2088, and shunt resistors 2099 are resin-molded as one module. The other power module 2060 corresponds to the inverter circuit 2089, and includes the MOSs, power relays, and shunt resistors forming the inverter circuit 2089. In the present embodiment, one of the power modules 2060 corresponds to a one-system inverter circuit. That is, in the present embodiment, the power modules 2060 are disposed system by system on the heat radiation blocks 2051.

The power circuit substrate 2070 is a thick four-layer substrate with a pattern copper foil that is formed with a glass epoxy substrate, and is formed like a substantially square plate to be stored in the motor case area. The four corners of the power circuit substrate 2070 each have notches 2071 formed in order to preserve spaces for the connection portions 2054, 2055 of the heat sink 2050. The power circuit substrate 2070 is threaded to the heat sink 2050 by inserting screws 2072 from the side thereof opposite to the motor 2002.

In the power circuit substrate 2070, power wirings by which a driving current to drive the motor 2002 is conducted are formed. In the present embodiment, a wiring for linking the U-phase MOS 2081, V-phase MOS 2082, and W-phase MOS 2083 over the power line, a wiring for linking the U-phase MOS 2084, V-phase MOS 2085, and W-phase MOS 2086 on the ground, a wiring for linking the power relay 2088 and MOSs 2081 to 2083, and a wiring for linking the power relay 2087, choke coil 2076, and smoothing capacitor 2077 are formed on the power circuit substrate 2070.

In the power circuit substrate 2070, the through holes 2073 through which the power terminals 2065 of the power modules 2060 are penetrated are formed. In addition, through holes 2074 through which the motor wires 2027 are penetrated are formed outside the through holes 2073 in the power circuit substrate 2070. The motor wires 2027 are penetrated through the through holes 2074, and electrically coupled to the power circuit substrate 2070 with solder or the like. Accordingly, the motor wires 2027 are connected to the power modules 2060 via the power circuit substrate 2070.

On the side surface of the power circuit substrate 2070 facing the motor 2002, the choke coil 2076, smoothing capacitor 2077, electrolytic capacitors 2078, and power connector 2079 are mounted to constitute the power unit 2105. The power unit 2105 and power modules 2060 constitute the power circuit 2100.

The arrangement of the power unit 2105 will be described below in conjunction with FIG. 96 to FIG. 98.

The choke coil 2076, smoothing capacitor 2077 and electrolytic capacitors 2078, and power connector 2079 that constitute the power unit 2105 are disposed in a space formed between the coupling part 2052 of the heat sink 2050 and the power circuit substrate 2070 and between the two heat radiation blocks 2051. As for these electronic components, the choke coil 2076, smoothing capacitor 2077 and electrolytic capacitors 2078, and power connector 2079 are linearly arrayed in that order from the control connector 2045 coupled to the control circuit substrate 2040.

The choke coil 2076 is shaped like a cylinder whose length in the axial direction is shorter than the length in the radial direction. When viewed in the axial direction of the motor 2002, the choke coil 2076 is located at a position at which the choke coil does not overlap the shaft 2035. The choke coil 2076 is placed longitudinally so that the axial line thereof becomes perpendicular to the center line of the shaft 2035.

The smoothing capacitor 2077 is disposed substantially in the middle of the four electrolytic capacitors 2078. The four electrolytic capacitors 2078 are disposed mutually adjacently to surround the smoothing capacitor 2077. The electrolytic capacitors 2078 having a larger electrical capacitance than the smoothing capacitor 2077 does are employed.

The power connector 2079 is disposed on the side opposite to the control connector 2045 coupled to the control circuit substrate 2040. The power connector 2079 is disposed so that a wiring can be coupled to the power connector from the radially outer side of the motor 2002, and is connected to the power supply 2075. Accordingly, power is supplied to the power circuit substrate 2070 via the power connector 2079. The power from the power supply is supplied to the windings 2026 formed on the stator 2020 by way of the power connector 2079, power circuit substrate 2070, power modules 2060, and motor wires 2027.

The electronic control unit 2003 is housed inside the cover 2110. The cover 2110 is made of a magnetic material such as iron, prevents an electric field from leaking out from the electronic control unit 2003, and also prevents dust or the like from entering the electronic control unit 2003. The cover 2110 has substantially the same diameter as the motor case 2010 does, and is shaped like a bottomed cylinder that opens on the motor 2002. The cover 2110 is attached to the motor case 2010 together with the heat sink 2050 with screws 2057. The cover 2110 has notches 2111 at positions corresponding to the positions of the connectors 2045 and 2079. The connectors 2045 and 2079 are exposed to face radially outward through the notches 2111. In addition, a convex part 2018 is formed at a position on the resin guide 2016 corresponding to the position of the notch 2111 for the power connector 2079. A step 2019 is formed on the resin guide 2016 so that the resin guide 2016 can be engaged with the cover 2110.

The microcomputer 2094 on the control circuit substrate 2040 produces a pulsating signal through PWM control via the pre-driver circuits 2091 so as to assist steering operation by the steering wheel 2005 according to a vehicle speed on the basis of signals sent from the position sensor 2093, torque sensor 2008, and shunt resistors 2099.

The pulsating signal is outputted to the two-system inverter circuits, which include the respective power modules 2060, via the control terminals 2064, whereby an action of switching the on and off states of the MOSs of the power modules 2060 is controlled. Accordingly, sine-wave currents that are out of phase with one another are supplied to the respective phases of the windings 2026, whereby a rotating magnetic field is induced. On receipt of the rotating magnetic field, the rotor 2030 and shaft 2035 are rotated as an integrated body. With the rotation of the shaft 2035, a driving force is outputted from the output end 2037 to the gear 2007 of the column shaft 2006 in order to assist in driver's steering by the steering wheel 2005.

Heat generated at the time if switching the MOSs of the power modules 2060 is dissipated to the heat sink 2050 through the heat radiation sheets. Thus, a failure or a malfunction arising from temperature rise in the power modules 2060 can be prevented.

The sizes of the stator 2020 and rotor 2030 can be arbitrarily designated according to a required output.

The twenty-fifth embodiment provides the same advantages as the advantages (1), (2), (5) to (8), and (10) to (14) described in relation to the first embodiment.

In addition, in the drive apparatus 2001, the heat sink 2050 includes the two heat radiation blocks 2051. The power modules 2060 realizing the respective inverter circuits 2080 and 2089 are disposed one by one on the heat radiation blocks 2051. Accordingly, heat can be dissipated from the power modules 2060 in a well-balanced manner. In addition, since the power modules 2060 are disposed on the two separated heat radiation blocks 2051, it does not occur that one of the power modules 2060 is affected by heat from the other power module 2060. Further, compared with the configuration in which the power modules 2060 are concentrated on the same position, it is less likely that both of two systems fail at the same time since the power modules 2060 are located at different positions.

In addition, in the drive apparatus 2001, the heat radiation blocks 2051 are formed to have a wide columnar shape. Each of the heat radiation blocks 2051 has the connection portions 2054 and 2055 on both the edges thereof. Each of the connection portions 2054 and 2055 has a hole that penetrates in the axial direction of the motor 2002. The screw 2056 is inserted into the connection portion 2054, whereby the heat radiation block is screwed to the motor case 2010. The screw 2057 is inserted into the other connection portion 2055, whereby the heat radiation block is screwed together with the cover 2110 to the motor case 2010. Accordingly, the heat sink 2050 can be readily secured to the motor case 2010.

Further, in the drive apparatus 2001, the two heat radiation blocks 2051 are symmetrically disposed with the center of the shaft 2035 as a reference. Owing to the heat radiation blocks 2051, the time required for layout or design of the power modules 2060 or for attachment work is shortened.

Twenty-Sixth Embodiment

Figure 99:
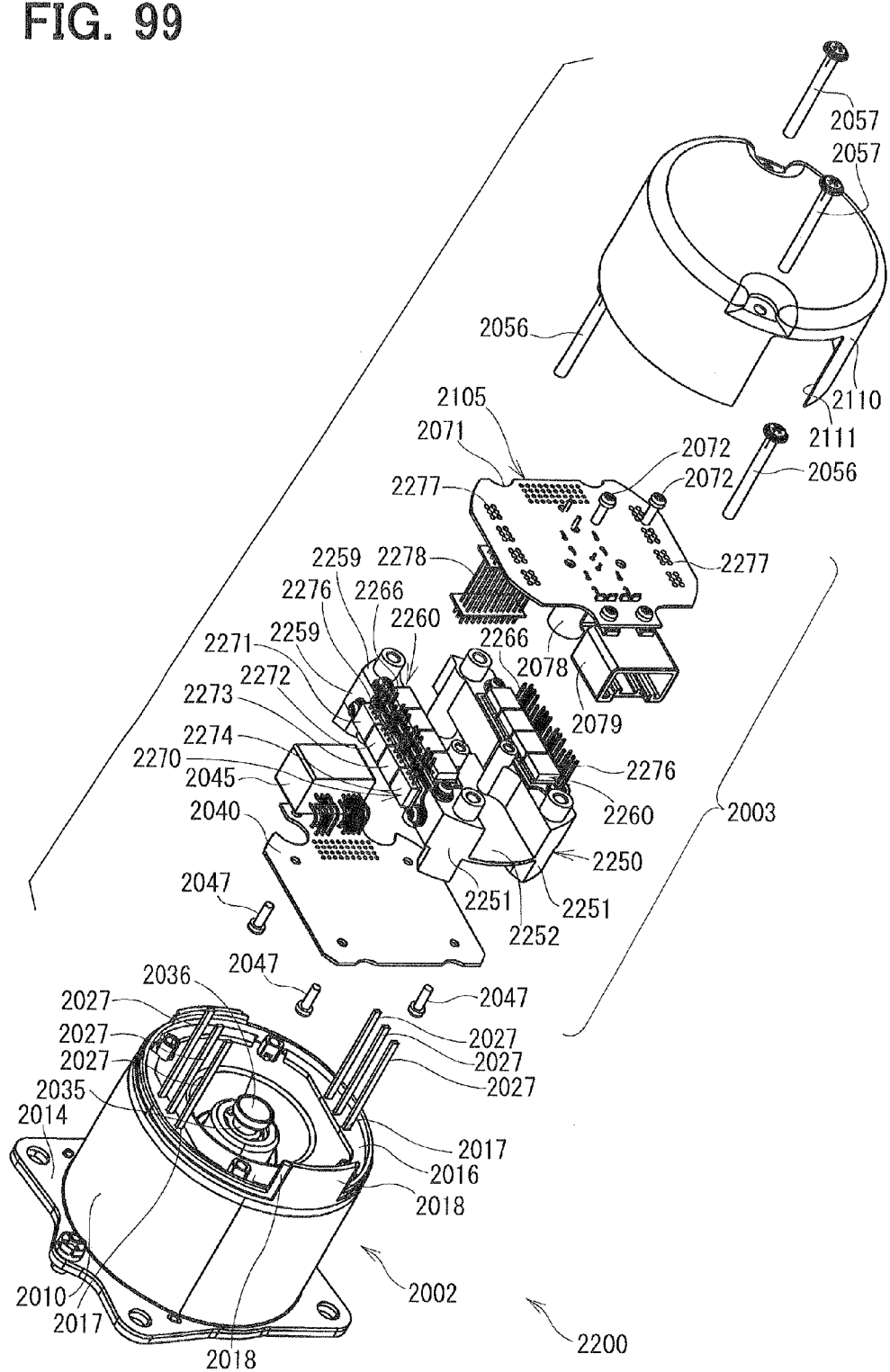
FIG. 99 is an exploded perspective view of a drive apparatus according to a twenty-sixth embodiment.
Figure 100:
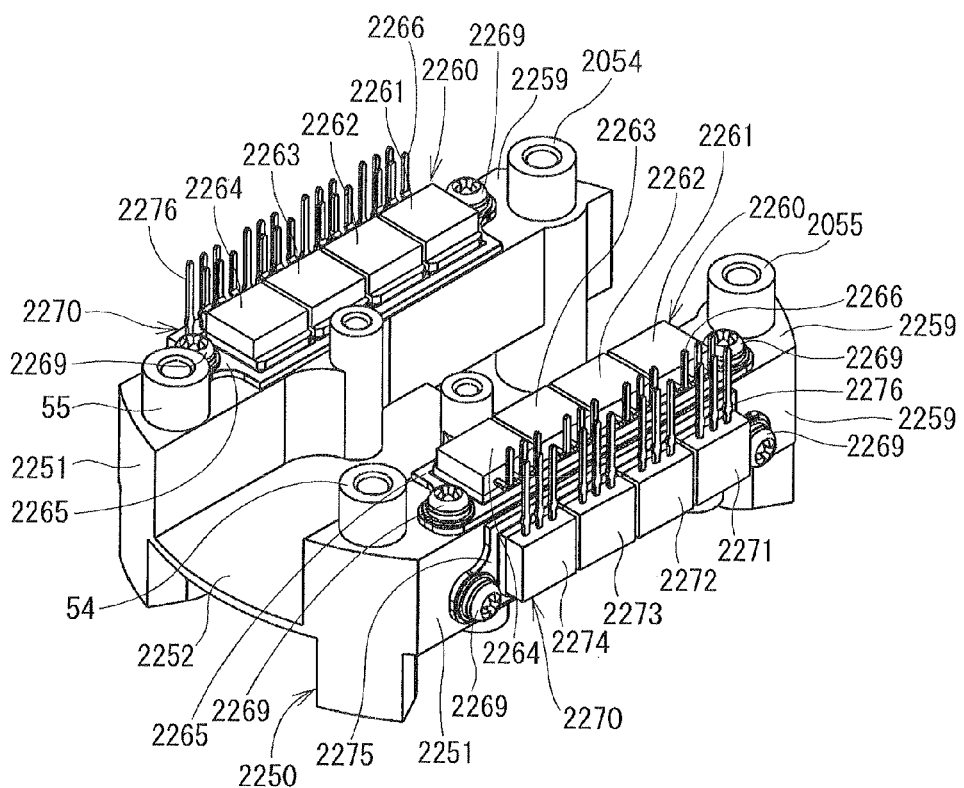
FIG. 100 is a perspective view of the drive apparatus according to the twenty-sixth embodiment with power modules incorporated into a heat sink.

In a drive apparatus 2200 of a twenty-sixth embodiment, as shown in FIG. 99 and FIG. 100, a heat sink 2250 includes, similarly to that of the twenty-fifth embodiment, two heat radiation blocks 2251, and a coupling part 2252 interposed between the two heat radiation blocks 2251. The two heat radiation blocks 2251 and coupling part 2252 are formed as an integrated body with a material of high thermal conductivity (for example, aluminum).

Two module units 2260 and 2270 are disposed on each of the heat radiation blocks 2251. The module unit 2260 is disposed on the surface facing the power circuit substrate 2070. Specifically, the module unit 2260 is disposed substantially horizontally with respect to the end wall 2013 in the axial direction of the motor case 2010. The other module unit 2270 is disposed on the heat radiation block 2251 on the radially outer side of the motor 2002 in a direction of rising from the end wall 2013 in the axial direction of the motor case 2010. That is, the module unit 2270 is placed longitudinally with respect to the end wall 2013 in the axial direction of the motor case 2010.

The module unit 2260 includes four semiconductor modules 2261 to 2264 and a wiring substrate 2265. Each of the semiconductor modules 2261 to 2264 has three terminals 2266 attached to one surface perpendicular to a wide surface thereof, and is disposed so that the terminals 2266 are oriented to the radially outer side of the motor 2002. The terminals 2266 of the semiconductor modules 2261 to 2264 are bent substantially perpendicularly toward the power circuit substrate 2070.

The module unit 2270 includes four semiconductor modules 2271 to 2274 and a wiring substrate 2275. Each of the semiconductor modules 2271 to 2274 has three terminals 2276 attached to one surface perpendicular to a wide surface thereof. The semiconductor modules 2271 to 2274 are disposed so that the terminals 2276 are oriented toward the power circuit substrate 2070.

The terminals 2266 of the semiconductor modules 2261 to 2264 and the terminals 2276 of the semiconductor modules 2271 to 2274 are inserted into through holes 2277 formed in the power circuit substrate 2070, and electrically connected to the power circuit substrate 2070 with solder or the like.

The module units 2260 and 2270 are attached to the heat sink 2250 with screws 2269. A heat radiation sheet ensures insulation between the module unit 2260 or 2270 and the heat sink 2250.

The module units 2260 and 2270 disposed on the outer side of one of the heat radiation blocks 2251 are associated with the inverter circuit 2080, and the module units 2260 and 2270 disposed on the other heat radiation block 2251 are associated with the inverter circuit 2089. The inverter circuit 2080 and inverter circuit 2089 are identical to each other. Therefore, the module units 2260 and 2270 associated with the inverter circuit 2080 will be described below.

In the module unit 2260 disposed on the surface of one of the heat radiation blocks 2251 facing the power circuit substrate 2070, the semiconductor module 2261 includes the power relay 2087, the semiconductor module 2262 includes the MOS 2081, the semiconductor module 2263 includes the MOS 2082, and the semiconductor module 2264 includes the MOS 2083. That is, the module unit 2260 includes the MOSs 2081 to 2083 on the side of the power line and the one power relay 2087. The module unit 2260 includes the MOSs 2081 to 2083 on the side of the power line so as to form an upstream (high-potential) unit.

In the module unit 2270 placed longitudinally on the radially outer side surface of the heat radiation block 2251, the semiconductor module 2271 includes the power relay 2088, the semiconductor module 2272 includes the MOS 2084, the semiconductor module 2273 includes the MOS 2085, and the semiconductor module 2274 includes the MOS 2086. That is, the module unit 2270 includes the MOSs 2084 to 2086 on the side of a ground and the one power relay 2088. The module unit 2270 includes the MOSs 2084 to 2086 on the side of the ground so as to realize a downstream (low-potential) unit.

Specifically, the semiconductor module 2262 including the MOS 2081 connected to the U-phase coil and the semiconductor module 2272 including the MOS 2084 connected to the U-phase coil are disposed to adjoin through a side line of the heat radiation block 2251, which lies between two surfaces of the power circuit substrate 2070 side and the radially outer side. Likewise, the semiconductor module 2263 including the MOS 2082 connected to the V-phase coil and the semiconductor module 2273 including the MOS 2085 connected to the V-phase coil are disposed to adjoin through the side line of the heat radiation block 2251, which lies between the two surfaces of the radially outer side and the power circuit substrate 2070 side. In addition, the semiconductor module 2264 including the MOS 2083 connected to the W-phase coil and the semiconductor module 2274 including the MOS 2086 connected to the W-phase coil are disposed to adjoin through the side line of the heat radiation block 2251, which lies between the two surfaces of the radially outer side and the power circuit substrate 2070 side. Further, the semiconductor module 2261 including the power relay 2087 and the semiconductor module 2271 including the power relay 2088 are disposed to adjoin through the side line of the heat radiation block 2251, which lies between two surfaces of the radially outer side and the power circuit substrate 2070 side. Since the semiconductor modules are thus disposed, a wiring loss can be minimized.

In the twenty-sixth embodiment, the semiconductor modules 2261 to 2264 and 2271 to 2274 are devoid of a terminal for direct connection to the control circuit substrate 2040. Therefore, the control circuit substrate 2040 and power circuit substrate 2070 are electrically connected to each other by a substrate connection terminal 2278. The control circuit substrate 2040 and the semiconductor modules 2261 to 2264 and 2271 to 2274 are electrically connected to one another via the substrate connection terminal 2278 and power circuit substrate 2070. A control signal outputted from the control circuit substrate 2040 is sent to the semiconductor modules 2261 to 2264 and 2271 to 2274 by way of the substrate connection terminal 2278 and power circuit substrate 2070, whereby turning on or off the MOSs of the semiconductor modules 2261 to 2264 and 2271 to 2274 is controlled. Therefore, drive of the motor 2002 is controlled in the same manner as it is in the twenty-fifth embodiment.

According to the twenty-sixth embodiment provides the same advantages as those of the twenty-fifth embodiment.

In the twenty-sixth embodiment, unlike the twenty-fifth embodiment, systematically integrated modules are not employed but the semiconductor modules 2261 to 2264 and 2271 to 2274 that are resin-molded in units of each MOS are employed. The semiconductor modules 2261 to 2264 and 2271 to 2274 are disposed on the surface of the heat sink 2250 facing the power circuit substrate 2070. This permits effective utilization of a space and contributes to compactness of the entire device.

The present invention is not limited to the above-described embodiments but may be implemented in other various modes.

(A) The embodiments are described as being used for EPS. A drive apparatus having the similar configuration can be adapted to any other field.

(B) In the above-described embodiments, the semiconductor modules are disposed on plural side wall surfaces of the heat sink. Alternatively, the semiconductor modules may be disposed on a single side wall surface of the heat sink.

(C) In the above-described embodiments, the doughnut-shaped choke coil 52 is inserted over the shaft 401. The choke coil is not limited to the doughnut shape. In addition, the choke coil may not be inserted over the shaft 401 but may be disposed around the shaft 401. Here, the coil may be placed longitudinally or sideways.

(D) In the above-described embodiments, the board surface of the printed circuit board 801 or 802 is perpendicular to the center line of the shaft 401. However, the present invention is not limited to this perpendicular arrangement. In addition, although the printed circuit board 801 or 802 is used, it is possible to use no circuit board.

(E) In the above-described embodiments, the cover 103 is included. Alternatively, it is possible to use no cover.

(F) In the above-described embodiments, the coil terminals 508, control terminals 509, and capacitor terminals 510 jut out from the ends in the axial direction of the semiconductor modules. In contrast, the terminals 508, 509, and 510 may jut out from the ends of the semiconductor modules oriented in any direction other than the axial direction.

(G) In the above-described embodiments, the magnet 402 fixed to the shaft 401 and the position sensor 73 mounted on the printed circuit board 801 are used to detect a rotational position. Alternatively, any other method may be used to detect the rotational position.

(H) In the above-described embodiments, the heat sink is integrally formed with the motor case. The heat sink may be formed separately from the motor case.

(I) In the above-described embodiments, the capacitors are disposed near respective semiconductor modules. Alternatively, the capacitors may be disposed so that a range of disposition in an axial direction of the capacitors is partly superposed on the range of disposition in the axial direction of the semiconductor modules. In addition, the aluminum electrolytic capacitor of columnar shape is used. If a large capacitance is not needed, any other type of capacitor may be used.

The invention claimed is:

1. A drive apparatus comprising:
a motor including a cylindrical motor case that forms an outer periphery, a stator that is disposed on a radially inner side of the motor case and has windings wound about the stator to form a plurality of phases, a rotor disposed on a radially inner side of the stator, and a shaft that rotates together with the rotor;
a heat sink extended in a same direction as a center line direction of the shaft from an end wall of the motor case; and
an electronic control unit that is disposed on a heat sink side in the center line direction of the motor case, and performs control of drive of the motor,
wherein the electronic control unit includes:
semiconductor modules that include semiconductor chips for switching winding currents which flow through the windings of the plurality of phases, and that is placed longitudinally to be directly or indirectly in contact with a side wall surface of the heat sink so that a vertical line to each semiconductor chip surface is non-parallel to the center line of the shaft;
capacitors connected in parallel between a line from power supplying sides of the semiconductor modules to a power supply and a line from grounding sides of the semiconductor modules to a ground; and
a choke coil disposed in a power line from the power supply for the semiconductor modules and disposed on a radially inner side of a side wall of the heat sink, and
wherein the semiconductor modules, the heat sink and the capacitors are arranged to overlap one another at least partly in the center line direction, and the semiconductor modules, the heat sink and the choke coil are arranged to overlap one another at least partly in the center line direction.

2. The drive apparatus according to claim 1, wherein:
the heat sink includes a plurality of side wall surfaces that define mutually different planes; and
the semiconductor modules are dispersedly disposed on two or more side wall surfaces out of the plurality of side wall surfaces; and
the choke coil is disposed in a space formed between the side wall surfaces of the heat sink.

3. The drive apparatus according to claim 2, wherein:
the heat sink includes a first side wall provided with the semiconductor modules in correspondence to a first driving system, and a second side wall provided with the semiconductor modules in correspondence to a second driving system; and
the side walls are disposed to be symmetrical to each other with a center of the shaft as a reference.

4. The drive apparatus according to claim 2, wherein:
the heat sink is configured so that the side wall surface thereof is tilted with respect to the center line of the shaft.

5. The drive apparatus according to claim 1, wherein:
the capacitors are disposed on one sides of the semiconductor modules, which are same sides as the heat sink is; and
the capacitors are accommodated in accommodation spaces formed in the heat sink.

6. The drive apparatus according to claim 1, wherein:
the capacitors are disposed on one sides of the semiconductor modules, which are opposite to other sides of the semiconductor modules facing the heat sink.

7. The drive apparatus according to claim 1, wherein:
the heat sink includes a plurality of side walls that are separated from each other; and
the semiconductor modules are disposed to correspond to a plurality of driving systems, and disposed on the side walls so that one side wall corresponds to one driving system.

8. The drive apparatus according to claim 7, wherein:
the side walls each have connection portions, each of which has a connecting hole that penetrates in an axial direction, on edges thereof.

9. The drive apparatus according to claim 8, wherein:
the heat sink includes a first side wall provided with the semiconductor modules in correspondence to a first driving system, and a second side wall provided with the semiconductor modules in correspondence to a second driving system; and
the side walls are disposed to be symmetrical to each other with a center of the shaft as a reference.

10. The drive apparatus according to claim 1, wherein:
the electronic control unit includes a control circuit that controls the semiconductor modules;
the control circuit is formed with a printed circuit board disposed in the center line direction of the shaft in the motor case;
the printed circuit board is disposed on one sides of the semiconductor modules, which are opposite to the motor case in the center line direction;
the semiconductor modules have control terminals at one ends thereof in the center line direction of the shaft, and the control terminals are connected to the printed circuit board; and
the semiconductor modules have coil terminals at other ends thereof, which are opposite to the printed circuit board, and the coil terminals are connected to the windings of the stator.

11. The drive apparatus according to claim 1, wherein:
the electronic control unit includes a control circuit that controls the semiconductor modules;
the control circuit is formed with a printed circuit board disposed in the center line direction of the shaft in the motor case;
the printed circuit board is disposed on one sides of the semiconductor modules, which are same sides as the motor case is in the center line direction;
the semiconductor modules have control terminals at one ends thereof in the center line direction of the shaft, and the control terminals are connected to the printed circuit board; and
the semiconductor modules have coil terminals at other ends thereof, which are opposite to the printed circuit board, and the coil terminals are connected to the windings of the stator.

12. The drive apparatus according to claim 11, wherein:
the coil terminals are bent in radial directions, and are connected to the windings of the stator by utilizing accommodation spaces provided in the radial directions near the semiconductor modules.

13. The drive apparatus according to claim 12, wherein:
the accommodation spaces near the semiconductor modules are provided on the radially outer sides of the semiconductor modules.

14. The drive apparatus according to claim 1, wherein:
specific ones of the plurality of semiconductor modules are preliminarily interconnected through a bus bar to form a module unit.

15. The drive apparatus according to claim 1, wherein:
the heat sink is integrally formed with a same material as that of the motor case.

16. The drive apparatus according to claim 1, wherein:
the heat sink is configured so that the side wall surface thereof is tilted with respect to the center line of the shaft.

17. The drive apparatus according to claim 16, wherein:
the side wall surface is tilted to approach the center line of the shaft as distanced away from an end of the motor case.

18. The drive apparatus according to claim 16, wherein:
the side wall surface is tilted to recede from the center line of the shaft as distanced away form an end of the motor case.

19. The drive apparatus according to claim 1, wherein:
a specific one of the plurality of semiconductor modules includes a semiconductor chip forming a semiconductor switching element for protection of the switching elements from reverse connection.

20. The drive apparatus according to claim 1, wherein:
the plurality of semiconductor modules have terminals, which are dedicated to the capacitors in the center line direction; and the capacitors are disposed to have the terminals thereof connected directly to the dedicated terminals.

* * * * *